United States Patent
Kim

(10) Patent No.: US 10,671,249 B2
(45) Date of Patent: *Jun. 2, 2020

(54) DEVICE AND METHOD FOR ORGANIZING AND DISPLAYING INSTANT MESSAGES IN VARIOUS STRUCTURED FASHIONS

(71) Applicant: Byung Jin Kim, Seoul (KR)

(72) Inventor: Byung Jin Kim, Seoul (KR)

(*) Notice: Subject to any disclaimer, the term of this patent is extended or adjusted under 35 U.S.C. 154(b) by 18 days.

This patent is subject to a terminal disclaimer.

(21) Appl. No.: 16/021,885

(22) Filed: Jun. 28, 2018

(65) Prior Publication Data

US 2018/0307389 A1  Oct. 25, 2018

Related U.S. Application Data

(63) Continuation of application No. 16/017,555, filed on Jun. 25, 2018, which is a continuation of application No. 15/393,199, filed on Dec. 28, 2016, now Pat. No. 10,114,525.

(51) Int. Cl.
| | |
|---|---|
| G06F 15/16 | (2006.01) |
| G06F 3/14 | (2006.01) |
| G06F 3/048 | (2013.01) |
| G06F 3/0482 | (2013.01) |
| H04L 12/58 | (2006.01) |
| G06F 8/38 | (2018.01) |
| G06F 3/0488 | (2013.01) |
| G06Q 10/10 | (2012.01) |
| G06F 40/106 | (2020.01) |
| G06F 40/137 | (2020.01) |

(52) U.S. Cl.
CPC ........ *G06F 3/0482* (2013.01); *G06F 3/04883* (2013.01); *G06F 3/04886* (2013.01); *G06F 8/38* (2013.01); *G06F 40/106* (2020.01); *G06F 40/137* (2020.01); *G06Q 10/107* (2013.01); *H04L 51/04* (2013.01)

(58) Field of Classification Search
CPC ..... G06Q 10/107; H04L 51/16; G06F 3/0481; G06F 9/451
See application file for complete search history.

(56) References Cited

U.S. PATENT DOCUMENTS

| | | |
|---|---|---|
| 5,226,117 A | 7/1993 | Miklos |
| 5,760,772 A | 6/1998 | Austin |
| 6,121,968 A | 9/2000 | Arcuri et al. |
| 7,134,218 B1 | 11/2006 | Mitchell |
| 7,421,461 B2 | 9/2008 | Prokop |
| 8,122,086 B1 | 2/2012 | King et al. |
| 8,332,477 B1 | 12/2012 | Kaiserlian et al. |

(Continued)

*Primary Examiner* — Jordany Nunez
(74) *Attorney, Agent, or Firm* — Hauptman Ham, LLP

(57) ABSTRACT

A device for organizing and displaying messages, the device comprising a processor, the processor being configured to: set a plurality of layout modes for organizing and displaying the messages exchanged among devices in a structured fashion; determine a layout mode for a chat session among the plurality of layout modes; display messages included in the chat session in the determined layout mode; and adjust the textbox-widths of all messages whenever a predetermined event occurs, wherein the event comprises at least one of a rotation of the device, sending or receiving of at least one message, and an input of at least one command for a scheme of displaying messages.

15 Claims, 81 Drawing Sheets

(56) References Cited

U.S. PATENT DOCUMENTS

| | | | |
|---|---|---|---|
| 9,817,805 B1* | 11/2017 | Markman | G06F 17/241 |
| 2005/0234850 A1* | 10/2005 | Buchheit | G06Q 10/10 |
| 2005/0262203 A1 | 11/2005 | Buchheit et al. | |
| 2006/0224992 A1 | 10/2006 | Rossi et al. | |
| 2006/0253796 A1 | 11/2006 | Wang et al. | |
| 2007/0198930 A1* | 8/2007 | Chu | G06F 9/451 |
| | | | 715/713 |
| 2007/0282956 A1 | 12/2007 | Staats | |
| 2008/0005234 A1 | 1/2008 | Newnam Giardino et al. | |
| 2008/0082607 A1 | 4/2008 | Sastry et al. | |
| 2008/0148181 A1* | 6/2008 | Reyes | G06F 3/0482 |
| | | | 715/801 |
| 2010/0185665 A1* | 7/2010 | Horn | G06Q 10/107 |
| | | | 707/769 |
| 2010/0211889 A1 | 8/2010 | Durazo et al. | |
| 2010/0229127 A1 | 9/2010 | Williams | |
| 2010/0287249 A1* | 11/2010 | Yigang | G06Q 10/107 |
| | | | 709/206 |
| 2011/0041082 A1 | 2/2011 | Nguyen | |
| 2012/0124483 A1 | 5/2012 | Zuckerberg et al. | |
| 2012/0143972 A1 | 6/2012 | Malik et al. | |
| 2012/0306748 A1* | 12/2012 | Fleizach | G06F 3/033 |
| | | | 345/161 |
| 2013/0021377 A1 | 1/2013 | Doll | |
| 2013/0036177 A1* | 2/2013 | Leeder | G06Q 10/107 |
| | | | 709/206 |
| 2014/0280616 A1* | 9/2014 | Ramanathan | H04L 51/22 |
| | | | 709/206 |
| 2015/0205465 A1* | 7/2015 | Robison | G06F 3/0484 |
| | | | 715/744 |

\* cited by examiner

Hi  ~ 700
Hello World !!!  ~ 702
ABCDEFGHIJKLMNOPQRSTUVWXYZ
ABCDEFGHIJKLMNOPQRSTUVWXYZ  ~ 706
⋮
←—— 704 ——→
Fig. 7A
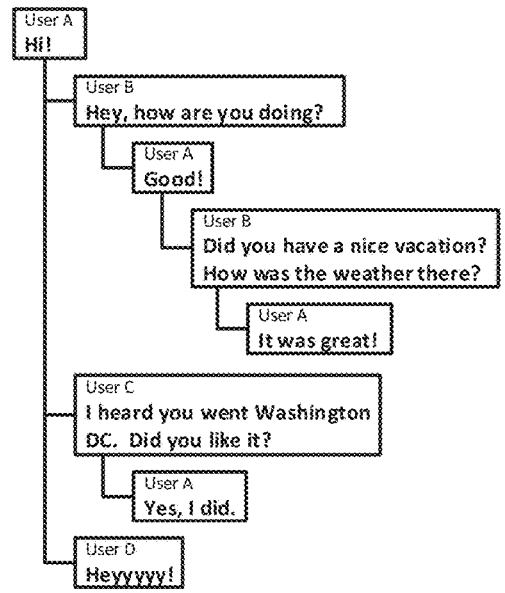
Fig. 7B
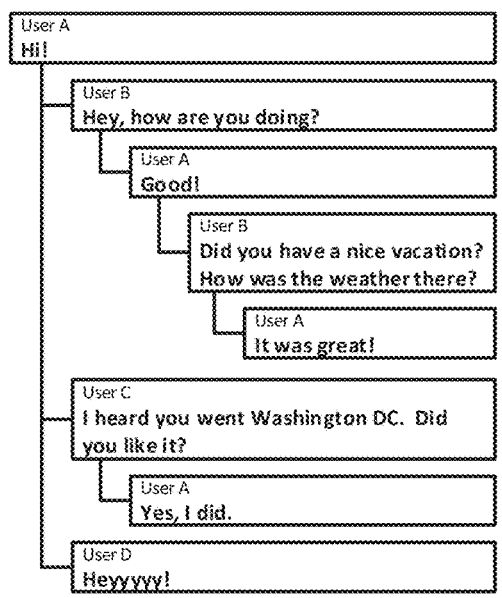
Fig. 7C

| Name of RWE | | Reference-Width Equations and Reference-Depth Equations | |
|---|---|---|---|
| Maximum of Maximums (MoM) | Intra-DE | $T_k = max\{t_k^1, t_k^2, t_k^3, ...\}$ | |
| | Inter-DE | $R = max\{T_0, T_1, T_2, ..., T_d\} = T_k$ | |
| | RDE | $n$ such that $T_n = max\{T_0, T_1, T_2, ..., T_d\}$ | |
| Average of Maximums (AoM) | Intra-DE | $T_k = max\{t_k^1, t_k^2, t_k^3, ...\}$ | |
| | Inter-DE | $R = (T_0 + T_1 + \cdots + T_d)/(d+1)$ | |
| | RDE | $n$ such that $T_n = max\{T_0, T_1, T_2, ..., T_d\}$ | |
| Normalization of Maximums (NoM) | Intra-DE | $T_k = max\{t_k^1, t_k^2, t_k^3, ...\}$ | $D$ = depth limit<br>$k = 0, 1, 2, ..., d$<br>$0 \leq d \leq D$ |
| | Inter-DE | $N = T_k/M_k = max\{T_0/M_0, T_1/M_1, T_2/M_2, ..., T_d/M_d\}$<br>$R = N \cdot M_k$ | |
| | RDE | $n$ such that $T_n/M_n = max\{T_0/M_0, T_1/M_1, T_2/M_2, ..., T_d/M_d\}$ | |
| Average of Normalized Maximums (AoNM) | Intra-DE | $T_k = max\{t_k^1, t_k^2, t_k^3, ...\}$ | Number of statements at depth $k$:<br>$a_k$<br><br>Total number of statements<br>$a = \sum_{k=0}^{d} a_k$ |
| | Inter-DE | $N = (T_0/M_0 + T_1/M_1 + ... + T_d/M_d)/(d+1)$<br>$R = N \cdot M_k, \{T_k/M_k = max\{T_0/M_0, T_1/M_1, ..., T_d/M_d\}\}$ | |
| | RDE | $n$ such that $T_n/M_n = max\{T_0/M_0, T_1/M_1, T_2/M_2, ..., T_d/M_d\}$ | |
| Maximum of Averages (MoA) | Intra-DE | $T_k = (t_k^1 + t_k^2 + t_k^3 + \cdots)/a_k$ | |
| | Inter-DE | $R = max\{T_0, T_1, T_2, ..., T_d\}$ | |
| | RDE | $n$ such that $T_n = max\{T_0, T_1, T_2, ..., T_d\}$ | |
| Average of Averages (AoA) | Intra-DE | $T_k = (t_k^1 + t_k^2 + t_k^3 + \cdots)/a_k$ | |
| | Inter-DE | $R = (T_0 + T_1 + \cdots + T_d)/(d+1)$ | |
| | RDE | $n$ such that $T_n = max\{T_0, T_1, T_2, ..., T_d\}$ | |
| Average of Text-Lengths (AoT) | Intra-DE | $T_k = (t_k^1 + t_k^2 + t_k^3 + \cdots)$ | |
| | Inter-DE | $R = (T_0 + T_1 + \cdots + T_d)/a$ | |
| | RDE | $T_n = max\{T_0, T_1, T_2, ..., T_d\}$ | |
| Fixed Textbox-Width (FTW) | | $w_k = M_k$ | |

Fig. 14

① 
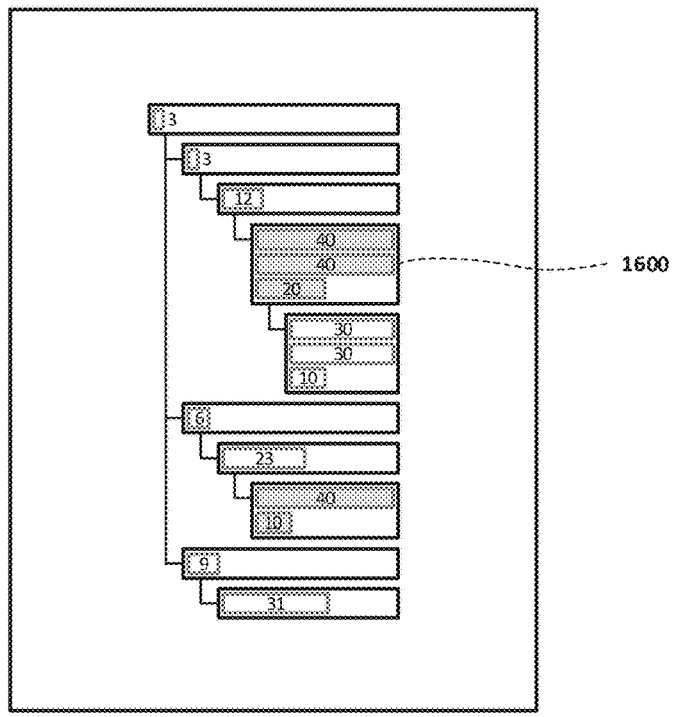
Actual Screen of a Device in Portrait Mode
② 
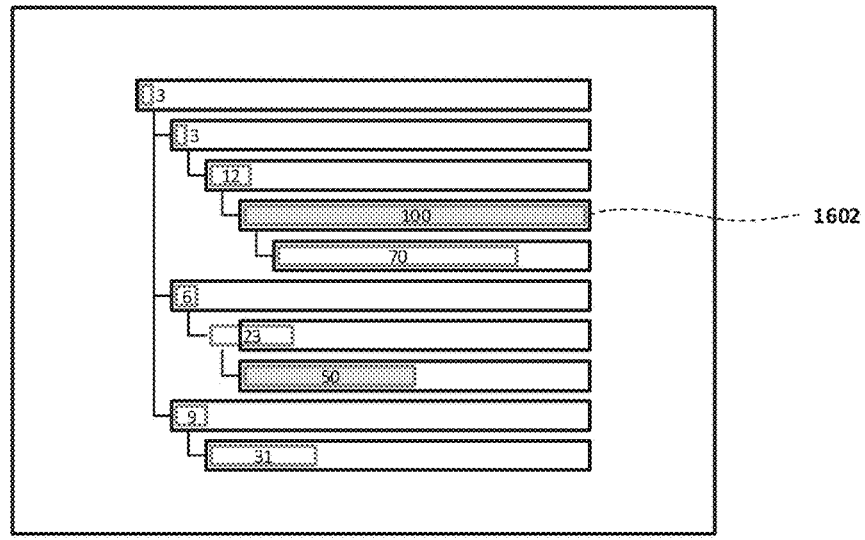
Actual Screen of a Device in Landscape Mode
Fig. 16A

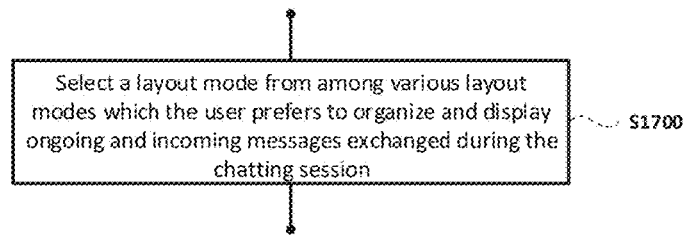
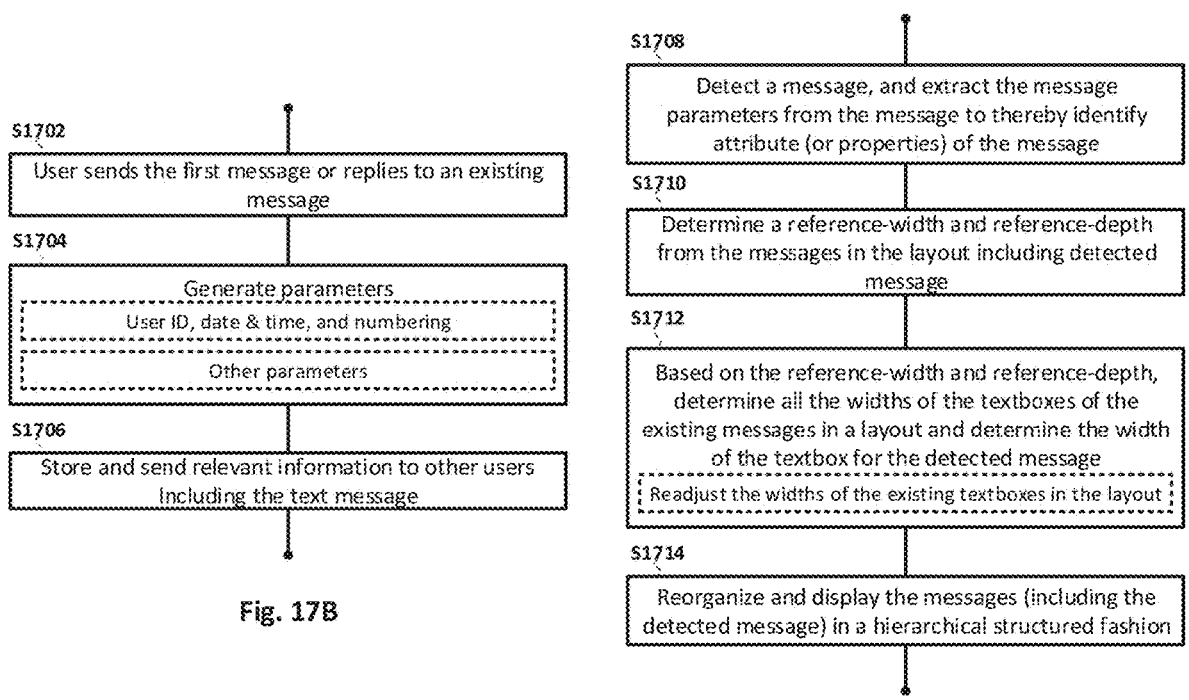

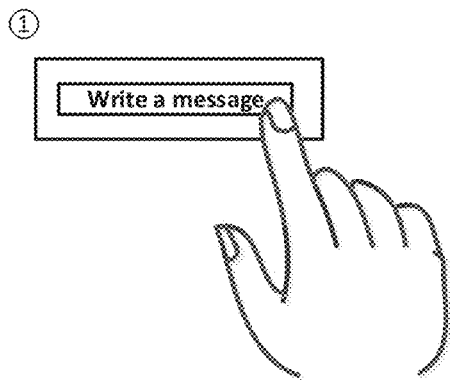
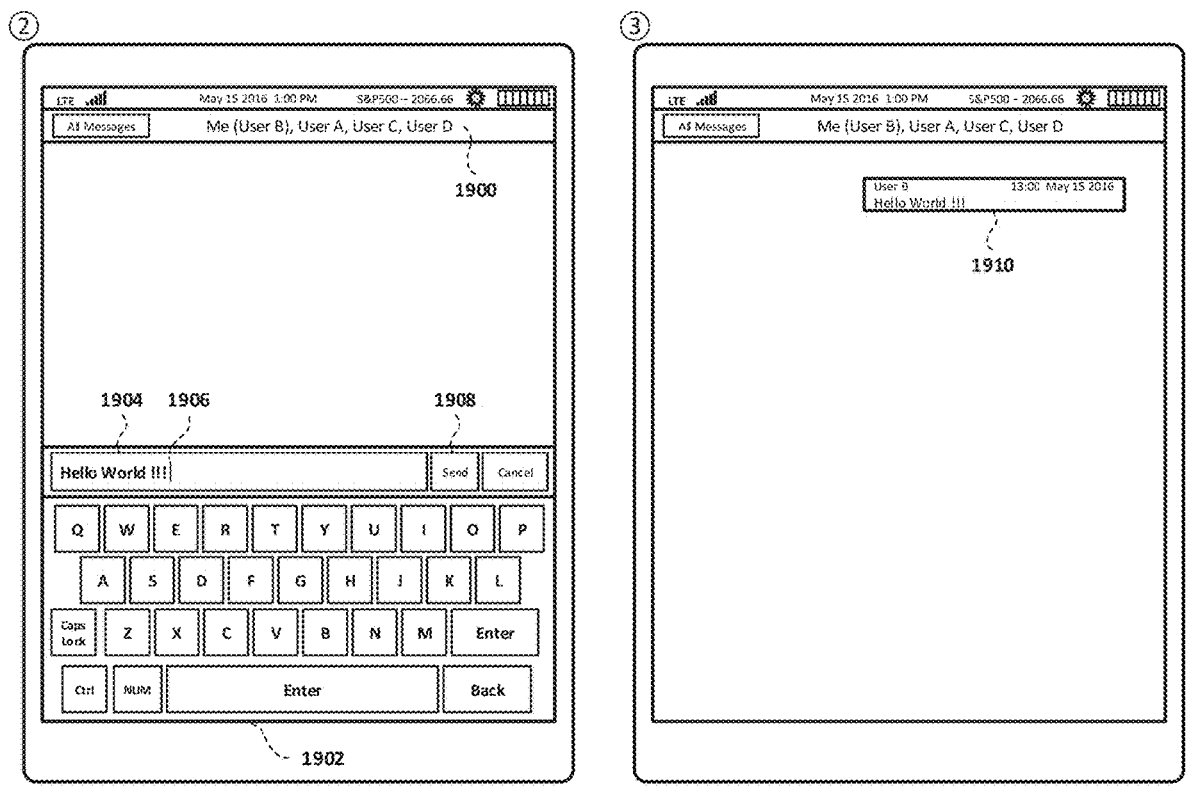
Fig. 19

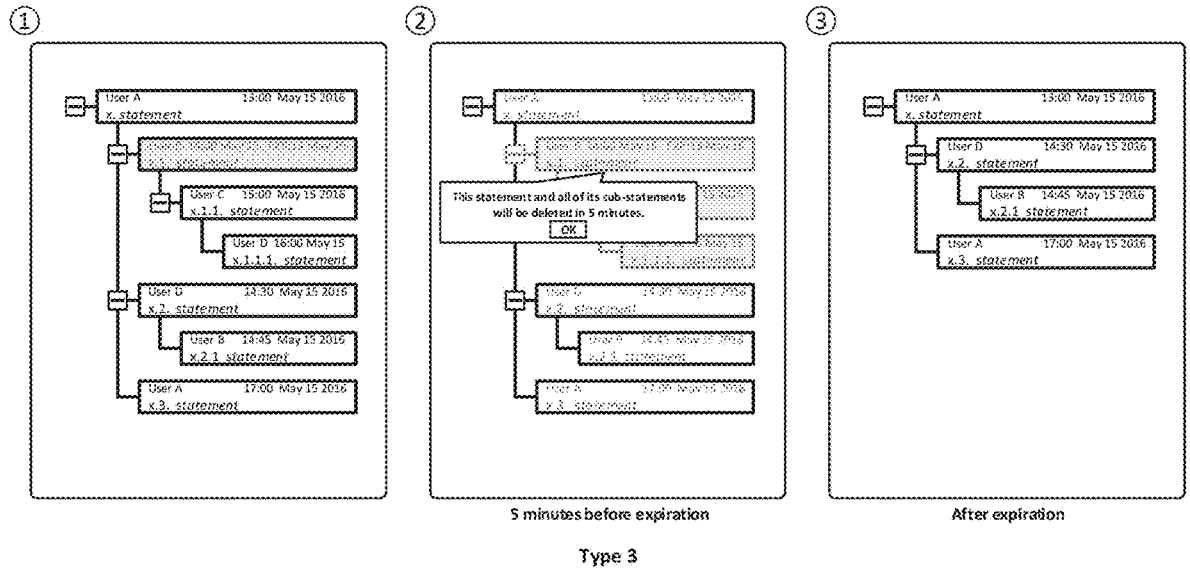
Type 3
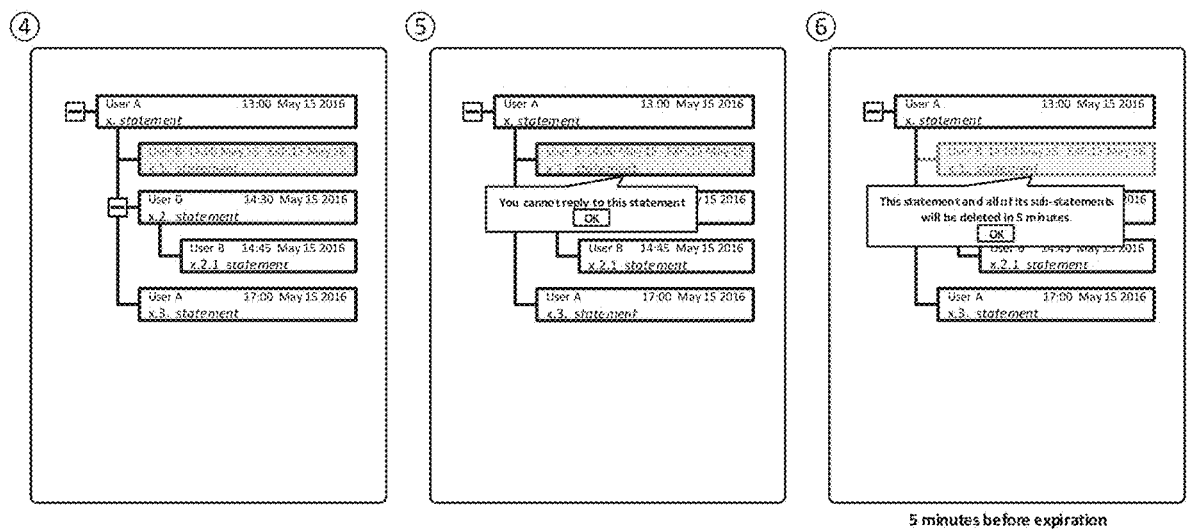
Type 4
Fig. 21C

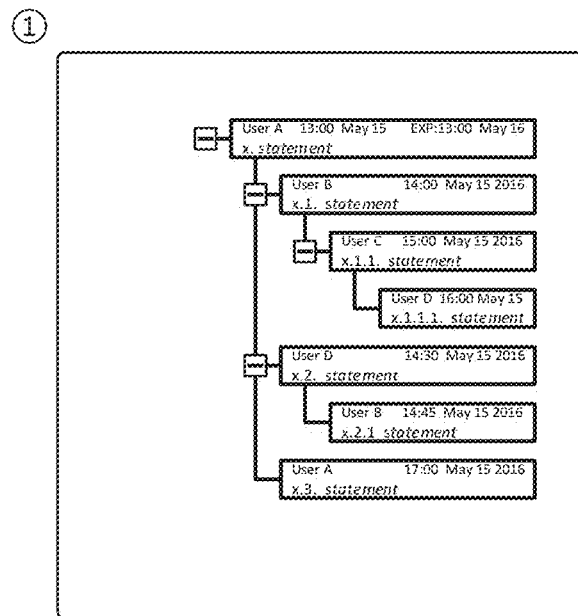
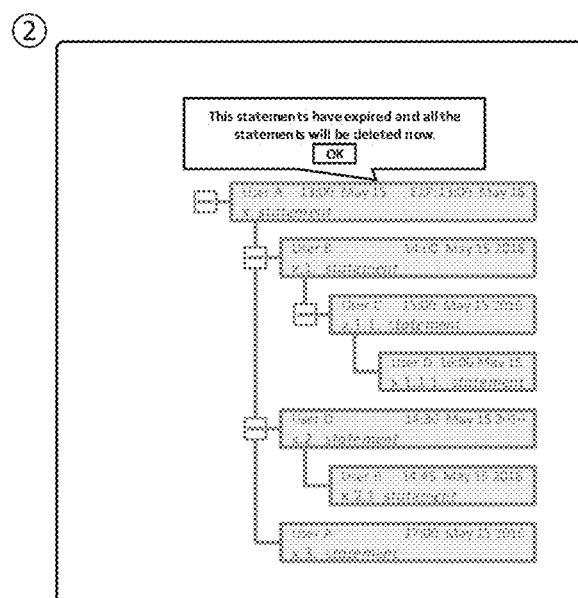
Fig. 21D

①

| Command | Internalized | Externalized | Customized | Tag |
|---|---|---|---|---|
| | 0 | 0 | 1 | 1 |
| | 0 | 1 | 0 | 2 |
| | 0 | 1 | 1 | 3 |
| | 1 | 0 | 0 | 4 |
| | 1 | 0 | 1 | 5 |
| | 1 | 1 | 0 | 6 |
| | 1 | 1 | 1 | 7 |

②

| Reply | Collapse | Expand | Hide | Show | Delete | Modify | UBD | Invert | Revert | Increase | Decrease | Collapse All | Expand All | Hide All | Show All | Delete All | UBD All |
|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 | 3 | 3 | 3 | 3 | 3 | 3 |
| 4 | 4 | 4 | 4 | 4 | 4 | 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 | 5 | 5 | 5 | 5 | 5 | 5 |
| 6 | 6 | 6 | 6 | 6 | 6 | 6 | 6 | 6 | 6 | 6 | 6 | 6 | 6 | 6 | 6 | 6 | 6 |
| 7 | 7 | 7 | 7 | 7 | 7 | 7 | 7 | 7 | 7 | 7 | 7 | 7 | 7 | 7 | 7 | 7 | 7 |

Number of possible combinations : $7^{18}=1,628,413,597,910,449$

③

| Reply | Collapse or Expand | Hide or Show | Delete | Modify | UBD | Invert or Revert | Incr. or Decr. | CA or EA | HA or SA | Delete All | UBD All |
|---|---|---|---|---|---|---|---|---|---|---|---|
| 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 |
| 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 |
| 6 | 6 | 6 | 6 | 6 | 6 | 6 | 6 | 6 | 6 | 6 | 6 |
| 7 | 7 | 7 | 7 | 7 | 7 | 7 | 7 | 7 | 7 | 7 | 7 |

Number of possible combinations :
$7^{12}=13,841,287,201$ for non-leaf-statement and $7^8=5,764,801$ for leaf-statements

Fig. 32A

DEVICE AND METHOD FOR ORGANIZING AND DISPLAYING INSTANT MESSAGES IN VARIOUS STRUCTURED FASHIONS

CROSS REFERENCE TO RELATED APPLICATION

This application is a continuation application of a U.S. patent application Ser. No. 16/017,555 filed on Jun. 25, 2018, which is a continuation application of a U.S. patent application Ser. No. 15/393,199 filed on Dec. 28, 2016, which are hereby incorporated by reference for all purposes as if fully set forth herein.

TECHNICAL FIELD

The present disclosure relates to a device and a method for organizing instant messages in various structured fashions, and providing a user interface for displaying the organized instant messages on a display.

BACKGROUND

The statements in this section merely provide background information related to the present disclosure and do not constitute prior art.

When users interact with one another via instant messaging (hereinafter referred to as "IM"), it is the case both party are not available to respond to any questions or remarks the other has sent. The inventor(s) has noted that one user sends number of questions to the other and the other can answer these questions at once. When this happens, the "replier" faces mental burden to state which question sender(s) is replying to and if this is not stated clearly the sender(s) faces the mental burden of figuring out which message is an answer to the question that sender(s) had sent. The inventor(s) has experienced that intuitively, the situation can get even worse if more than two users are interacting with one another via IM. The inventor(s) has experienced that if or when a plurality of users is sending IMs via a messaging software (or application), a user may be confused or annoyed in distinguishing messages received for the plurality of users via IM, and feel burden on identifying who send each of the messages per each sender. The inventor(s) has noted that a known IM software or a known IM application does not provide any user interface in a display fashion to user friendly represent on a touch screen display the messages interacted or exchanged between the replier and sender(s).

When users interact with one another via instant messaging (hereinafter referred to as "IM") where all the text messages are organized in hierarchical fashion, users may want to edit part of the structure itself or text messages displayed within this structure. Users are allowed to do so using carefully designed set of commands (or set of processes) within framework of the hierarchical structure. Especially, when the physical widths or heights of the hierarchical structure needs to be adjusted whenever text messages are sent or received, it is important that these set of commands operate within the framework of the structure. Additionally, not only the commands operating logically is important but also providing a convenient interface to the users so they can apply the commands with ease is also important. In other words, it is preferable that the device provides the flexibility to the user so the user can set these commands in a way where some of them are readily available on the screen, some of them hidden together and can be displayed when necessary, or some of them executed by simple hand gestures.

SUMMARY

In accordance with some aspect of the present disclosure, a device for organizing and displaying messages is provided. The device comprises a processor. The processor being configured to: set a plurality of layout modes for organizing and displaying the messages exchanged among devices in a structured fashion; determine a layout mode for a chatting session among the plurality of layout modes; display messages included in the chatting session in the determined layout mode; and adjust the textbox-widths of all messages whenever a predetermined event occurs.

In accordance with another aspect of the present disclosure, a device for organizing and displaying messages is provided. The device comprises a processor, the processor being configured to: establish a plurality of layout modes for organizing and displaying the messages exchanged among the devices in a structured fashion; determine a layout mode for a chatting session among the plurality of layout modes; display messages included in the chatting session in the determined layout mode; and adjust the textbox-widths of all messages whenever a predetermined event occurs, wherein the event comprises at least one of a rotation of the device, sending or receiving of at least one message, and an input of at least one command for a scheme of displaying messages.

BRIEF DESCRIPTION OF THE DRAWINGS

The above and other objects, features and advantages of the present disclosure will be more apparent from the following detailed description taken in conjunction with the accompanying drawings, in which:

FIGS. 7A-7I illustrate exemplary diagrams explaining the rationale behind present disclosure.

FIG. 14 is a table illustrating various Reference Width Equations (RWEs) and Reference Depth Equations (RDEs).

FIG. 16A consists of exemplary diagrams illustrating layouts in portrait mode and landscape mode.

FIG. 17A consists of a flowchart illustrating a method of selecting layout mode.

FIG. 17B consists of a flowchart illustrating a method of sending a text message with the relevant parameters (information).

FIG. 17C consists of a flowchart illustrating a method of extracting relevant parameters from the detected text message.

FIG. 19 consists of exemplary diagrams illustrating a user sending a text message and how it is displayed.

FIG. 21A-21D consists of exemplary diagrams illustrating a method of applying time-expiring text messages.

FIG. 32A consists of tables illustrating all the possible combinations of how each command can be presented—i.e., internalized, externalized, or customized.

FIG. 33I consists of flowcharts illustrating methods of Hide, Show, Hide All, and Show All commands.

DETAILED DESCRIPTION

Hereinafter, exemplary embodiments of the present disclosure will be described with reference to the accompanying drawings.

The present disclosure relates to a device and a method for organizing instant messages in various hierarchically structured fashions by considering earlier precedent message(s) among exchanged messages, and providing user interface for displaying the organized instant messages on a touch screen display in various fashions. The disclosed embodiments relate to multifunction devices with touch screen displays to enable the users to reply to received or sent messages in instant messaging software (or applications) and manage the instant messages in a structured and consistent fashion.

Figure 1:
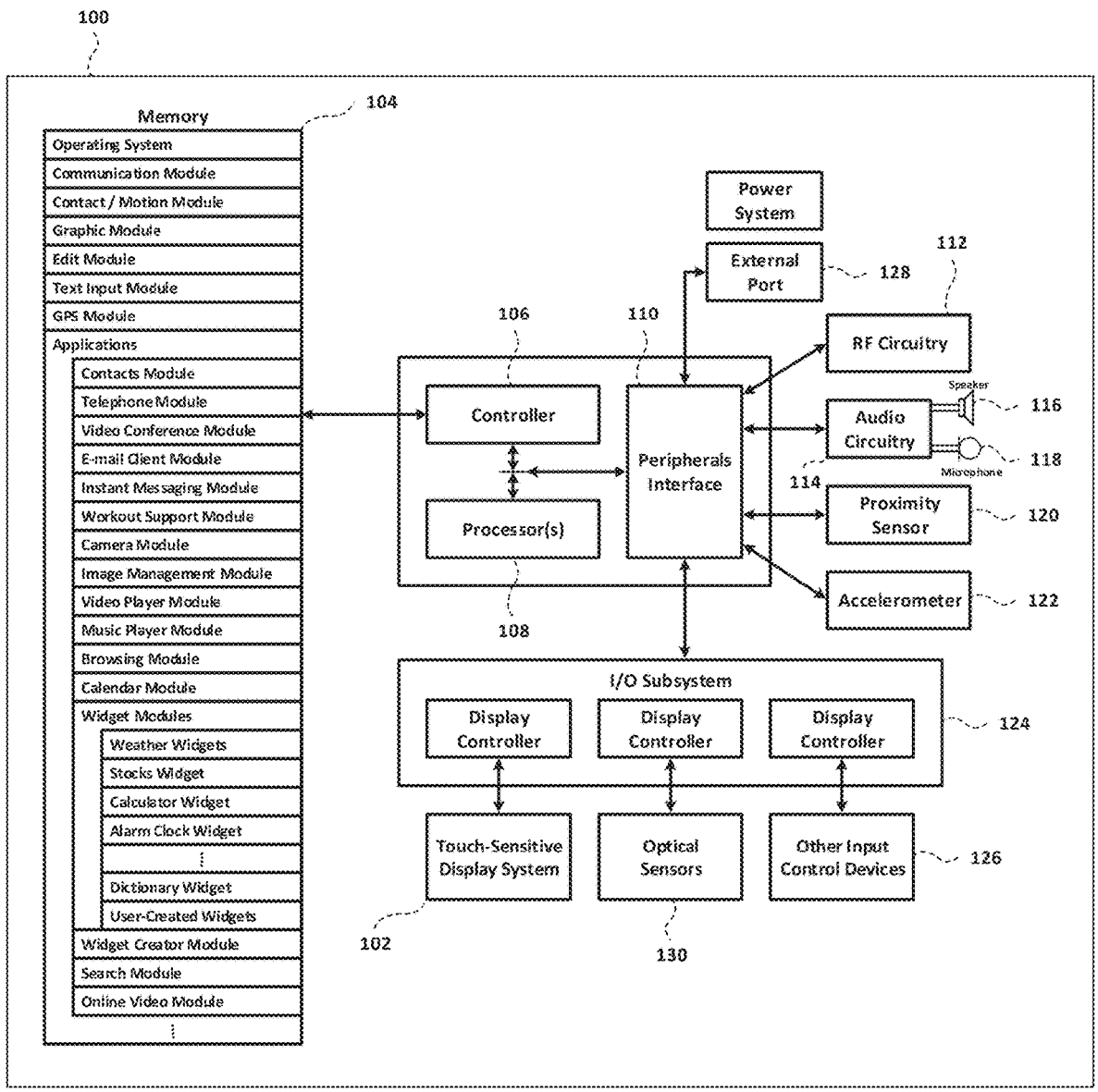
FIG. 1 is a schematic block diagram of a device according to at least one an exemplary embodiment of the present disclosure.

FIG. 1 is a schematic block diagram of a device according to at least one an exemplary embodiment of the present disclosure. The device 100 refers to a user device for transmitting and receiving instant messages via wire or wireless network(s), and corresponds to, for example, a mobile portable terminal, a multimedia player device, a navigation device, an educational device, a gaming system, a control device, a Personal Computer (PC), a laptop computer, a tablet PC, a Personal Digital Assistant (PDA) or the like. However, the device 100 is not limited thereto and may include all devices which can transmit/receive the instant messages through the wire or wireless network(s). The device 100 includes touch-sensitive display 102 (hereinafter, referred to as a touch screen or a touch screen display) configured to input text messages, image and video messages and display the messages transmit to and/or received from other users. The touch-sensitive display 102 refers to a "touch screen" or a "touch-sensitive display system" which is equipped with an input panel for sensing and/or detecting user's motions, and contact(s) initiated by, for example, user's finger(s) or a stylus pen. The device 100 also includes a memory 104 (which may include one or more non-transitory computer readable storage medium), a memory controller 106, one or more processors (e.g., microprocessors, or CPU's) 108, a peripherals interface 110, RF circuitry 112, audio circuitry 114, a speaker 116, a microphone 118, a proximity sensor 120, and accelerometer 122. The device 100 includes an input/output (I/O) subsystem 124, other input or control devices 126, and an external port 128, and one or more optical sensors 130. These components communicate over one or more communication buses or signal lines (indicated by bidirectional arrows). The device 100 is an exemplary embodiment of a portable multifunction device and that the device is embodied with more or fewer components than shown in FIG. 1, combines two or more components, or is embodied with a different configuration or arrangement of the components. The various components shown in the FIG. 1 are implemented in hardware, software, or a combination of both hardware and software, including one or more signal processing processor and/or circuits. Each component of the device 100 is implemented by one or more processors and/or application-specific integrated circuits (ASICs) to perform specific functions described hereinafter.

Figure 2:
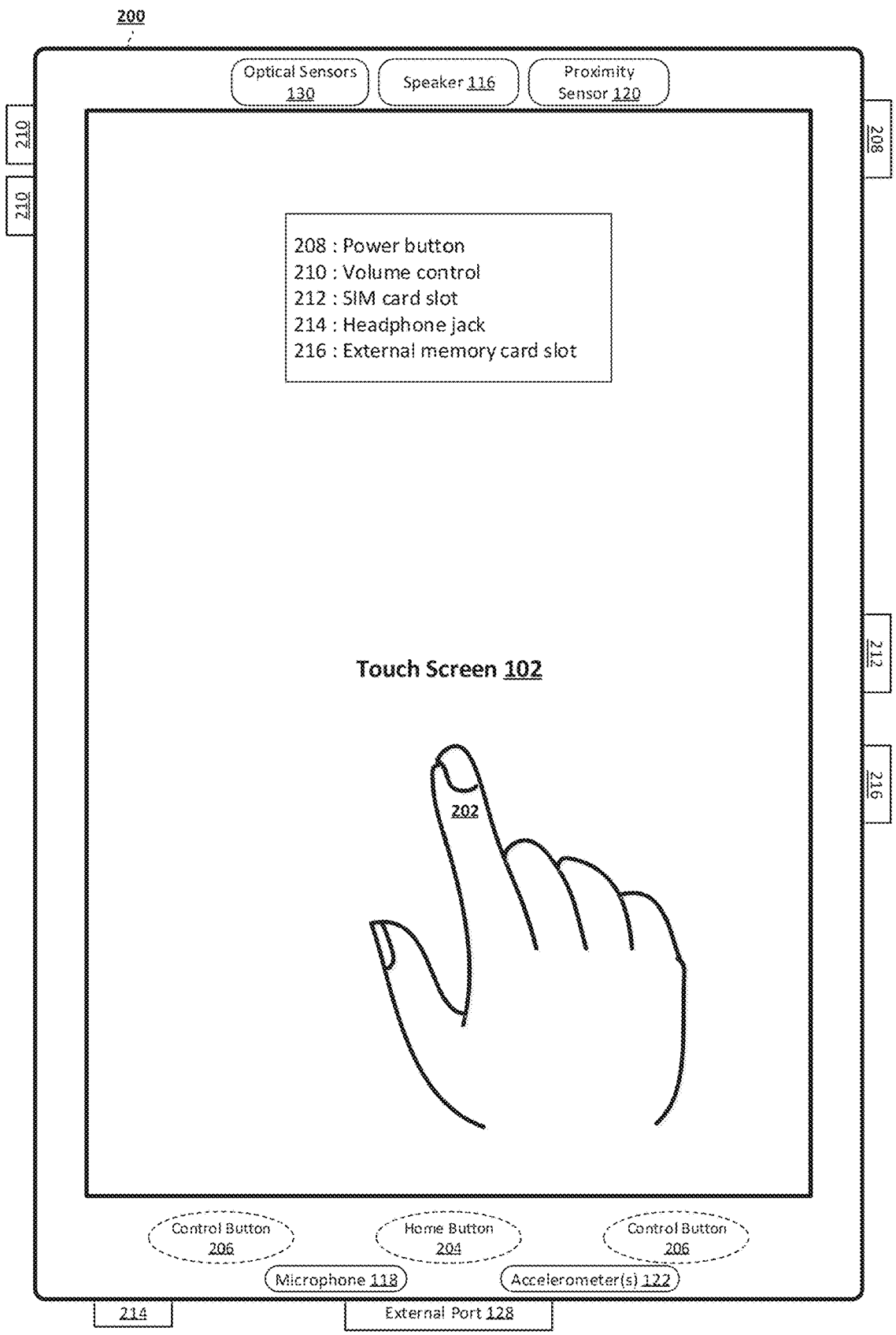
FIG. 2 is a schematic block diagram of a touch screen of a device according to at least one an exemplary embodiment of the present disclosure.

FIG. 2 is a schematic block diagram of a touch screen of a multifunction device according to at least one an exemplary embodiment of the present disclosure. Referring to FIG. 2, the touch screen 102 displays one or more graphics and/or texts within user interface (UI) of the device 200 (i.e., identical to the device 100 in FIG. 1). In some embodiments, as well as others described below, a user selects one or more of the graphics involve with predefined functions thereof by making contact or touching the graphics, for example, with one or more fingers' touches 202. In some embodiments, selection of one or more graphics occurs when the user breaks contact with the one or more graphics. In some embodiments, various types of the contact include, for example, a gesture, such as one or more taps, one or more swipes (from left to right, right to left, upward and/or downward) and/or a rolling of a finger (from right to left, left to right, upward and/or downward) that has made contact with the touch screen 102 (or camera sensor (now shown in Figures) to detect various motions) of the device 200. In some embodiments, inadvertent contact with a graphic does not select the graphic. For example, a swipe gesture that sweeps over an application icon does not select the corresponding application when the gesture corresponding to selection is a tap.

The device 200 also includes one or more physical buttons, such as "home" or menu button 204, and control button(s) 206. The menu button 204 or the control button(s) 206 are used to navigate to any application in a set of applications that is loaded in, and retrieved from, the memory 104 and be executed on the device 200. Alternatively, in some embodiments, the menu button 204 is alternatively or additionally implemented as a soft key embodied in a graphic user interface (GUI) in touch screen 102.

In one embodiment, the device 200 includes a touch screen 102, a menu button 204, control button(s) 206, a push button 208 for powering the device on/off and locking the device, volume adjustment button(s) 210, a Subscriber Identity Module (SIM) card slot 212, a head set jack 214, external memory card slot 216, and a docking/charging external port 128. The push button 208 is used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 detects a verbal input for activation or deactivation of some functions through the microphone 118.

Figure 3:
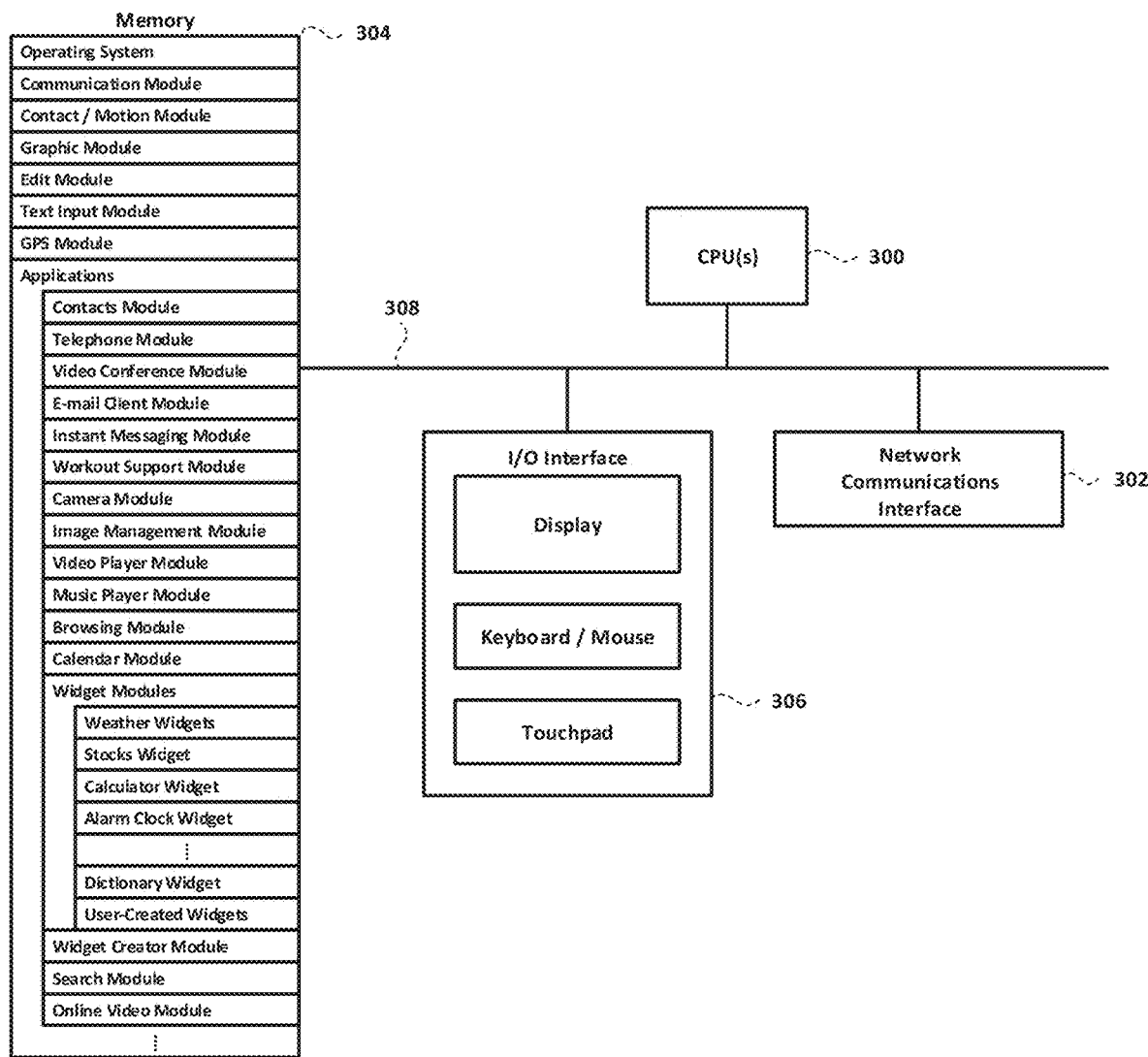
FIG. 3 is a schematic block diagram of a device according to at least one another exemplary embodiment of the present disclosure.

FIG. 3 is a schematic block diagram of a device according to at least one another exemplary embodiment of the present disclosure. Referring to FIG. 3, in some embodiments, the device 200 includes one or more processors (CPU's) 300 and one or more network or other communications interfaces 302. The device 200 includes memory 304. The memory includes, for example, high-speed random access memory, such as DRAM, SRAM, DDR RAM or other random access solid state memory devices; and includes non-volatile memory, such as one or more magnetic disk storage devices, optical disk storage devices, flash memory devices, or other non-volatile solid state storage devices. The device 200 includes input/output (I/O) interface 306 comprising of a display, which in some embodiment is a touch screen display 102, a keyboard and/or mouse (or other pointing device), and a touchpad. In the multifunction device 200, there are one or more communication buses 308 for interconnecting these components. The communication buses 308 include circuitry (sometimes called a chipset) that interconnects and controls communications between system components.

Figure 4:
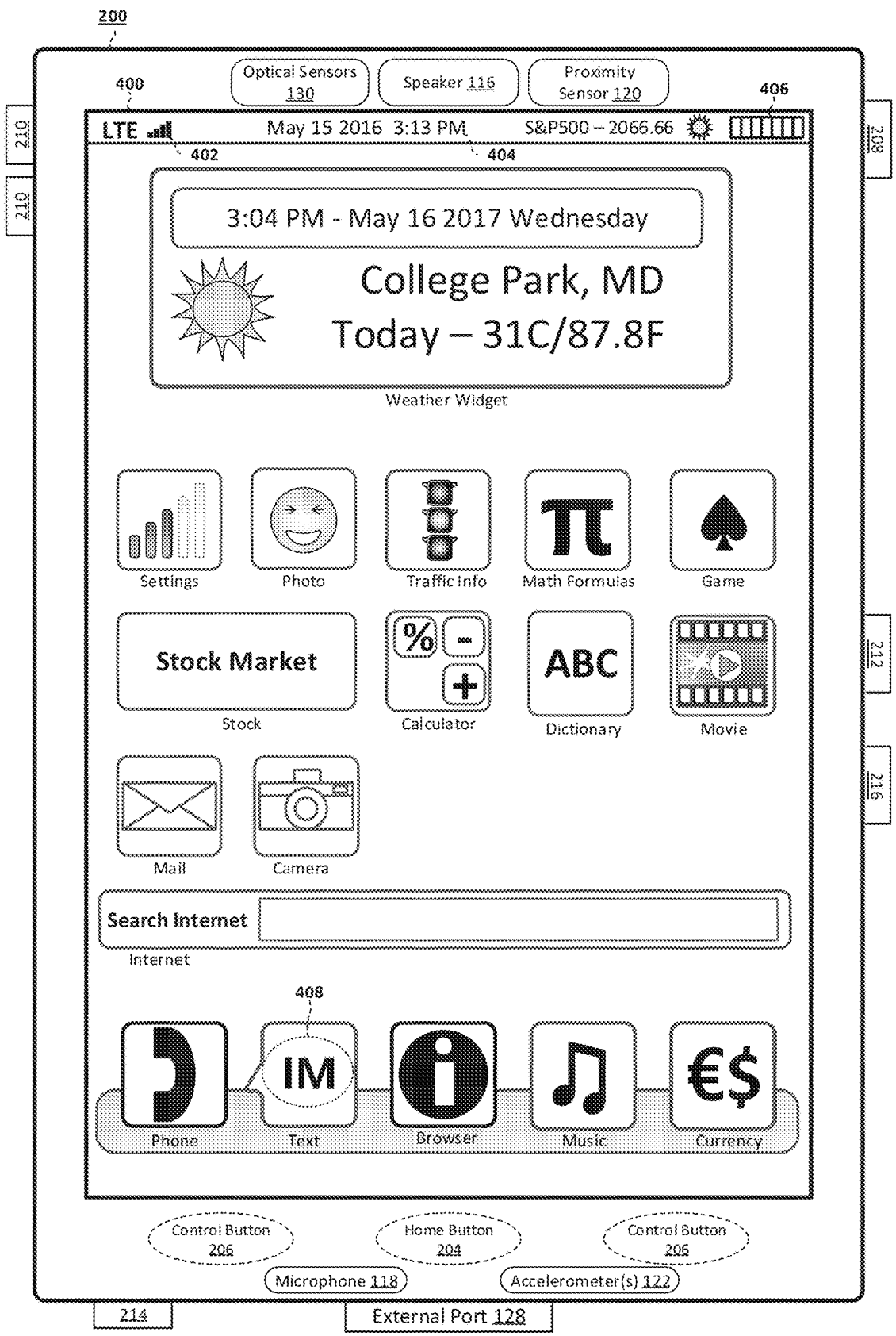
FIG. 4 is exemplary diagram illustrating user interfaces for a menu of applications on a device according to at least one an exemplary embodiment of the present disclosure.

FIG. 4 is an exemplary diagram illustrating user interfaces for a menu of applications on a device according to at least one an exemplary embodiment of the present disclosure. Similar user interface embodiments, user interface 400 includes the following elements, or a subset or superset thereof: signal strength indicator 402 for wireless communication(s), such as cellular and Wi-Fi signals, time 404, battery status indicator 406, and other information related to the device or user customized information such as stock quotes and weather.

The interface 400 includes icons for applications, such as, for example, settings (general setting of the device), photos, traffic info, math formulas, gams, calculators, dictionary, movies, mail, camera, and so on. The interface 400 includes widgets, such as, for example, weather forecast of designated area and stock market information widget that provides the user with stock quotes and news.

The interface 400 also highlights or groups number of frequently used icons, such as, for example, phone, text, internet browser, music player, and currency inverter.

Figure 5:
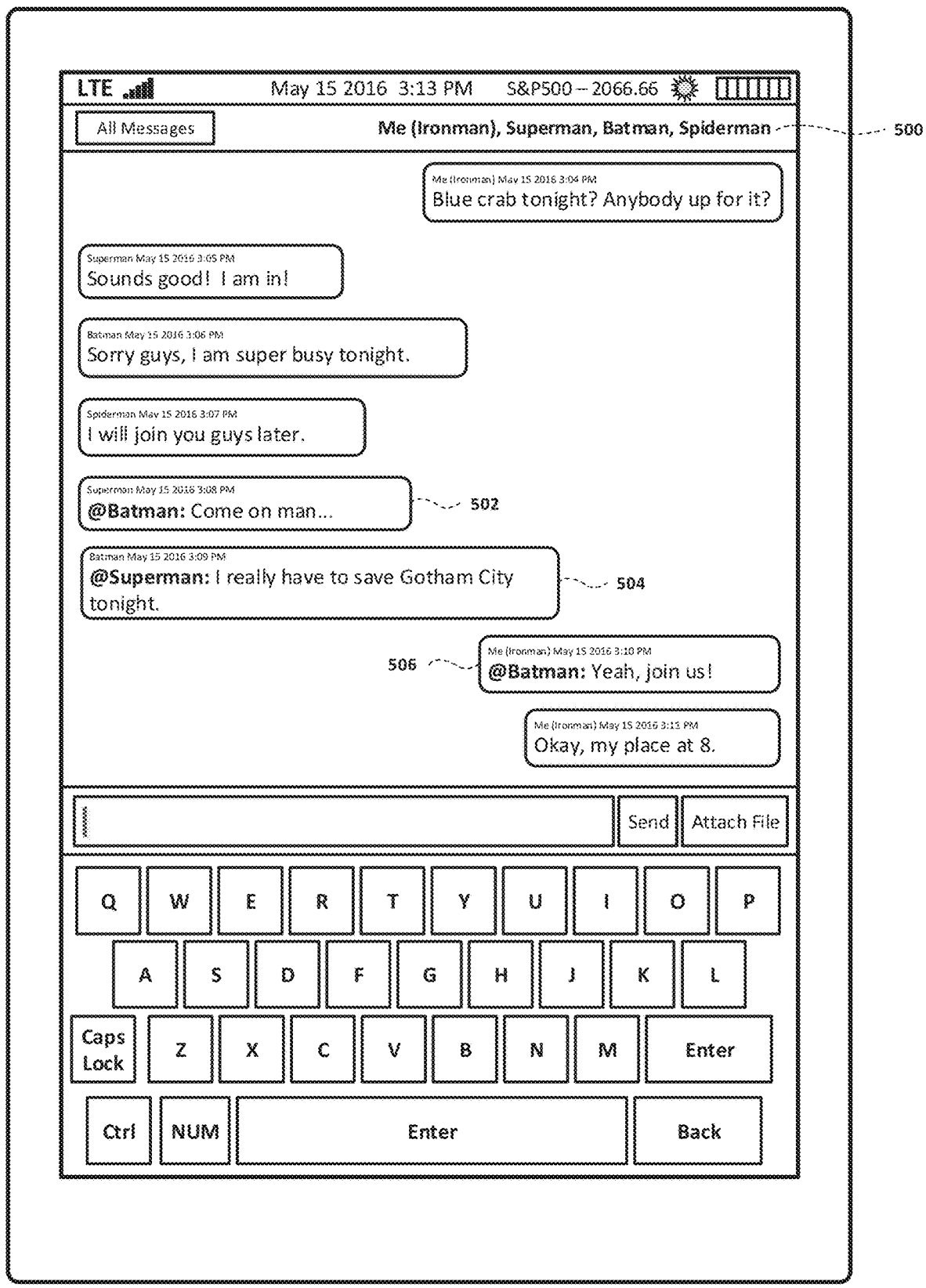
FIG. 5 is an exemplary diagram illustrating a situation where group of four people are exchanging instant messages.

FIG. 5 is an exemplary diagram illustrating group of four people (500; Me, Superman, Batman, Spiderman) are exchanging instant messages (or text messages). In the situation of exchanging the instant messages among four members in the same session, the scheme of displaying the text messages as shown in FIG. 5 can cause a recipient(s) (a user(s)) to distinguish (identify, organize or classify) the text messages, and be even more confusing than two-party instant messaging if it is not clear which text message is directed to whom, because the recipient(s) is required some effort to by identify or track who each of the text messages in such a general scheme displayed in FIG. 5 is originated from. To avoid confusion, users indicate to whom they are replying to by, for example, adding a predefined identification or symbol (identifier or operator) (e.g., @+target recipient). For example, in 502, 504, and 506, users have used @ (at) sign (i.e., a symbol of an operator to designate the target recipient for a specific text message) to indicate whom they are responding to. This is inconvenient for users because it requires unnecessary time, and annoys users, for inputting the operator symbol (i.e., @) and the target recipient per each text message from the members of the group, and this system of FIG. 5 imposes unnecessary mental burden on the repliers and receivers.

Figure 6:
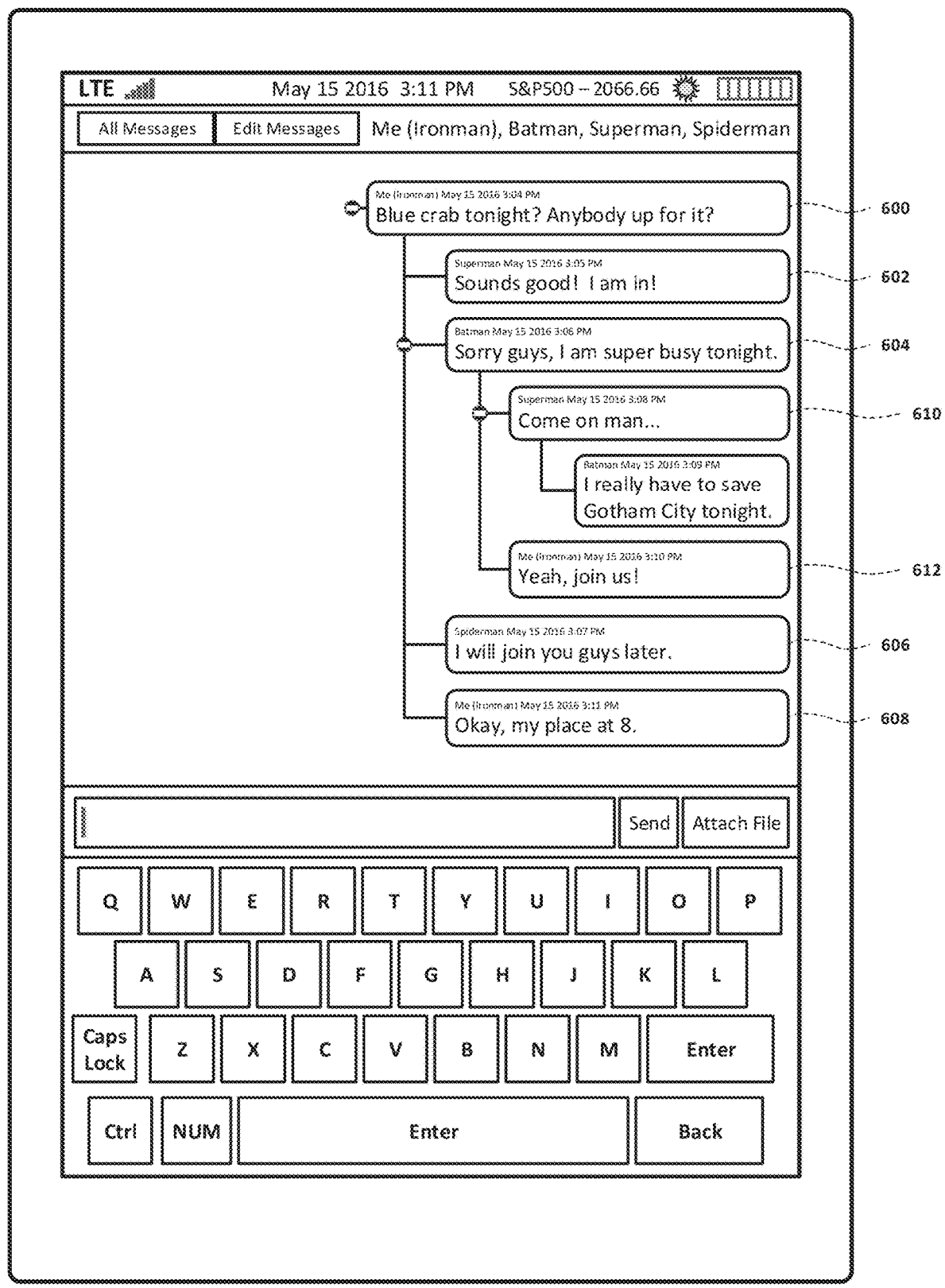
FIG. 6 is an exemplary diagram illustrating a messaging display according to at least one an exemplary embodiment of the present disclosure.

FIG. 6 is an exemplary diagram illustrating a messaging display according to at least one an exemplary embodiment of the present disclosure. As illustrated in FIG. 6, the reply of any text message is displayed in a hierarchical structure by placing the reply text message below the corresponding text message the user intended to reply to. Notice that the reply of a text message is placed below a "target" text message (e.g., outgoing text message of "Blue crab tonight? Anybody up for it?" in FIG. 6) with indentation. So, all the text messages below the target text message with same amount of indentation grouped as the most relevant replies to the target text message (i.e., the replies (602, 604, 606, and 608) directly depending on the target text message (600)). For example, the first text message 600 is outgoing message originated from the sender (i.e., Me; Ironman)). The text messages 602, 604, 606, and 608 are all replies to, and directly depending upon, the first text message (600). The four replies (i.e., text messages 602, 604, 606 and 608) are directly related to the first text message 600. The user identifies the four text messages are replies related to the text message 600 since they are placed below the text message 600 with same amount of indentations arranged from the position of the first text message 600. Also, the user (i.e., Me; Ironman)) identifies that text messages 610 and 612 are replies directly associated with text message 604 and are not directly related to, nor stemming from, text message 600. Again, the two replies 610 and 612 are identified as such since the two placed below the target text message (604) with equal amount of indentations arranged from the position of text message 604.

Hence, the present disclosure is to provide displaying IMs that present the users' interaction in a structured and organized fashion. The present disclosure is to provide systematically optimized (in a technical sense) way of integrating the said presentation for the device 100 with the touch screen display 102.

If and when a group of users can reply to already existing text message(s) and the interaction is visibly organized in hierarchical fashion, we call the system, Reply Messaging System (RMS).

In the following, FIG. 7A-7I, the idea and rationale of RMS are explained.

In known IM, the size of textboxes that contain user's text messages are optimized in a sense that the shorter the text message, the smaller the textbox, and the longer the text message, the bigger the textbox. Since the text messages users send to one another are clearly in random lengths, these text messages are displayed in different sized textboxes. If or when this feature is not present then all the users' text messages, regardless of their lengths the text messages are placed in textboxes each of which has the same width in a textbox size.

As illustrated in FIG. 7A, when the device 200 displays a relatively short text message (e.g., text message 700), the width of the textbox that "wraps" the text message is also relatively shorter. When the device 200 displays a longer text message (702), the width of the textbox that wraps the text message also increases. Also, if or when a text message is longer than a certain width then the device 200 breaks the text message into multiple (text) lines and the width of the text message (704) and textbox (706) remain constant.

Now, if or when the device simply organizes all the text messages in a structured way without any mechanism to adjust the widths of the textboxes according to their relevance, the text messages are exemplarily displayed in FIG. 7B. In FIG. 7B, all the text messages are organized in a structured way but the widths of the textboxes are in random and do not provide users good readability and the placements of the textboxes look disorganized. In order to increase readability and make it organized, the widths of all the textboxes are adjusted as illustrated in FIG. 7C.

The collection of text messages in FIG. 7C is the end result of users' interactions. However, it does not illustrate how each instant message (IM) has progressed.

Figure 7D:
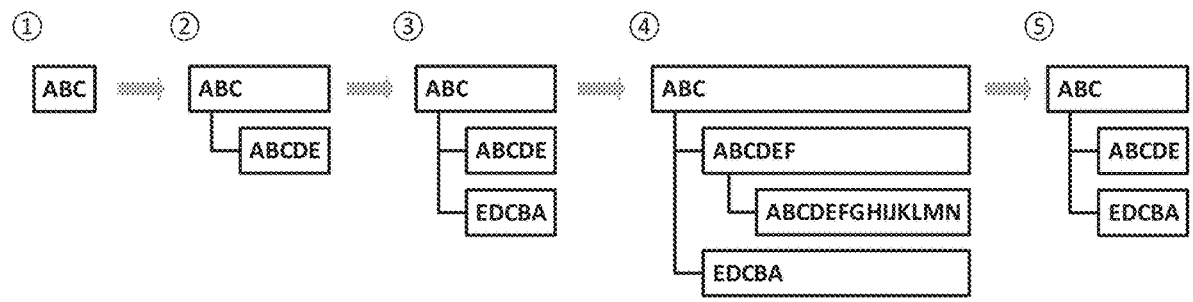

FIG. 7D illustrates this point and at the same time illustrates the fundamental characteristic of RMS. In ①of FIG. 7D, a user receives a text message ("ABC"). As illustrated, the textbox "wraps" the text where the width of the textbox is close to the actual length of the text "ABC". In ② of FIG. 7D, the user receives a longer text message ("ABCDE") that is reply to the first text message. Notice that the width of the textbox of the first text message ("ABC") has adjusted to form a specific appearance which is predefined. In ③ of FIG. 7D, the user receives another reply text message ("EDCBA") to the first text message. Since the text message is a reply to the first one, it is placed below the first reply. In ④ of FIG. 7D, the user receives another longer text message ("ABCDEFGHIJKLMN") and the widths of the textboxes of the first three text messages have adjusted to form the specific appearance. Additionally, the received text message ("ABCDEFGHIJKLMN") is the reply to, and directly depending upon, the second one ("ABCDEF"). In ⑤ of FIG. 7D, the last text message (i.e., "ABCDEFGHIJKLMN") was deleted from the device (or system). Notice that the widths of the textboxes of the first two text messages have adjusted (decreased) to be equal to the width of the text box having the longest width of textbox among the rest of textboxes.

FIG. 7D illustrates that, in RMS, widths of the textboxes changes depending on the text length of the incoming/outgoing text messages as well as deletion of any existing text message(s). Since the length of the outgoing or incoming text message is random, a procedure that calculates the "right" textbox width for each textbox detecting and analyzing the currently presenting messages in the chatting session is performed per each occurrence when a user sends/receives a text message (Note that the length of text message, e.g., "ABC" can be any positive real number where the unit can be pixels, number of characters, millimeter, centimeter, inch, and so on.). Therefore, in RMS, widths of all the textboxes are adjusted whenever the user sends or receives a text message by a set of rules using all the lengths of the messages during the chatting session that the device 200 sent to or received from other users who currently participate the chatting session. Moreover, the changes of the widths of the textboxes are carried out based on predefined rules so the collection of text messages is formed to have a specific appearance.

Figure 7E:
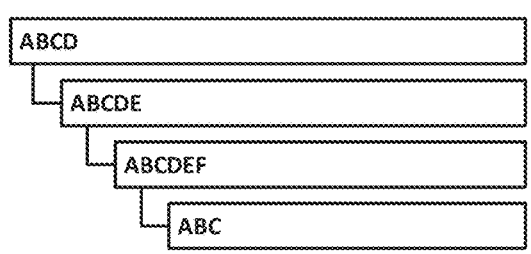
Figure 7F:
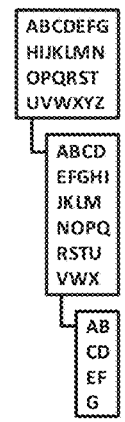

In RMS, the widths of the textboxes are calculated so it avoids extreme situations. As illustrated in FIG. 7E, the spaces in textboxes are overly redundant. On the other hand, as illustrated in FIG. 7F, the spaces in the textboxes are overly insufficient, giving a "squashed" feeling to the user. Therefore, the procedure (or a set of procedures) that determines the widths of the textboxes aims to increase readability and organization by keeping the balance between redundant spaces and insufficient spaces.

Realistically, widths of the textboxes cannot increase indefinitely for there is a physical limit to the device 200. Also, they cannot decrease to a point where the widths reach zero. Therefore, maximum width and minimum width of a textbox are defined and we call them max-widths and min-widths. When the widths of the textboxes are adjusted, the width of each textbox is adjusted within predefined max-widths and predefined min-widths.

Figure 7G:
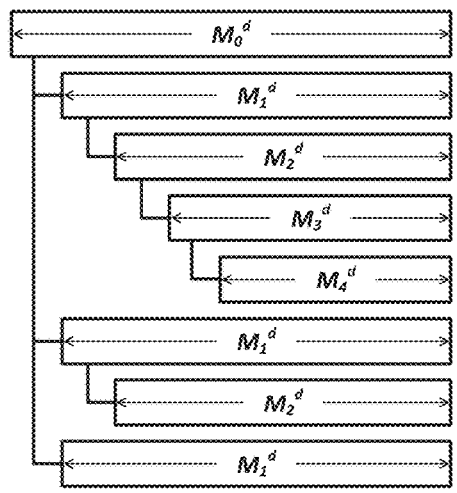

FIG. 7G illustrates the widths of all the textboxes those reached their max-widths which we denoted by $M_k^d$ (k, d=0, 1, 2, . . . ).

Figure 7H:
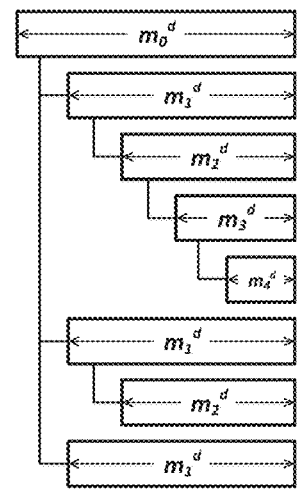
Figure 71:
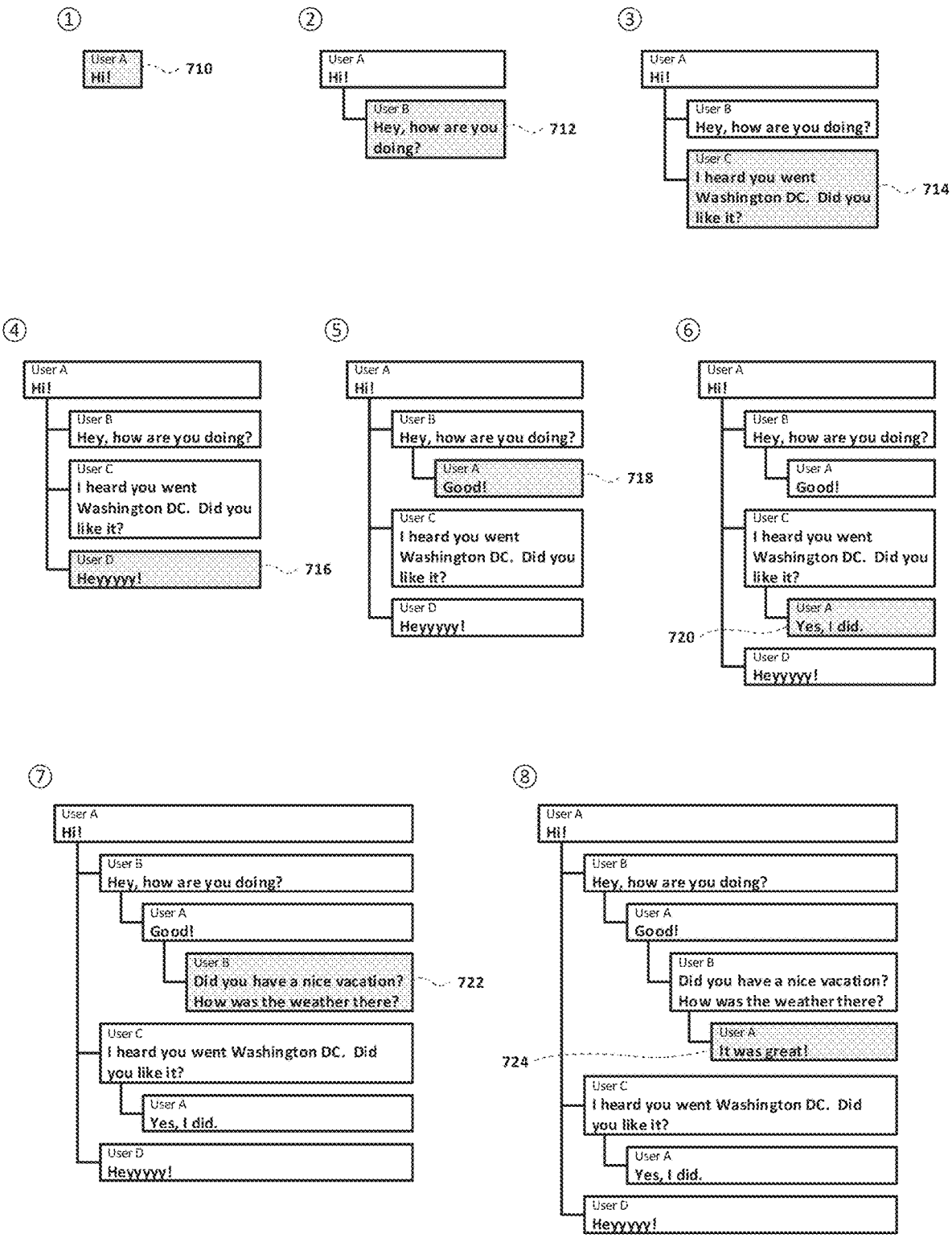

FIG. 7H illustrates the widths of all the textboxes those reached their min-widths which we denoted by $m_k^d$ (k, d=0, 1, 2, . . . ). When max-width and min-width are mentioned generally, the superscript d is dropped and are denoted by $M_k$ and $m_k$. The details of max-width and min-width are explained hereinafter. FIG. 7I illustrates an exemplary way of how the users (i.e., Users A thru User D in FIG. 7I) might have interacted in IM illustrated in FIG. 7C. In ① of FIG. 7I, a user, say User B, receives a text message from User A (710, shaded text box). In ② of FIG. 7I, User B sends to User A a message 712 in response to the received text message 710 (shaded textbox). The device 200 analyzes both text message 710 and received message 712 and determines the widths of both textboxes. As illustrated, the textbox width of the text message 710 from User A is adjusted to have a predefined width depending on the width of the received message 712. And the reply text message (712) is placed below the text message from User A (710). Notice that the width of 712 is smaller than the width of the message box (i.e., "Hi!") in ② of FIG. 7I and the right sides of both textboxes are aligned. In ③ of FIG. 7I, User B receives a text message (714, shaded textbox) from User C. As illustrated, the textbox width of text messages from User A (710) and User B (712) have increased and the text message from User C (714) which is a reply to User A's text message is placed below the text message by User B (712). In ④ of FIG. 7I, User B receives a text message from User D (716, shaded textbox). Notice that the width of message 716 is the same as the messages (i.e., "Hey, how are you doing?" and "I heard you went Washington D.C. Did you like it?") placed above message 716 and this indicates that text messages, 712, 714, and 716, are reply text messages directly responding to message 710. That is, all three text messages (712, 714, and 716) are directly related to the first text message (i.e., message 710). In ⑤ of FIG. 7I, User B receives a text message (718, shaded textbox) from User A which is a reply of 712. In ⑥ of FIG. 7I, User C receives a text message (720, shaded textbox) from User A which is a reply of 714. Note that the two text messages, 718 and 720, are smaller in width compared to their "parent" text messages and even smaller than the first text message. This depicts the different "depths" of replies or in other words, the hierarchical relevance. In ⑦ of FIG. 7I, User A receives a text message (722, shaded textbox) from User B which is a reply directly responding to message 718. In ⑧ of FIG. 7I, User B receives a text message (724, shaded textbox) from User A which is a reply directly responding to message 722.

The general illustration thus far has demonstrated how the device 200 adjusts the widths of the textboxes per every single event occurred at a time when it detects an incoming or outgoing text message(s) in situation where users sending/receiving text messages to one another. However, the key idea how the device 200 identifies a text message (i.e., each outgoing message from or incoming message to the device 200) and places in its right position is not illustrated. The key idea is to assign a unique identifier to the very first text message and assign natural numbers any replies to the first text message.

Figure 8A:
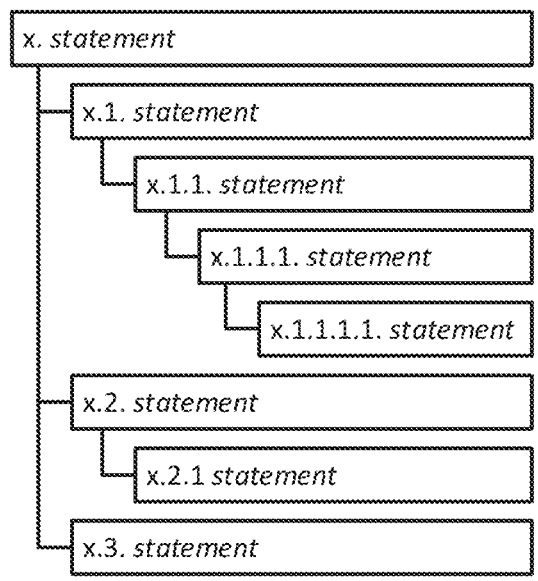
FIG. 8A is exemplary diagram illustrating a layout with unique identifiers.

If or when the group of text messages is structured, unique numbers are assigned to each text message. The controller 106 generates an identifier (for example, i.e., a number, a character, or their combination) to identify each message, where the number identifies each text message as illustrated in FIG. 8A (Note that the identifiers are assigned internally and not visible to the users). For example, the first box reads "x. statement", statement x or the main statement. The term "statement" corresponds to corresponding text message displayed in corresponding textbox, respectively. Herein, the term statement includes the text message (hereinafter, referred to as text, solely for convenience of description) and the textbox. Each statement in FIG. 8A consists of a corresponding text and the textbox that wraps the corresponding text.

When a group of statements are grouped together in a hierarchical structure and each statement is assigned with an identifier then we call the group of statements, a layout. We refer to the group of statements in FIG. 8A as a layout.

In the layout shown FIG. 8A, it consists of a main statement and its related child (or sub-) statements that are replies directly or indirectly responding to the main statement. Additionally, or alternatively, the controller 106 generates one or more other layouts to be displayed on the touch screen 102 by designating different identifiers such as w, x, y, and z to respectively indicate each main statement of the layout.

The child-statements of the main statement are statement x.1, x.2, and x.3. Statement x.3 has no child-statement and statement x.2 has one child-statement (statement x.2.1). The child-statement of statement x.1 is statement x.1.1, the child-statement of statement x.1.1 is statement x.1.1.1, and so on. However, statement x.1.1 is not a child-statement of statement x.

Conversely, the parent-statement of statements x.1, x.2, and x.3 is the main statement (statement x). So, the parent-statement of statement x.1.1 is statement x.1, the parent-statement of statement x.1.1.1 is statement x.1.1, and so on. However, statement x is not the parent-statement of statement x.1.1.

Any statements, except the main statement, are referred to as the sub-statement. Statements x.1.1, x.1.1.1, and x.1.1.1.1 are sub-statements of statement x.1. Note that statement x.1.1 is also a child-statement of statement x.1. Statement x.2 has one sub-statement, at the same time one child-statement that is statement x.2.1.

Conversely, statement x, x.1, x.1.1, x.1.1.1 are super-statements of statement x.1.1.1.1. Note that statement x.1.1.1 is also a parent-statement of statement x.1.1.1.1. The super-statement of statement x.2.1 are statement x and x.2. The super-statement of statement x.3 is statement x.

Statements without any child-statements such as statement x.1.1.1.1, x.2.1, and x.3 are called leaf-statements. That is, leaf-statements indicate end statements in hierarchical structure, stemming from each originated statement of each end statement. Leaf-statements indicate end statements of each branch of statements. For example, statement x.1.1.1.1 is a leaf-statement stemming, and originated, from statement x. Statement x.2.1 is a leaf-statement stemming, and originated, from statement x.2 and statement x, and Statement x.3 is a leaf-statement stemming, and originated, from statement x.

There are three branches in the layout. Statement x, x.1, x.1.1, x.1.1.1, and x.1.1.1.1 forms a first branch of the layout of FIG. 8A. Statement x, x.2, and x.2.1 forms a second branch of the layout of FIG. 8A. Statement x and x.3 forms a third branch of the layout of FIG. 8A.

Physically, a child-statement is placed and arranged with predefined indentation stemmed from its parent-statement. The vertical and horizontal lines in the figure which are configured to connect text boxes to display their hierarchical correlations among incoming and outgoing statements, emphasize these indentations are called indentation lines.

All the statements have depth defined in the present application for convenience of description. That is, depth of a statement indicates indentation of how much the statement is placed and arranged away from predefined alignment of its parent statement and the main statement. For example, assuming that the main statement (or statement x) is at depth 0, statement x.1, x.2 and x.3 are at depth 1 from the position (or virtual alignment) where the main statement displays and arranges in the layout of, e.g., FIG. 8A. Statement x.1.1 and x.2.1 are at depth 2 from the position (or virtual alignment) where the main statement displays and arranges in the layout of, e.g., FIG. 8A. Statement x.1.1.1 is at depth 3 and statement x.1.1.1.1 is at depth 4 which is at the lowest depth. Note that the higher the numerical number, the lower the depth and the lower the numerical number, the higher the depth. So, the main statement is at the highest depth while statement x.1.1.1.1 is at the lowest depth.

The lowest depth is denoted by letter d. Note that there is a limit to depth d. This limit is denoted by D, $0 \leq d \leq D$. For example, if or when the lowest depth allowed in the layout in FIG. 8A is set to 4 (D=4), then statement x.1.1.1.1 is at the lowest possible depth and no user is allowed to further reply responding to, and stemming from, statement x.1.1.1.1.

The limits (or restraints) on the number of child-statements stemming from a parent-statement is expressed as a function, M(•). For example, in a layout, if or when the statement at the lowest depth allowed is 4 (D=4), and given that any statement can be expressed as "$x.a_1.a_2.a_3.a_4$", the limits can be expressed as:

$$M(x)=4, M(a_1)=3, M(a_2)=5, M(a_3)=2, M(a_4)=0, \text{ with } D=4.$$

This (M(x)=4) means the main statement is able to have up to 4 child-statements, any statement at depth 1 can have up to 3 child-statements, any statement at depth 2 can have up to 5 child-statements, and any statements at depth 3 can have up to 2 child-statement. Note that the lowest depth allowed is 4 (D=4) so any statement at depth 4 cannot have any child-statements and therefore, $M(a_4)=0$.

As explained, each statement is assigned with a unique identifier, e.g., statement x.2.1. Note that positive integer is sequentially assigned to each statement with a dot. For example, when a statement has a child-statement, the number "0.1" is appended to the first child-statement, "0.2" is appended to the second child-statement, and so on. Each statement has a unique and independent number distinguishable from other statements. We call the action of appending the number to the identifier as well as the numbers themselves, numbering. It is assumed that the numbering of the main statement is 0. That is, internally, the main statement is statement x.0. The numberings of the child-statements of the main statement (statement x.1, x.2, and x.3) are 1, 2, and 3. The numbering of statement x.1.1.1.1 is 1.1.1.1.

In summary, the layout in FIG. 8A, there are seven sub-statements to the main statement, three branches in the layout, and three leaf-statements. Also, the statement at the current lowest depth is 4 (statement x.1.1.1.1), the lowest depth allowed is D, and the function M(•) is defined for $x.a_1 \ldots a_k$ ($0 \leq k \leq D$). Finally, the numbering of each statement is uniquely assigned.

The letter "x" plays an important role in the system. This letter, internally, serves as a unique identification of the main statement. When a user' device (e.g., the device 200) sends/receives a reply statement to or from other users' device, the device on the receiving side identifies the incoming statement and locates the single statement in corresponding IM "forums" or "groups" (e.g., active chatting sessions) where the single statement belongs among many IM "forums" or "groups". Not only that, once the "big" location is identified, the device 200 determine a position to locate the right position in the layout. So, the letter x serves as an identifier and with the numbering, the device 200 is able to pinpoint its right location. The letter x is exemplarily embodied with a combination of the user id, the created time (preferable down to milliseconds) of the main statement, and the numbering.

Figure 8B:
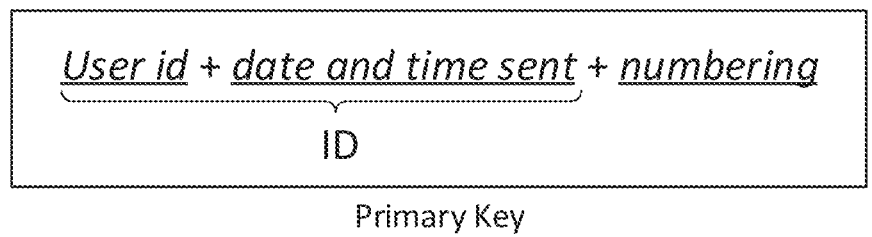
FIG. 8B is exemplary diagram illustrating a primary key.

FIG. 8B illustrates the idea. As illustrated in the figure, three parameters—user id, date & time sent (or received), and numbering—are concatenated. All three concatenated parameters are called the primary key and this piece of information plays as an 'identifier'. As illustrated in the figure, the user id concatenated with date and time sent is called ID which is simply denoted by the character 'x'. From now on, x and the numbering all together are denoted as the "primary key" for the purpose of concise description of the present disclosure.

If and when a user sends a text message to other user(s), the primary key and other information are sent to the user(s). For example, assuming User B sends a text message to User A, User C, and User D, when the device sends the text it also sends the sender's id that is concatenated with the date & time sent and the numbering 0 (this information is also stored in User B device as well). So the primary key other three users receive looks like:

User B+2016-Dec-28-13:13:01:03+0

Now, if User A replies to the received statement from User B, the User A's device replaces the current numbering (0) with 1 and a new primary key is sent to other users. The primary key User A's device sends looks like:

User B+2016-Dec-28-13:13:01:03+1

The device of all four users finds the text message with the same ID and acknowledges that it is the first child-statement of the existing main statement. If User C replies to the received statement from User A, the User C's device replaces the current numbering (1) with 1.1 and a new primary key is sent to other users. The primary key User C's device sends looks like:

User B+2016-Dec-28-13:13:01:03+1.1

From the simple illustration from FIG. 7I, the layout is simply a "template" or a "shell" where the widths of all the textboxes inside the layout changes while maintaining a specific shape. Note that there is a procedure that adjusts the widths of the textboxes in the "template" (layout) and this is explained in detailed later. In the following number of "templates" are explained.

FIG. 9A-FIG. 11B are exemplary layouts of text boxes including incoming and outgoing statements by controlling parameters (e.g., $l_1$ and $l_0$ alignment, point $P_1$ and $P_0$, $\Delta_1$ and $\Delta_0$, $w_k$, $\alpha_k$ and $\beta_k$, $c_{1k}$ and $c_{0k}$ and so on) described hereinafter. The parameters are controlled and determined by the controller 106 or processor(s) 108.

Figure 9A:
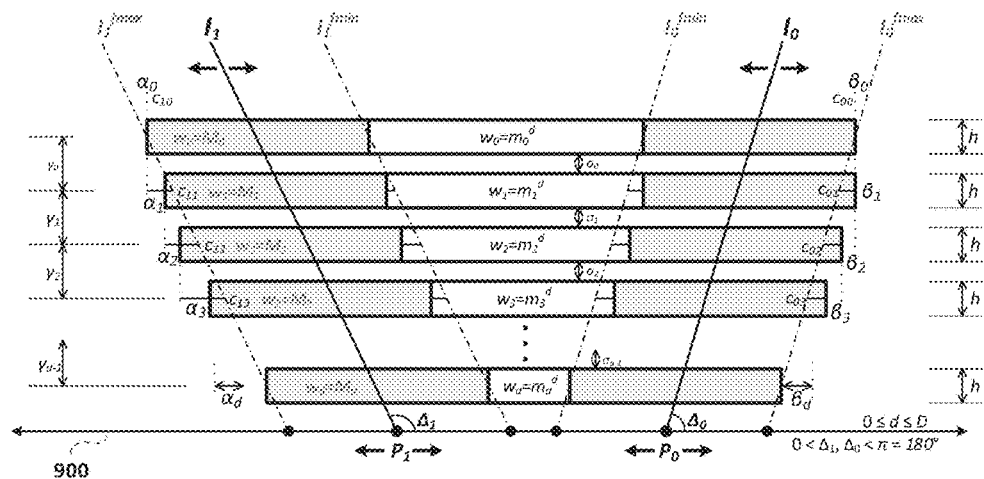
FIGS. 9A and 9B consists of exemplary diagrams illustrating a "template" called Generalized Fixed Angle Layout (GFAL).

FIG. 9A illustrates an exemplary "template" of a layout according to at least one an exemplary embodiment of the present disclosure. This template is a blue print of a layout that behaves in a specific fashion. This layout is called Generalized Fixed Angle Layout (GFAL, hereafter).

In FIG. 9A, there are two imaginary lines $l_1$ and $l_0$ those intersect with a horizontal line (900), the base line. The lines $l_1$ and $l_0$ are alignment lines. Again, these are imaginary lines (or virtual lines) those are not visible to the user. The point where alignment line intersects with the base line indicates base point. Therefore, the point $P_1$ is the point where alignment line $l_1$ and the base line intersects and the point $P_0$ is the point where alignment line $l_0$ and the base line intersects. $\Delta_1$ and $\Delta_0$ indicates angles between the alignment lines, $l_1$ and $l_0$, and the base line. $\Delta_1$ and $\Delta_0$ are called the alignment angles. These two angles are fixed values with $\pi > \Delta_1 \geq \Delta_0 > 0$ ($\pi = 180°$). The angle, $\Delta_1$ is set to be greater than equal to $\Delta_0$.

In FIG. 9A, the rectangular boxes are textboxes and they are placed between the alignment lines $l_1$ and $l_0$. The width of each textbox (textbox-widths, hereafter) is denoted by $w_k$, k=0, 1, 2, ..., d. So $w_0$ indicates the textbox-width of the main statement (depth 0), $w_1$ indicates the textbox-width at depth 1, and so on. In GFAL, the restriction of $\Delta_1 \geq \Delta_0$ implies:

$$w_0 \geq w_1 \geq w_2 \geq \ldots \geq w_d$$

So all the textboxes decreases, in width, as depth gets lower. The value $w_d$ is a variable not parameter. $w_d$ represents the textbox width at the lowest depth in the current layout. The character d represents the lowest depth in a sense that it is the lowest among the displayed statements. Most importantly, all the textbox-widths at depth k are identical. Therefore, $w_k$ (textbox-width at k) applies to all the statements at depth k.

As illustrated in FIG. 9A, the height of each textbox (textbox-height, hereafter) at depth k is set to default-height h. The default-height is the minimum possible height of a textbox and is not set to be smaller than h. In this setting, all the default-heights are the same in a layout. There can be textboxes with multiple lines of texts meaning the textbox-height is greater than h. However, this template indicates how the textboxes are aligned assuming all the textbox-heights are set to default-height.

The vertical distances between textboxes are denoted by $\gamma_k$ (k=0, 1, 2, ..., d–1, $\gamma$: gamma). The value $\gamma_k$ represents the distance from the mid-point (center of the side of the textbox) of the textbox at depth k to the mid-point of the textbox at depth k+1. In FIG. 9A, $\gamma_d$ is not defined. There are vertical distance $\sigma_k$ ($\sigma$. sigma) beneath a textbox at depth k. So, $\sigma_0$ indicates the bottom vertical distance of the textbox at depth 0.

The horizontal distance from the left mid-point of a textbox to its parent textbox's left mid-point is denoted by $\alpha_k$ (k=0, 1, 2, ..., d). Here, $\alpha_0$=0. Also, the horizontal distance from the right mid-point of a textbox to its parent textbox's right mid-point is denoted by $\beta_k$ (k=0, 1, 2, ..., d). Here, $\beta_0$=0.

The horizontal distance from the left mid-point of the textbox at depth k to the alignment line $l_1$ is denoted by $c_{1k}$ and the horizontal distance from the right mid-point of the textbox at depth k to the alignment line $l_0$ is denoted by $c_{0k}$. The controller 106 or the processor(s) adjusts or set these values (i.e., parameters) to display text boxes in convex or concave shape on two sides of the layout. By setting $c_{1k}=c_{0k}=0$ (k=1, 2, ..., D), text boxes are set or arranged in a linear alignment.

When a textbox-width of a statement at depth k is determined, other textbox-widths at different depth are adjusted based on the determined width at depth k. The overall textbox-widths in the layout increase or decrease depending on the procedure (or algorithm). In GFAL, whenever this happens, all the textbox-widths increase or decrease while the values of $\alpha_k$, $\beta_k$, $c_{1k}$, and $c_{0k}$ remain constant. Therefore, the layout is changed and displayed in various linear shape as two alignment lines $l_1$ and $l_0$ parallel shift left or right: e.g., in case of increase of textbox-widths, when $l_1$ shifts left and $l_0$ shifts right; and in case of decrease of textbox-widths when $l_1$ shifts right and $l_0$ shifts left.

Note that in the figure, the alignment line $l_1$ shifts between the maximum alignment line $l_1^{fmax}$ and minimum alignment line $l_1^{fmin}$. Also, the alignment line $l_0$ shifts between the maximum alignment line $l_0^{fmax}$ and minimum alignment line $l_0^{fmin}$ (the superscript fmax and fmin indicate maximum and minimum in fixed angle layout system). Therefore, if or when alignment line $l_1$ and $l_0$ coincide with $l_1^{fmax}$ and $l_0^{fmax}$, all the textbox-widths in the layout have reached their max-widths. Also, if or when alignment line $l_1$ and $l_0$ coincide with $l_1^{fmin}$ and $l_0^{fmin}$, all the textbox-widths in the layout have reached their min-widths.

In the figure, the textbox-heights of all the textboxes are in default-height and the alignment lines pass the left and right mid-points (the center on both sides). The height of any textboxes is larger than default-height depending on the length of a text. However, when an alignment line is drawn, the heights of the textboxes are in default-heights.

Figure 9B:
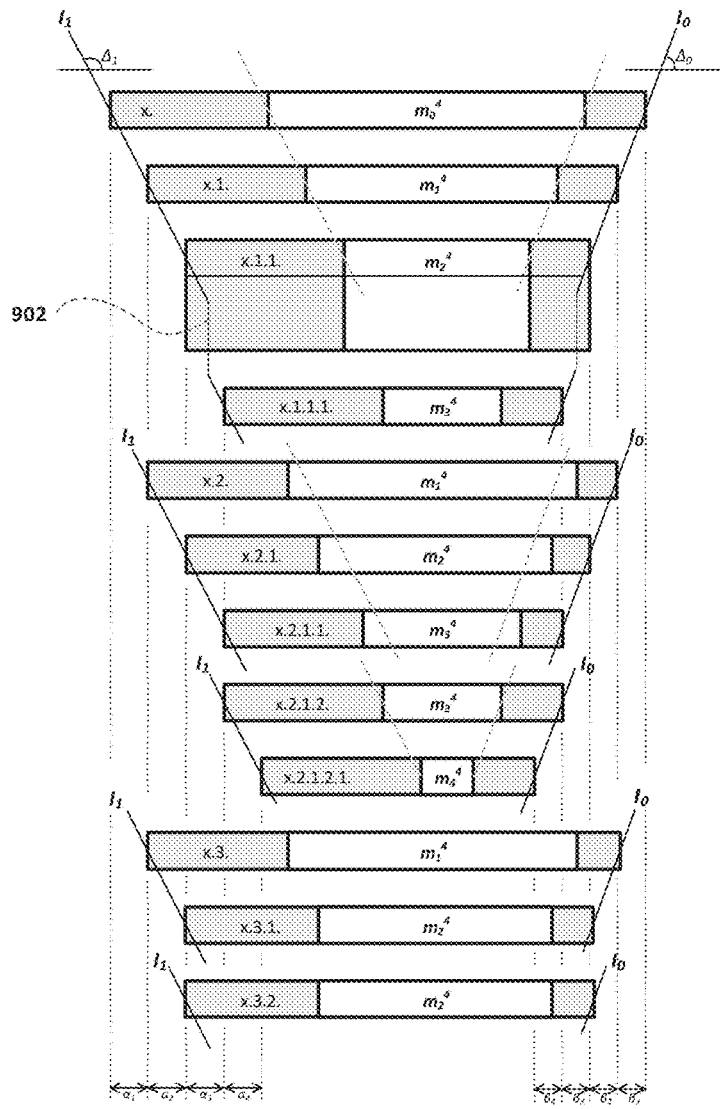

FIG. 9B illustrates a layout with several branches where $c_{10}$, $c_{00}$, $c_{1d}$ and $c_{0d}$ are set to zero. In the figure, there are several alignment lines and they are all parallel to one another. Additionally, as illustrated on statement x.1.1 (902), alignment line does not make a straight line connecting statement x.1.1.1. As mentioned, these lines are drawn under the assumption the textbox-height is in default-height. Therefore, the alignment line is broken and another that is parallel to the original one pass the left and right mid-point of statement x.1.1.1. As mentioned previously, $w_k$ indicates the textbox-width at depth k. Mathematically, the width $w_k$ can be expressed as:

$$w_k = f(k, R, n, d, \alpha_k, \beta_k, c_{1k}, c_{0k})$$

or $$w_k = f(k|R, n, d, \alpha_k, \beta_k, c_{1k}, c_{0k})$$

to emphasize wk is a function of k and the rest are parameters. If and when the parameters, $\alpha_k$, $\beta_k$, $c_{1k}$, and $c_{0k}$ are set internally, then we can simply write:

$$w_k = f(k, R, n, d) \text{ or } w_k = f(k|R, n, d)$$

For now, we assume the value R is a nonnegative real number and n is a nonnegative integer and is determined by the processor using set of formulas, procedures, or algorithms. The formula indicates that all the textbox-widths ($w_k$, k=0, 1, 2, . . . , d) are determined by one real value and a designated depth, k. Since $$w_0 \geq w_1 \geq w_2 \geq \ldots \geq w_d$$

the function f(k, R, n, d) is incrementing as the depth gets higher.

Figure 10A:
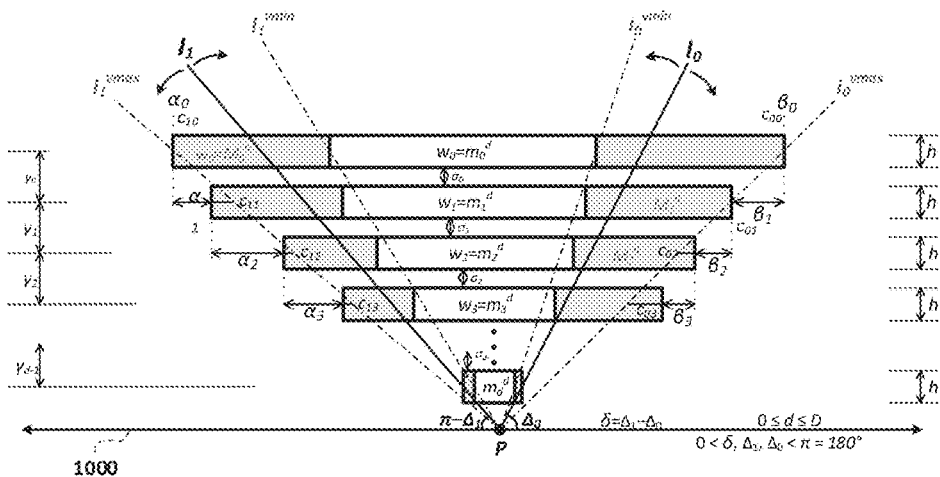
FIGS. 10A and 10B consists of exemplary diagrams illustrating a "template" called Generalized Varying Angle Layout (GVAL).

FIG. 10A illustrates an exemplary "template" of the new layout according to at least one an exemplary embodiment of the present disclosure. This template is a blue print of a layout that behaves in a specific fashion. This layout represents Generalized Varying Angle Layout (GVAL, hereafter).

In FIG. 10A, there are two imaginary lines $l_1$ and $l_0$ those intersect with a horizontal line (1000), the base line. $l_1$ and $l_0$ represent alignment lines. The point where alignment line intersects with base line is called rotation point. Therefore, the point P is the point where alignment line $l_1$ and $l_0$ and the base line intersects. There are two types of rotation points, namely, fixed rotation point and floating rotation point. These two rotation points are described later. $l_1$ and $l_0$ indicate alignment lines. $\Delta_1$ and $\Delta_0$ are the alignment angles between the alignment lines and the base line. Either one of these two angles is fixed or none of them are fixed. Also, we have $\pi > \Delta_1 \geq \Delta_0 > 0$ ($\pi = 180°$).

In FIG. 10A, the rectangular boxes are textboxes and they are placed between the alignment lines $l_1$ and $l_0$. The textbox-width is denoted by $w_k$, k=0, 1, 2, . . . , d. So $w_0$ indicates the textbox-width of the main statement (depth 0), $w_1$ indicates the textbox-width at depth 1, and so on. In GVAL, the restriction of $\Delta_1 \geq \Delta_0$ implies:

$$w_0 \geq w_1 \geq w_2 \geq \ldots \geq w_d$$

So all the textboxes decreases, in width, as depth gets lower. The value $w_d$ represents the textbox width at the lowest depth in the current layout. The character d represents the lowest depth in a sense that it is the lowest among the displayed statements. Most importantly, all the textbox-widths at depth k are identical. Therefore, $w_k$ (textbox-width at k) applies to all the statements at depth k.

As illustrated in FIG. 10A, the textbox-height at depth k is set to default-height h. The default-height is the minimum possible height of a textbox and cannot be smaller than h. In this setting, all the default-heights are the same in a layout. There can be textboxes with multiple lines of texts meaning the textbox-height is greater than h. However, this template indicates how the textboxes are aligned assuming all the textbox-heights are set to default-height.

The vertical distances between textboxes are denoted by $\gamma_k$ (k=0, 1, 2, . . . , d−1, γ: gamma). The value $\gamma_k$ represents the distance from the mid-point (center of the side of the textbox) of the textbox at depth k to the mid-point of the textbox at depth k+1. In FIG. 10A, $\gamma_d$ is not defined. There are vertical distance $\sigma_k$ (σ: sigma) beneath a textbox at depth k. So, $\sigma_0$ indicates the bottom vertical distance of the textbox at depth 0.

The horizontal distance from the left mid-point of a textbox to its parent textbox's left mid-point is denoted by $\alpha_k$ (k=0, 1, 2, . . . , d). Here, $\alpha_0 = 0$. Also, the horizontal distance from the right mid-point of a textbox to its parent textbox's right mid-point is denoted by $\beta_k$ (k=0, 1, 2, . . . , d). Here, $\beta_0 = 0$. Unlike GFAL, in GVAL, the values $\alpha_k$ and $\beta_k$ depend on the values of $\Delta_1$ and $\Delta_0$, respectively. In other words, $\alpha_k$ and $\beta_k$ are functions of $\Delta_1$ and $\Delta_0$, respectively, then it is more appropriate to write $\alpha_k(\Delta_1)$ and $\beta_k(\Delta_0)$.

The horizontal distance from the left mid-point of the textbox at depth k to the alignment line $l_1$ is denoted by $c_{1k}$ and the horizontal distance from the right mid-point of the textbox at depth k to the alignment line $l_0$ is denoted by $c_{0k}$. In the figure, $c_{10}$, $c_{00}$, $c_{1d}$, and $c_{0d}$ are set to zero. By adjusting these values (parameters), text boxes are displayed in convex or concave shape on two sides of the layout. By setting $c_{1k} = c_{0k} = 0$ (k=1, 2, . . . , D), text boxes are set or arranged in a linear alignment. $c_{1k}$ and $c_{0k}$ are fixed or functions of $\Delta_1$ and $\Delta_0$, respectively. When $c_{1k}$ and $c_{0k}$ are functions of $\Delta_1$ and $\Delta_0$, respectively, then it is more appropriate to write $c_{1k}(\Delta_1)$ and $c_{0k}(\Delta_0)$.

When a textbox-width of a statement at depth k is determined, other textbox-widths at different depth are adjusted based on the determined width at depth k. The overall textbox-widths in the layout increase or decrease depending on the procedure (or algorithm) performed by the processor(s) or the controller 106. In GVAL, whenever this happens, all the textbox-widths increase or decrease depending on the values of $\Delta_1$ and $\Delta_0$ those were determined by the angles formed by the rotation point P and the textbox-width that was determined. Therefore, the layout for displaying textboxes of each of text messages on the touch screen (i.e., displayer of the device 200) is able to be variously changed by controlling two alignment lines $l_1$ and $l_0$ to rotate left or right direction if the two alignment lines $l_1$ and $l_0$ rotate left or right, just as a fan. That is, the processor(s) or the controller 106 detects a user's contact or touch (i.e., either or both of two alignment lines $l_1$ and $l_0$) on the touch screen to change the layout by rotating the two alignment lines $l_1$ and $l_0$ in a left or right direction. In the case of increase of textbox-widths then $l_1$ rotates left and $l_0$ rotates right and vice versa in the case of decrease of textbox-widths.

Note that in the figure, the alignment line $l_1$ rotates between the maximum alignment line $l_1^{vmax}$ and minimum alignment line $l_1^{vmin}$. Also, the alignment line $l_0$ rotates between the maximum alignment line $l_0^{vmax}$ and minimum alignment line $l_0^{vmin}$ (the superscript vmax and vmin indicate the maximum and minimum of the varying angle.). Therefore, when alignment line $l_1$ and $l_0$ coincide with $l_1^{vmax}$ and $l_0^{vmax}$ all the textbox-width in the layout have reached their max-widths. Also, when alignment line $l_1$ and $l_0$ coincide with $l_1^{vmin}$ and $l_0^{vmin}$, all the textbox-width in the layout have reached their min-widths.

In the figure, the textbox-heights of all the textboxes are in default-height and the alignment lines pass the left and right mid-points (the center on both sides). The height of any textboxes is larger than default-height depending on the length of a text. However, when an alignment line is drawn, the heights of the textboxes are in default-heights.

Figure 10B:
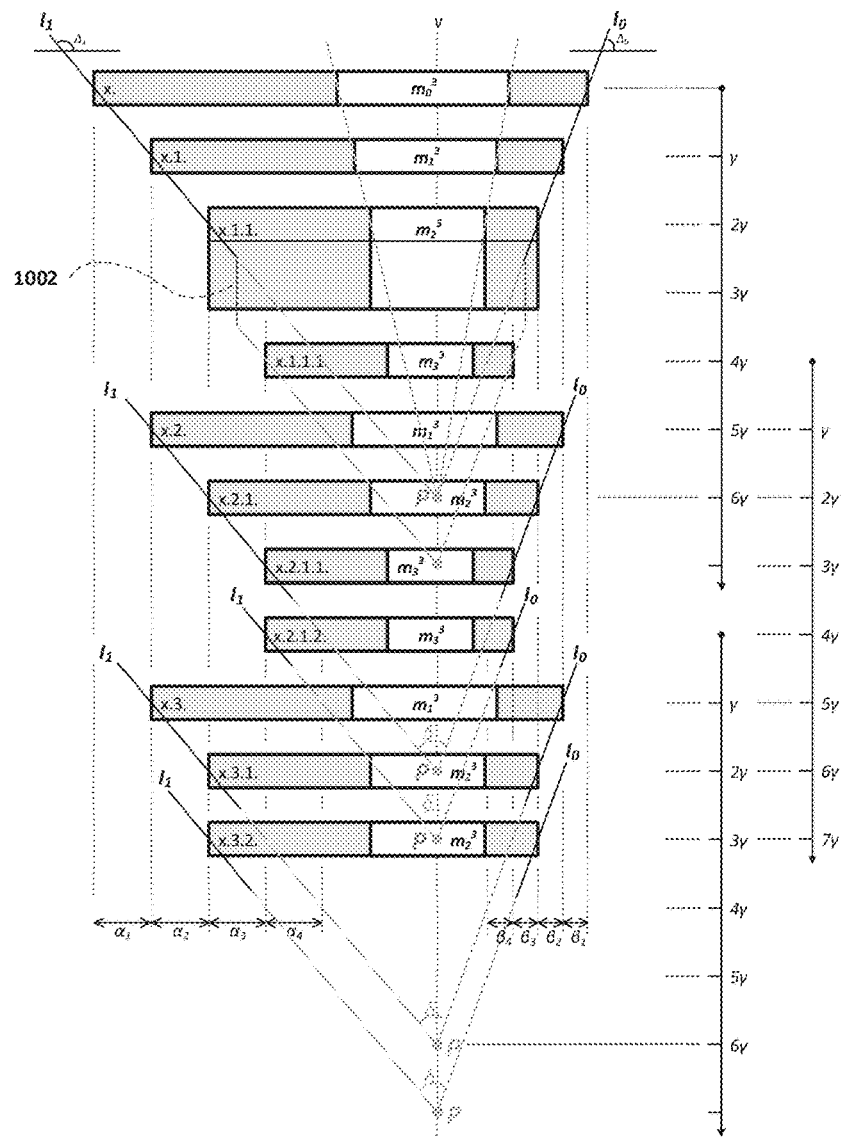

FIG. 10B illustrates a layout with several branches (in FIG. 10B, the first branch of statement x.1, the second branch of statement x.2, and the third branch of statement x.3) where $c_{10}$, $c_{00}$, $c_{1d}$ and $c_{0d}$ are set to zero. In the figure, there are several alignment lines and they are all parallel to one another. Additionally, as illustrated on statement x.1.1 (1002), alignment line does not make a straight line connecting statement x.1.1.1. As mentioned, these lines are drawn under the assumption the textbox-height is in default-height. Therefore, the alignment line is broken and another that is parallel to the original one pass the left and right mid-point of statement x.1.1.1.

Mathematically, the width $w_k$ can be expressed using a function $v(\bullet)$ as:

$$w_k = v(k, R, n, d, \alpha_k(\Delta_1), \beta_k(\Delta_1), c_{1k}(\Delta_1), c_{0k}(\Delta_0))$$

or $$w_k = v(k | R, n, d, \alpha_k(\Delta_1), \beta_k(\Delta_1), c_{1k}(\Delta_1), c_{0k}(\Delta_0))$$

to emphasize $w_k$ is a function of k and the rest are parameters.

Figure 11A:
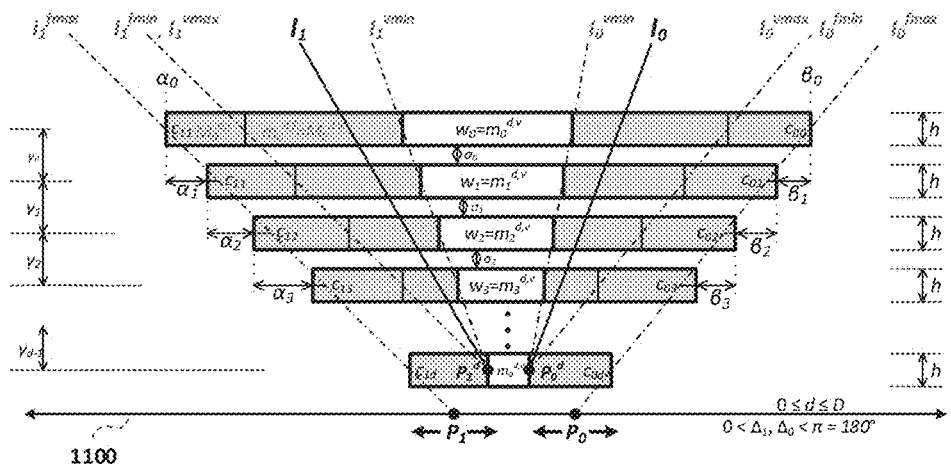
FIGS. 11A and 11B consists of exemplary diagrams illustrating a "template" called Generalized Mixed Angle Layout (GMAL).

FIG. 11A illustrates an exemplary "template" of the new layout according to at least one an exemplary embodiment of the present disclosure. This template is a blue print of a layout that behaves in a specific fashion. This layout represents Generalized Mixed Angle Layout (GMAL, hereafter). From the name of the layout, GMAL is a hybrid of GFAL and GVAL.

In this layout, when the textbox-width is less than a certain width then the layout behaves as GVAL and when it exceeds a certain width it behaves as GFAL. When the layout behaves as GFAL, the layout is in GFAL mode and when the layout behaves as GVAL the layout is in GVAL mode. In the figure, there are two imaginary lines $l_1$ and $l_0$. We call $l_1$ and $l_0$, alignment lines. Again, these are imaginary lines those are not visible to the user.

When the layout is in GVAL mode, the two alignment lines $l_1$ and $l_0$ rotate about the left mid-point and right mid-point of the statement at the lowest depth d. When the layout is in GVAL mode, the textbox-width of the statement at the lowest depth is $m_d^d$. Otherwise, the layout is in GFAL mode. When the layout is in GVAL mode, we denote the left rotation point by $P_1^d$ and the right rotation point by $P_0^d$. There are important positions of two alignment lines $l_1$ and $l_0$ and these positions define the mode of the layout. The alignment line $l_1$ rotates between $l_1^{vmin}$ and $l_1^{vmax}$. The alignment line $l_0$ rotates between $l_0^{vmin}$ and $l_0^{vmax}$. These two sets of angles $\{l_1^{vmin}, l_1^{vmax}\}$ and $\{l_0^{vmin}, l_0^{vmax}\}$ define the GVAL part of the layout. The alignment line $l_1$ parallels shift between $l_1^{fmin}$ and $l_1^{fmax}$ and the alignment line $l_0$ parallels shift between $l_0^{fmin}$ and $l_0^{fmax}$. These two sets of lines $\{l_1^{fmin}, l_1^{fmax}\}$ and $\{l_0^{fmin}, l_0^{fmax}\}$ define the GFAL part of the layout. Note that $l_1^{fmin} = l_1^{vmax}$ and $l_0^{fmin} = l_0^{vmax}$. When the layout is in GFAL mode, then the alignment lines are fixed and intersect with the base line (1100).

Since GMAL is a mixture of GFAL and GVAL, there are two types of max-widths and min-widths each. There are $M_k^{d,f}$ and $m_k^{d,f}$ for GFAL part (the superscript f means fixed). Also, there are $M_k^{d,v}$ and $m_k^{d,v}$ for GVAL part (the superscript v means varying). These max-widths and min-widths are determined by the alignment positions described previously.

Using max-widths, the textbox-width of the statement at the lowest depth is set to m (i.e. $w_d = m_d^{d,v} = M_d^{d,v} = m$). When $w_k \leq M_k^{d,v}$ (for all k=0, 1, 2, . . . , d), the layout behaves as GVAL. When this condition does not hold, i.e., $w_k > M_k^{d,v}$ then the layout behaves as GFAL. When $w_k \leq M_k^{d,v}$, the two imaginary alignment lines $l_1$ and $l_0$ rotate around the left mid-point and right mid-point, respectively, of the textbox at the lowest depth d. The alignment positions $l_1^{vmin}$ and $l_0^{vmin}$ are the lines (positions) that determine the min-widths of GVAL part of the layout. Obviously, the alignment positions $l_1^{vmax}$ and $l_0^{vmax}$ are the lines that determine the max-widths of GVAL part of the layout. Therefore, the alignment line $l_1$ rotates between $l_1^{vmin}$ and $l_1^{vmax}$ and the alignment line $l_0$ rotates between $l_0^{vmin}$ and $l_0^{vmax}$. If or when alignment lines $l_1$ and $l_0$ coincide with $l_1^{vmin}$ and $l_0^{vmin}$ then this width defines $M_k^{d,v}$, and if or when alignment lines $l_1$ and $l_0$ coincide with $l_1^{vmax}$ and $l_0^{vmax}$ then this width defines $m_k^{d,f}$. If or when $l_1$ passes $l_1^{vmax}$ then the alignment line $l_1$ behaves as GFAL and $l_1$, instead of rotating, begins to parallel shifts. If or when $l_0$ passes $l_0^{vmax}$ then the alignment line $l_0$ behaves as GFAL and $l_0$, instead of rotating, begins to parallel shifts. So, $l_1^{vmax}$ equals $l_1^{fmin}$ and $l_0^{vmax}$ equals $l_0^{fmin}$. Put it differently, $m_k^{d,f} = M_k^{d,v}$. Finally, when $l_1$ and $l_0$ parallel shift, the positions that limit the shift are $l_1^{fmax}$ and $l_0^{fmax}$. The distance between the two alignment lines define $M_k^{d,f}$.

Figure 11B:
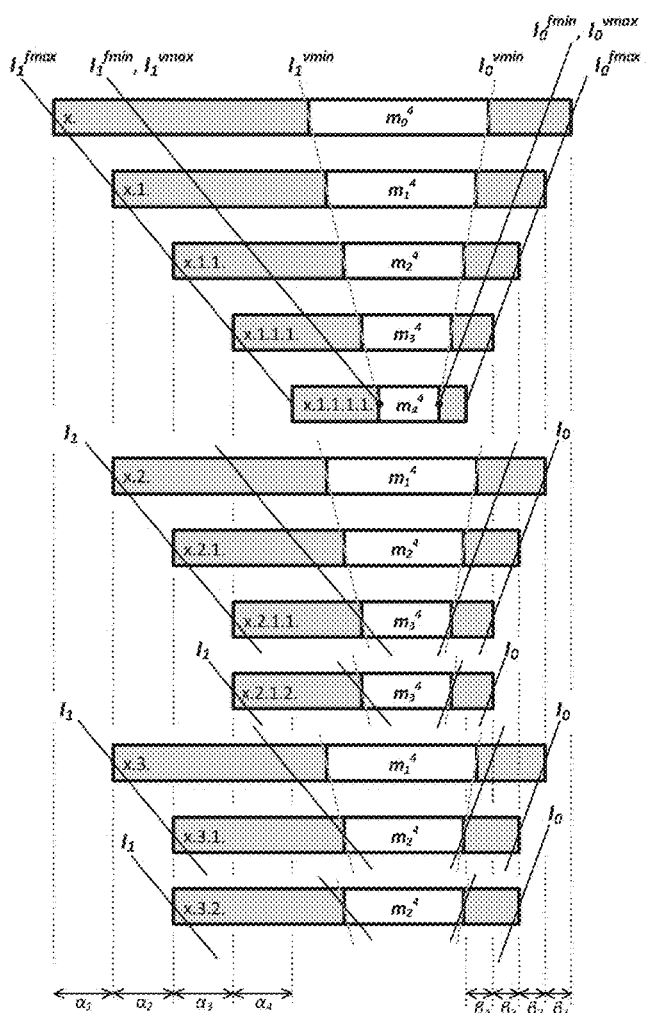

FIG. 11B illustrates a layout with several branches where $c_{10}$, $c_{00}$, $c_{1d}$ and $c_{0d}$ are set to zero. In the figure, there are several alignment lines and they are all parallel to one another.

When $c_{1k} = c_{0k} = 0$ (for all k=0, 1, 2, . . . , D) then instead of using $l_1$ and $l_0$, we use $L_1$ and $L_0$ and call it linear alignment lines. If $c_{1k}$ and $c_{0k}$ are set such that the alignments form smooth convex curves then we use $C_1^v$ and $C_0^v$ and call them convex alignment curves. If $c_{1k}$ and $c_{0k}$ are set such that the alignments form smooth concave curves then we use $C_1^c$ and $C_0^c$ and call them concave alignment curves.

We have introduced three types of layouts, namely, GFAL, GVAL, and GMAL. In all layouts, the textbox-width increase and decrease in a unique way. From these generalized versions, we can derive special cases. In all these special cases $c_{1k} = c_{0k} = 0$ for all k=0, 1, 2, . . . , D.

There are five special cases (or a subset) of GFAL out of infinitely many cases that can be derived.

Figure 12A:
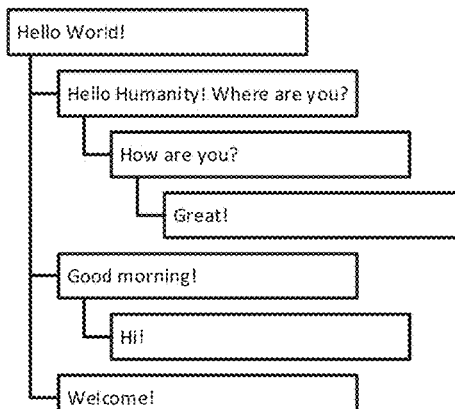
FIGS. 12A and 12B consists of exemplary diagrams illustrating Same Width Layout—Left to Right (SWL-LR) and Same Width Layout—Right to Left (SWL-RL).
Figure 12B:
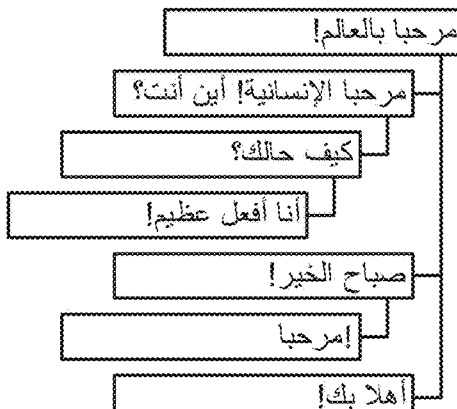

The first two are called SWL (Same Widths Layout). These are cases where the slope of the alignment lines $L_1$ and $L_0$ are fixed so they are parallel to one another ($\Delta_1 = \Delta_0$). In this layout, all the textbox-widths are the same widths regardless of the depth of each statement. If $\Delta_1 = \Delta_0 = \Delta > \pi/2$ then this special case layout is called SWL-LR (Same Width Layout—Left to Right). If $\Delta_1 = \Delta_0 = \Delta < \pi/2$ then this special case layout is called SWL-RL (Same Width Layout—Right to Left). Both SWL-LR and SWL-RL are illustrated in FIG. 12A and FIG. 12B.

Figure 12C:
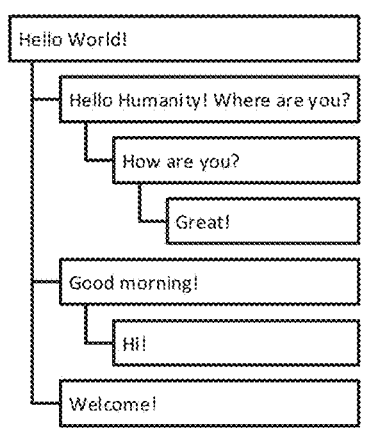
FIG. 12C consists of exemplary diagrams illustrating Fixed Angles Layout—Right Aligned (FAL-R), Varying Angle Layout—Right Aligned (VAL-R), and Mixed Angle Layout—Right Aligned (MAL-R), respectively.
Figure 12D:
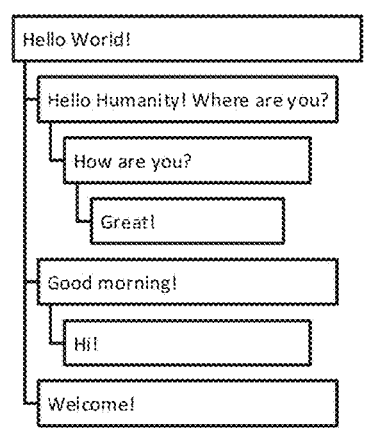
FIG. 12D consists of exemplary diagrams illustrating Fixed Angles Layout—Center Aligned (FAL-C), Varying Angle Layout—Center Aligned (VAL-C), and Mixed Angle Layout—Center Aligned (MAL-C), respectively.
Figure 12E:
FIG. 12E consists of exemplary diagrams illustrating Fixed Angles Layout—Left Aligned (FAL-L), Varying Angle Layout—Left Aligned (VAL-L), and Mixed Angle Layout—Left Aligned (MAL-L), respectively.

The last three are called FAL (Fixed Angles Layout). When the slope of the alignment line $L_1$ is set such that $\Delta_1 > \pi/2$ and $L_0$ perpendicular ($\Delta_0 = \pi/2$) where only $L_1$ shifts right or left, layout is called FAL-R (Fixed Angle Layout—Right Aligned). When the slope of the alignment line $L_1$ is set such that $\Delta_1 > \pi/2$ and $L_0$ such that $\Delta_0 < \pi/2$ (with $\Delta_1 = \pi - \Delta_0$) where both $L_1$ and $L_0$ shift left or right (opposite direction to one another) then the layout is called FAL-C (Fixed Angle Layout—Center Aligned). When the alignment line $L_1$ perpendicular ($\Delta_1 = \pi/2$) and the slope of the alignment line $L_0$ is set such that $\Delta_0 < \pi/2$ where only $L_0$ shifts right or left then the layout is called FAL-L (Fixed Angle Layout—Left Aligned). The figures FIG. 12C, FIG. 12D, and FIG. 12E illustrate FAL-R, FAL-C, and FAL-L, respectively.

Three special cases (or a subset) of GVAL out of infinitely many cases can be derived.

When the slope of the alignment line $L_1$ is set such that $\Delta_1 > \pi/2$ and $L_0$ perpendicular ($\Delta_0 = \pi/2$) where only $L_1$ rotates clock-wise or counter clock-wise then the layout is called FAL-R (Fixed Angle Layout—Right Aligned). When the slope of the alignment line $L_1$ is set such that $\Delta_1 > \pi/2$ and $L_0$ such that $\Delta_0 < \pi/2$ (with $\Delta_1 = \pi - \Delta_0$) where both $L_1$ and $L_0$ rotates clock-wise or counter clock-wise (opposite direction to one another) then the layout is called FAL-C (Fixed Angle Layout—Center Aligned). When the alignment line $L_1$ perpendicular ($\Delta_1 = \pi/2$) and the slope of the alignment line $L_0$ is set such that $\Delta_0 < \pi/2$ where only $L_0$ rotates clock-wise or counter clock-wise then the layout is called FAL-L (Fixed Angle Layout—Left Aligned). The figures FIG. 12C, FIG. 12D, and FIG. 12E illustrate VAL-R, VAL-C, and VAL-L, respectively.

Finally, three special cases (or a subset) of GMAL out of infinitely many cases can be derived by combining FALs and VALs. These special cases are called MAL-R, MAL-C, and MAL-L. The figures FIG. 12C, FIG. 12D, and FIG. 12E illustrate MAL-R, MAL-C, and MAL-L, respectively. Note that although the still depictions of the FALs, VALs, and MALs are the same their movements are not the same.

Note that SWL-RL, FAL-L, VAL-L, and MAL-L are particularly useful for languages that write from right to left such as Hebrew or Arabic.

In summary, a structured IM satisfy the conditions: (1) the very first text has the largest textbox-width; (2) all the textbox-width at the same depth are equal; (3) every time the device sends/receives a text, all the textbox-widths are modified; and (4) for all the textbox-widths, w, at depth k, we have $M_k \geq w_k \geq m_k$ with $M_0 \geq M_1 \geq M_2 \geq \ldots \geq M_d$ and $m_0 \geq m_1 \geq m_2 \geq \ldots \geq m_d$ (where d represents the lowest depth). This implies that there are (A) a mechanism that uniquely numbers every text, (B) a mechanism that adjusts all the widths of the textboxes, and (C) a mechanism that places text in its right (intended) position. Therefore, RMS consists of structured IM and all three mechanisms.

From FIG. 7A through FIG. 12E, simple illustrations and various templates (GFAL, GVAL, and GMAL) were provided. However, the mechanism that "drives" the template was not introduced. The "mechanism" that adjusts the textbox-widths is called, Textbox-Width Adjustment (TWA, hereafter).

All the operations related to FIG. 7I to be described herein is controlled and performed by at least controller 106 (or processor(s) 108 or combination of both) by communicating and controlling other components shown in FIG. 1-FIG. 6.

For purpose of concise descriptions, the corresponding operations to be performed the controller 106 and/or the processor(s) 108 are described hereinafter.

Now, TWA is explained in detail.

The number one rule, as mentioned, is that all the textbox-widths follows:

$$w_0 \geq w_1 \geq w_2 \geq \ldots \geq w_d$$

The second rule is that all the textbox-widths in the same depth have the same widths. That is, $$w_k^1 = w_k^2 = w_k^3 = \ldots = w_k^s$$

where $w_k$ indicates the textbox-width at depth k and s indicates different statements in the same depth (at depth k). The value of $w_k$ must be between min-width $m_k$ and max-width $M_k$ ($m_k \leq w_k \leq M_k$). In the following couple of terms are defined.

The literal length of the text of an incoming or outgoing statement is called text-length. The text-length can be in any length. As mentioned, the text-length can be in any unit (e.g. pixels, millimeter, centimeter, inch, number of characters, and so on). The text-length can be smaller than $m_k$ and larger than $M_k$. If the device sets textbox-width at depth k to equal $M_k$ and the text-length is greater than $M_k$ then this will make the text to appear in multiple lines inside a textbox. Also, even if the text-length is smaller than $m_k$, since the $m_k$ is the smallest possible textbox-width at depth k, the text is displayed in the textbox where the textbox-width is equal to $m_k$.

In TWA, whenever the device detects either an incoming or an outgoing statement (i.e., text message), the device starts adjusting all the textbox-widths in the layout. In order to do so, the device selects the "best" or "optimized" textbox-width at depth n. By the second rule mentioned above, this forces all the textbox-width at depth n to equal this newly computed "best" or "optimized" textbox-width. Also, once this "best" or "optimized" textbox-width is determined at depth n, the rest of the textbox-width at depth $0, 1, 2, \ldots, n-1, n+1, \ldots, d$ can be determined since GFAL, GVAL, and GMAL follows geometric rules. This "best" or "optimized" textbox-width is called reference-width at depth n and is denoted by $R^{(n)}$ ($0 \leq n \leq d$).

Assuming $R^{(n)}$ is determined by an algorithm or mathematical equations, if or when the device operates on GFAL, the rest of the textbox-widths can be calculated using simple linear equations and if the device operates on GVAL, the rest of the textbox-widths can be calculated using simple trigonometric properties. For GMAL, the device calculates the rest of the textbox-widths based on the mode the layout is in.

Figures 13A, 13B:
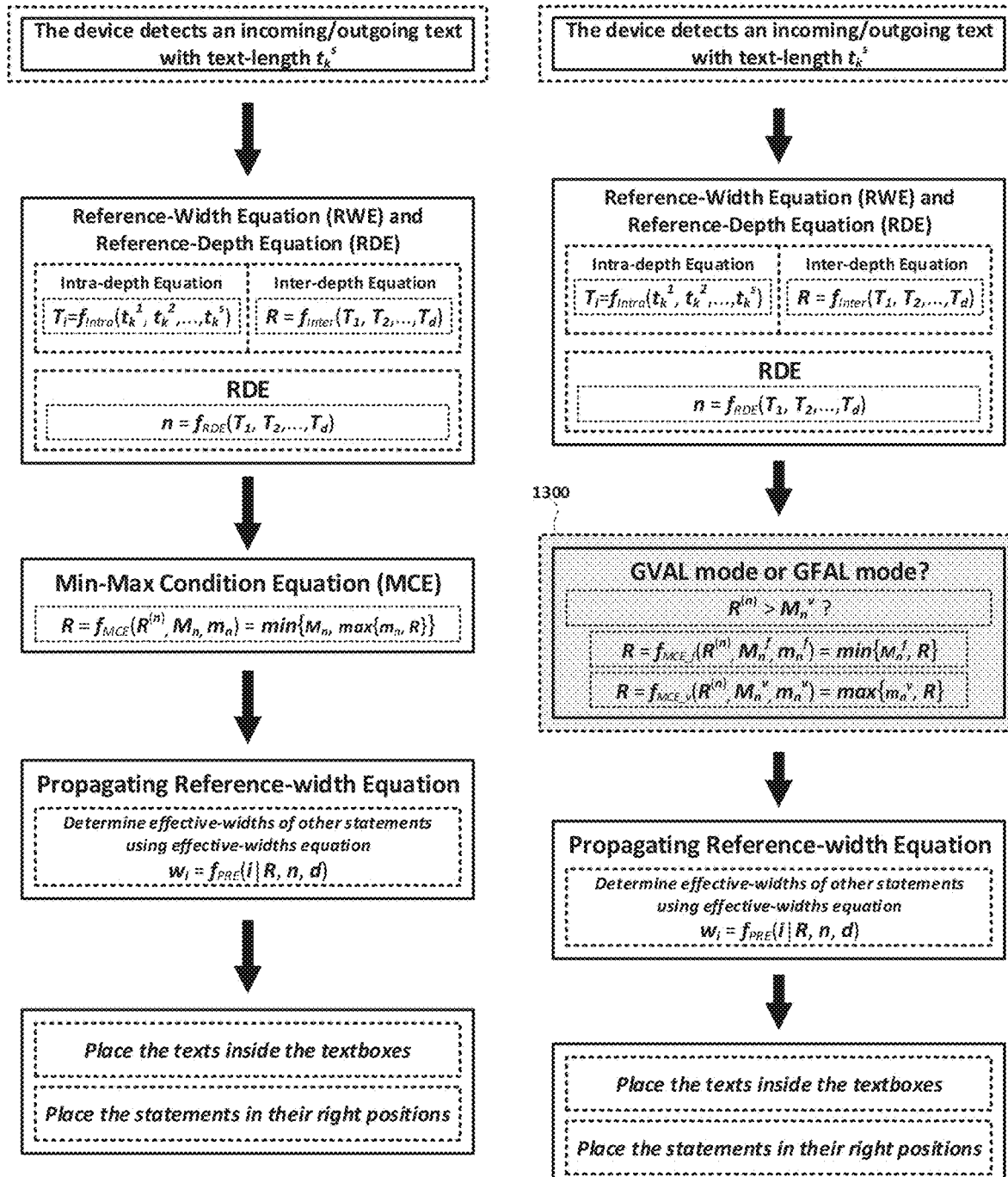
FIGS. 13A and 13B consists of flowcharts illustrating a method of processing incoming or outgoing text message(s) in order to determine all textbox widths in a layout.

The flow of the idea is illustrated in detail in FIG. 13A and FIG. 13B.

FIG. 13A illustrates detailed view of the process of TWA. As illustrated at the top of the flow chart, the device detects an incoming or an outgoing statement with text-length $t_k^s$ (this is the text-length of the $s^{th}$ statement at depth k). After the detection, the next step is to find the reference-widths and reference-depth. Finding the reference-width involves two steps that are expressed in equations. We call this set of equations that determines the reference-width, Reference-Width Equation (RWE). We call the set of equation(s) that determines the reference-depth, Reference-Depth Equation (RDE). Generally, RWE can be split into two steps. The first step is simply calculating a value from the pool of text-lengths at the same depths. This process is denoted by a mathematical function and is called Infra-depth Equation (Intra-DE). The Intra-DE is a set of functions where each function takes on text-lengths at the same depth as input. Each function is denoted it by:

$$T_k = f_{intra}(t_k^1, t_k^2, t_k^3, \ldots, t_k^s).$$

Where $f_{intra}(\bullet)$ is a function that takes on all the (s number of) text-lengths at depth k. The notation $t_k^s$ indicates the text-length of the $s^{th}$ text message at depth k. The result of this function is $T_k$ which is a numerical value (non-negative real number). The Intra-DE calculates all $T_k$ values for k=0, 1, 2, ... d. Therefore, the Intra-DE produces d+1 number of values—$\{T_0, T_1, T_2, \ldots, T_d\}$. Note that the nonnegative integer k is simply an index to indicate the depth, from 0 to d (d being the lowest depth in the layout). There can only be one main statement so $T_0 = f_{intra}(t_0^1)$, for text messages at depth 1, $T_1 = f_{intra}(t_1^1, t_1^2, \ldots, t_1^a)$, for text messages at depth 2, $T_2 = f_{intra}(t_2^1, t_2^2, \ldots, t_2^b)$, and so on. Therefore, after the Intra-DE is applied on all the text-lengths, we have a set—$\{T_0, T_1, T_2, \ldots, T_d\}$.

Once the Intra-DE is calculated, the next step is to find the reference-width using Inter-depth Equation (Inter-DE). Unlike Intra-DE, Inter-DE consists of only one function that takes on the set of values—$\{T_0, T_1, T_2, \ldots, T_d\}$. Inter-De is denoted by:

$$R = f_{intra}(T_1, T_2, \ldots, T_d).$$

where $f_{inter}(\bullet)$ is a function that takes on all the (d+1 number of) values from Intra-DE. The result of Inter-DE is denoted by R and this is the reference-width. Once the reference-width is determined, the reference-depth n is determined. There are several ways to determine the reference-depth such as setting n=d (where d is the lowest depth), setting the [[k]] n=0, randomly pick a reference-depth, and etc. One of "reasonable" method is to set the reference-depth to the depth that gives the maximum value from the result of Intra-DE. Mathematically:

$$n \text{ such that } T_n = \max\{T_0, T_1, T_2, \ldots, T_d\}.$$

To further generalize the procedure, RDE is expressed as:

$$n = f_{RDE}(t_0^1, t_1^1, t_1^2, \ldots, t_1^a, t_2^1, t_2^2, \ldots, t_2^b, t_3^1, t_3^2, \ldots, t_3^c, \ldots, t_d^1, t_d^2, \ldots, t_d^z,)$$

or $$n = f_{RDE}(\text{all the text-lengths in the layout}).$$

This equation implies that the reference-depth n is determined based on all the text-lengths in the layout. Once the reference-width and reference-depth are calculated, the result is denoted by $R^{(n)}$.

The second process, as stated, checks whether the reference-width, $R^{(n)}$, determined from the first process is between min-width and max-width at depth n. That is, it checks if $m_n \leq R^{(n)} \leq M_n$. If the reference-width is smaller than $m_n$ then the reference-width R is adjusted to $m_n$. If on the other hand the reference-width is larger than $M_n$ then the reference-width R is adjusted to $M_n$. The purpose of this process is to make sure the computed reference-width lies in allowed range. The equation that performs this process is called, Min-Max Condition Equation (MCE). Mathematically, this is simply:

$$R = \min\{M_n, \max\{m_n, R\}\}.$$

Once $R^{(n)}$ is calculated, the device determines the textbox-widths for rest of the textboxes in the layout. Note that since all the textboxes at the same depth have the same textbox-width, the device only determines d number of textbox-widths. That is, once the reference textbox-width $R^{(n)}$ is being determined the device determines the textbox-widths for the textboxes at depth 0, 1, 2, ..., n−1, n+1, ... d. This is the third process and is called Propagating Reference-width Equation (PRE). The PRE is a function of depth i with R, n and d as parameters and we denote it by:

$$w_i = f_{RDE}(i | R, n, d)$$

where i=0, 1, 2, ..., n−1, n+1, ..., d.

Since the alignment lines in GFAL parallel shifts, once the $R^{(n)}$ is determined, the rest of the textbox-width can be calculated using linear equations. On the other hand, in GVAL, since the alignment lines rotate, the rest of the textbox-width can be calculated using trigonometric properties.

Finally, the last process involves placing the texts inside the textboxes and placing the textboxes in their right positions.

Note that the flow chart in FIG. 13A is for GFAL and GVAL. However, for GMAL, since there are two sets of max-widths and min-widths—$M_k^f$, $M_k^v$, $m_k^f$, and $m_k^v$—an extra step that checks the mode of the layout is necessary. This is illustrated in FIG. 13B, the shaded box of 1300. Once $R^{(n)}$ is calculated, the device checks if $R^{(n)}$ is greater than $M_n^v$ which is the max-width of the GVAL mode. If R is greater than $M_n^v$ then the device acknowledges that the layout is in GFAL mode and checks:

$$R = \min\{M_n^f, R\}.$$

On the other hand, if R is less than or equal to $M_n^v$ then the device acknowledges that the layout is in GVAL mode and checks:

$$R = \max\{m_n^v, R\}.$$

The device based on these information, including which mode the layout is in, proceeds to execute PRE and determines the textbox-widths of rest of the textboxes.

There are several different kinds of RWE and RDE equations those determine reference-width and reference-depth, $R^{(n)}$. As mentioned, the process that determines $R^{(n)}$ uses a pool of text-lengths.

FIG. 14 illustrates various RWEs and RDEs those can be used as "plug-ins". Here, for illustration purposes of RWEs and RDEs, detailed explanation is provided.

The first RWE, in the table of FIG. 14, is Maximum of Maximums (MoM). As the name implies, this process selects the one with the largest text-length as the reference-width. First, in Intra-DE, the largest text-length among the text-lengths in the same depth is selected. This is expressed as:

$$T_k = \max\{t_k^1, t_k^2, t_k^3, \ldots\} \; (k=0,1,2,\ldots,d)$$

and the result is a set:

$$\{T_0, T_1, T_2, \ldots, T_d\}.$$

Then the Inter-DE selects the largest from the above set and this is expressed as:

$$R = \max\{T_0, T_1, T_2, \ldots, T_d\}.$$

Now the device selects the reference-depth n by selecting the depth the largest text-length came from. This is expresses as:

$$n \text{ such that } T_n = \max\{T_0, T_1, T_2, \ldots, T_d\}.$$

Hence, the reference-widths is R and the reference-depth is n.

The second RWE, in the table of FIG. 14, is Average of Maximums (AoM). As the name implies, this process selects the largest text-length in each depth and then takes the average of them. This average is selected as the reference-width. First, in Intra-DE, the largest text-length among the text-lengths in the same depth is selected. This is expressed as:

$$T_k=\max\{t_k^1, t_k^2, t_k^3, \ldots\} \ (k=0,1,2,\ldots,d)$$

and the result is the set:

$$\{T_0, T_1, T_2, \ldots, T_d\}.$$

Then the Inter-DE calculates the average of the above set and this is expressed as:

$$R=(T_0+T_1+T_2+\ldots+T_d)/(d+1).$$

Now the device selects the reference-depth n by selecting the depth the largest text-length came from. This is expressed as:

$$n \text{ such that } T_n=\max\{T_0, T_1, T_2, \ldots, T_d\}.$$

Hence, the reference-widths is R and the reference-depth is n.

The third RWE, in the table of FIG. 14, is Normalization of Maximums (NoM). As stated, any textbox-width is smaller than or equal to the textbox of its parent-statement in length. Since all the textbox-width is bounded by max-width, $M_k$, at depth k, it is reasonable to normalize any text-length $t_k$ by its max-length $M_k$. For example, if $t_0$=90, $t_1$=90, $M_0$=100, and $M_1$=90 and the text-lengths are normalized by their corresponding max-width then the result shows:

$$t_0/M_0=0.9 \text{ and } t_1/M_1=1.0$$

This implies that the text-length at depth 1 is larger than the text-length at depth 0 relative to its allowed max-width. This is the idea behind normalization. First, in Intra-DE, the largest text-length among the text-lengths in the same depth is selected. This is expressed as:

$$T_k=\max\{t_k^1, t_k^2, t_k^3, \ldots\} \ (k=0,1,2,\ldots,d)$$

and the result is the set:

$$\{T_0, T_1, T_2, \ldots, T_d\}.$$

Then the Inter-DE selects the largest from the above set where each value is normalized by its corresponding max-width and this is expressed as:

$$N=\max\{T_0/M_0, T_1/M_1, T_2/M_2, \ldots, T_d/M_d\}.$$

Once the maximum of the normalized values is found, the process "undoes" the normalization and this expressed as:

$$R=N \cdot M_k$$

Now the device selects the reference-depth n by selecting the depth the maximum of the normalized text-length came from. This is expresses as:

$$n \text{ such that } T_n=\max\{T_0/M_0, T_1/M_1, T_2/M_2, \ldots, T_d/M_d\}.$$

Hence, the reference-widths is R and the reference-depth is n.

The fourth one is Average of Normalized Maximums (AoNM). In Intra-DE, the largest text-length in each depth is calculated which is denoted by $T_k$. Then in Inter-DE, the average of the normalized largest text-length in each depth is calculated which we denote it by N. After finding N, the largest value of the normalized text-length, $\max\{T_0/M_0, T_1/M_1, T_2/M_2, \ldots, T_d/M_d\}$, and the corresponding depth is calculated. Finally, the device multiplies N with max-width of the depth just calculated. The reference-width R is set to $N \cdot M_k$ and the reference-depth is set to n such that $T_n/M_n=\max\{T_0/M_0, T_1/M_1, T_2/M_2, \ldots, T_d/M_d\}.$ The fifth one is Maximum of Averages (MoA). This is the opposite of AoM. In Intra-DE, the average of all the text-lengths at the same depth is calculated which is denoted by $T_k$. In Inter-DE, the largest $T_k$ is determined. The reference-width R is set to this largest value of $T_k$ (k=0, 1, ..., d) and the reference-depth is set to n such that $T_n=\max\{T_0, T_1, T_2, \ldots, T_d\}.$ The sixth one is Average of Averages (AoA). In Intra-DE, the average of all the text-lengths at the same depth is calculated which is denoted by $T_k$. In Inter-DE, the device takes the average of the results from the Intra-DE. The reference-width R is set to this final averaged value and the reference-depth is set to n such that $T_n=\max\{T_0, T_1, T_2, \ldots, T_d\}$. Note that in Intra-DE, all the text-lengths in the same depth are divided by number of statements at that depth. But in Inter-DE the averaged value from each depth is divided by d+1. This is to avoid situation where d=0.

The seventh one is Average of Text-lengths (AoT). In Intra-DE, the summation of all the text-lengths at the same depth is calculated which is denoted by $T_k$. In Inter-DE, the average of all the summation of different depth is calculated. The reference-width R is set to this averaged value and the reference-depth is set to n such that $T_n=\max\{T_0, T_1, T_2, \ldots, T_d\}.$ Note that the last RWE in FIG. 14 is Fixed Textbox-Width (FTW). This is the case where regardless of the size of incoming or outgoing statements, the textbox-widths are all fixed to their respective max-widths at depth k.

We now demonstrate how TWA is applied in different layouts. For illustration purpose, MoM is used for Reference-Width Equation.

Figure 15A:
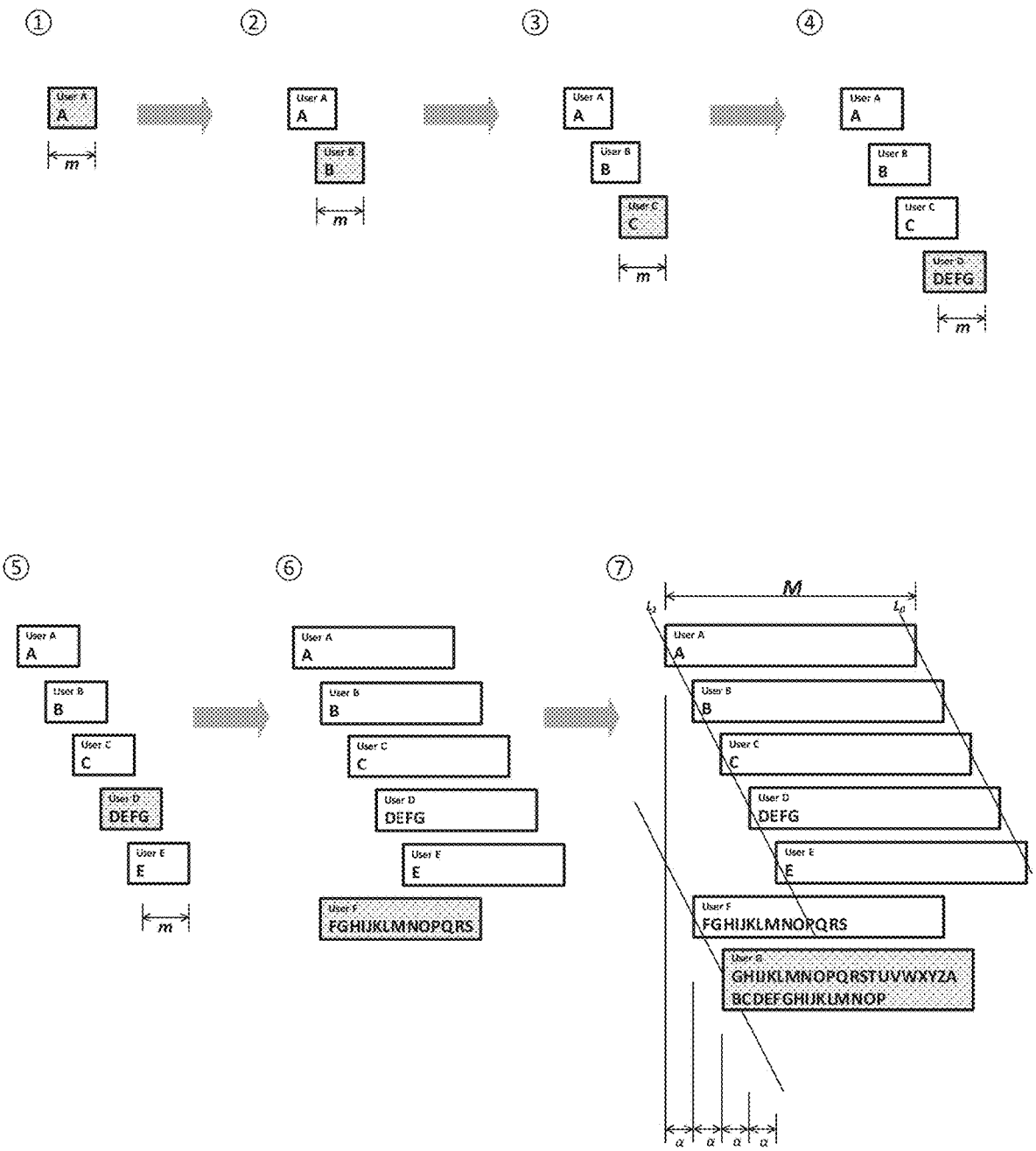
FIG. 15A consists of exemplary diagrams illustrating instant messaging between users under SWL-LR.

FIG. 15A illustrates the results after TWA was applied in GFAL. For the example, SWL-LR is used.

In ①  of FIG. 15A, a user (i.e., a user's device 200) receives a statement from User A (i.e., user A's device) and the statement becomes the main statement. We assume the text-length of the received statement is a (numerical value) and is less than m so this makes $R^{(0)}$=m.

In ② of FIG. 15A, the user receives a statement from User B and the statement becomes the child-statement of the main statement. We assume both text-lengths are the same and are less than m so it does not matter which statement becomes the reference-width. However, the device selects the statement from User B as a reference-width so $R^{(1)}=w_1$=m. This forces the remaining textbox-width $w_0$=m.

In ③ of FIG. 15A, the user receives a statement from User C and the statement becomes the child-statement of the statement from User B. We assume the text-length of the received statement is the same as others. The device selects User C's statement as a reference-width so we have $R^{(2)}=w_2$=m. This forces remaining textbox-width at depth 0 and 1 to equal m ($w_0=w_1$=m).

In ④ of FIG. 15A, the user receives another statement from User D that is a child statement of the statement from User C and it is placed below the statement received from User C. We assume the text-length of the received statement is equal to b and is greater than m. The device selects User D's statement as a reference-width so we have $R^{(3)}$=b. This forces the remaining textbox-widths at depths 0, 1, and 2 to equal b ($w_0=w_1=w_2$=b).

In ⑤ of FIG. 15A, the user receives a statement from User E that is a child statement of the statement from User D and it is placed below the statement received from User D. We assume the text-length of the received statement is equal to a and is less than m. The device again selects User D's statement as a reference-width so we have $R^{(3)}$=b. This forces the remaining textbox-widths at depths 0, 1, 2, 4 to equal b ($w_0=w_1=w_2=w_4$=b).

In ⑥ of FIG. 15A, the user receives a statement from User F that is a child statement of the main statement and it is placed below the statement received from User E. We assume the text-length of the received statement is equal to c and is greater than b. The device selects User F's statement as a reference-width so we have $R^{(1)}$=c. This forces the remaining textbox-widths at depths 0, 2, 3, 4 to equal to c ($w_0=w_2=w_3=w_4$=c).

Finally, in ⑦ of FIG. 15A, the user receives a statement from User G that is a child statement of the statement from User F and it is placed below the statement received from User F. We assume the text-length of the received statement is equal to d and is greater than c and M. The device selects User G's statement as a reference-width so we have $R^{(2)}$=M. This forces textbox-widths at remaining depth 0, 1, 3, 4 to equal to M ($w_0=w_1=w_3=w_4$=M).

Note that the layout has reached its maximum possible widths.

Figure 15B:
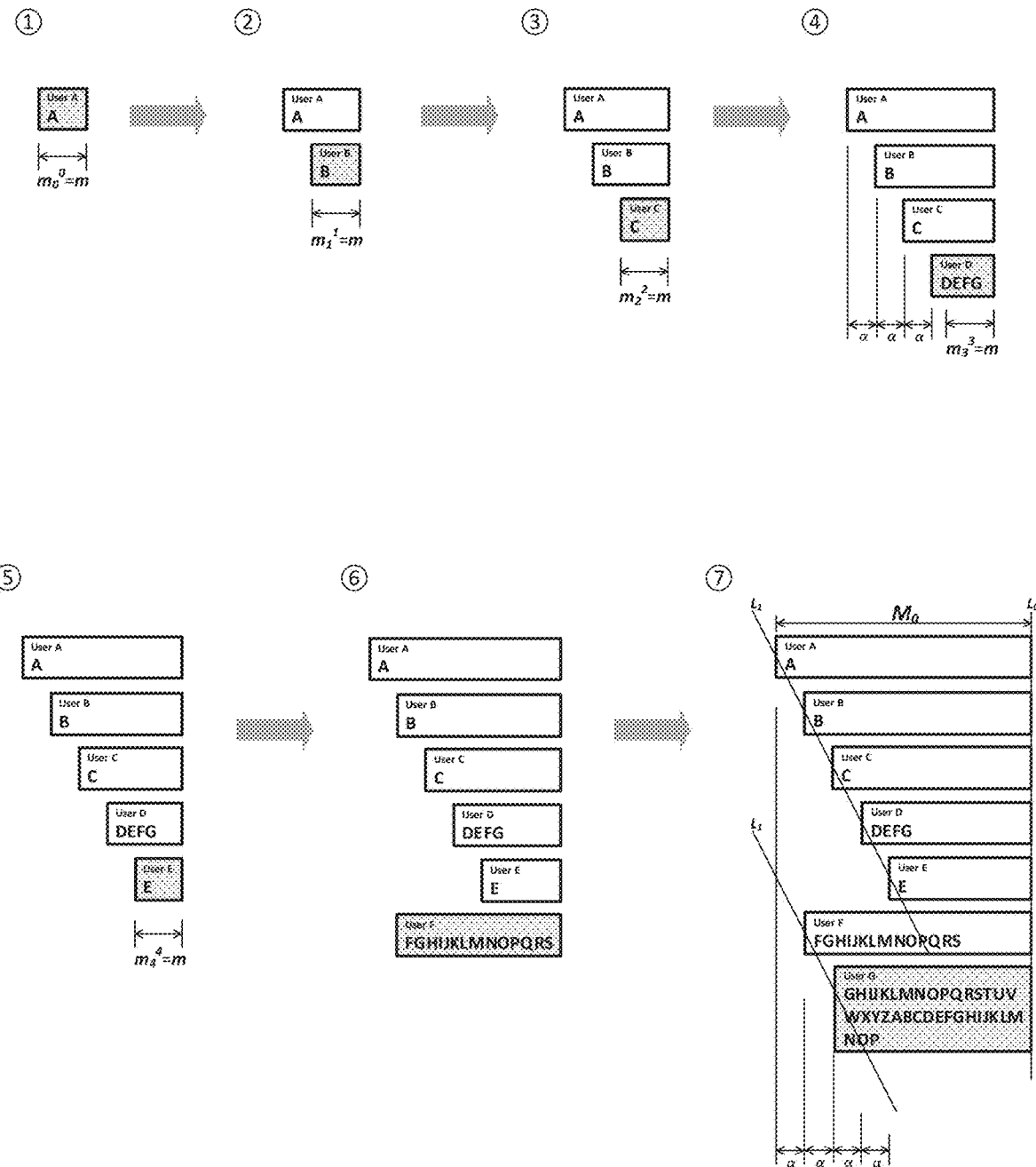
FIG. 15B consists of exemplary diagrams illustrating instant messaging between users under FAL-R.

FIG. 15B illustrates the results after TWA was applied in GFAL. For the example, FAL-R is used. Note that the superscript d in $m_k^d$ is used to illustrate how $m_k^d$ depends on the current lowest depth of a statement in a layout. Also, we have $m_d^d$=m.

In ① of FIG. 15B, a user receives a statement from User A and the statement becomes the main statement. We assume the text-length of the received statement is a (numerical value) and is less than m so this makes $R^{(0)}=m_0^0$.

In ② of FIG. 15B, the user receives a statement from User B and the statement becomes the child-statement of the main statement. We assume both text-length are in same length so it does not matter which statement becomes the reference-width. However, the device selects the statement from User B as a reference-width so we have $R^{(1)}=m_1^1$. This forces the textbox-width $w_0$ equal to $m_0^1$ ($w_0=m_0^1$). Note that the textbox-width of the statement at depth 0 is set to $m_0^1$ and the textbox-width of the statement at depth 1 is set to $m_1^1$. When the main statement was the only statement (lowest depth being 0) and its text-length was smaller than m, the textbox-width $w_0$ equaled $m_0^0$ which is smaller than $m_0^1$. Now that the lowest depth being 1, the min-widths at depth 0 is $m_0^1$ ($\neq m_0^0$).

In ③ of FIG. 15B, the user receives a statement from User C and the statement becomes the child-statement of the statement from User B. We assume the text-length of the received statement is the same as others. The device selects User C's statement as a reference-width so we have $R^{(2)}=m_2^2$. This forces textbox-widths $w_0=m_0^2$, $w_1=m_1^2$. The min-width for each depth when the lowest depth is at 2 is illustrated. That is, $m_0^2 > m_0^1 > m_0^0$ and $m_1^2 > m_1^1$.

In ④ of FIG. 15B, the user receives another statement from User D that is a child statement of the statement from User C and it is placed below the statement received from User C. We assume the text-length of the received statement is equal to b and is greater than $m_3^3$. The device selects User D's statement as a reference-width so we have $R^{(3)}$=b. This forces textbox-widths $w_0=3\alpha+b$, $w_1=2\alpha+b$, and $w_2=\alpha+b$. The min-width for each depth when the lowest depth is at 3 is illustrated. That is, $m_0^3 > m_0^2 > m_0^1 > m_0^0$, $m_1^3 \geq m_1^2 \geq m_1^1$ and $m_2^3 > m_2^2$.

In ⑤ of FIG. 15B, the user receives a statement from User E that is a child statement of the statement from User D and it is placed below the statement received from User D. We assume the text-length of the received statement is equal to a and is less than $m_4^4$. The device again selects User D's statement as a reference-width but b is less than $m_3^4$ so we have $R^{(3)}=m_3^4$. This forces textbox-widths $w_0=m_0^4$, $w_1=m_1^4$, $w_2=m_2^4$, and $w_4=m_4^4$.

In ⑥ of FIG. 15B, the user receives a statement from User F that is a child statement of the main statement and it is placed below the statement received from User E. We assume the text-length of the received statement is equal to c and is greater than b. The device selects User F's statement as a reference-width so we have $R^{(1)}$=C. This forces textbox-widths $w_0=\alpha+c$, $w_2=c-\alpha$, $w_3=c-2\alpha$ and $w_4=c-3\alpha$.

Finally, in ⑦ of FIG. 15B the user receives a statement from User G that is a child statement of the statement from User F and it is placed below it. We assume the text-length of the received statement is equal to d and is greater than c and $M_2$. The device selects User G's statement as a reference-width so we have $R^{(2)}=M_2$. This forces textbox-widths $w_0=M_0$, $w_1=M_1$, $w_3=M_3$, and $w_4=M_4$. Note that the max-width $M_k$ does not depend on the current lowest depth d. The layout has reached its maximum possible widths.

Now we focus on TWA applied on GVAL. There are two types of GVALs—fixed rotation point GVAL and floating rotation point GVAL. As mentioned previously, in GVAL, the alignment lines $l_1$ and $l_0$ rotates counter-clockwise or clockwise. So, as the names imply, in fixed rotation point, the rotation point is fixed but in floating rotation point, the point shifts down as the depth of the sent/received statement gets lower. In fixed rotation point GVAL, only the min-width $m_k^d$ depends on the current lowest depth d but in floating rotation point GVAL, both max-width $M_k^d$ and min-width $m_k^d$ depends on the current lowest depth d.

Figure 15C:
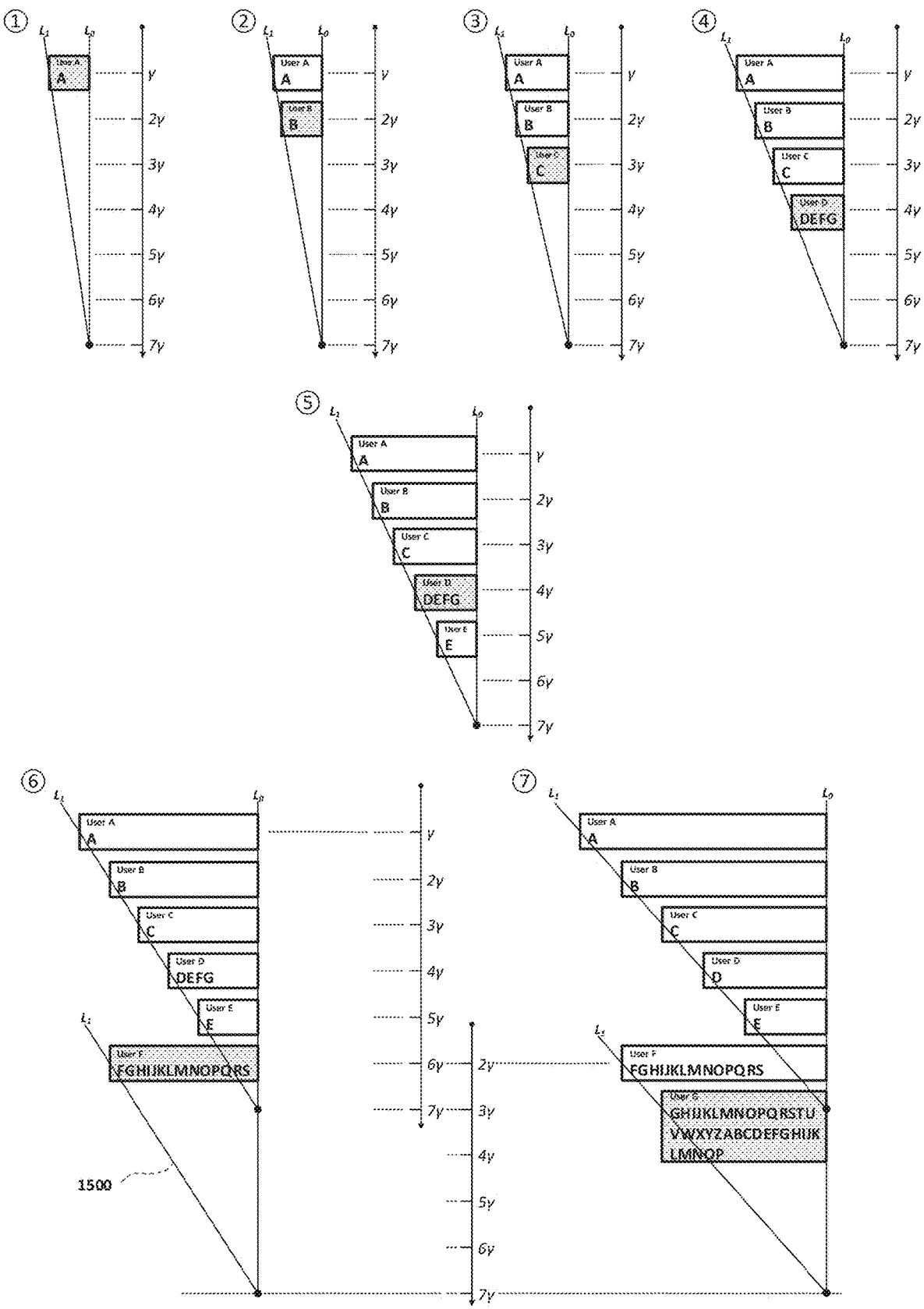
FIG. 15C consists of exemplary diagrams illustrating instant messaging between users under fixed rotation point VAL-R.

FIG. 15C illustrates the results after TWA was applied in fixed point GVAL. For the example, fixed point VAL-R is used. Note that in the example, the rotation point is fixed at $7\gamma$.

In ① of FIG. 15C, a user receives a statement from User A and the statement becomes the main statement. We assume the text-length of the received statement is a (numerical value) and is less than m so this makes $R^{(0)}=m_0^0$.

In ② of FIG. 15C, the user receives a statement from User B and the statement becomes the child-statement of the main statement. We assume both text-length are in same length so it does not matter which statement becomes the reference-width. However, the device selects the statement from User B as a reference-width so we have $R^{(1)}=m_1^1$. This forces the textbox-width $w_0=m_0^1$. Now that the lowest depth being 1, the min-widths at depth 0 is $m_0^1$ ($\neq m_0^0$).

In ③ of FIG. 15C, the user receives a statement from User C and the statement becomes the child-statement of the statement from User B. We assume the text-length of the received statement is the same as others. The device selects User C's statement as a reference-width so we have $R^{(2)}=m_2^2$. This forces textbox-widths $w_0=m_0^2$, $w_1=m_1^2$. The min-width for each depth when the lowest depth is at 2 is illustrated. That is, $m_0^2 > m_0^1 > m_0^0$ and $m_1^2 > m_1^1$.

In ④ of FIG. 15C, the user receives another statement from User D that is a child statement of the statement from User C and it is placed below the statement received from User C. We assume the text-length of the received statement is equal to b and is greater than $m_3^3$. The device selects User D's statement as a reference-width so we have $R^{(3)}$=b. This forces textbox-width at depth 0, 1, 2, and 3 to equal the lengths between alignment line $L_1$ and $L_0$. Each remaining textbox-width—$w_0$, $w_1$, and $w_2$—is calculated by using trigonometric properties.

In ⑤ of FIG. 15C, the user receives a statement from User E that is a child statement of the statement from User D and it is placed below the statement received from User D. We assume the text-length of the received statement is equal to a and is less than $m_4^4$ and assume that the text-length of the text "DEFG" (=b) is less than $m_3^4$. The device again selects User D's statement as a reference-width but b is less than $m_3^4$ so we have $R^{(3)}=m_3^4$. This forces textbox-widths $w_0=m_0^4$, $w_1=m_1^4$, $w_2=m_2^4$, and $w_4=m_4^4$. The min-widths when the current lowest depth is 4 are predefined by trigonometric properties.

In ⑥ of FIG. 15C, the user receives a statement from User F that is a child statement of the main statement and it is placed below the statement received from User E. Another alignment line (1500) is drawn in the layout. Note that the rotation point of this new alignment line is five units away from the statement (just as the first rotation point is five units away from the statement from User B). We assume the text-length of the received statement is equal to c and is greater than b. The device selects User F's statement as a reference-width so we have $R^{(1)}=c$. This forces remaining textbox-width at depth 0, 2, 3, 4 to equal the lengths between alignment line $L_1$ and $L_0$. Again, each remaining textbox-width is calculated by trigonometric properties.

Finally, in ⑦ of FIG. 15C, the user receives a statement from User G that is a child statement of the statement from User F and it is placed below it. We assume the text-length of the received statement is equal to d and is greater than c and $M_2$. The device selects User G's statement as a reference-width so we have $R^{(2)}=M_2$. This forces remaining textbox-widths $w_0=M_0$, $w_1=M_1$, $w_3=M_3$, and $w_4=M_4$. Note that the layout has reached its maximum possible widths.

Figure 15D:
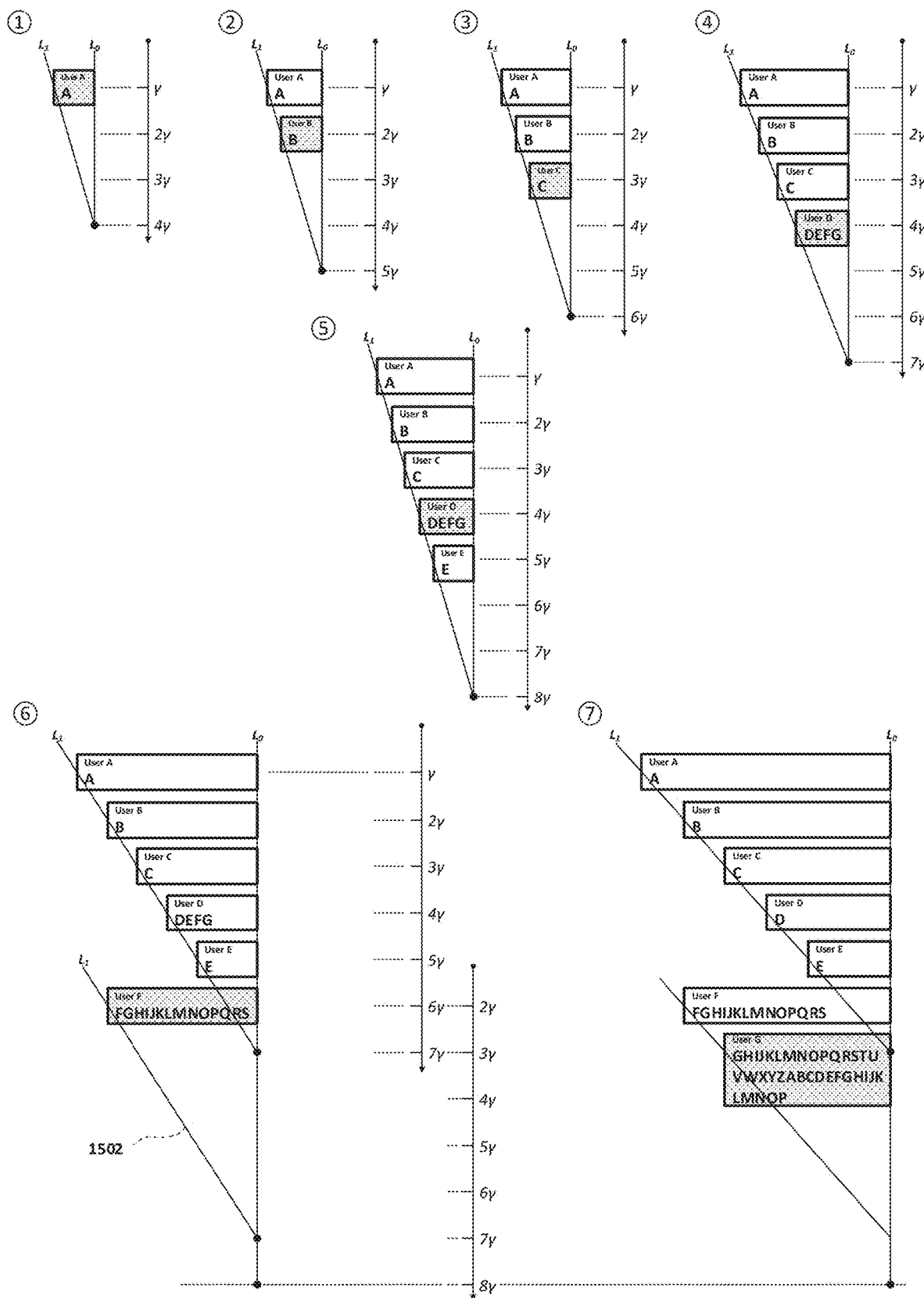
FIG. 15D consists of exemplary diagrams illustrating instant messaging between users under floating rotation point VAL-R.

FIG. 15D illustrates the results after TWA was applied in floating point GVAL. For the example, we use floating point VAL-R. Note that in the example, the rotation point is initially positioned at 4γ.

In ① of FIG. 15D, a user receives a statement from User A and the statement becomes the main statement. We assume the text-length of the received statement is a (numerical value) and is less than m so this makes $R^{(0)}=m_0^0$.

In ② of FIG. 15D, the user receives a statement from User B and the statement becomes the child-statement of the main statement. The rotation point moves down one unit and forms a new alignment. We assume both text-length are in same length so it does not matter which statement becomes the reference-width. However, the device selects the statement from User B as a reference-width so we have $R^{(1)}=m_1^1$. This forces the textbox-width $w_0=m_0^1$. Now that the lowest depth being 1, the min-widths at depth 0 is $m_0^1$ ($>m_0^0$).

In ③ of FIG. 15D, the user receives a statement from User C and the statement becomes the child-statement of the statement from User B. The rotation point moves down one unit and forms a new alignment. We assume the text-length of the received statement is the same as others. The device selects User C's statement as a reference-width so we have $R^{(2)}=m_2^2$. This forces textbox-widths $w_0=m_0^2$ and $w_1=m_1^2$. The min-width for each depth when the lowest depth is at 2 is illustrated. That is, $m_0^2>m_0^1>m_0^0$ and $m_1^2>m_1^1$.

In ④ of FIG. 15D, the user receives another statement from User D that is a child statement of the statement from User C and it is placed below the statement received from User C. The rotation point moves down one unit and forms a new alignment. We assume the text-length of the received statement is equal to b and is greater than $m_3^3$. The device selects User D's statement as a reference-width so we have $R^{(3)}=b$. This forces textbox-width at depth 0, 1, 2, and 3 to equal the lengths between alignment line $L_1$ and $L_0$. Each remaining textbox-width—$w_0$, $w_1$, and $w_2$—is calculated by using trigonometric properties.

In ⑤ of FIG. 15D, the user receives a statement from User E that is a child statement of the statement from User D and it is placed below the statement received from User D. The rotation point moves down one unit and forms a new alignment. We assume the text-length of the received statement is equal to a and is less than $m_4^4$ and assume that the text-length of the text "DEFG" (=b) is less than $m_3^4$. The device again selects User D's statement as a reference-width but b is less than $m_3^4$ so we have $R^{(3)}=m_3^4$. This forces remaining textbox-widths $w_0=m_0^4$, $w_1=m_1^4$, $w_2=m_2^4$ and $w_4=m_4^4$. The min-widths when the current lowest depth is 4 are predefined by trigonometric properties.

In ⑥ of FIG. 15D, the user receives a statement from User F that is a child statement of the main statement and it is placed below the statement received from User E. The rotation point does not move down since the statement is not at the new lowest depth. But another alignment line is drawn in the layout (1502). Note that the rotation point of this alignment line is five γ away from the statement (just as the first rotation point is five units away from the statement from User B). We assume the text-length of the received statement is equal to c and is greater than b. The device selects User F's statement as a reference-width so we have $R^{(1)}=c$. This forces remaining textbox-width at depth 0, 2, 3, 4 to equal the lengths between alignment line $L_1$ and $L_0$. Again, each remaining textbox-width is calculated by trigonometric properties.

Finally, in ⑦ of FIG. 15D, the user receives a statement from User G that is a child statement of the statement from User F and it is placed below the statement received from User F. The rotation point does not move down. We assume the text-length of the received statement is equal to d and is greater than c and $M_2^4$. The device selects User G's statement as a reference-width so we have $R^{(2)}=M_2^4$. This forces remaining textbox-widths $w_0=M_0^4$, $w_1=M_1^4$, $w_3=M_3^4$, and $w_4=M_4^4$. Note that the layout has reached its maximum possible widths. Additionally, if the user receives a new statement at depth 5, the max-widths $M_i^5$ (i=1~5) would be different from $M_j^4$ (j=1~4). Note that $M_0^5=M_0^4$ regardless of the value of depth d. Therefore, in general, we have $M_k^a \geq M_k^b$ where a>b>0. So, in the case of floating point GVAL, max-widths $M_k^d$ do depend on the current lowest depth d.

Figure 15E:
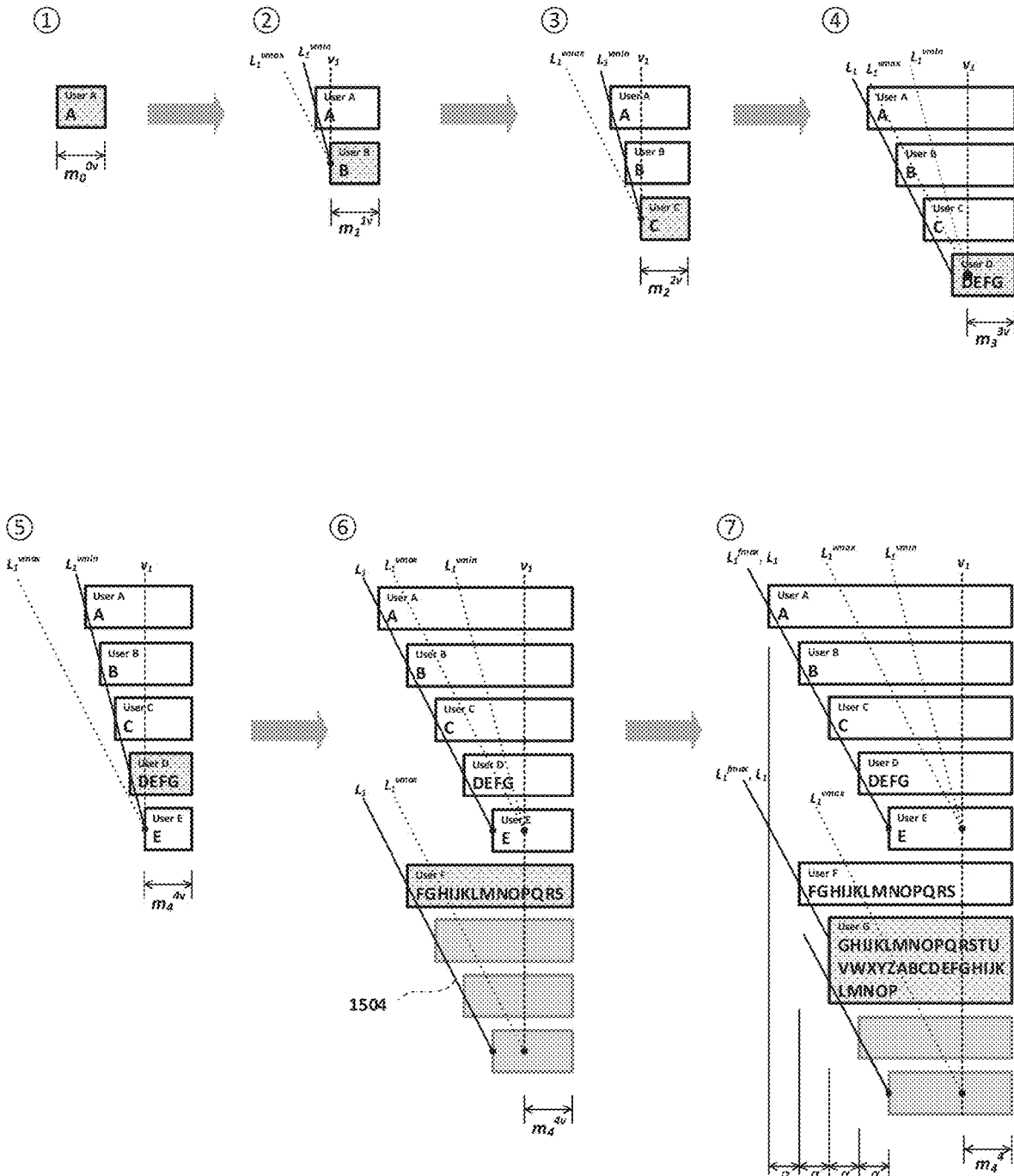
FIG. 15E consists of exemplary diagrams illustrating instant messaging between users under fixed rotation point MAL-R.

FIG. 15E illustrates the results after TWA was applied in floating point GMAL. For the example, we use floating point MAL-R. This implies the floating point VAL-R is used for the VAL part of MAL-R.

In ① of FIG. 15E, a user receives a statement from User A and the statement becomes the main statement. We assume the text-length of the received statement is a (numerical value) and is less than m so this makes $R^{(0)}=m_0^0$.

In ② of FIG. 15E, the user receives a statement from User B and the statement becomes the child-statement of the main statement. The rotation point is now on the left mid-point of the new statement and forms a new alignment. We assume both text-length are in same length so it does not matter which statement becomes the reference-width. However, the device selects the statement from User B as a reference-width so we have $R^{(1)}=m_1^1$. This forces the remaining textbox-width $w_0=m_0^1$. Since text-lengths of both of the texts are smaller than $m_0^{1v}$ and $m_1^{1v}$, the layout is in VAL-R mode (superscript v indicates that the layout is in VAL mode).

In ③ of FIG. 15E, the user receives a statement from User C and the statement becomes the child-statement of the statement from User B. The rotation point is now on the left mid-point of the new statement and forms a new alignment.

We assume the text-length of the received statement is the same as others. The device selects User C's statement as a reference-width so we have $R^{(2)}=m_2^{2v}$. This forces the remaining textbox-widths $w_0=m_0^{2v}$ and $w_1=m_1^{2v}$. Since text-lengths of all the texts are smaller than $m_0^{2v}$, $m_1^{2v}$, and $m_2^{2v}$, the layout is still in VAL-R mode.

In ④ of FIG. 15E, the user receives another statement from User D that is a child statement of the statement from User C and it is placed below the statement received from User C. The rotation point is now on the left mid-point of the new statement and forms a new alignment. We assume the text-length of the received statement is equal to b and is greater than $m_3^{3v}$. The device selects User D's statement as a reference-width so we have $R^{(3)}=b$. Notice that since b is greater than $m_3^{3v}$, the layout turns into FAL-R mode. This forces the remaining textbox-widths $w_0=3\alpha+b$, $w_1=2\alpha+b$, and $w_2=\alpha+b$.

In ⑤, the user receives a statement from User E that is a child statement of the statement from User D and it is placed below the statement received from User D. We assume the text-length of the received statement is equal to a and is less than $m_4^{4v}$ and assume the text from User D is less than $m_3^{4v}$. This makes the layout to turn into VAL-R mode and the rotation point is placed at the left mid-point of the statement from User E. The device again selects User D's statement as a reference-width but b is less than $m_3^{4v}$ so we have $R^{(3)}=m_3^{4v}$. This forces the remaining textbox-widths $w_0=m_0^{4v}$, $w_1=m_1^{4v}$, $w_2=m_2^{4v}$, and $w_4=m_4^{4v}$.

In ⑥ of FIG. 15E, the user receives a statement from User F that is a child statement of the main statement and it is placed below the statement received from User E. We assume the text-length of the received statement is equal to c and is greater than b. So, this makes the layout to turn into FAL-R mode. Notice that there are empty textboxes below the new statement. These "invisible" textboxes are there to illustrate the statement is aligned with the linear alignment line (1504) that is coming from the "imaginary" statement. The device selects User F's statement as a reference-width so we have $R^{(1)}=c$. This forces textbox-widths $w_0=\alpha+c$, $w_2=c-\alpha$, $w_3=c-2\alpha$, and $w_4=c-3\alpha$.

Finally, in ⑦ of FIG. 15E, the user receives a statement from User G that is a child statement of the statement from User F and it is placed below the statement received from User F. We assume the text-length of the received statement is equal to d and is greater than c and $M_2$. This makes the layout to still be in FAL-R mode. The device selects User G's statement as a reference-width so we have $R^{(2)}=M_2^{4f}$. This forces textbox-widths $w_0=M_0^{4f}$, $w_1=M_1^{4f}$, $w_3=M_3^{4f}$, and $w_4=M_4^{4f}$. Note that the layout has reached its maximum possible widths.

The TWA is executed in several situations. The first situation is when the user rotates his/her device. We can assume that most of the devices are rectangular shape and the users mostly use the device in portrait mode. However, the user can rotate the device so it is in landscape mode. This implies that the default max-width and min-width of the textbox-widths can be increased since there is increase of horizontal space. We call the process TWA Upon Rotation (TWA-R). The second situation is when the user sends/receives a statement to/from others. In this case, the text-length of the new statement is added to the pool of already existing text-lengths and the process decides $R^{(k)}$. We call this process TWA Upon Send and Receive (TWA-SR, hereinafter). The third situation is when the user decides to not display some statements. In this case, the process recalculates the $R^{(k)}$ and switches back to its original view when the user decides to display what was not displayed. We call this process TWA Upon Collapse and Expand (TWA-CE, hereinafter). The fourth situation is when the user deletes a statement. In this case the text-length of the deleted statement is excluded from the pool of text-lengths and the $R^{(k)}$ is recalculated. We call this process TWA Upon Delete (TWA-D, hereinafter). Finally, the last situation is when the user modifies an existing statement. In this case, modifying an existing text can affect the text-length and the process recalculates the $R^{(k)}$. We call this process TWA Upon Modify (TWA-M, hereinafter). These are the processes that follow after commands are executed. We explain these processes in detail later. These processes will be explained with detail in later subsections.

As illustrated thus far, we can see that TWA plays a major role in RMS. This mechanism keeps the layout synchronized and consistent which is one of the purpose of RMS.

We now illustrate a feature called TWA Upon Rotation (TWA-R). Thus far, we have assumed that the layout was displayed on the physical screen that was on portrait mode. Whenever a user rotates his/her device in landscape mode, the device can redo TWA based on different values of M and m. So, in TWA-R, the term rotation means switching from portrait mode to landscape mode. The device can be set to redo TWA upon rotation.

FIG. 16A illustrates two different looking layouts but they are the same layouts on the same device just displayed in different mode. We note that the numbers indicate the text-length of the text in each statement (i.e., each text message).

The layout in ① of FIG. 16A is in portrait mode and the layout in ② of FIG. 16A is in landscape mode. Since the values of M and m in portrait mode are smaller than the values of M* and m* in landscape mode, the statements in ② of FIG. 16A are wider than the ones in ① of FIG. 16A. For example, the text-length in the statement (1600) is 100 and the text is broken down into three lines. On the other hand as indicated in 1602, the text can fit nicely in one line when the device is in landscape mode.

Figures 16B, 16C:
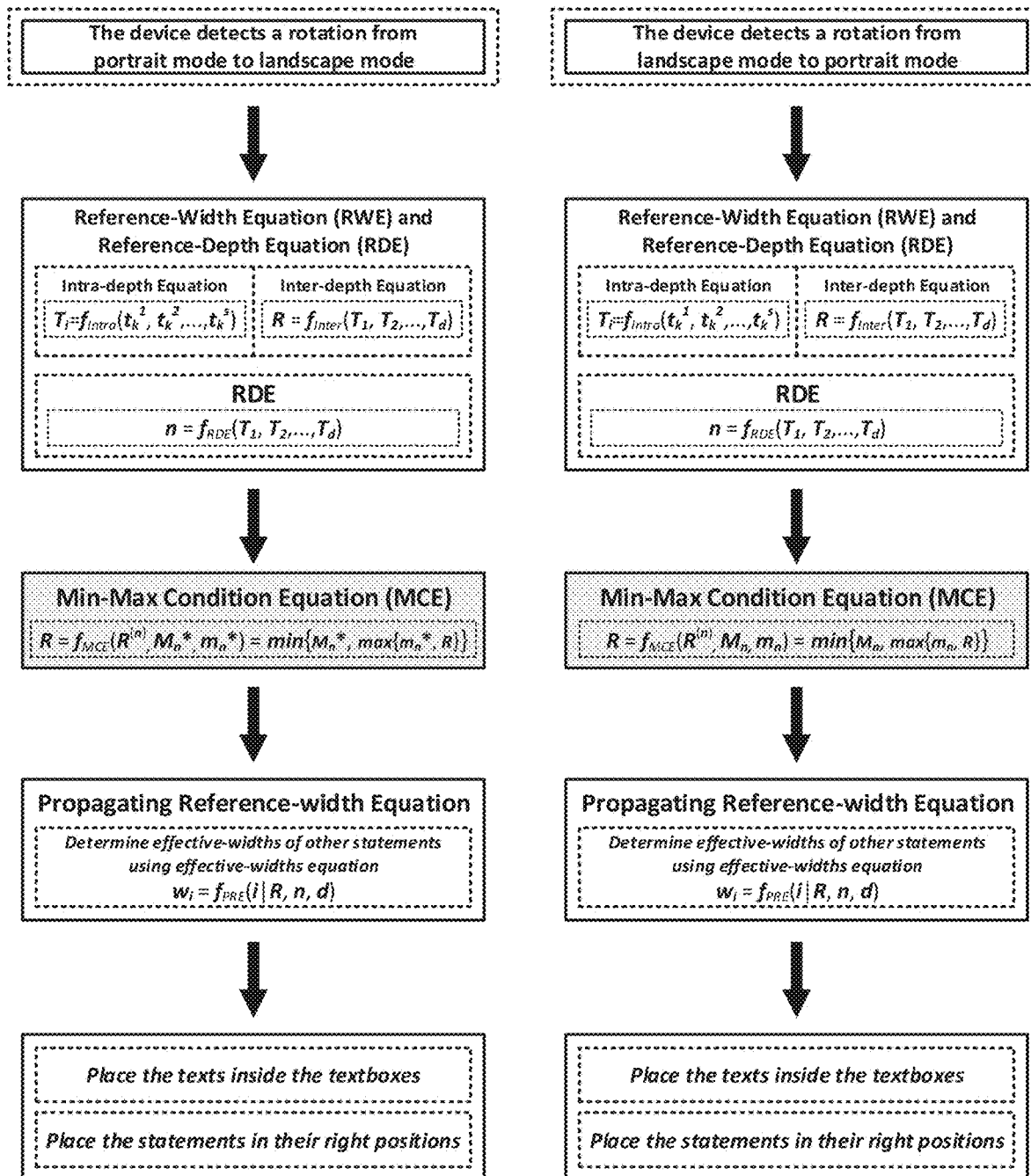
FIGS. 16B and 16C consists of flowcharts illustrating a method of readjusting all the textbox widths when the device rotates from portrait mode to landscape mode.

FIG. 16B and FIG. 16C illustrate two flowcharts those are similar to the ones in FIG. 13A and FIG. 13B. In FIG. 16B, whenever the device detects a rotation from portrait mode to landscape mode the process of TWA executed with different values of max-widths $M_n^*$ and min-widths $m_n^*$. In FIG. 16C, whenever the device detects a rotation from landscape mode to portrait mode the process of TWA is executed but with different values of max-widths, $M_n$, and min-widths $m_n$.

FIG. 17A-17C are flowcharts of organizing and displaying instant messages in various structured fashion according to at least one an exemplary embodiment presented in FIGS. 1 thru 16C of the present disclosure.

The device 200 communicates with a plurality of users' devices (e.g., group of user's devices to participate in a chatting session or a group text mode exclusively established for the group members) through I/O interface 306 and network communication interface 302. When the device 200 receives and/or transmits, not limited to, text messages (including image messages and/or video messages) among the devices of the group members to participate in, e.g., the chatting session, one or more processors or the controller 106 of the device 200 is configured to organize and display the messages on the displayer (e.g., a touch screen displayer) in a hierarchical structure fashion. To do so, the present disclosure defines parameters to be used for organizing and displaying the messages (i.e., outgoing messages and incoming messages) as addressed in FIGS. 8A and 8B, and FIGS. 9A-11B. That is, the parameters (e.g., user identification, data and time (ID) and numbering in FIG. 8B) include parameters (hereinafter, referred to as "message parameters" solely for convenience of description) related information for identifying whether each of the messages is the main message or a sub-message stemming from the main message. When the processor detects an event of occurring a message (i.e., an outgoing message or incoming message during the chatting session, the processor extracts the message parameters from said message to identify whether the message is a main message or a sub-message by analyzing each parameter of the message parameters.

The processor also defines parameters (hereinafter, referred to as "layout parameters" solely for convenience of description) including information of how to organize or display the messages in a hierarchical structured fashion. For example, the "layout parameters" include parameters for one or more alignment lines (e.g., a first alignment line $l_1$ and a second alignment line $l_0$, indentation parameter (i.e., depth D and d) in FIGS. 9A-11B), max-width an min-width of each alignment line parameter, slope parameters (e.g., point $P_1$ and $P_0$, as well as angular $\Delta_1$ and $\Delta_0$). The processor defines various layout modes for messages by setting various combinations with the messages parameters and the layout parameters, as illustrated in, e.g., FIGS. 9A-11B of the present disclosure. Herein, for convenience of brief description, each parameter for the message parameters and the layout parameters is incorporated herein as exemplarily described above in FIGS. 9A-11B.

FIG. 17A illustrates the flowchart where the user of the device 200 selects a layout mode from among various layout modes which the user prefers to organize and display outgoing and incoming messages exchanged during the chatting session, the processor sets the selected layout mode (S1700).

As mentioned, whenever a user sends the first message (or main statement), the ID (user id and date & time sent) and the numbering are sent along with the actual text message. In the case of the very first message, the numbering is simply 0 and this indicates the message is the first message. However, when a user replies to the first message (or any sub-messages), the device 200 only generates a new numbering and appends it to the existing ID. Finally, this new information is sent to other user(s).

FIG. 17B is a flowchart illustrating a method of sending a message to other user(s). The user either sends the first message or replies to an existing message (S1702). In the former, the ID (user id+date & time the message was sent), and the numbering are generated. In the latter, based on the message the user is replying to, only a new numbering is generated. Additionally, other relevant parameters are generated (S1704). At the final stage, the above mentioned parameters are stored and sent to other users (i.e., other users' devices) (S1706).

FIG. 17C is a flowchart illustrating a method of processing a detected message. When a message is occurred, the processor detects the message, the processor extracts the message parameters from the message to thereby identify attribute (or properties) of the message, i.e., whether the message is the first message or sub-message to the first message, by analyzing information of the extracted messages parameters (S1708). The processor determines reference-width and reference-depth per a time when outgoing or incoming message is sequentially occurred (S1710). The processor determines all the widths of the textboxes of the existing message(s) in a layout and determines the width of the textbox for the detected message. Then the processor readjusts the widths of the existing textboxes in the layout (S1712). Finally, the processor reorganizes the layout including the detected message in a hierarchical structured fashion (S1714).

The processor organizes outgoing or incoming messages currently occurred during the chatting session based on each parameter previously set in the selected layout mode and the determined reference-width and reference-depth. Based on the textbox size of the determined reference-width and the determined reference-depth, the processor determines a textbox size of an outgoing or incoming message to be displayed. Based on the layout parameters previously set for the selected layout mode, the processor displays the messages in a hierarchical structure fashion in a manner where the textbox size (i.e., width) of each of the messages is determined or adjusted as set in max-width of a first alignment line parameter and min-width of a second alignment line parameter, the indentation parameter, and the slope parameters.

For example, in FIG. 9A, when the slope parameters are fixed, the textboxes of outgoing or incoming messages are organized and displayed with a range specified by max and min values of a first alignment line parameter $l_1$, and max-width and min-width of a second alignment line parameter $l_0$. That is, in FIG. 9A, textbox width of each message is organized and displayed with a range specified in the max-width and min-width of each of the first and second alignment parameters where the range is also specified in the fixed angular (i.e., point $P_1$ and $P_0$, $\Delta_1$ and $\Delta_0$) set in the slope parameters. For another example, in FIG. 9B, when the slope parameters are fixed, the textboxes of outgoing or incoming messages are organized and displayed with a range specified by max-width and min-width of a first alignment line parameter $l_1$, and max-width and min-width of a second alignment line parameter $l_0$. That is, in FIG. 9B, textbox width of each message is organized and displayed with a range specified in the values of the first and second alignment parameters where the range is also specified in the fixed angular (i.e., point $P_1$ and $P_0$, $\Delta_1$ and $\Delta_0$) set in the slope parameters. Further, in FIG. 9B, the processor organizes and displays messages sorted by or originated per each branch message (or parent message for the sorted messages) within a family range parallel to previous range, where the family range is set by a left-shifted alignment line $l_1$ and a right-shifted alignment line $l_0$.

For example, in FIG. 10A, when the slope parameters point ($\Delta_1$ and $\Delta_0$) are variously set, the textboxes of outgoing or incoming messages are organized and displayed with a range angularly changed by max-width and min-width of a first alignment line parameter $l_1$, and max-width and min-width of a second alignment line parameter $l_0$, where the first and second alignment lines have respective slopes on the center of point P with angular (i.e., $\Delta_1$ and $\Delta_0$) set in the slope parameters. Herein, the processor controls the first and second alignment lines to respectively rotate in a clockwise direction or counter-clockwise direction within max-width and min-width of the first and second alignment lines parameters previously set.

In an exemplary embodiment, the processor reorganizes and displays the messages in another hierarchical structured fashion by linearly shifting the first and second alignment lines in a left or right direction to thereby adjusting or resizing textbox width of each message, as illustrated in FIGS. 9A-9B.

In another exemplary embodiment, the processor reorganizes and displays the messages in another hierarchical structured fashion by angularly shifting the first and second alignment lines in a clockwise or counter-clockwise direction to thereby adjusting or resizing textbox width of each message, as illustrated in FIGS. 10A-11B.

Now that we have defined number of layouts, it is obvious that there must be a mechanism that manages a layout and statement(s) on the device. This is done by special features that enable the user to manage the layout. We call them commands and we present eighteen of them. Before we present them we note that there are number of ways how the device provides these commands to the user. Stated differently, the user can "access" the commands in different ways. We broadly categories how the device provides the commands into three methods:

The first method is called internalized commands (i.e., commands in an internalized type or status). In this method, the commands are not shown to the user. The user needs to take a necessary step in order to view set of command he/she can apply on a layout or statement.

Figure 18A:
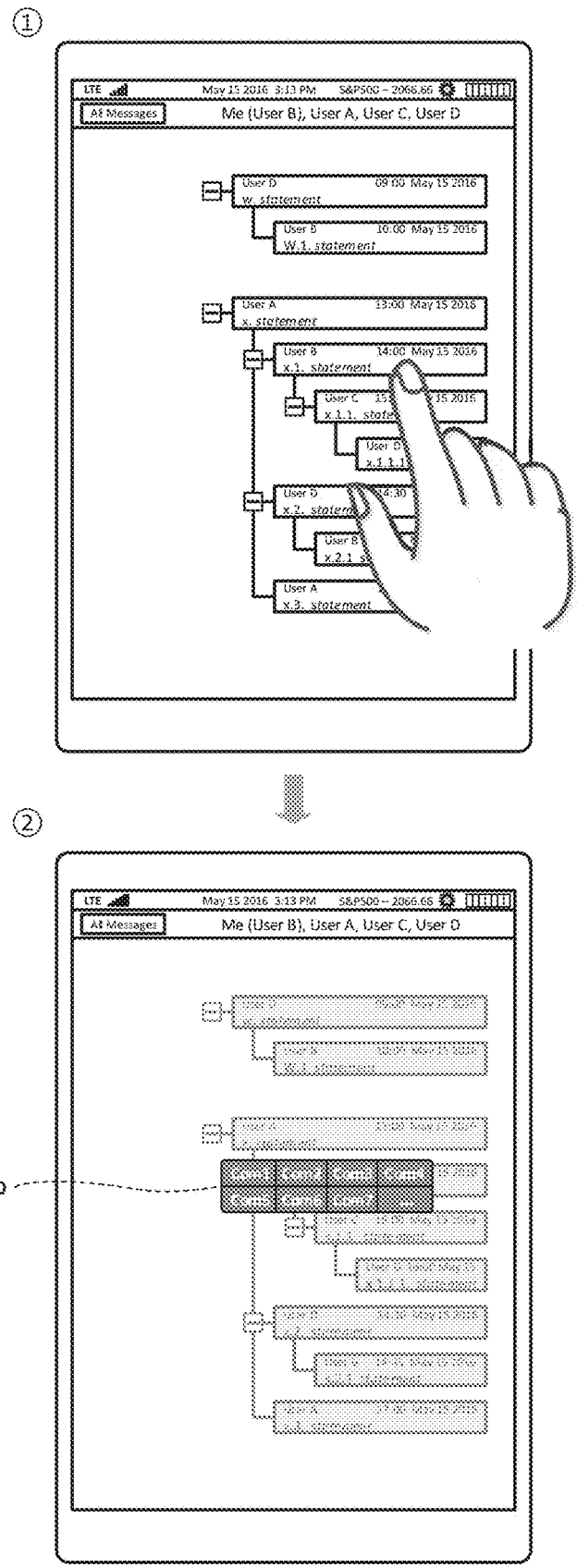
FIG. 18A consists of exemplary diagrams illustrating the notion of internalized commands.

FIG. 18A illustrates internalized commands. In ① of FIG. 18A, a user applies a predefined hand gesture (or a predefined user gesture, e.g., a finger touch, movement, tapping on displayer of the device and so on) on statement x.1. Once the device detects this hand gesture then the device displays set of commands as illustrated in 1800. We call 1800, the prompted command display area. As illustrated in ② of FIG. 18A, once the device applies the predefined hand gesture on a specific statement then the device checks the internal statement of the statement and displays all the commands (as illustrated as Com1, Com2, and so on) in the prompted command display area. The user sees the commands and applies a hand gesture on the command he/she was intended to apply.

The second method is called externalized commands (i.e., commands in an externalized type or status). In this method, the commands are readily displayed on each statement. Therefore, the user can see the commands and apply it right away.

Figure 18B:
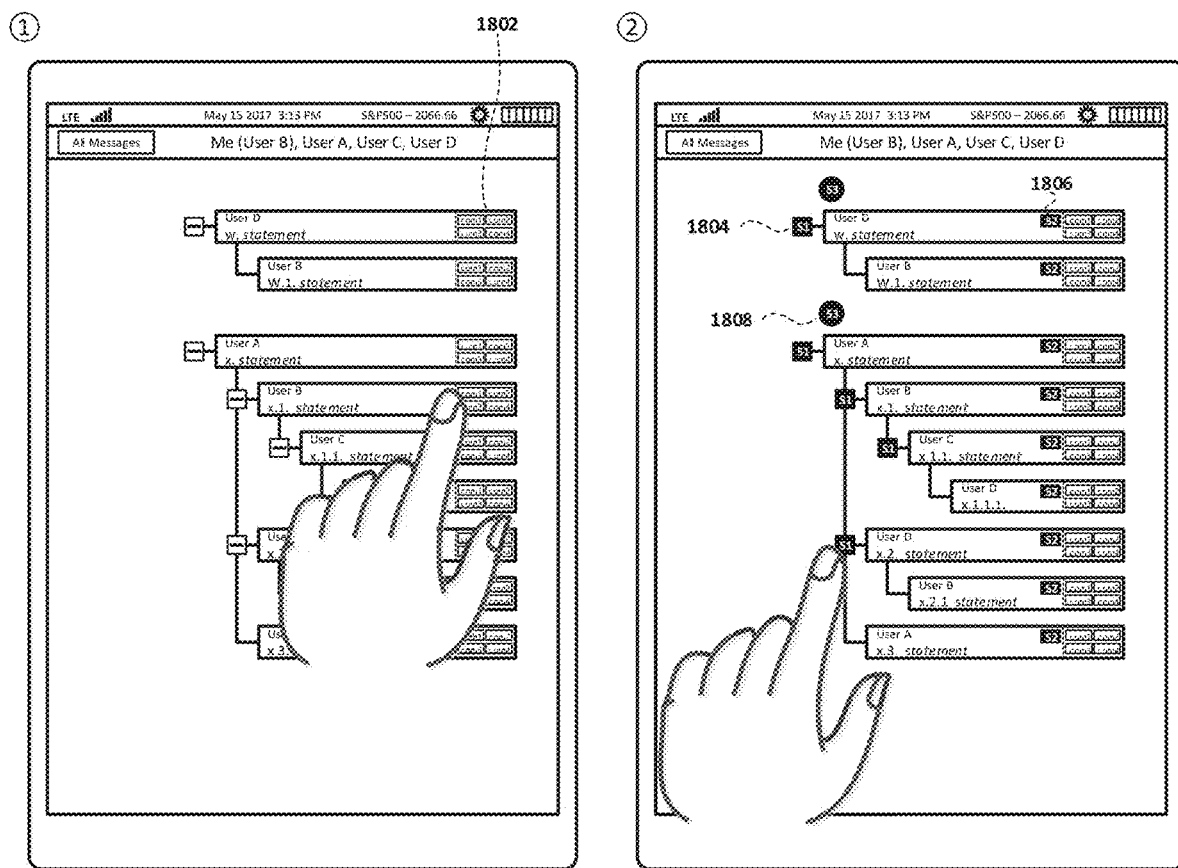
FIG. 18B consists of exemplary diagrams illustrating the notion of externalized commands.

FIG. 18B illustrates externalized commands. As illustrated in ① of FIG. 18B, commands are readily displayed on each statement. In the figure all the commands are displayed on the right part of each statement. We call the area where the commands are displayed, the command display area (1802). So in externalized commands, the device keeps track of the internal state of each statement every time a command is applied on a layout and updates or renews all the applicable commands (as illustrated as Com1, Com2, and so on) on each statement. Sometimes, instead of enumerating applicable commands in the command display area, we can simply use symbols to replace the displayed commands. This idea is illustrated in ② of FIG. 18B. Although we will not go into detail on these symbols now but positions of these symbols are illustrated in 1804, 1806, and 1808. We note that each symbol replaces specific command.

Finally, the last method is called customized commands (i.e., commands in a customized type or status). In this method, a distinct hand gestures represent a command. Therefore, we assume that the user "knows" the specific (customized) hand gesture that represents a specific command in advance. If a command is customized the command will not be displayed in anyway.

Figure 18C:
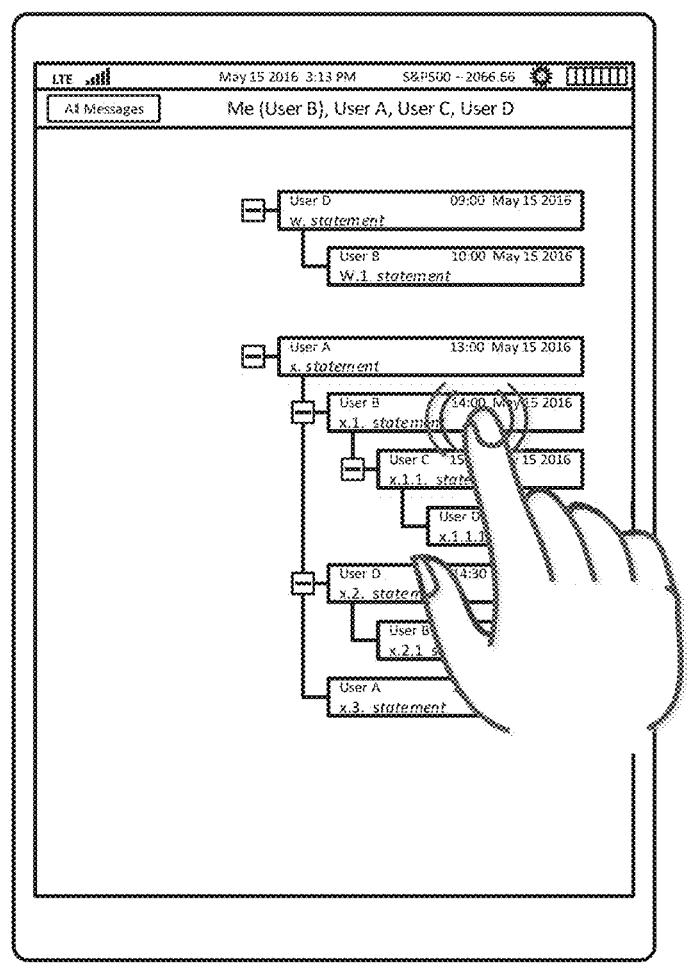
FIG. 18C consists of exemplary diagram illustrating the notion of customized commands.

FIG. 18C illustrates customized commands. The figure illustrates a user applying a customized hand gesture on a statement in order to apply the command that the customized hand gesture represents.

In summary, the idea of internalized and externalized commands are basically the same but in internalized commands, the user needs to take an extra step to actually see the applicable commands whereas in externalized commands, these commands are readily available. The idea of customized commands is different from other two where a specific command can be applied on the layout by a specific (customized) hand gesture.

Before we provide detail explanations of eighteen different commands, we first introduce how a statement is sent.

FIG. 19 illustrates User B sending a statement to other users. We assume User B sends a statement to three other users—User A, User C, and User D.

In ① of FIG. 19, the user initiates writing a message by applying a hand gesture on the "Write a message" button on the RMS. The software allows User B to allow the other users he wants to send a message to. He adds User A, User C, and User D.

In ② of FIG. 19, all the users who are participating in the "chatting room" that User B has created are listed in 1900. Also, a soft keyboard (1902) that allows User B to write a message is displayed to the user. The user writes a text in the text input area (1904) where 1906 is a cursor. Once the user is finished writing a message, he applies a hand gesture on the Send button (1908).

In ③ of FIG. 19, upon detecting a hand gesture on the Send button, the device displays the user's text (1910) on the user's device and sends the text and other information to other three users. Other three users receive the same message as in the figure. Inside the statement, the user who sent the statement (owner of the statement) and the time it was sent is displayed in the statement.

We now illustrate how Reply command is applied on a layout.

We consider the situation where the user replies to a statement and how it is done. When we say reply, it means corresponding or answering to a received statement. We emphasize that Reply command cannot exist if there are no received or sent statements. Also, Reply command does not prompt if the user does not specify which statement he/she intends to reply to. The act of replying is same as sending but it has an intrinsic meaning. It is conceptually relevant to a statement the user is replying to. We emphasize that when we say reply, as the name implies, it is a reply of an existing statement and most importantly, a statement generated by applying Reply command. A Reply command is configured to enable the processor to activate a writing message window to send a message in response to a specific message received from other users in the chatting session, when the specific message is detected to be selected. The writing message window of the reply command includes parameters (or options) to set an expiration date and expiration time of the message in response to the specific message, and to set whether a reply to the message is allowed to be sent from recipients. Herein, the writing message window is activated to send an initial message to other users, who participate or are invited in a chatting session, or to send a message in response to the previously received message from the other users. The Reply command is configured to enable the processor to extract parameters from the specific message received from the other users in the chatting session, wherein the extracted parameters includes at least one of information on identification of the other users, information on time and date of the specific message, information on priority of the messages, or information on numbering for an order of the messages (the information related to primary key and numbering). The Reply command is configured to update the extracted parameters based on analyzing information of the extracted parameters from the specific messages. And, the Reply command is configured to send the other users the message in response to the specific message with the updated parameters.

Figure 20A:
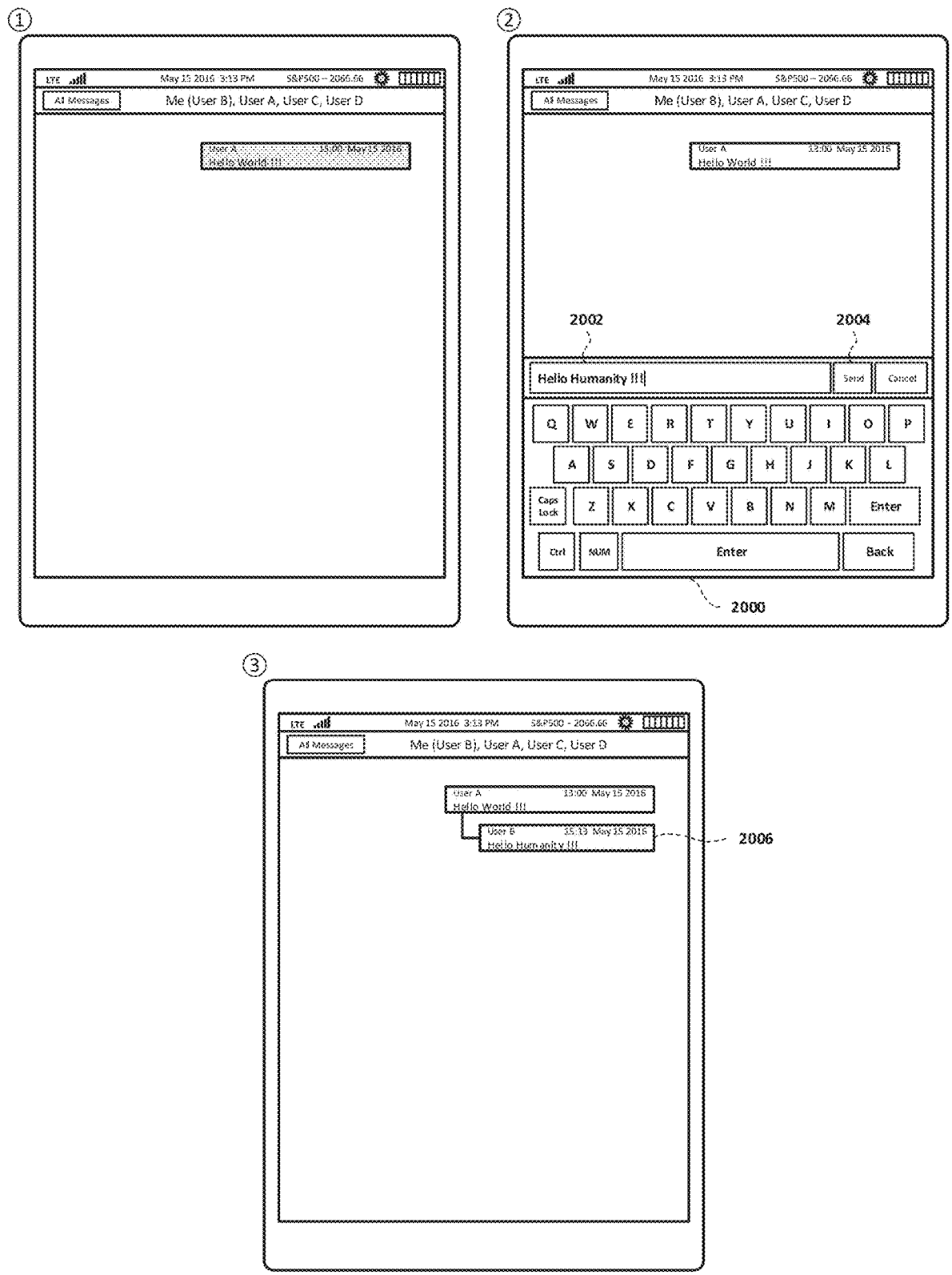
FIG. 20A consists of exemplary diagrams illustrating user replying to an existing text message.

FIG. 20A illustrates how user replies an existing statement. Here, we assume User B is replying to an existing statement.

In ① of FIG. 20A, the user selects an already existing statement and applies Reply command.

In ② of FIG. 20A, once the user applies Reply command, a soft keyboard (2000) where the user can input text is displayed to the user. The user inputs text in the text input area (2002). The user applies a hand gesture on the Send button (2004). The device, upon detecting a hand gesture on the Send button, it sends the user's text and other information of the statement.

In ③ of FIG. 20A, the new statement written by User B (2006) is placed below the statement the user intended to reply. Other three users receive the same statement as well. All the users, including the sender and the receivers preferably share the identical layout in their devices. Also, we assume that the devices of both users apply TWA upon sending or receiving a (reply) statement.

We noted that in any layouts, there are limits to number of child statement a statement can have. If a layout has reached its limits then we say it has reached its full capacity and in this case the device must not allow the user to reply (or the Reply command must be disabled).

For explanation purposes, let us assume that the device is set as follows:

$$M(x)=M(a_1)=M(a_2)=M(a_3)=2 \text{ and } D=4$$

where M(•) is the maximum number of child-statement allowed to a statement. This implies that there could be only two child-statements to any statements and the lowest depth of a statement is 4. This layout will have the same structure as binary tree.

Figure 20B:
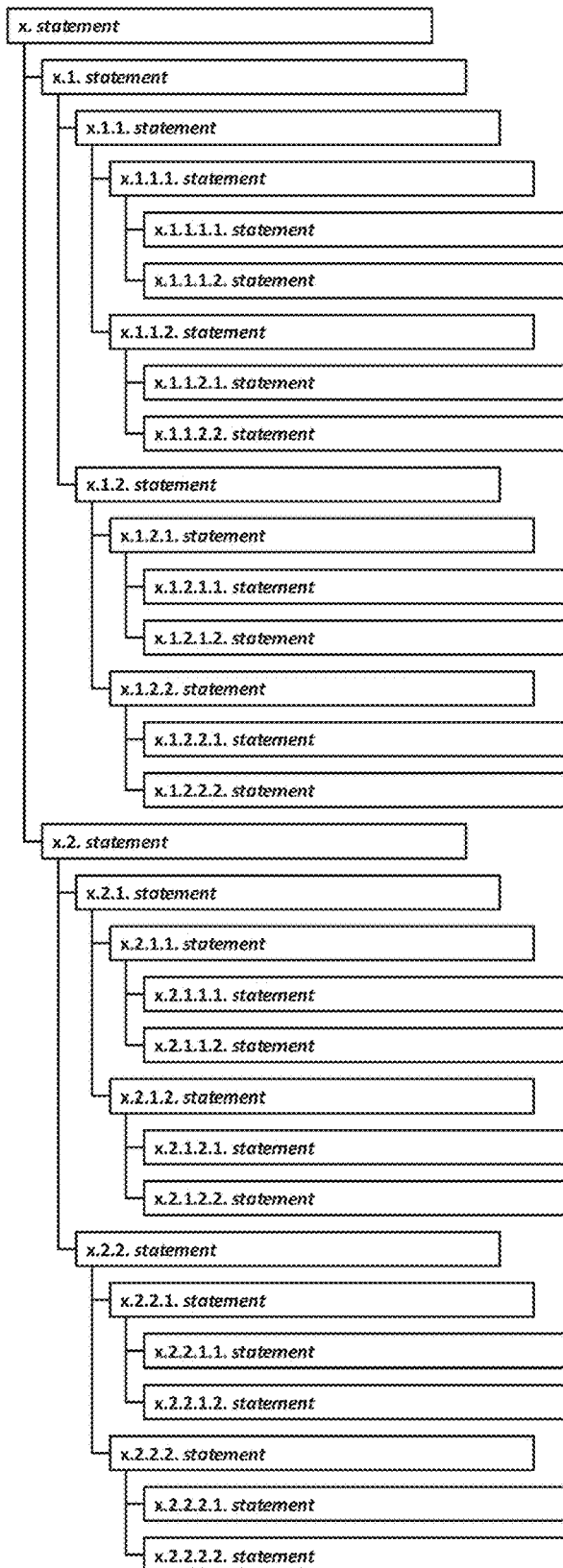
FIG. 20B consists of exemplary diagram illustrating a layout in its full capacity.

FIG. 20B illustrates the layout that is in its full capacity given $M(x)=M(a_1)=M(a_2)=M(a_3)=2$ and D=4. This means there are no more rooms for reply statements under the constraints given. So, if the user selects any one of the statements, the user should not be able to apply the Reply command. This in turn implies that there must be an indication whether the selected statement can be replied to or not. We assume the device keeps track of these internal states.

Figure 20C:
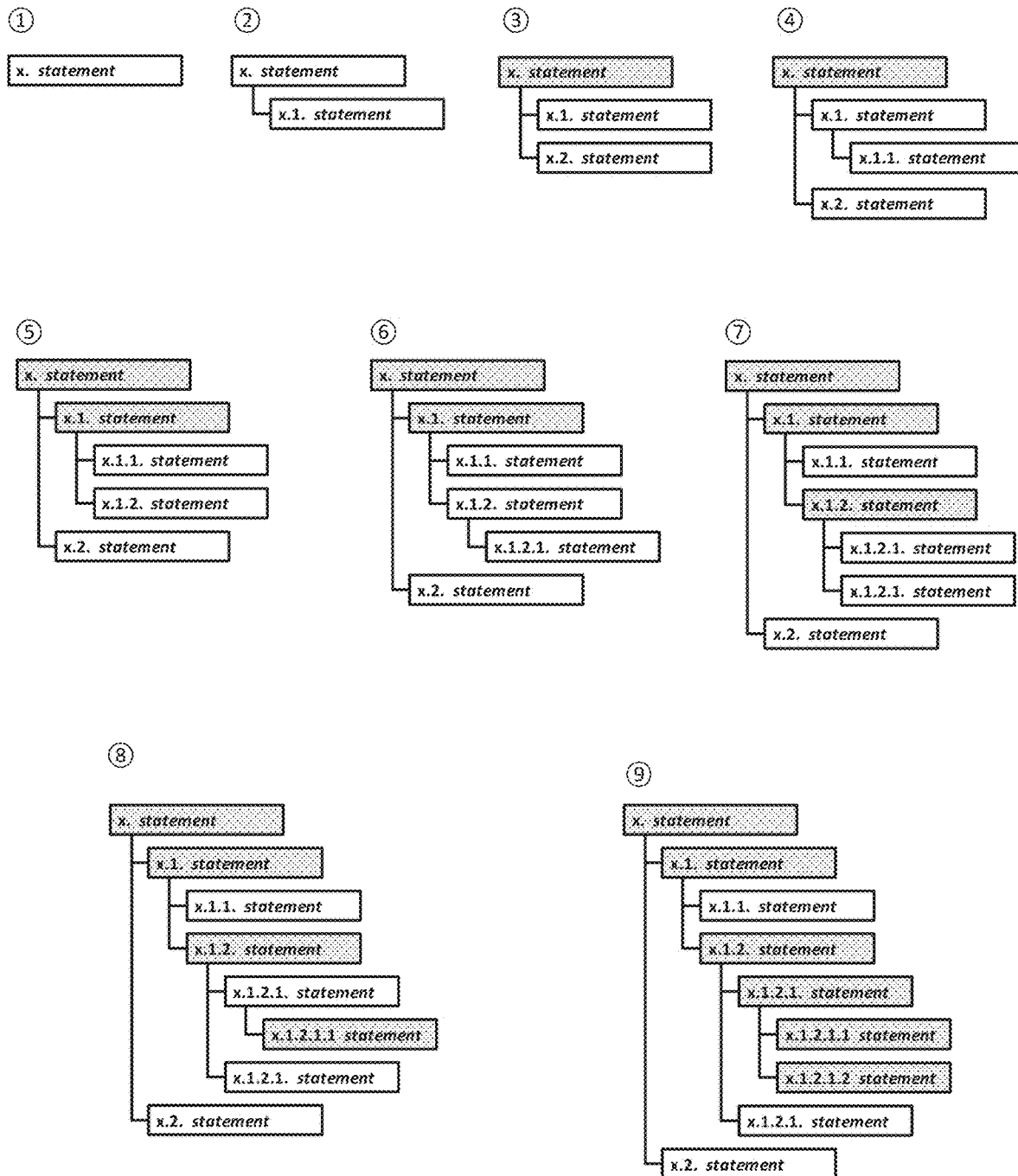
FIG. 20C consists of exemplary diagrams illustrating instant messaging interactions between users.

FIG. 20C illustrates a user's reply sequence based on the reply constraints just given. The shaded statements are the ones where users can no longer reply to due to the constraints.

In ① of FIG. 20C, the figure illustrates a layout with a main statement. We assume this is User B's device and other users, including User B, are interacting with one another. So this implies, all the users are in fact receiving and replying to statements. In ② of FIG. 20C, the figure illustrates a user replying to the main statement. In ③ of FIG. 20C, the figure illustrates the user replying to the main statement. Since the main statement already has two sub-statements, no user can reply to it anymore. In ④ of FIG. 20C, the figure illustrates the user replying to statement x.1. In ⑤ of FIG. 20C, the figure illustrates the user replying to statement x.1. Now, there are two child-statements to statement x.1 so no user can reply to the statement anymore. In ⑥ of FIG. 20C, the figure illustrates the user replying to statement x.1.2. In ⑦ of FIG. 20C, the figure illustrates the user replying to statement x.1.2. Now, there are two child-statements to statement x.2.1 so no user can reply to the statement anymore. In ⑧ of FIG. 20C, the figure illustrates the user replying to statement x.1.2.1. The child-statement is statement x.2.1.1 and it has reached the depth limit (D=4). Therefore, no user can reply to statement x.2.1.1 anymore. In ⑨ of FIG. 20C, the figure illustrates the user replying to statement x.1.2.1. The child-statement is statement x.2.1.2 and it has reached the depth limit (D=4). Therefore, no user can reply to statement x.2.1.2 anymore. Also, since there are two child-statements to statement x.1.2.1, no user can reply to the statement anymore.

We now explain time-expiring statement (TES).

Time-expiring statement is not necessarily a command. But rather a feature that is part of sending a text (sending the first statement) and Reply command. To simply put, in time-expiring statement, the user can set the expiration time right before he/she sends a statement. This statement is sent to number of users. At the expiration time, the statements are deleted from all the users' devices those received the time-expiring statement. In other words, this feature allows temporary statements. In time-expiring statement, only the owner of the statement can apply expiration time/date.

Before we go on, we note that there can be four cases when it comes to setting time-expiring statement.

The first case, Type 1, is to only allow the main statement (very first statement in the layout) to be time-expiring and allow the user to reply to it. The second case, Type 2, is to only allow the main statement to be time-expiring and block users from replying to the main statement. Therefore, in this case there will one statement without any sub-statements. Note that in these cases, the user will not be able to create time-expiring statement by applying Reply command.

The third case, Type 3, is to allow any statements (main statement or sub-statements) to be time-expiring statement and allow the users to reply to it. The fourth case, Type 4, is to allow any statements to be time-expiring statement and block users from replying to the main statement and/or sub-statements.

We provide more details in the following.

Figure 21A:
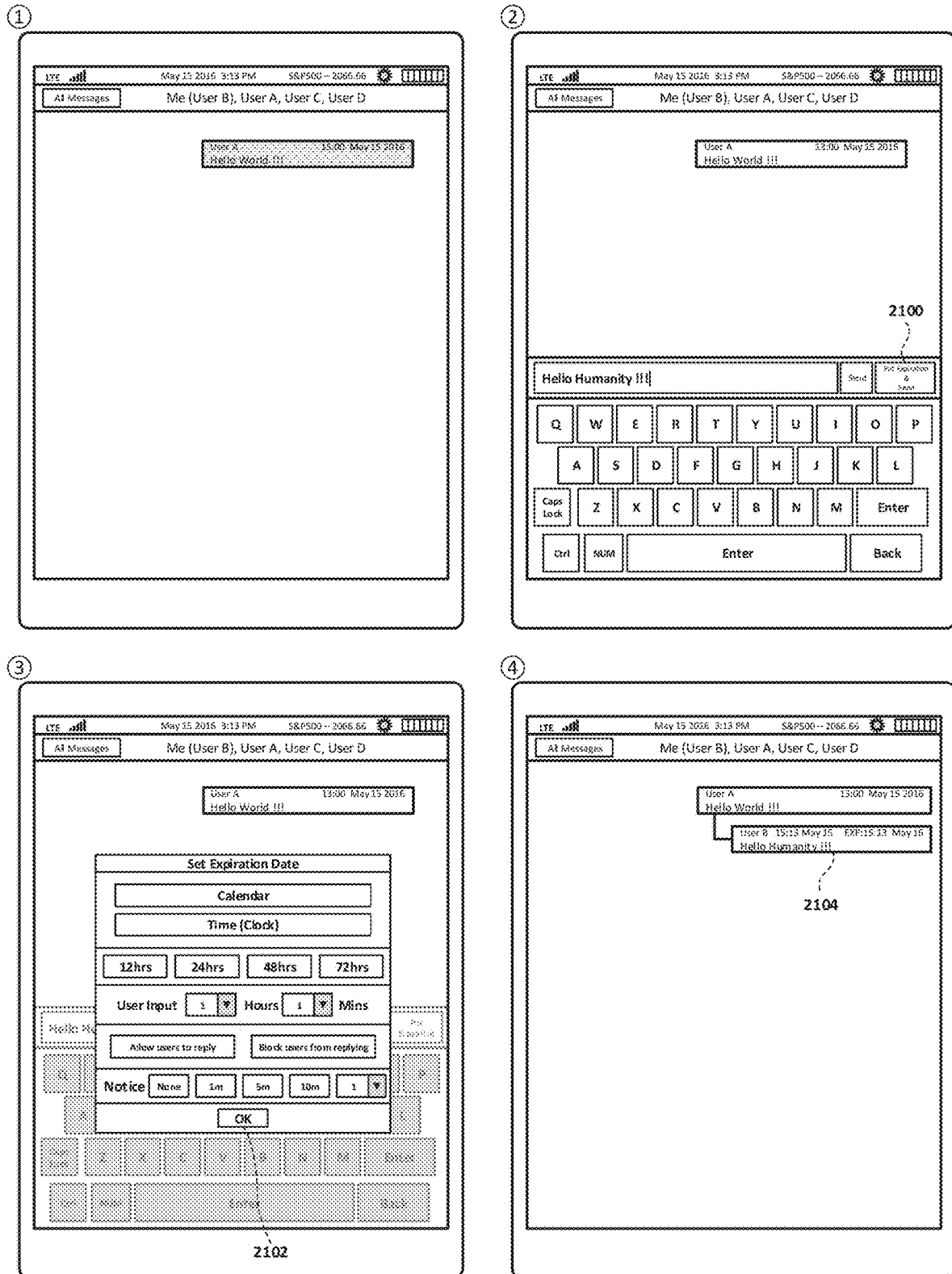

FIG. 21A illustrates how the user sets the expiration date of a statement. The following procedures takes place once the user choose to write a message to other user(s) or applies the Reply command on an existing statement. We assume the user puts an expiration time when he replies to a statement. In ① of FIG. 21A, the user selects an existing statement and applies Reply command. In ② of FIG. 21A, the user writes a statement and instead of applying a hand gesture on the Send button the user applies a hand gesture on Put Expiration & Send (2100) button. It is important to note that if the device only allows the main statement to be time-expiring statement then the Put Expiration & Send (2100) button will not appear when the user applies Reply command. However, if the device allows any statements to be time-expiring statement then the Put Expiration and Send (2100) button will appear regardless of the fact the user is writing a main statement or replying to an existing statement. In ③ of FIG. 21A, upon detecting a hand gesture on 2100, Set Expiration Date is displayed. This display allows users to select expiration time. As illustrated, the user is given an option to input the expiration time by year, month, weeks, days and hours. We assume the user selects "24 hrs". The user now decides whether he/she should allow other users to reply to the statement that is about to be created. The user can either choose Allow users to reply or Block users from replying. So, if the device only allows main statements to be time-expiring then we will have either Type 1 or Type 2 scenario and otherwise, Type 3 and Type 4 scenario. The user selects five minutes (5 m) for notification (the device displays a message that the time-expiring statement will be delete in five minutes). Finally, the user applies a hand gesture on OK button. Upon detecting a hand gesture on the OK button (2102), the time-expiring statement is displayed on the user's device and the same statement is sent to other users in ④ of FIG. 21A.

Since time-expiring statements are special statements, it is informative to let the users know which statements are time-expiring. There are several ways to indicate this fact. By default, we assume time-expiring statements have different textbox colors than other non-time-expiring statements. Also, as illustrated in ④ of FIG. 21A, the expiration time is displayed on the top-right corner inside the statement (2104).

Finally, we note that whenever a time-expiring statement expires, the statement itself and all of its sub-statements are deleted as well. Additionally, there cannot be a sub-statement of a time-expiring statement that expires later than its super-statement.

We provide more detailed illustrations of four different types.

Figure 21B:
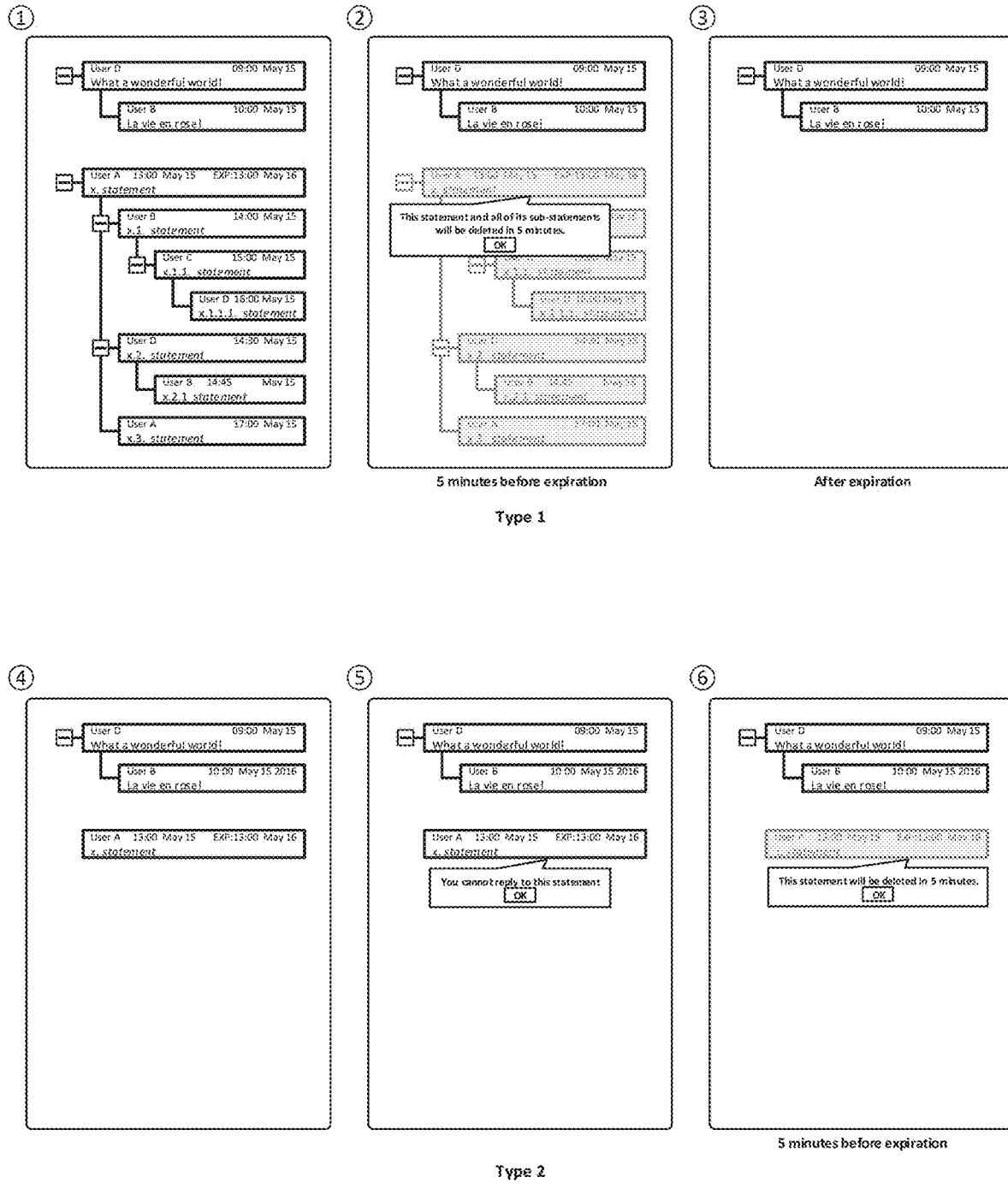

FIG. 21B illustrates details of Type 1 and Type 2.

The figures from ① to ③ of FIG. 21B illustrate details of Type 1. In of FIG. 21B, there are two layouts. None of the statements in the first layout is time-expiring. However, the main statement of the second layout is written by User A and it is time-expiring. Other users have replied to the main statement. In ② of FIG. 21B, the device displays a notification that the main statement and all of its sub-statements will be deleted in five minutes. In ③ of FIG. 21B, the device deletes the statement right after the expiration.

The figures from ④ to ⑥ of FIG. 21B illustrate details of Type 2. In ④ of FIG. 21B, there are two layouts. None of the statements in the first layout is time-expiring. However, the main statement of the second layout is written by User A and it is time-expiring. Other users are blocked from replying. In ⑤ of FIG. 21B, a user attempts to reply to the statement. The device displays a message that the user cannot reply to this statement. In ⑥ of FIG. 21B, the device displays a notification that the main will be deleted in five minutes. Once the statement expires, the layout appears as the one in ③ of FIG. 21B.

FIG. 21C illustrates details of Type 3 and Type 4.

The figures from ① to ③ of FIG. 21C illustrate details of Type 3. In ① of FIG. 21C, User B replies to the main statement that is not time-expiring. User B set his/her statement to time-expiring and allowed other users to reply to it. As illustrated, statement x.1 and all of its sub-statements (statement x.1.1 and x.1.1.1) are now time-expiring. In ② of FIG. 21C, the device displays a notification that statement x.1 and all of its sub-statements will be deleted in five minutes. In ③ of FIG. 21C, the device deletes the device right after the expiration. As illustrated in the figure, statement x.1, x.1.1, and x.1.1.1 are no longer visible.

The figures from ④ to ⑥ of FIG. 21C illustrate details of Type 4. In ④ of FIG. 21C, User B replies to the main statement that is not time-expiring. User B set his/her statement to time-expiring and blocks other users from replying. In ⑤ of FIG. 21C, a user attempts to reply to the statement. The device displays a message that the user cannot reply to this statement. In ⑥ of FIG. 21C, the device displays a notification that the main statement will be deleted in five minutes. Once the statement expires, the layout appears as the one in ③ of FIG. 21C.

Now, consider a situation where a user's device was turned off and the time-expiring statement had expired during this time. If the user had already read the time-expiring statement before the device was turned off then the device can delete the expired statement when the user turns on the device. However, if this is not the case then the device needs to withhold the deletion of the expired statement and check the user had read it. The following illustrates this idea.

FIG. 21D illustrates the situation where the user turns off the device without reading time-expiring statement (or the user received the time expiring-statement while the device was turned off) and turns on the device after the expiration. The figure in ① of FIG. 21D illustrates a layout where the main statement is time-expiring. Either the user did not read the statement or received these statements after he/she turned off the device. The figure in ② of FIG. 21D illustrates the device displaying a message that all the statements have expired and about to be deleted. Once the user applies a hand gesture on the OK button, the device deletes the layout.

We now illustrate how Collapse, Expand, Collapse All, and Expand All commands are applied on a layout.

In some situations, a user might not want to display some statements. We call this process collapsing. For example, the user might want to collapse the sub-statement(s) of a selected statement. This is what Collapse command does. If statements can be collapsed then there must be a process that displays what were collapsed. In other words, there must be a process that undoes the collapse. We call this process expanding and this is what Expand command does.

Not all statements can be collapsed. Any leaf-statements and a main statement without sub-statements cannot be collapsed. Therefore, there should be some kind of indication to the user which statements are collapsible. We call the symbol that indicates a statement is collapsible, collapsible symbol. We use a square box with a minus sign inside as a collapsible symbol. Also, there are situations where statements cannot be expanded. So, there should also be some kind of indication to the user which statements are expandable. We call the symbol that indicates a statement is expandable, expandable symbol. We use a square box with a plus sign inside as an expandable symbol. We also note that we can also use a variation of this symbol where the numbers of sub-statements those are collapsed are also indicated inside the symbol.

If there are no collapsed statements in a layout, we say the layout is fully expanded or completely expanded. Obviously, this condition can be verified just by checking the symbols. If there are only collapsible symbols then the layout is fully expanded. On the other hand, if the main statement is collapsed, we say the layout is fully collapsed or completely collapsed. We also say the statement is in fully expanded state or in fully collapsed state.

In collapsing and expanding statements, there are two types of collapse-expand operations. One is, what we call, memorized method and the other one is, what we call, non-memorized method. To simply put, in memorized method, the states of all the statements (either in collapsed state or expanded state) are internally memorized. On the other hand, in non-memorized method, these states are not memorized. We explain these concepts in more detail.

We now explain Collapse command.

Figure 22A:
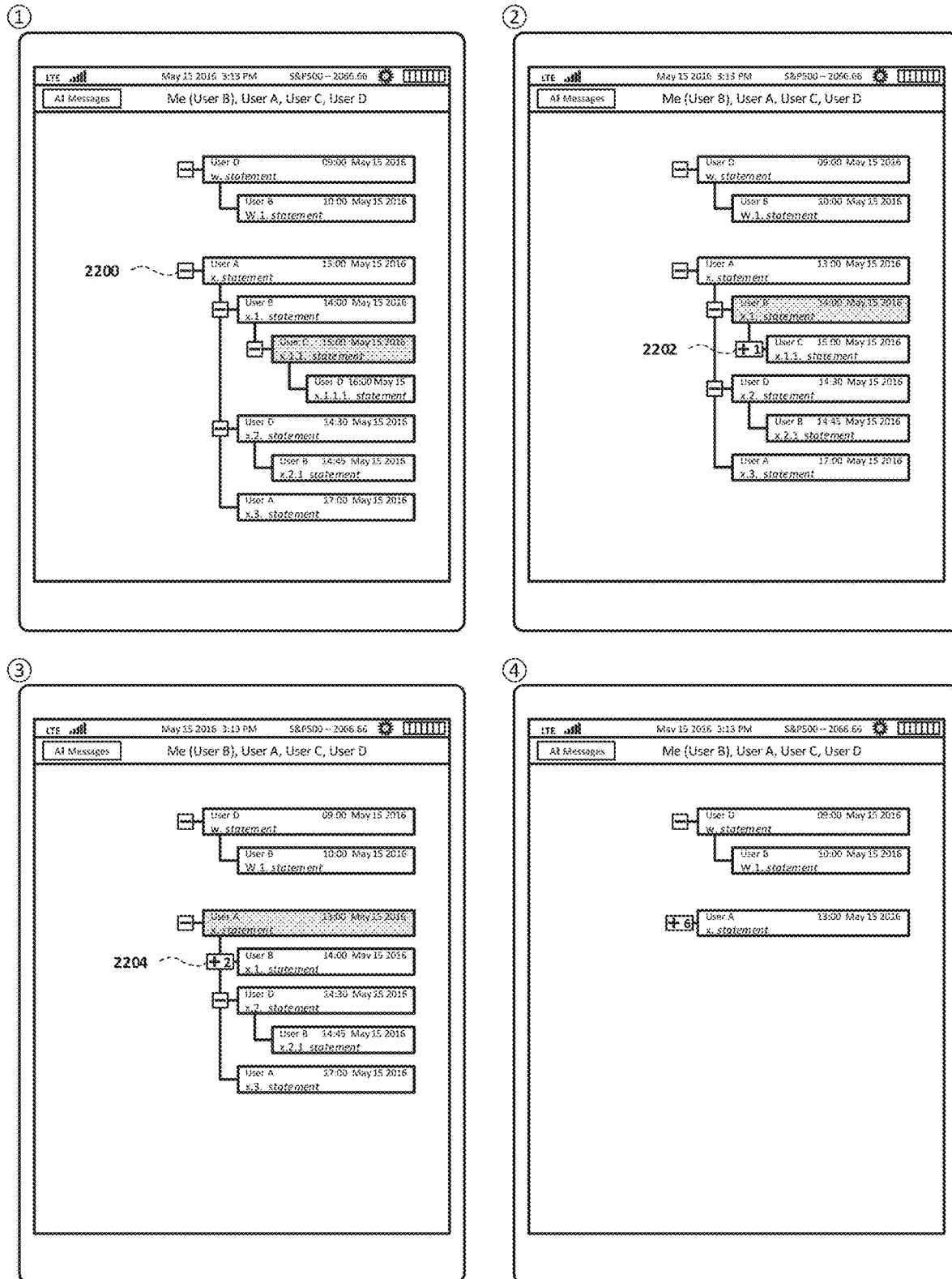
FIG. 22A consists of exemplary diagrams illustrating a method of applying Collapse command.

FIG. 22A illustrates the results after applying Collapse command. Note that collapsible symbols are placed in front of statements where statements can be collapsed as illustrated as 2200 in of FIG. 22A.

The figure in ① of FIG. 22A illustrates the case where the user selects statement x.1.1 (shaded textbox) and applies Collapse command.

The figure in ② of FIG. 22A illustrates the layout after the user has applied the Collapse command on statement x.1.1. As illustrated, the sub-statement of statement x.1.1 is no longer displayed. Also, the collapsible symbol that was in front of statement x.1.1 has now changed to expandable symbol with number of collapsed statement indicated inside the symbol (2202). Note that if the collapsible symbol in front of statement x.1.1 was hand gesture detectable and the user had applied a hand gesture on the symbol then the user sees the same effect as applying the Collapse command on statement x.1.1. Now, the user selects statement x.1 (shaded textbox) and applies Collapse command.

The figure in ③ of FIG. 22A illustrates the layout after the user has collapsed statement x.1. As illustrated, its sub-statements are no longer displayed and the collapsible symbol has now changed to expandable symbol (2204). Note that the number 2 indicates that there are two sub-statements those were collapsed. Note that if the collapsible symbol in front of statement x.1 was hand gesture detectable and the user had applied a hand gesture on the symbol then the user sees the same effect as applying the Collapse command on statement x.1. Now, the user selects the main statement (shaded textbox) and applies Collapse command.

The figure in ④ of FIG. 22A illustrates the layout after the user has collapsed the main statement. As illustrated, all the sub-statements of the main statement are no longer displayed and the collapsible symbol has now changed to expandable symbol. Note that the number 6 indicates that there are six sub-statements those were collapsed.

We now explain Expand command.

Figure 22B:
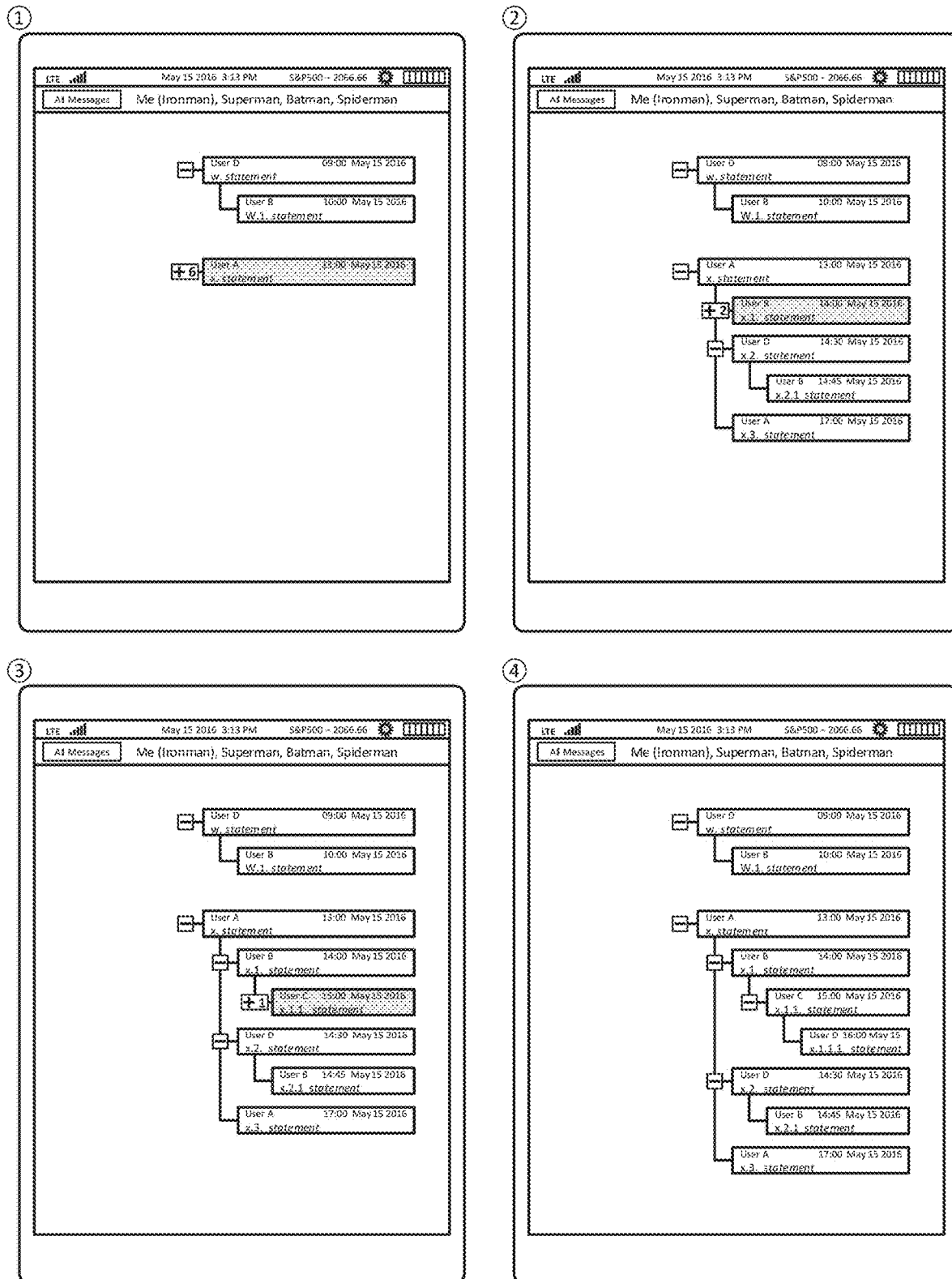
FIGS. 22B and 22C consist of exemplary diagrams illustrating a method of applying Expand command.

FIG. 22B illustrates the results after applying Expand command.

The figure in ① of FIG. 22B illustrates the case where the user selects the main statement (shaded textbox) and applies Expand command.

The figure in ② of FIG. 22B illustrates the layout after the user has applied the Expand command on the main statement. As illustrated, the sub-statements of the main statement are displayed. Since the device operates under Memorized Method, the device preserves the states (appearance) of the layout before the main statement was collapsed. In other words, statement x.1 was in collapsed state before the main statement was collapsed and when the main statement is expanded the layout goes back to its previous state. Also, the expandable symbol that was in front of the main statement has now changed to collapsible symbol. Note that if the expandable symbol in front of the main statement was hand gesture detectable and the user had applied a hand gesture on the symbol then the user sees the same effect as applying the Expand command on the main statement. Now, the user selects statement x.1 (shaded textbox) and applies Expand command.

The figure in ③ of FIG. 22B illustrates the layout after the user has expanded statement x.1. As illustrated, its sub-statements are displayed and the expandable symbol has now changed to collapsible symbol. Since the device operates under Memorized Method, the device preserves the states (appearance) of the layout before statement x.1 was collapsed. In other words, statement x.1.1 was in collapsed state before statement x.1 was collapsed and when statement x.1 is expanded the layout goes back to its previous state. Note that if the expandable symbol in front of statement x.1 was hand gesture detectable and the user had applied a hand gesture on the symbol then the user sees the same effect as applying the Expand command on statement x.1. Now, the user selects statement x.1.1 (shaded textbox) and applies Expand command.

The figure in ④ of FIG. 22B illustrates the layout after the user has expanded statement x.1.1. As illustrated, statement x.1.1.1, a sub-statement of statement x.1.1 is displayed and the expandable symbol has now changed to collapsible symbol.

Now we illustrate how the layout changes when the user applies Expand command on a device that operates under Non-memorized Method.

Figure 22C:
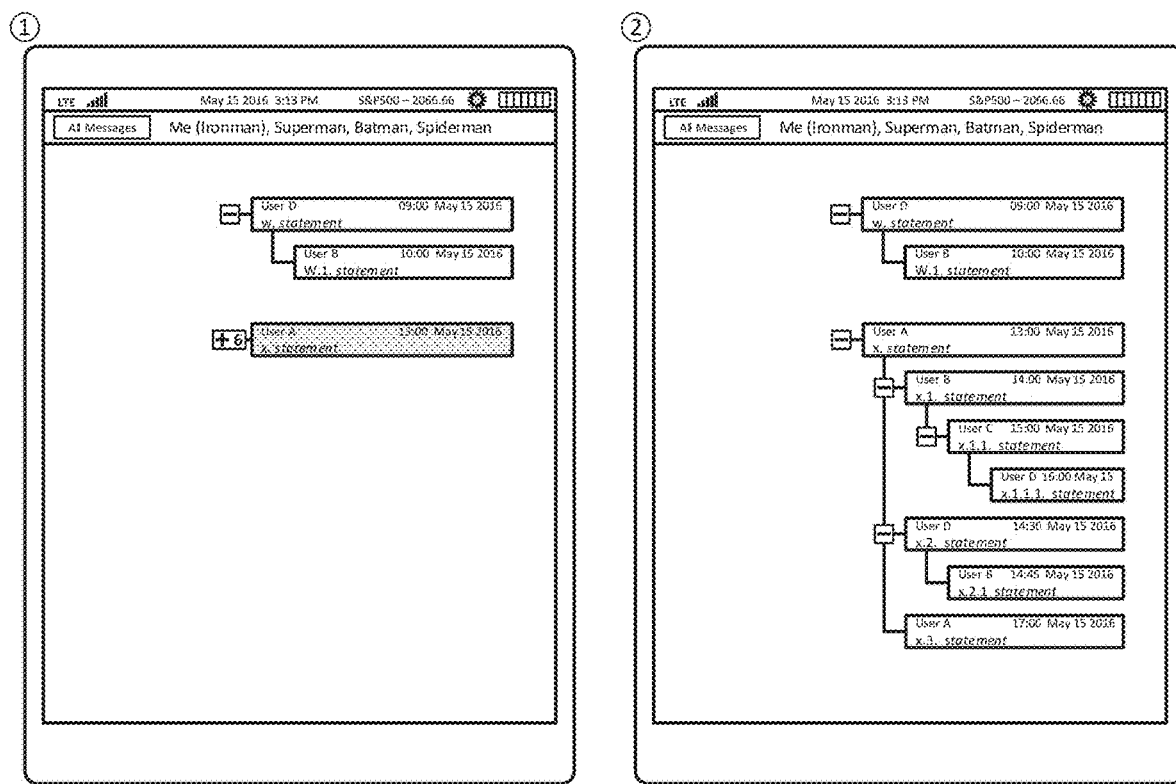

FIG. 22C illustrates the results after applying Expand command on the collapsed main statement where the device operates under Non-memorized Method.

The figure in ① of FIG. 22C illustrates the case where the user selects the main statement (shaded textbox) and applies Expand command.

The figure in ② of FIG. 22C illustrates the layout after the user has applied the Expand command on the main statement. As illustrated, all the sub-statements of the main statement are displayed. Although statement x.1 and x.1.1 were in collapsed states before the main statement was collapsed, this fact is ignored and all the sub-statements are displayed. In Non-memorized Method, once the user applies Expand command on the main statement, the layout becomes fully expanded.

We now explain Collapse All command.

In Collapse All command, the device basically applies Collapse command on the selected statement and all of its sub-statements (except the leaf-statements). The command is not applicable on leaf-statements.

Figure 22D:
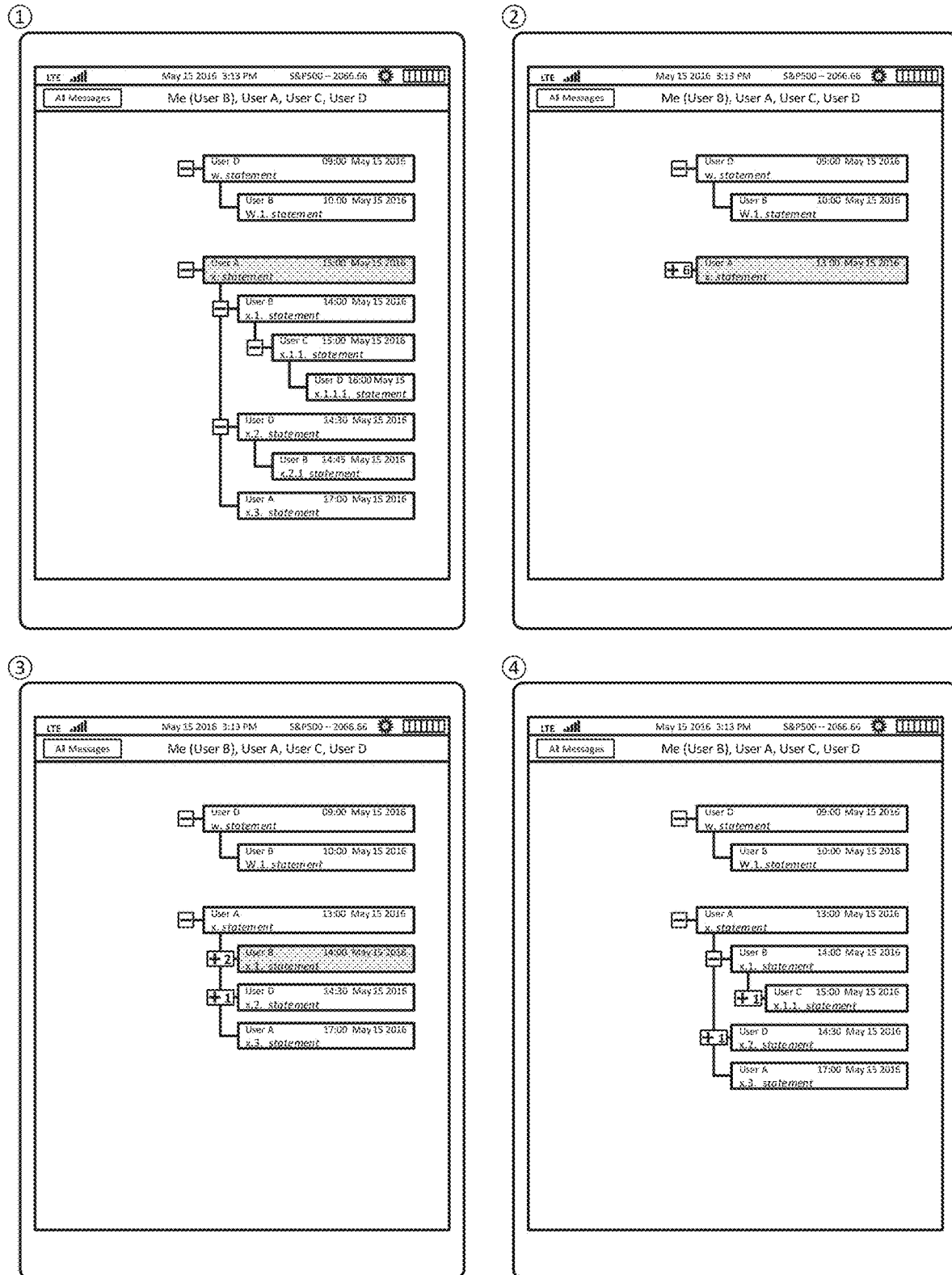
FIG. 22D consists of exemplary diagrams illustrating a method of applying Collapse All command.

FIG. 22D illustrates the results after applying Collapse All command.

The figure in ① of FIG. 22D illustrates the case where the user selects the main statement (shaded textbox) and applies Collapse All command.

Now we assume the user has applied Collapse All command on the main statement on both Memorized and Non-memorized method.

The figure in ② of FIG. 22D illustrates the layout after the user has applied Collapse All command. As illustrated, all the sub-statements of the main statement are no longer displayed. Also, the collapsible symbol that was in front of the main statement has now changed to expandable symbol with number of collapsed statement indicated inside the symbol.

Now we consider two cases where the user applies Expand command on the collapsed main statement.

The figure in ③ and ④ of FIG. 22D illustrate the case where the device operates under Memorized Method. We assume the user has selected and applied Expand command on the main statement in ② of FIG. 22D. As illustrated in ③ of FIG. 22D, the main statement is expanded but all of its sub-statements are in collapsed state. Now the user applies Expand command on statement x.1. As illustrated in ④ of FIG. 22D, statement x.1 is expanded but its sub-statement (statement x.1.1) is in collapsed state.

If the device was operating under Non-memorized Method and the user applied Expand command on the collapsed main statement that was collapsed by using Collapse All command then the fact that all the statement are in collapsed state is ignored and the device simply displays all the sub-statements of the main statement. In other words, the layout will be in fully expanded state.

We now explain Expand All command.

In Expand All command, the device basically applies Expand command on the selected statement and all of its sub-statements (except the leaf-statements). The command is not applicable on leaf-statements.

Figure 22E:
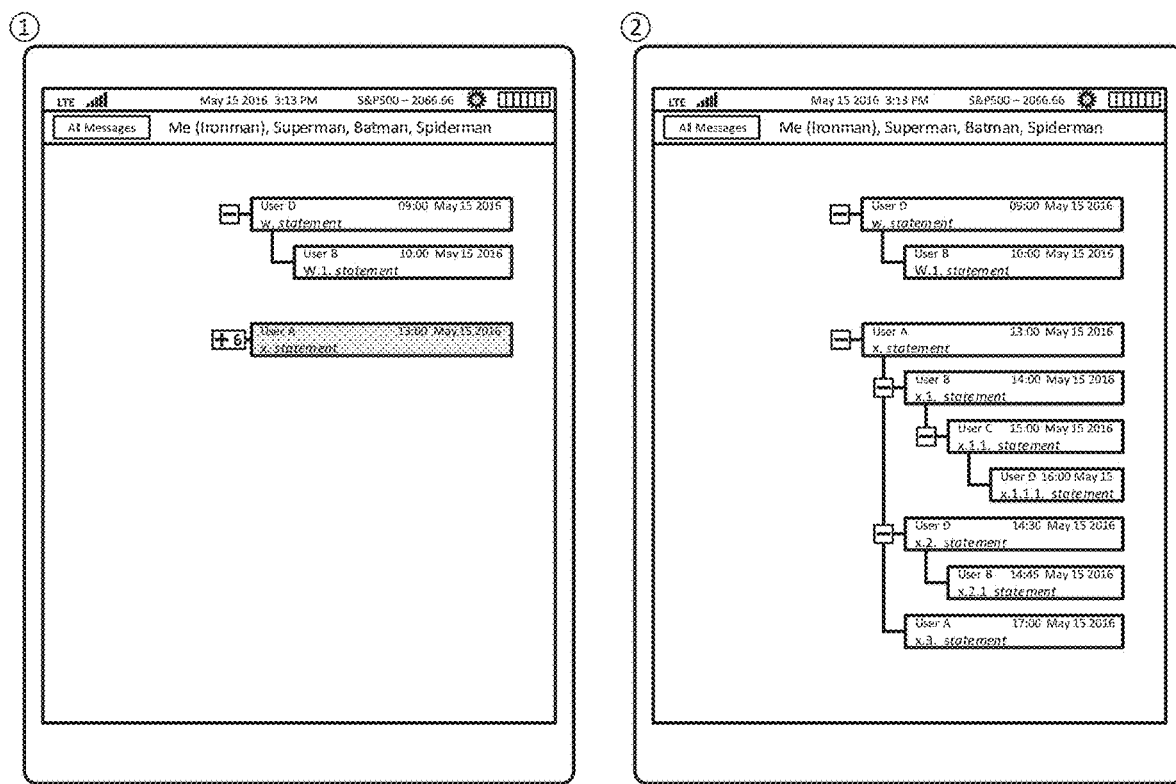
FIG. 22E consists of exemplary diagrams illustrating a method of applying Expand All command.

FIG. 22E illustrates the results after applying Expand All command.

The figure in ① of FIG. 22E illustrates the case where the user has selected and applied Expand All command on the main statement.

The figure in ② of FIG. 22E illustrates the layout after the user has applied the Expand All command on the main statement. Since Expand All command basically applies Expand command on every statement (except leaf-statement), as illustrated, the layout is fully expanded. Notice that if the device is operating under Non-memorized Method then there are no differences between Expand and Expand All commands.

We now illustrate how Hide, Show, Hide All, and Show All commands are applied on a layout.

When a user receives text messages they are in various lengths. A text can be short enough to fit into one text line in the text display area or it could take up several text lines. If all the received texts take up several lines, this can make the layouts to have textboxes with irregular heights and this could cause disorganization on the display of the device. It would be desirable to hide some portions of the text once the device has detected that the user had read the received statement. For example, if all of the textbox heights in a layout decrease to a predefined height once the user had read the statement, then the layout will be more organized. Additionally, most of the times, if a user had read a statement, it is very unlikely the user will go back and read the statement over and over again. Therefore, it is reasonable to hide some portion of the text to maintain organization and better overall view of the layout.

If a text in a statement is fully visible, we say the statement is in visible (or hidable) state. If, on the other hand, the height of a textbox is decreased to its default-height and the text is shortened to fit into the decreased textbox, we say the statement is in hidden (or showable) state.

Not all statements can be hidden. Any statement that is in default-height (minimum possible textbox height) cannot be hidden. Therefore, there should be some kind of indication to the user which statements are hidable. We call the symbol that indicates a statement is hidable, hidable symbol. We use a square box with a triangle pointing upwards inside as the hidable symbol. Also, once the user hides a statement, there should also be an indication to the user that the statement is showable. We call the symbol that indicates a statement is showable, showable symbol. We use a square box with a triangle pointing downwards inside as the showable symbol.

We now explain Hide command.

Figure 23A:
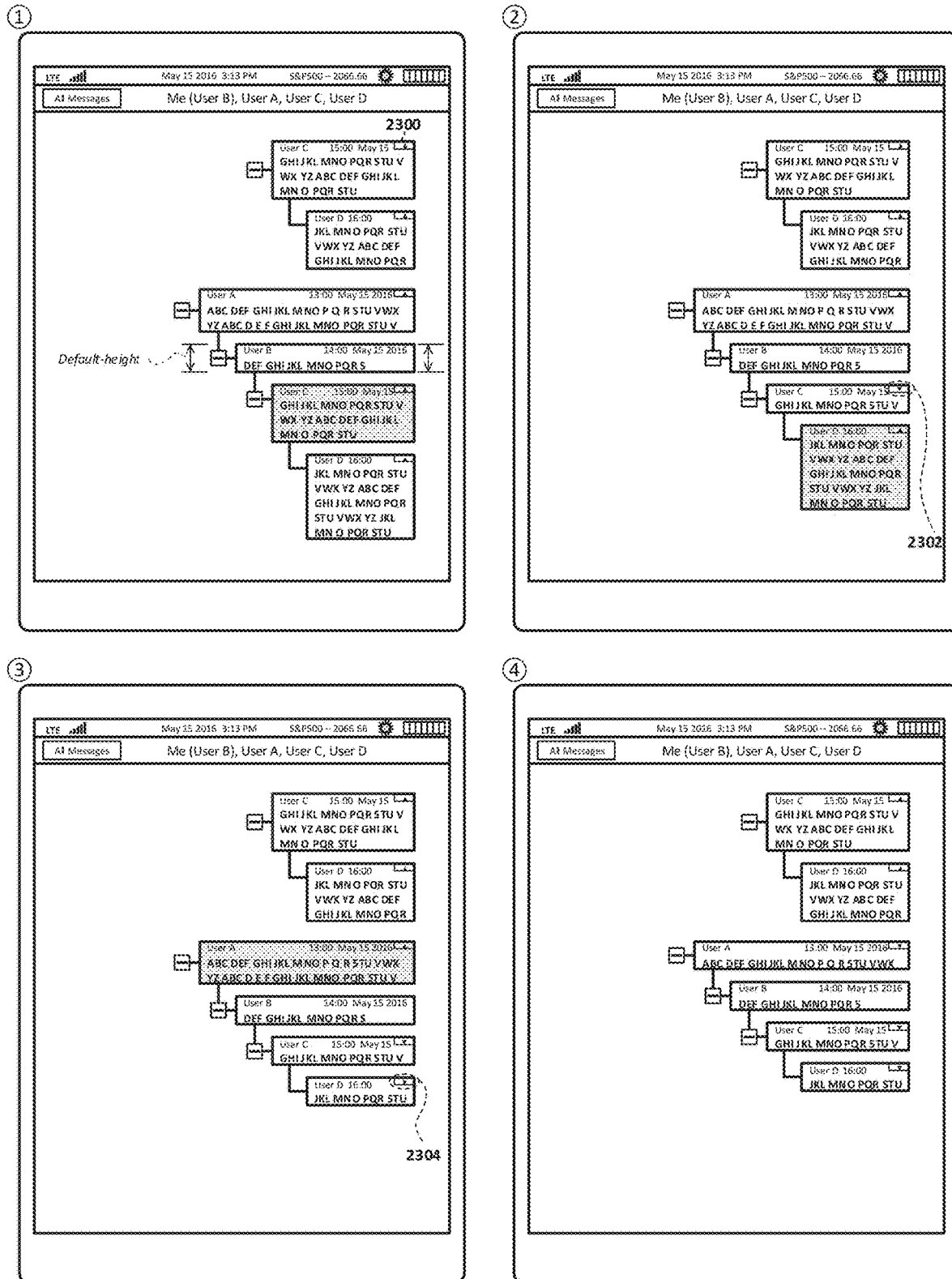
FIG. 23A consists of exemplary diagrams illustrating a method of applying Hide command.

FIG. 23A illustrates the results after applying Hide command. Note that hidable symbols (a triangle pointing upwards) are placed in the upper right corner of statements as illustrated in 2300 of ① of FIG. 23A.

The figure in ① of FIG. 23A illustrates the case where the user selects statement x.1.1 (shaded textbox) and applies Hide command. Note that statement x.1 only consists of one text line and the height of the textbox is equal to what we call default-height. The height of any textboxes cannot be smaller than the default-height. All the texts of the statements on the device are in fully visible state.

The figure in ② of FIG. 23A illustrates the layout after the user has applied the Hide command on statement x.1.1. As illustrated, the height of the statement has reduced to default-height and some portions of the texts are not displayed. Also, the hidable symbol on statement x.1.1 has now changed to showable symbol (2302, a triangle pointing downwards). Note that if the hidable symbol on statement x.1.1 was hand gesture detectable and the user had applied a hand gesture on the symbol then the user sees the same effect as applying the Hide command on statement x.1.1. Now, the user selects statement x.1.1.1 (shaded textbox) and applies Hide command.

The figure in ③ of FIG. 23A illustrates the layout after the user has hidden statement x.1.1.1. As illustrated, the height of the statement has reduced to default-height and some portions of the texts are not displayed. Also, the hidable symbol on statement x.1.1.1 has now changed to showable symbol (2304, a triangle pointing downwards). Note that if the hidable symbol on statement x.1.1.1 was hand gesture detectable and the user had applied a hand gesture on the symbol then the user sees the same effect as applying the Hide command on statement x.1.1.1. Now, the user selects the main statement (shaded textbox) and applies Hide command.

The figure in ④ of FIG. 23A illustrates the layout after the user has hidden the main statement. As illustrated, the height of the statement has reduced to default-height and some portions of the texts are not displayed. Also, the hidable symbol on the main statement has now changed to showable symbol. Note that if the hidable symbol on the main statement was hand gesture detectable and the user had applied a hand gesture on the symbol then the user sees the same effect as applying the Hide command on the main statement.

We now explain Show command.

Figure 23B:
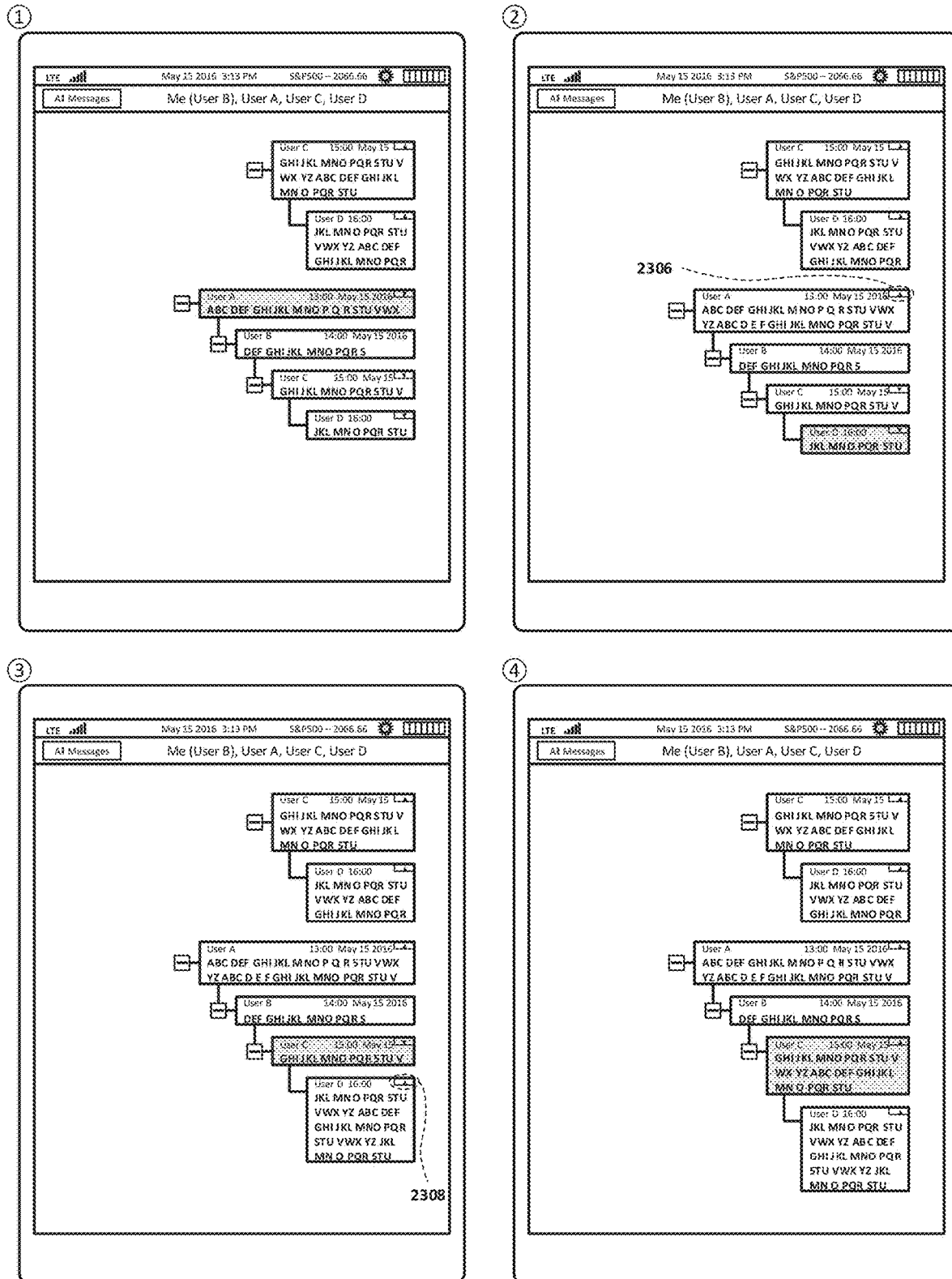
FIG. 23B consists of exemplary diagrams illustrating a method of applying Show command.

FIG. 23B illustrates the results after applying Show command.

The figure in ① of FIG. 23B illustrates the case where the user selects the main statement (shaded textbox) and applies Show command.

The figure in ② of FIG. 23B illustrates the layout after the user has applied the Show command on the main statement. As illustrated, the height of the statement has increased to its original textbox height and the text is fully displayed. Also, the showable symbol on the main statement has now changed to hidable symbol (2306, a triangle pointing upwards). Note that if the showable symbol on the main statement was hand gesture detectable and the user had applied a hand gesture on the symbol then the user sees the same effect as applying the Show command on the main statement. Now, the user selects statement x.1.1.1 (shaded textbox) and applies Show command.

The figure in ③ of FIG. 23B illustrates the layout after the user has made visible statement x.1.1.1. As illustrated, the height of the statement has increased to its original textbox height and the text is fully displayed. Also, the showable symbol on statement x.1.1.1 has now changed to hidable symbol (2308, a triangle pointing upwards). Note that if the showable symbol on statement x.1.1.1 was hand gesture detectable and the user had applied a hand gesture on the symbol then the user sees the same effect as applying the Show command on statement x.1.1.1. Now, the user selects the statement x.1.1 (shaded textbox) and applies Show command.

The figure in ④ of FIG. 23B illustrates the layout after the user has made visible statement x.1.1. As illustrated, the height of the statement has increased to its original textbox height and the text is fully displayed. Also, the showable symbol on statement x.1.1 has now changed to hidable symbol. Note that if the showable symbol on statement x.1.1 was hand gesture detectable and the user had applied a hand gesture on the symbol then the user sees the same effect as applying the Show command on statement x.1.1.

We now explain Hide All command.

In Hide All command, the device basically applies Hide command on the selected statement and all of its sub-statements. The command itself is not applicable on leaf-statements.

Figure 23C:
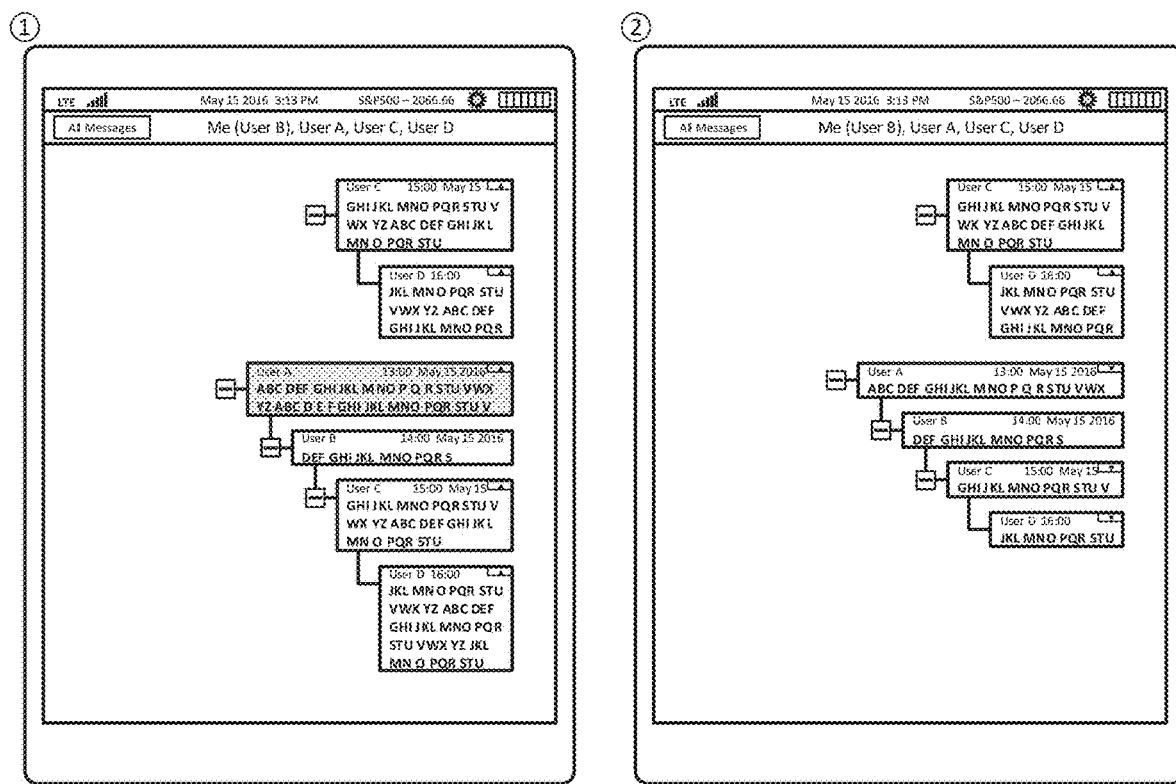
FIG. 23C consists of exemplary diagrams illustrating a method of applying Hide All command.

FIG. 23C illustrates the results after applying Hide All command.

The figure in ① of FIG. 23C illustrates the case where user selects the main statement (shaded textbox) and applies Hide All command. Note that the command is applicable since the selected statement is in visible state.

The figure in ② of FIG. 23C illustrates the layout after the user has applied Hide All command. As illustrated, all the sub-statements of the main statement have decreased to default-heights. Also, the hidable symbols those were on statements have now changed to showable symbols.

We now explain Show All command.

In Show All command, the device basically applies Show command on the selected statement and all of its sub-statements. The command itself is not applicable on leaf-statements.

Figure 23D:
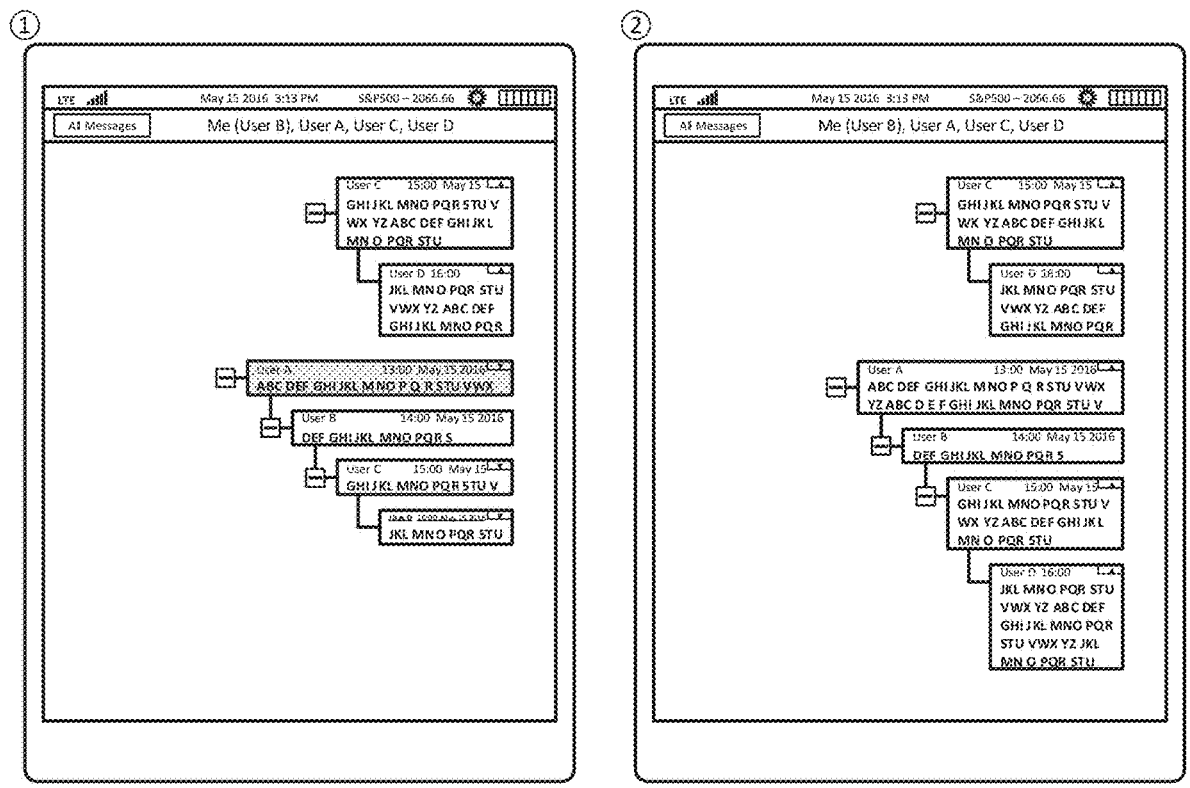
FIG. 23D consists of exemplary diagrams illustrating a method of applying Show All command.

FIG. 23D illustrates the results after applying Show All command.

The figure in ① of FIG. 23D illustrates the case where the user selects the main statement (shaded textbox) and applies Show All command. Note that the command is applicable since the selected statement is in hidden state.

The figure in ② of FIG. 23D illustrates the layout after the user has applied Show All command. As illustrated, all the sub-statements of the main statement have increased to their original textbox heights. Also, the showable symbols those were on statements have now changed to hidable symbols.

We now illustrate how Delete and Delete All commands are applied on a layout.

A statement generally consists of a text and a textbox. The purpose of Delete command is to erase or "not show" the text of the selected statement (or the statement itself) a user wishes to "delete". The purpose of Delete All command is to apply the Delete command to several statements at once.

If a text in a statement is deleted, we say the statement is in deleted state. Once a statement is deleted, most of the commands will be disabled. However, Reply, Collapse/Expand and Invert/Revert commands will not be disabled. Additionally, we present two types of delete methods and we call them Delete Method 1 and Delete Method 2.

We now explain Delete command.

Figure 24A:
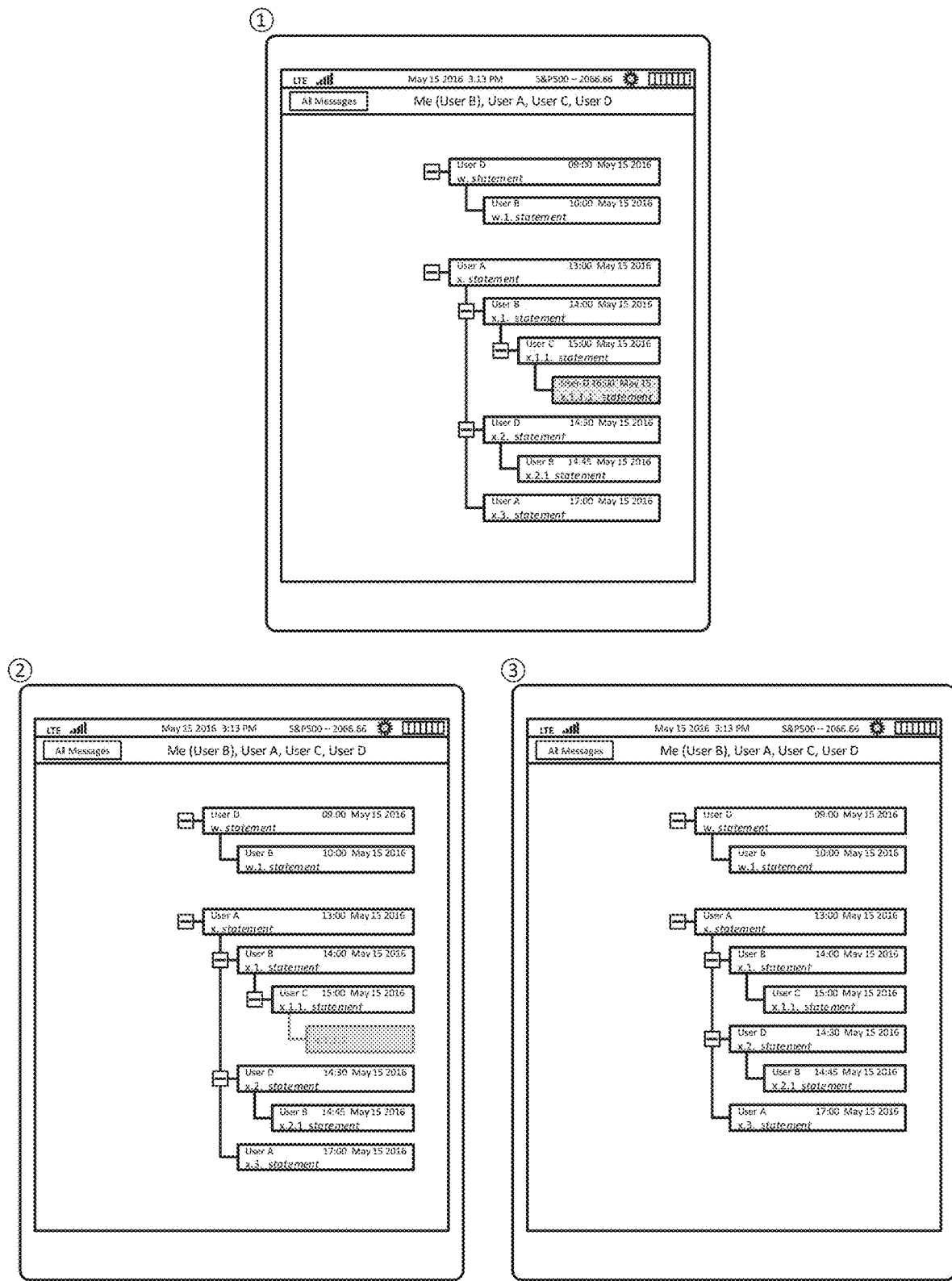
FIG. 24A consists of exemplary diagrams illustrating a method of applying Delete command.

FIG. 24A illustrates the results after applying Delete command.

The figure in ① of FIG. 24A illustrates the case where user selects statement x.1.1.1 (shaded textbox) and applies Delete command.

The figure in ② of FIG. 24A illustrates the layout after the user has applied the Delete command on statement x.1.1.1 where the device operates under Delete Method 1. As illustrated, the text of statement x.1.1.1 is no longer displayed (it is in deleted state).

The figure in ③ of FIG. 24A illustrates the layout after the user has applied the Delete command on statement x.1.1.1 where the device operates under Delete Method 2. As illustrated, the text and the textbox of statement x.1.1.1 is no longer displayed (it is in deleted state). However, while the textbox in Delete Method 1 was displayed, in Delete Method 2, the textbox is not displayed. However, if the device operates under Delete Method 1 and if statement x.1.1 was deleted then only the text will be deleted and the textbox will remain in the layout to maintain the structure.

We define a new term. When a streak of statements, including the leaf-statement are deleted then we say the statements form a streak of deleted statements to the leaf-statement and call it SDL-Branch.

Therefore, we can see that whenever a leaf-statement and its direct parent-statements are deleted (forms an SDL-Branch), then the statements are not displayed in Delete Method 2. For example let us assume statement $x.a_1 \ldots a_{k-1}.a_{k-1}.a_k$ is a leaf-statement. Also, assume that the statement itself and its two direct parent-statements $x.a_1 \ldots a_{k-2}.a_{k-1}$ and $x.a_1 \ldots a_{k-2}$ are deleted. As long as all the sub-statements of statement $x.a_1 \ldots a_{k-1}$ and $x.a_1 \ldots a_{k-2}$ are in deleted state, three statements—statement $x.a_1 \ldots a_{k-2}.a_{k-1}.a_k$, $x.a_1 \ldots a_{k-2}.a_{k-1}$, and $x.a_1 \ldots a_{k-2}$—are not displayed. If however, statement $x.a_1 \ldots a_{k-2}$ is in deleted state and one of its sub-statement is not in deleted state then only the textbox of statement $x.a_1 \ldots a_{k-2}$ is displayed.

We note that whenever a statement is deleted, the textbox height of the deleted statement reduces to default-height. Also, this implies hidable and showable symbols are not displayed.

In summary, in Delete Method 1, no matter what the textbox remains undeleted and only the texts are deleted. This way, the layout maintains its structure. However, in Delete Method 2, in a certain situation, a branch will not be displayed.

We now explain Delete All command.

In Delete All command, the device basically applies Delete command on the selected statement and all of its sub-statements. The command itself is not applicable on leaf-statements.

Figure 24B:
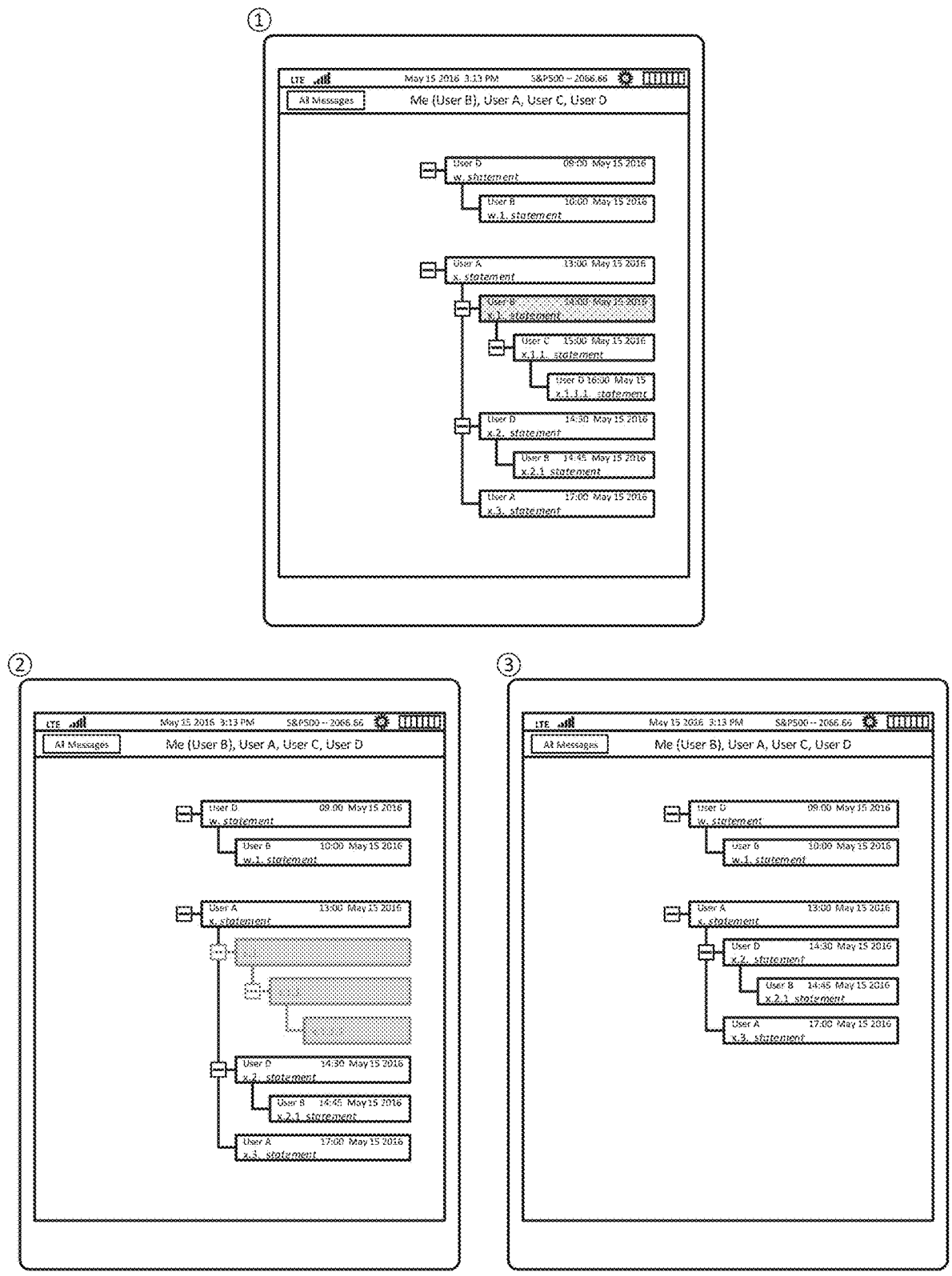
FIG. 24B consists of exemplary diagrams illustrating a method of applying Delete All command.

FIG. 24B illustrates the results after applying Delete All command.

The figure in ① of FIG. 24B illustrates the case where the user selects statement x.1 (shaded textbox) and applies Delete All command.

The figure in ② of FIG. 24B illustrates the layout after the user has applied the Delete All command on statement x.1 where the device operates under Delete Method 1. As illustrated, the texts of statement x.1 and all of its sub-statements are no longer displayed (they are in deleted states).

The figure in ③ of FIG. 24B illustrates the layout after the user has applied the Delete All command on statement x.1 where the device operates under Delete Method 2. As illustrated, the texts and the textboxes of statement x.1 and all of its sub-statements are no longer displayed (they are in deleted states). Note that the branch is not displayed since the series of deleted statements contains a leaf-statement and none of the statements have sub-statement that is not in deleted state (statement x.1 and x.1.1 have only one sub-statement and they are in deleted state).

If the user had applied Delete command on the main statement, the textbox will still be displayed (the text will not be displayed) since the main statement have sub-statements those are not in deleted states.

Now we consider what happens once the user deletes statement(s) and then receives a statement.

Figure 24C:
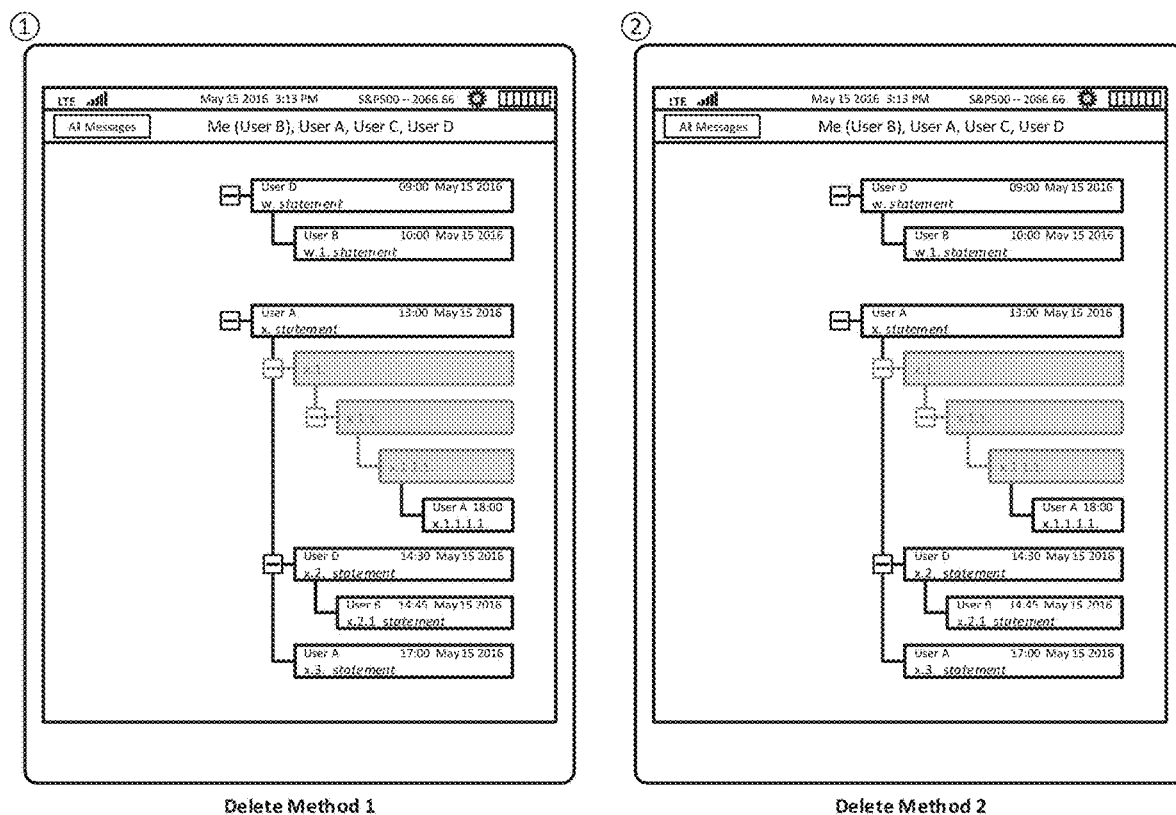
FIG. 24C consists of exemplary diagrams illustrating a user receiving a text message after text messages were deleted.

FIG. 24C illustrates the user receiving a new statement (statement x.1.1.1.1) after deleting statement x.1, x.1.1, and x.1.1.1. The result in ① of FIG. 24C illustrates the case where the device operates under Delete Method 1. This case is straightforward and simple. The new statement is placed in its right position as illustrated in the figure. The result in ② of FIG. 24C illustrates the case where the device operates under Delete Method 2. Note that the three deleted statements (shaded and empty textboxes) were not displayed after statement x.1, x.1.1, and x.1.1.1 were deleted. However, upon receiving statement x.1.1.1.1, these three deleted statements are now displayed. So, whenever a new statement is received and its parent-statement is in deleted state without being displayed in the layout then the new statement's direct parent-statements must be displayed. Additionally, when these direct parent-statements are displayed, they must satisfy the condition that none of their child-statements are in undeleted states.

We now illustrate how UBD and UBD All commands are applied on a layout.

Let us consider a situation where a user wishes to delete the statement the user has generated. At the same time the user wishes to ask other users who received the statement to delete the same statement as well. This is what Ubiquitous Delete does and we call it UBD command.

The UBD command is simply a delete operation. Whenever the user applies Ubiquitous Delete on a statement, the same delete procedures those were used in Delete command are applied. The only difference between UBD and Delete command is that when a user applies UBD command on a statement, the other users who also received the same statement is also asked to delete the statement. So, when a user applies UBD command on a statement, the Delete command is actually applied and then extra procedures that ask other users to delete the statement are executed. In Ubiquitous Delete, we impose a restriction. We assume the owner of the statement can apply UBD command. Of course, we can relax this restriction and allow any users to apply Ubiquitous Delete but here, we maintain the restriction.

We now explain UBD command. Here, we assume there are four users interacting with one another and User B applies UBD command.

Figure 25A:
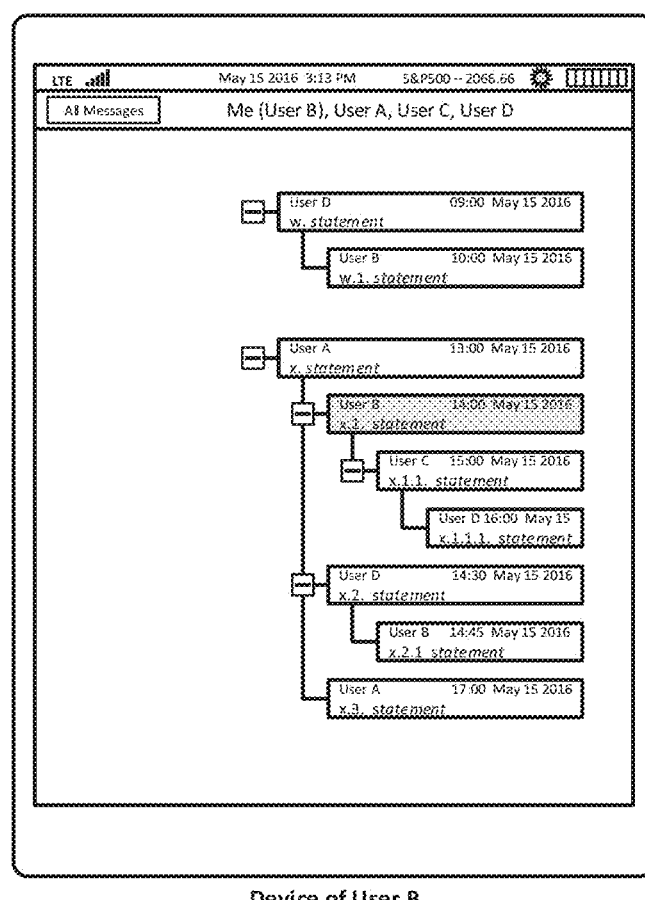
FIGS. 25A and 25B consists of exemplary diagrams illustrating a method of applying UBD command.

FIG. 25A illustrates User B applying UBD command on statement x.1. The device of User B applies Delete command on statement x.1 and sends a message to other users if each user wishes to delete the statement.

Figure 25B:
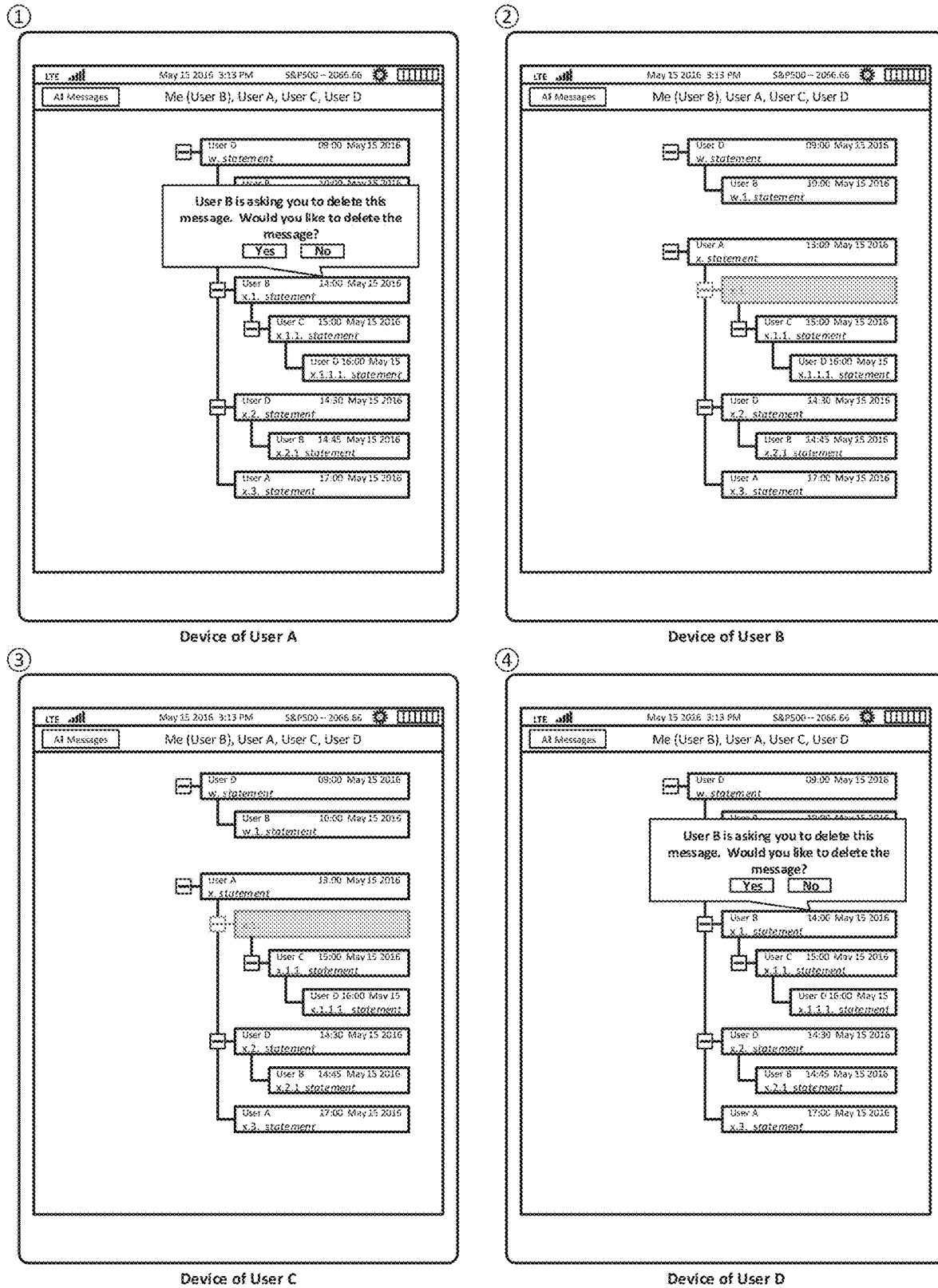

FIG. 25B illustrates the results after applying UBD command. The figures from ① to ④ of FIG. 25B are the devices of User A, User B, User C, and User D. Notice that statement x.1 that was created by User B has already been deleted as illustrated in ② of FIG. 25B due to applying UBD command. As illustrated in ③ of FIG. 25B, we assume that User C has delete statement x.1 before User B had applied UBD command on statement x.1 on his device. For other users, User A (① of FIG. 25B) and User D (④ of FIG. 25B), they are asked if they wish to delete statement x.1. If a user chooses to delete it then the user's device applies the Delete command on the statement. If a user chooses not to then the device does nothing. As for User C, the device does not ask the user if he/she wishes to delete the statement since it was already deleted. We assume User A and User D have agreed to delete the statements.

We now explain UBD All command. Again, we assume there are four users interacting with one another and User B applies UBD All command.

Figure 25C:
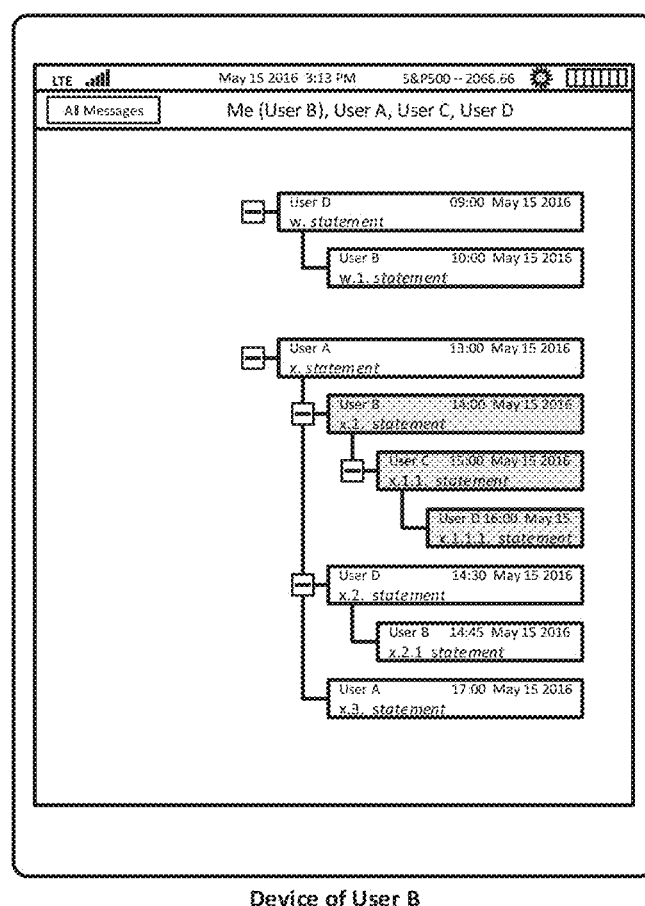
FIG. 25C-25E consists of exemplary diagrams illustrating a method of applying UBD All command.

FIG. 25C illustrates User B applying UBD All command on statement x.1. The device of User B applies Delete All command on statement x.1 and sends a message to other users if each user wishes to delete the statement and all of its sub-statements.

Figure 25D:
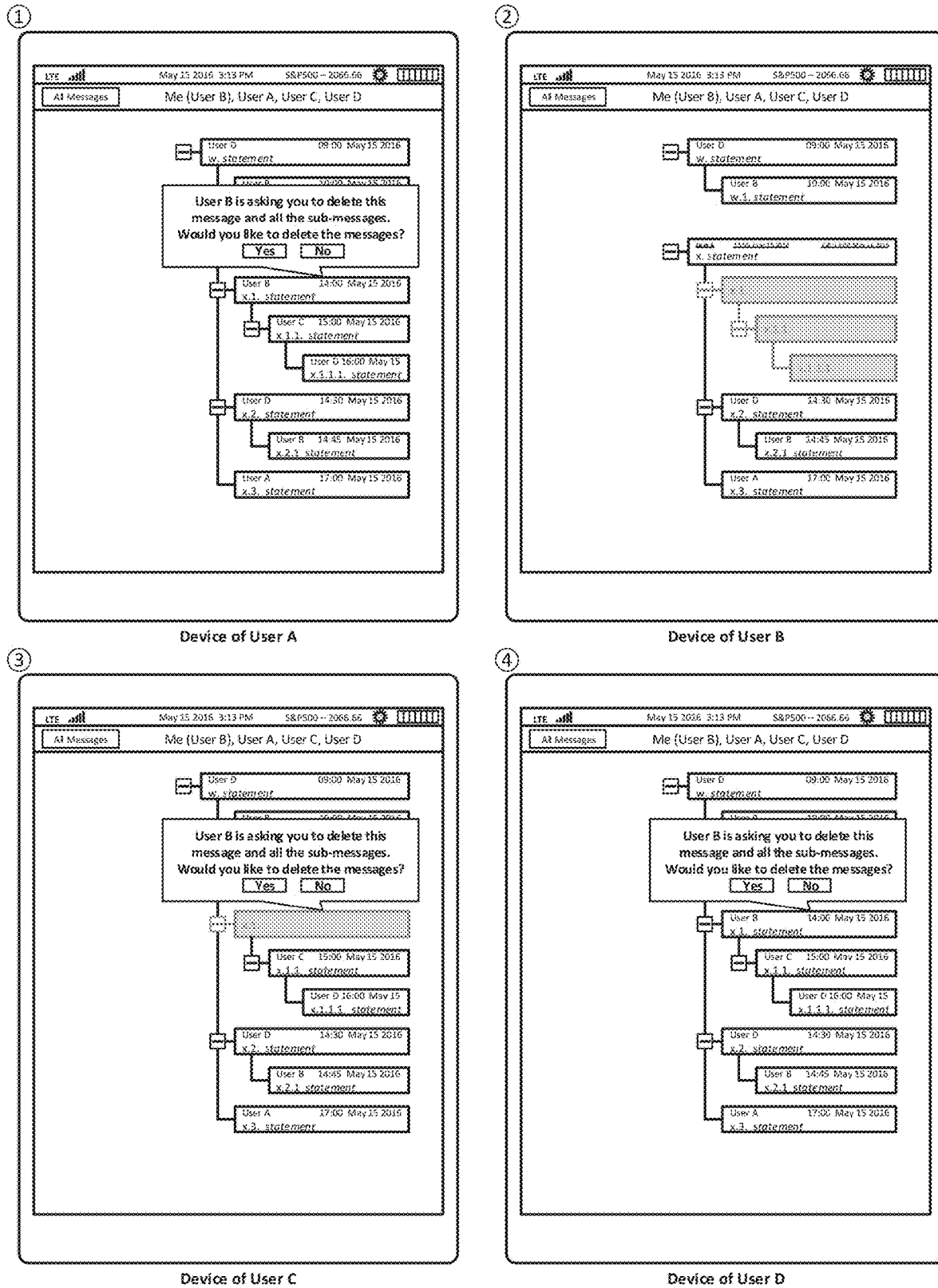

FIG. 25D illustrates the results after applying UBD command. The figures from ① to ④ of FIG. 25D are the devices of User A, User B, User C, and User D. Notice that statement x.1 that was created by User B and all of its sub-statements have already been deleted as illustrated in ② of FIG. 25D due to applying UBD All command. If a user chooses to delete it then the user's device applies the Delete All command on the statement. If a user chooses not to then the device does nothing. We assume User A and User D have agreed to delete the statements and User C refuses to delete the statement.

Now we illustrate what happens once the users who received a request from User B make decisions.

Figure 25E:
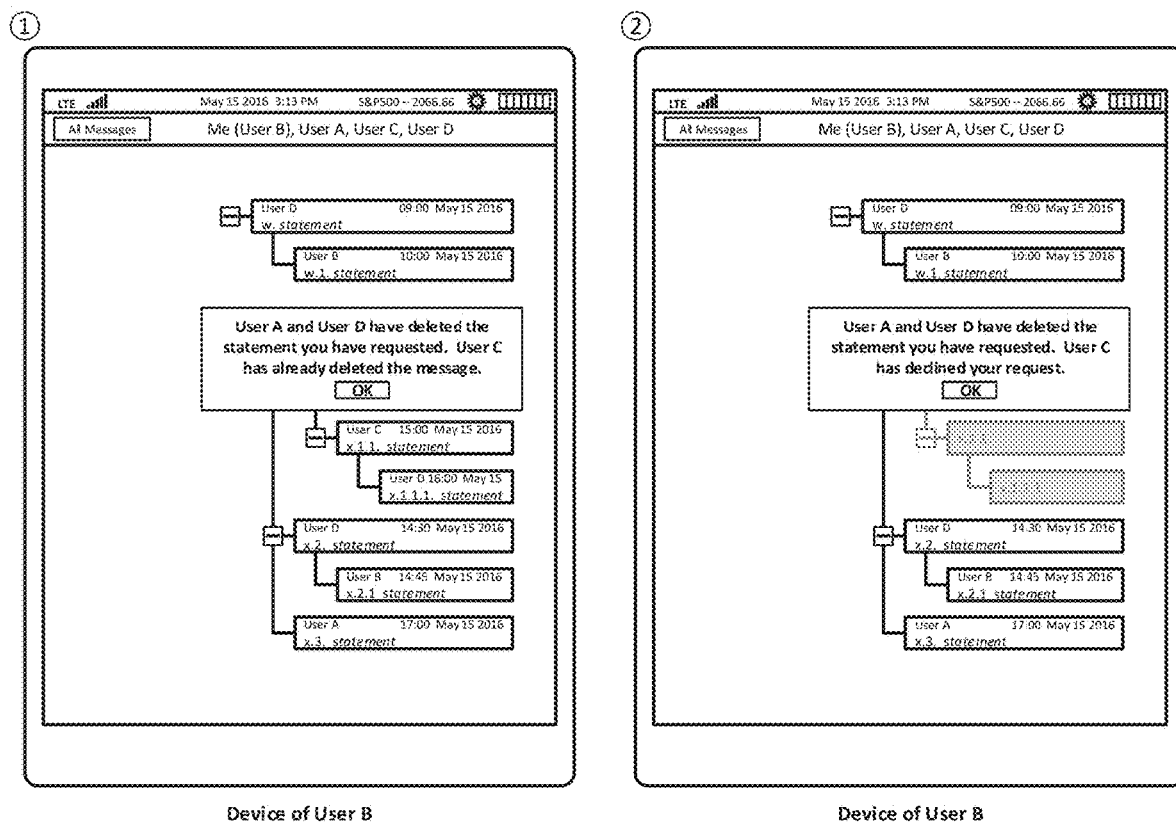

FIG. 25E illustrate User B's device after the user had applied UBD and UBD All command. The figure in ① of FIG. 25E is the case where the user had applied UBD command and all the other users have made decisions. As illustrated in the message box, the decisions made by other users are notified to User B. The figure in ② of FIG. 25E is the case where the user had applied UBD All command and all the other users have made decisions. As illustrated in the message box, the decisions made by other users are notified to User B.

In summary, the characteristic of Ubiquitous Delete is that whenever a user applies the command, the device sends a signal to other users. This triggers the requests to other users and once the other users make decisions, this result (signal) is sent to the original user who made the request.

We now illustrate how Modify command is applied on a layout.

After a user has written a statement and had sent it to other user(s), the user who sent the statement may want to "modify" the statement he/she had sent. The Modify command enables the user to change the text of a selected statement.

The basic assumption of applying Modify command is that a user has interacted with at least one other user(s) and all the users share the same statements. So, modifying a statement is changing the text of already existing statement that is on all the devices of the users in an interaction. The most important thing in modifying a text is that only the owner of the statement can apply the Modify command. Also, once the Modify command is applied on a statement, the same statement is modified on the devices of other user(s) who had received the statement.

Figure 26A:
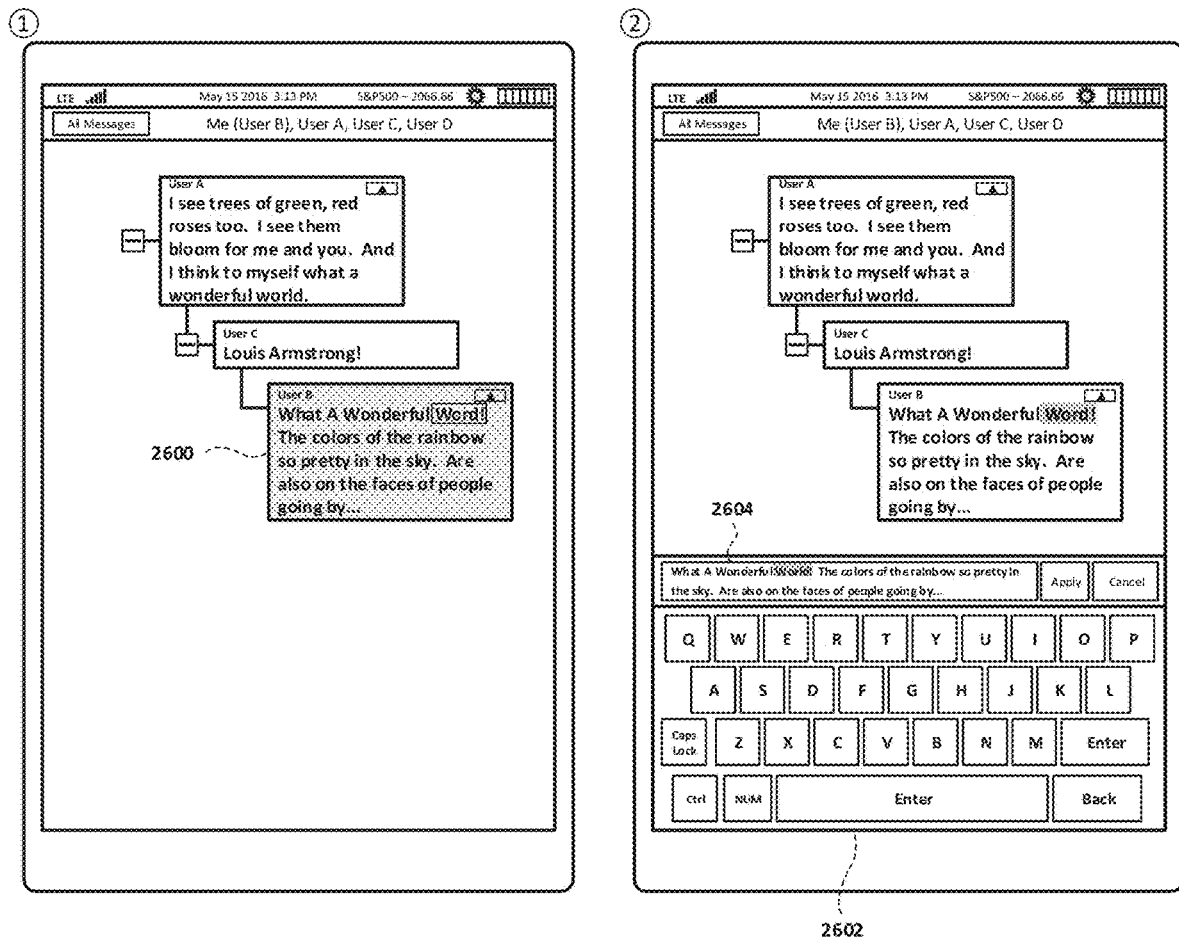
FIGS. 26A and 26B consists of exemplary diagrams illustrating a method of applying Modify command.

FIG. 26A illustrates User B applying Modify command on a statement where he is the owner of the statement. We assume User B is interacting with three other users—User A, User C, and User D.

In ① of FIG. 26A, the User B applies Modify command on statement x.1.1 (2600, shaded textbox). We assume that the user is trying to modify the word "Word!" to "World!".

In ② of FIG. 26A, once the user applies the command, a soft keyboard is displayed (2602) and the whole text is displayed in the text input area (2604) of the soft keyboard so the user can modify the text. The user changes the word "Word!" to "World!" and applies a hand gesture on "Apply" button. If the user applies a hand gesture on the "Cancel" button then nothing happens.

Note that the "Apply" button will be disabled when the user has made no change of the text or there is no text inside the text input area (2604).

Figure 26B:
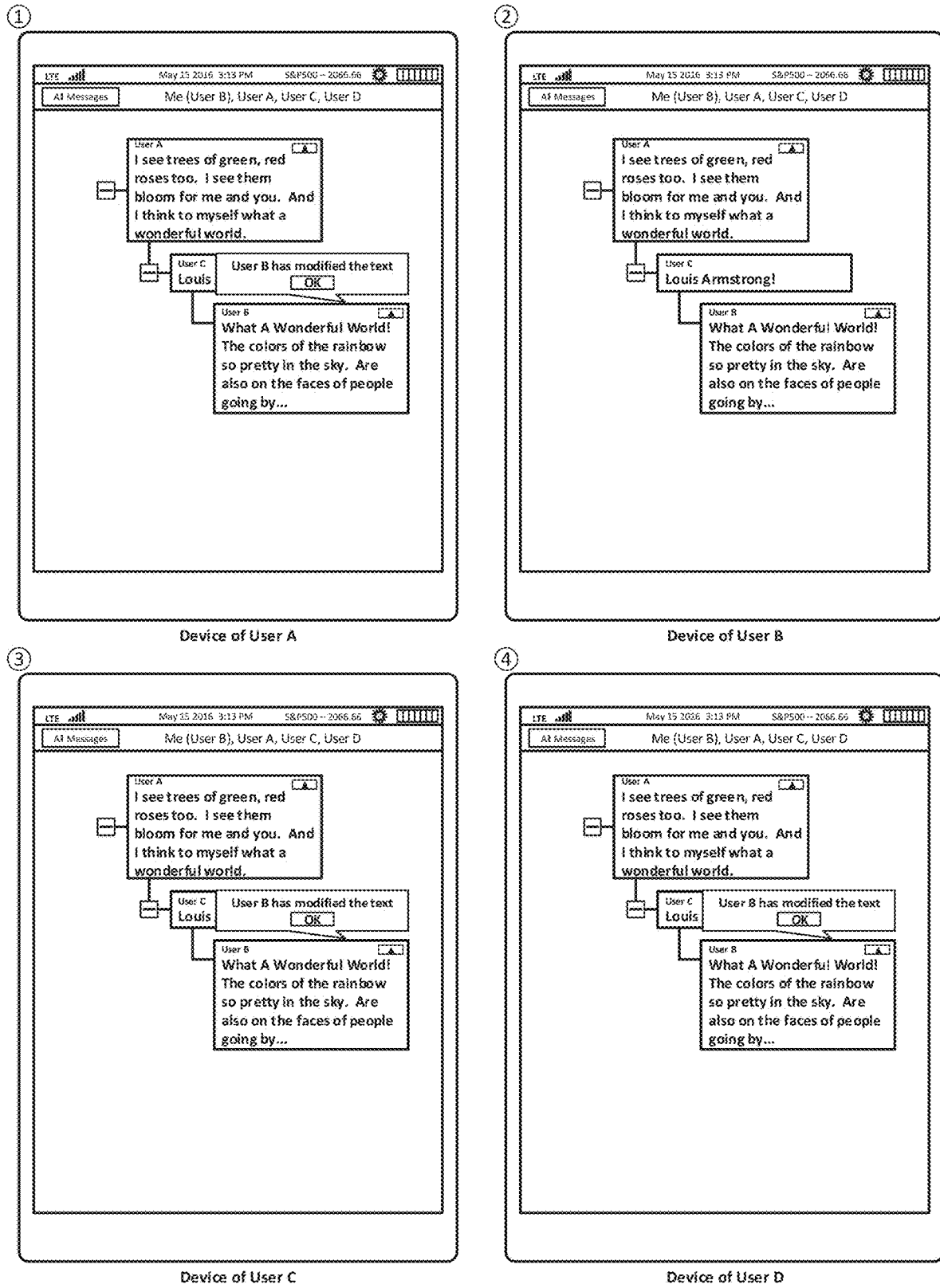

FIG. 26B illustrates the results after applying Modify command. As illustrated in all four figures, the modification has been projected to all four users. Also, as illustrated in ①, ③, and ④ of FIG. 26B, the three users (other than User B) receive messages notifying that User B has modified the statement.

We now illustrate how Invert and Revert commands are applied on a layout.

When there is a layout with a several statements, it might be a good idea to only highlight the most recent statements. Structurally, the most recent statements would be the leaf-statements (in a branch). Applying Invert command on a layout will make the device only display the leaf-statements.

It is as if the device is giving the users of the bottom view of the layout. The Revert command simply reverts the layout to its original view. To indicate whether the layout is in inverted or reverted state, we use symbols and call them invertible symbol and revertible symbol.

We note that Invert and Revert commands can be applied to any statements regardless of their states they are in.

We now explain Invert command.

Figure 27A:
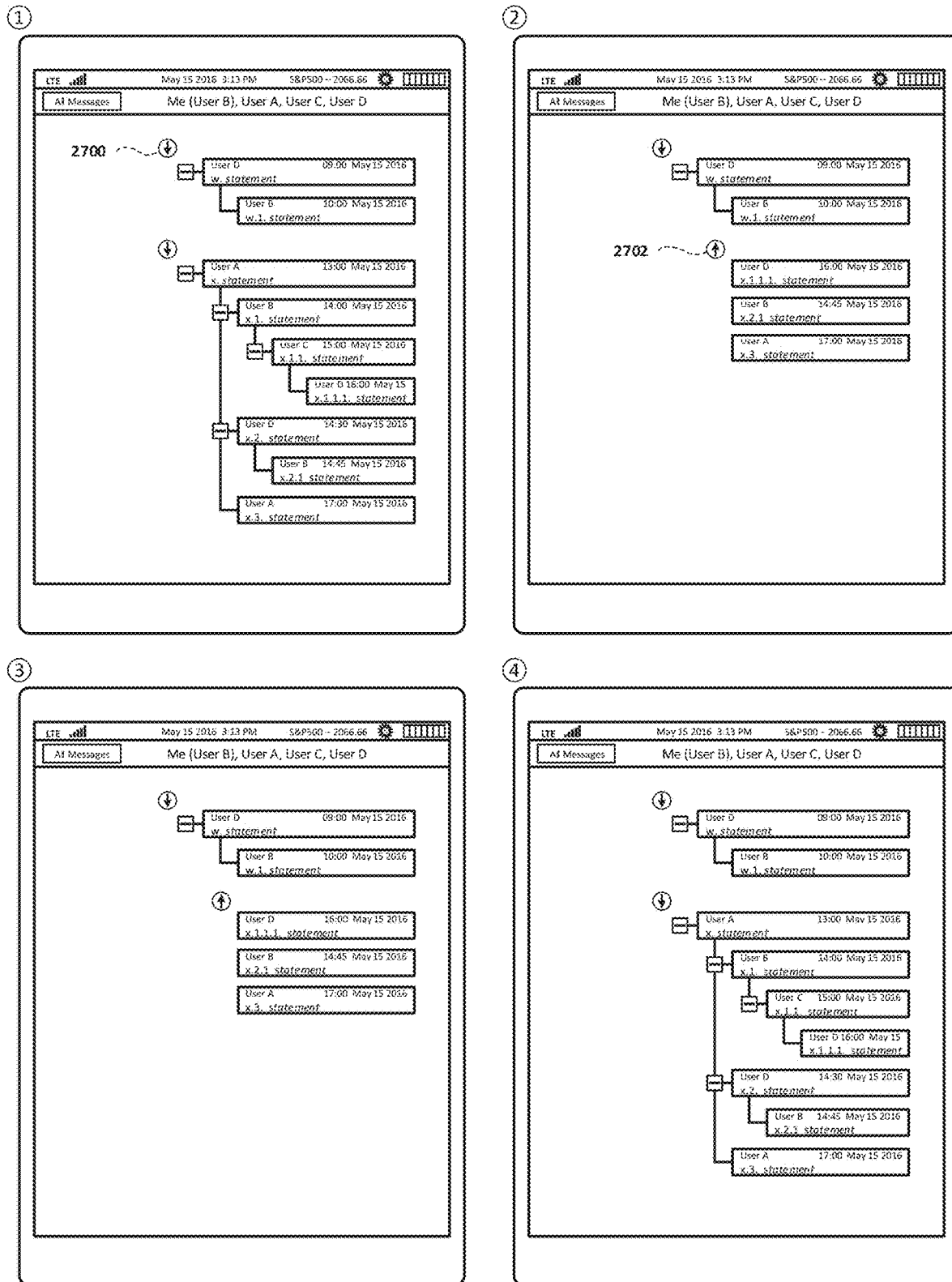
FIG. 27A consists of exemplary diagrams illustrating a method of applying Invert and Revert command.

FIG. 27A illustrates the user applying Invert and Revert commands.

The figure in ① of FIG. 27A illustrates two layouts and invertible symbols are placed in top left side of each layout as illustrated in 2700. This symbol indicates that the corresponding layout is invertible. Here, we assume the user has applied the Invert command on the second layout. The user chooses any statement and applies the command or if the invertible symbol is hand gesture detectable then the user applies a hand gesture on the symbol.

The figure in ② of FIG. 27A illustrates the layout after the user has applied the Invert command on the layout. As illustrated, only the leaf-statements are displayed (with the size of the textbox widths adjusted). Also, the invertible symbol has now changed to revertible symbol (2702). This symbol indicates that the layout is in inverted state and can be reverted back to the original view.

The figure in ③ of FIG. 27A illustrates two layouts and the second one is in inverted state. Here, we assume the user has applied the Revert command on the second layout. The user chooses any statement and applies the command or if the revertible symbol is hand gesture detectable then the user applies a hand gesture on the symbol.

The figure in ④ of FIG. 27A illustrates the layout after the user has applied the Revert command on the layout. The layout has reverted back to its original view.

Figure 27B:
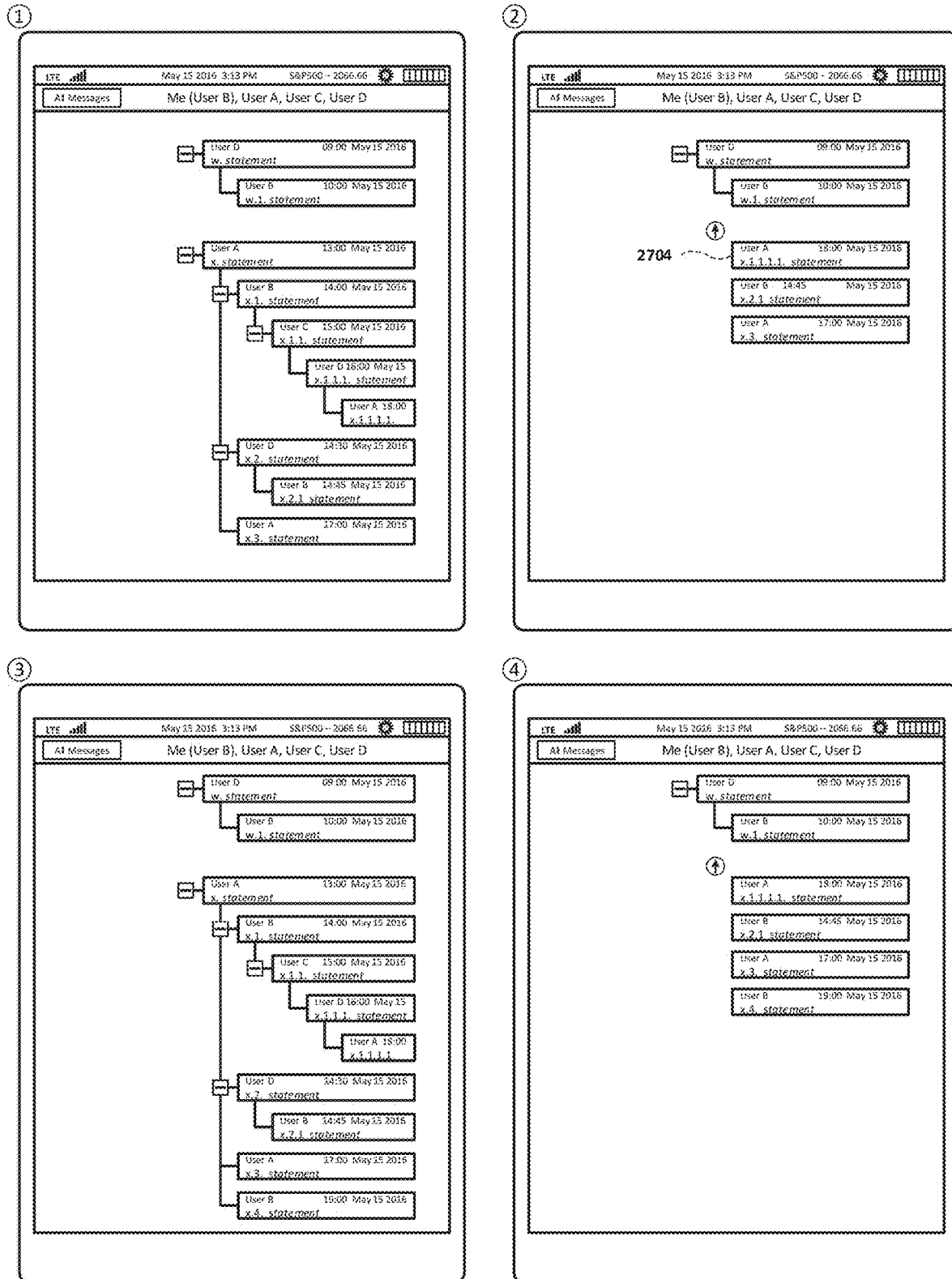
FIG. 27B consists of exemplary diagrams illustrating the user receiving a text message after the layout is in inverted and reverted state.

FIG. 27B illustrates a demonstration. We assume the user receives two new statements—statement x.1.1.1.1 and x.4. Figure ① and ③ of FIG. 27B illustrate the user receiving the statements while the layout is not inverted and FIG. ② and ④ of FIG. 27B illustrate the user receiving the statements while the layout is inverted.

In ① of FIG. 27B, the user receives statement x.1.1.1.1 and it is placed below statement x.1.1.1. However, as illustrated, in ② of FIG. 27B, the new statement x.1.1.1.1 (2704) replaces its parent-statement x.1.1.1 and is displayed to the user. This is because statement x.1.1.1 is no longer a leaf-statement anymore.

In ③ of FIG. 27B, the user receives statement x.4 and is placed below statement x.3. In ④ of FIG. 27B, since statement x.4 is a new leaf-statement, this is placed below statement x.3 and is displayed to the user.

We now illustrate how Increase and Decrease commands are applied on a layout.

This is relatively a simple command where the device simply enlarges the whole statement when applied. So when the user applies Increase command, the device enlarges the statement and when the user applies Decrease command while the statement is in increased state, the device undoes the enlargement and the statement returns to decreased (original) state.

Figure 28:
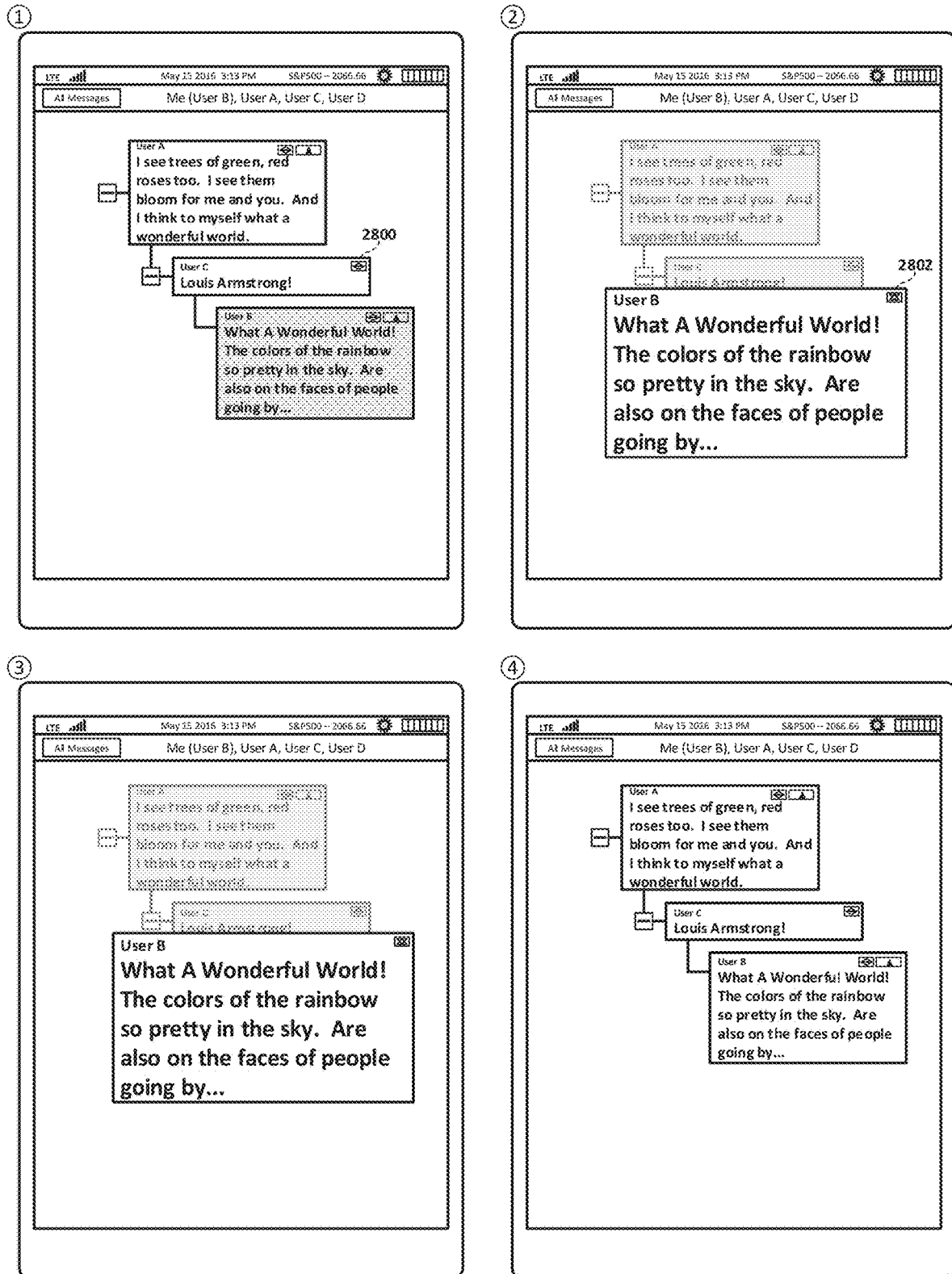
FIG. 28 consists of exemplary diagrams illustrating a method of applying Increase and Decrease command.

FIG. 28 illustrates the user applying Increase and Decrease command.

The figure in ① of FIG. 28 illustrates a layout and increase symbols are placed in top right corner of each statement as illustrated in 2800. This symbol indicates that the corresponding layout is increasable. Here, we assume the user has applied the Increase command on the leaf-statement (shaded textbox). If the increase symbol is hand gesture detectable then the user can apply a hand gesture on the symbol.

The figure in ② of FIG. 28 illustrates the layout after the device has applied the command. As illustrated, the whole statement is enlarged. The textbox width and height have increased and the overall font size of the text has increased as well. The symbol in 2802 is the decrease symbol and it is easy to notice that the increase symbol changes to decrease symbol once the statement is enlarged.

The figure in ③ of FIG. 28 illustrates the user applying Decrease command on the enlarged statement. If the decrease symbol is hand gesture detectable then the user can apply a hand gesture on the symbol.

The figure in ④ of FIG. 28 illustrates the layout after the device has applied the command. As illustrated, the enlarged statement is no longer displayed and the layout has returned to its original state. Also, the decrease symbol has now changed to increase symbol.

We now illustrate how ALL commands are applied on a layout.

There are eight commands we categorize as ALL commands. The eight commands are: Collapse All, Expand All, Hide All, Show All, Delete All, UBD All, Invert, and Revert. In the setting we present, these commands are applied on every main statement on the display.

Figure 29A:
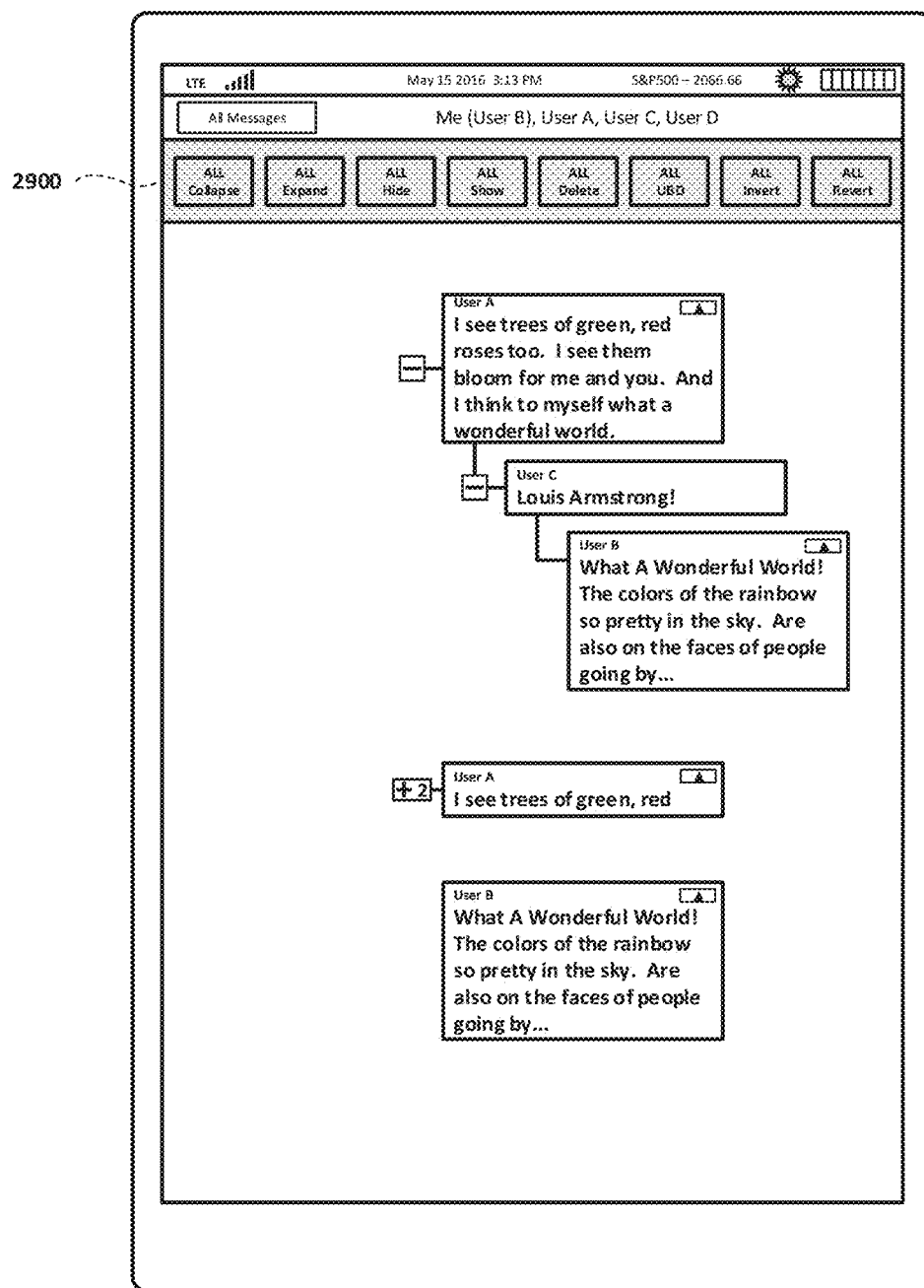
FIG. 29A consists of exemplary diagram illustrating how ALL Commands are displayed on the display of the device.

FIG. 29A illustrates a device with three layouts. On the top, there are eight commands displayed (2900). A user can apply one of these commands any time. For illustration purposes, all the three layouts are exactly the same. The first layout is fully expanded. The second layout is fully collapsed and the main statement is in hidden state. The last layout is inverted.

Now we illustrated what happens once the user applies a hand gesture on each command.

Figure 29B:
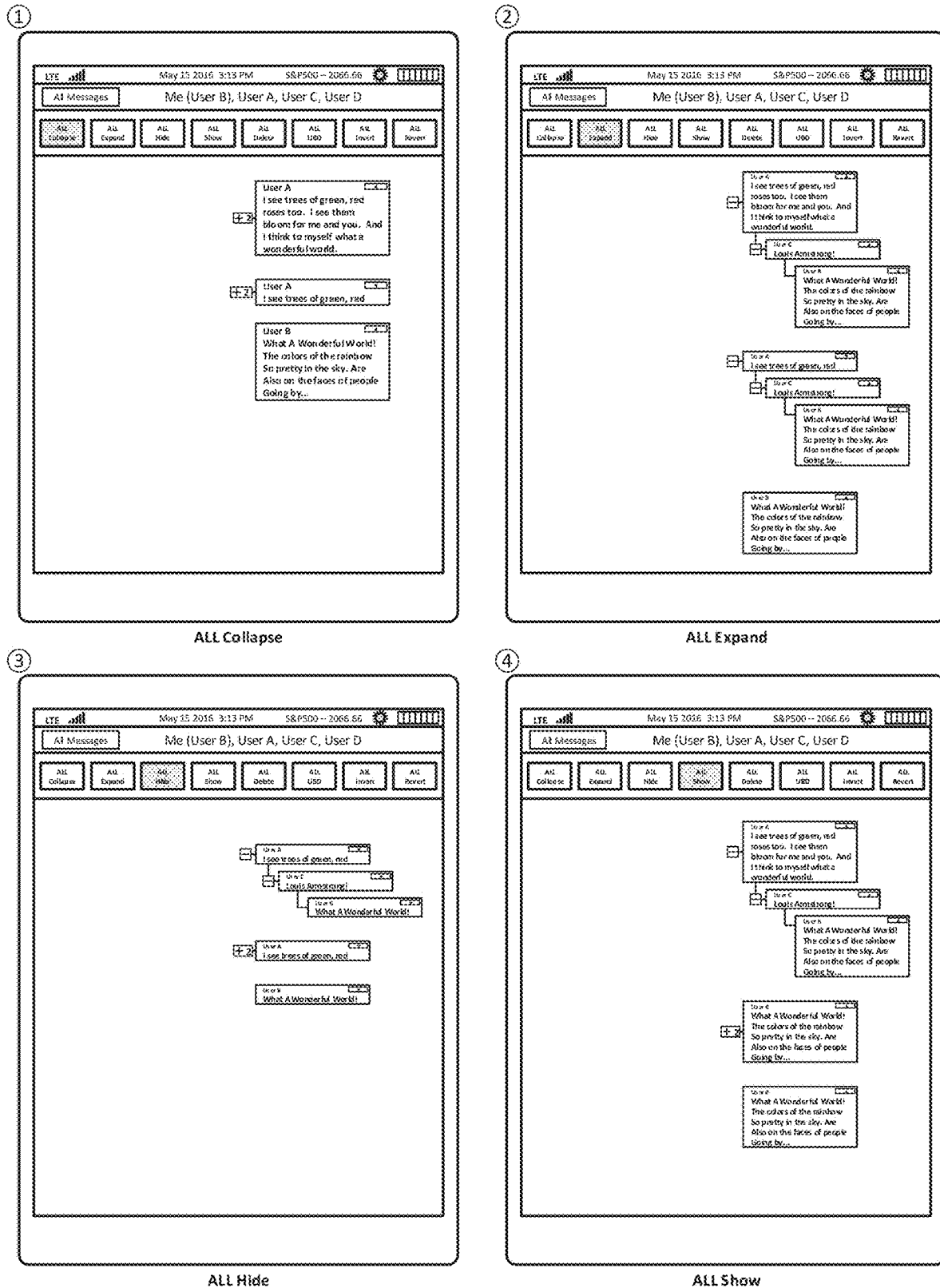
FIG. 29B consists of exemplary diagrams illustrating a method of applying ALL Collapse, ALL Expand, ALL Hide, and ALL Show commands.

FIG. 29B illustrates results after the user has applied four commands.

The figure in ① of FIG. 29B illustrates the result after applying Collapse All command on every main statement from FIG. 29A. As illustrated, the first layout has changed to fully collapsed state. The second and the last layouts remain unchanged.

The figure in ② of FIG. 29B illustrates the result after applying Expand All command on every main statement from FIG. 29A. As illustrated, the second layout has changed to fully expanded state but the main statement is still in hidden state. The first and the last layouts remain unchanged.

The figure in ③ of FIG. 29B illustrates the result after applying Hide All command on every main statement from FIG. 29A. As illustrated, all the statements in the first layout have change to hidden states. The leaf-statement of the last layout, which is still in inverted state, changed to hidden state.

The figure in ④ of FIG. 29B illustrates the result after applying Show All command on every main statement from FIG. 29A. As illustrated, the main statement of the second layout has changed to visible state. The first and the last layouts remain unchanged.

Figure 29C:
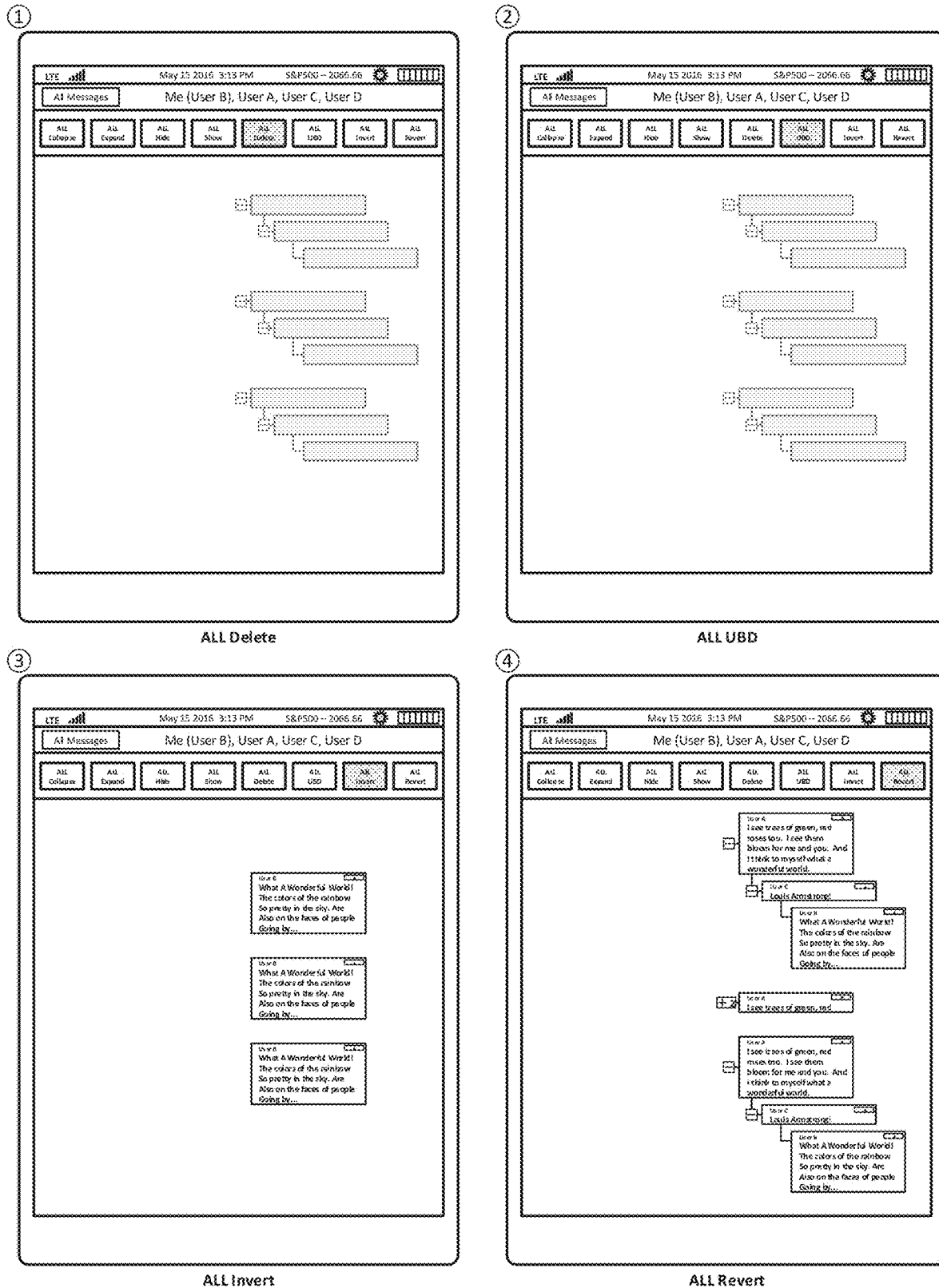
FIG. 29C consists of exemplary diagrams illustrating a method of applying ALL Delete, ALL UBD, ALL Invert, and ALL Revert commands.

FIG. 29C illustrates results after the user has applied four other commands.

The figure in ① of FIG. 29C illustrates the result after applying Delete All command on every main statement from FIG. 29A. As illustrated, all the statements are now in deleted state. Also, the last layout that was in inverted state has reverted to its original view.

The figure in ②of FIG. 29C illustrates the result after applying UBD All command on every main statement from FIG. 29A. As illustrated, all the statements are now in deleted state. Also, the last layout that was in inverted state has reverted to its original view.

The figure in ③ of FIG. 29C illustrates the result after applying Invert command on every main statement from FIG. 29A. As illustrated, all the statements are now in inverted state.

The figure in ④ of FIG. 29C illustrates the result after applying Revert command on every main statement from FIG. 29A. As illustrated, the last layout has changed to it is original view.

Now we introduce a feature called Auto-Expand (AE). This is not a command but a process that is executed by the device when a user receives a new statement and the super-statement of the newly received statement is in collapsed state. For example, if a main statement is in collapsed state the newly received statement has the numbering $x.a_1 \ldots a_k.r$ then clearly the main statement needs to be expanded in some way. Here, we present four ways to expand a super-statement.

For the illustration the four different methods to expand a statement, we first introduce a layout and illustrate how it is collapsed.

Figure 30A:
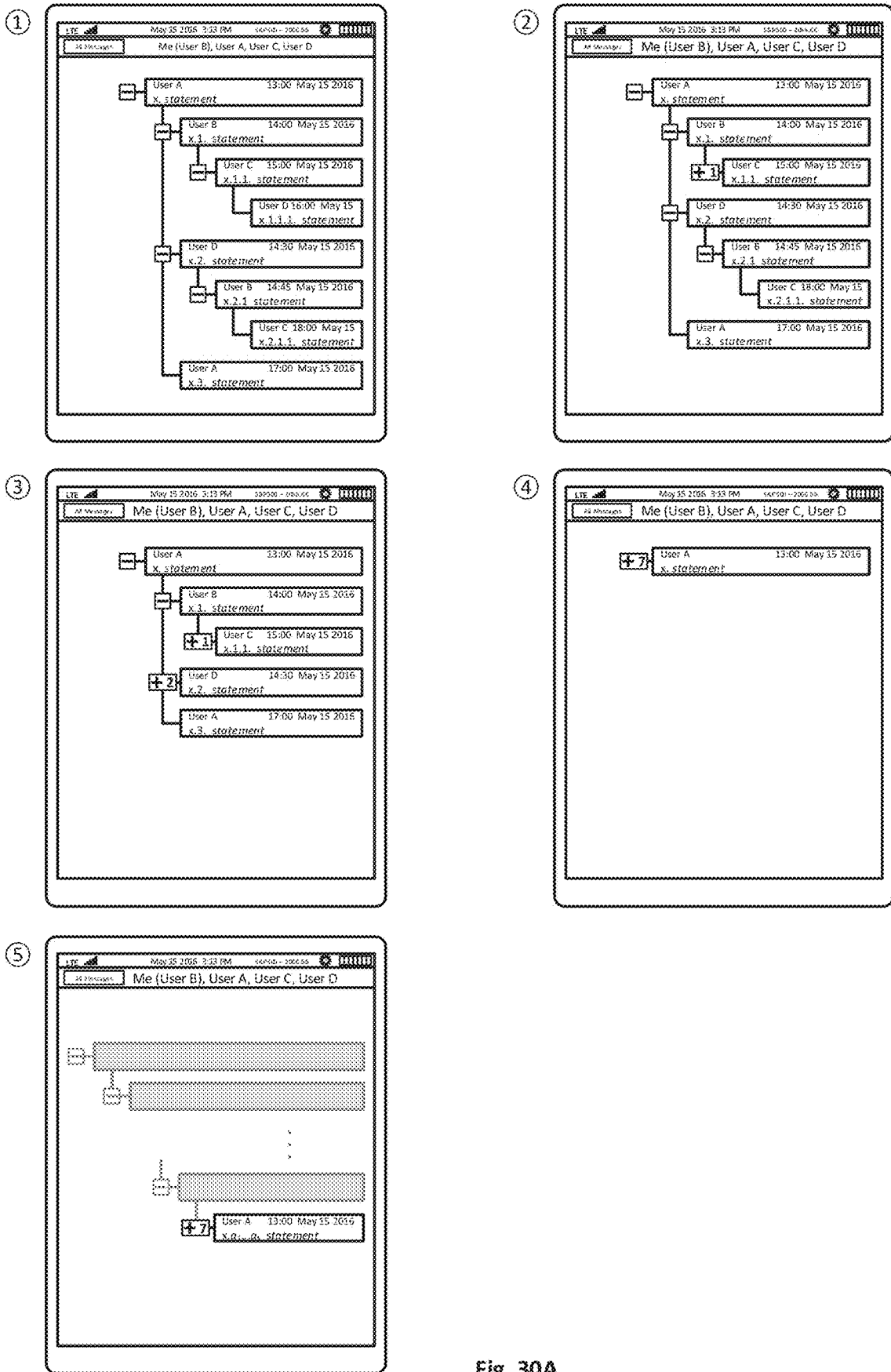
FIGS. 30A and 30B consists of exemplary diagrams illustrating the notion of Maintain the Previous State Auto-Expand, Common Depth Auto-Expand, One Branch Auto-Expand, and Expand All Auto-Expand.

FIG. 30A illustrates a layout and how it is collapsed. We assume the device operates under Memorized method. In ① of FIG. 30A, the layout consists of eight statements. In ② of FIG. 30A, the user collapses statement x.1.1. In ③ of FIG. 30A, the user collapses statement x.2. In ④ of FIG. 30A, the user collapses the main statement. From here we assume the user receives a new statement.

We note that although we assume the user is receiving a statement while the main statement is fully collapsed but we can also see it as one of the sub-statements being in collapsed state and receives a new statement as illustrated in ⑤ of FIG. 30A.

Figure 30B:
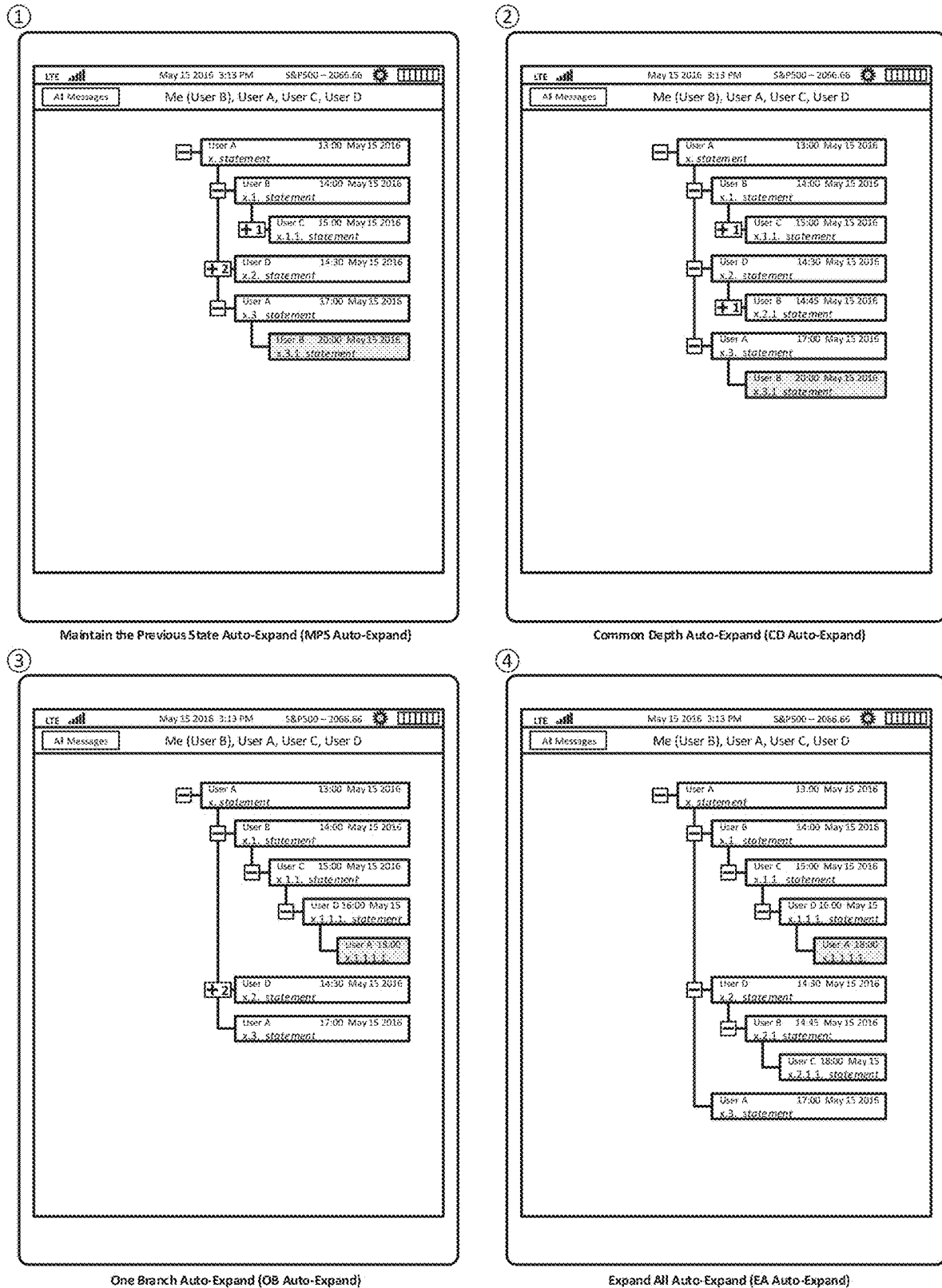

FIG. 30B illustrates four Auto-Expand. As noted we assume the main statement was collapsed in a way illustrated in FIG. 30A and the user receives a statement.

Figure ① of FIG. 30B illustrates Maintain the Previous State Auto-Expand (MPS Auto-Expand). In this method, whenever the user receives a new statement and the main statement is expanded, the layout returns to its previous state before the main statement was collapsed. The user receives a new statement (statement x.3.1). Note that before the main statement was collapsed, statement x.2.1 and x.2 were in collapsed states (③ of FIG. 30A). So, when the main statement is expanded it retains its previous state and statement x.3.1 is placed where it should be.

Figure ② of FIG. 30B illustrates Common Depth Auto-Expand (CD Auto-Expand). In this method, whenever the user receives a new statement and the main statement is expanded, all the statements in the same depth as the received statement are forced to be in collapsed state. The user receives a new statement (statement x.3.1). As illustrated, since the new statement is at depth 2, all the statements at depth 2 are forced to be in collapsed state.

Figure ③ of FIG. 30B illustrates One Branch Auto-Expand (OB Auto-Expand). In this method, whenever the user receives a new statement and the main statement is expanded, only the branch where the new statement should belong is expanded and rest of them are forced to be in collapsed state. The user receives a new statement (statement x.1.1.1.1). As illustrated, since the numbering of the new statement is x.1.1.1.1, statement x.1, x.1.1, and x.1.1.1 are expanded and the new statement is placed in its right position. Note that other statement such as statement x.2 is forced to be in collapsed state (if statement x.3 had sub-statements then the device will also force the statement to be in collapsed state). So, if the numbering of the new statement is x.a.b.c.d.2 (the second child-statement of statement x.a.b.c.d) then the statements x, x.a, x.a.b, x.a.b.c, and x.a.b.c.d would all be in expanded states. But rest of the statements with sub-statements will be forced to be in collapsed state.

Figure ④ of FIG. 30B illustrates Expand All Auto-Expand (EA Auto-Expand). In this method, whenever the user receives a new statement, the main statement is fully expanded. The user receives a new statement (statement x.1.1.1.1). As illustrated, the layout is fully expanded and the new statement is placed in its right position.

Now we illustrate how layouts are displayed on a device whenever the user sends or receive a statement. We present two ways to display the layouts.

Figure 31A:
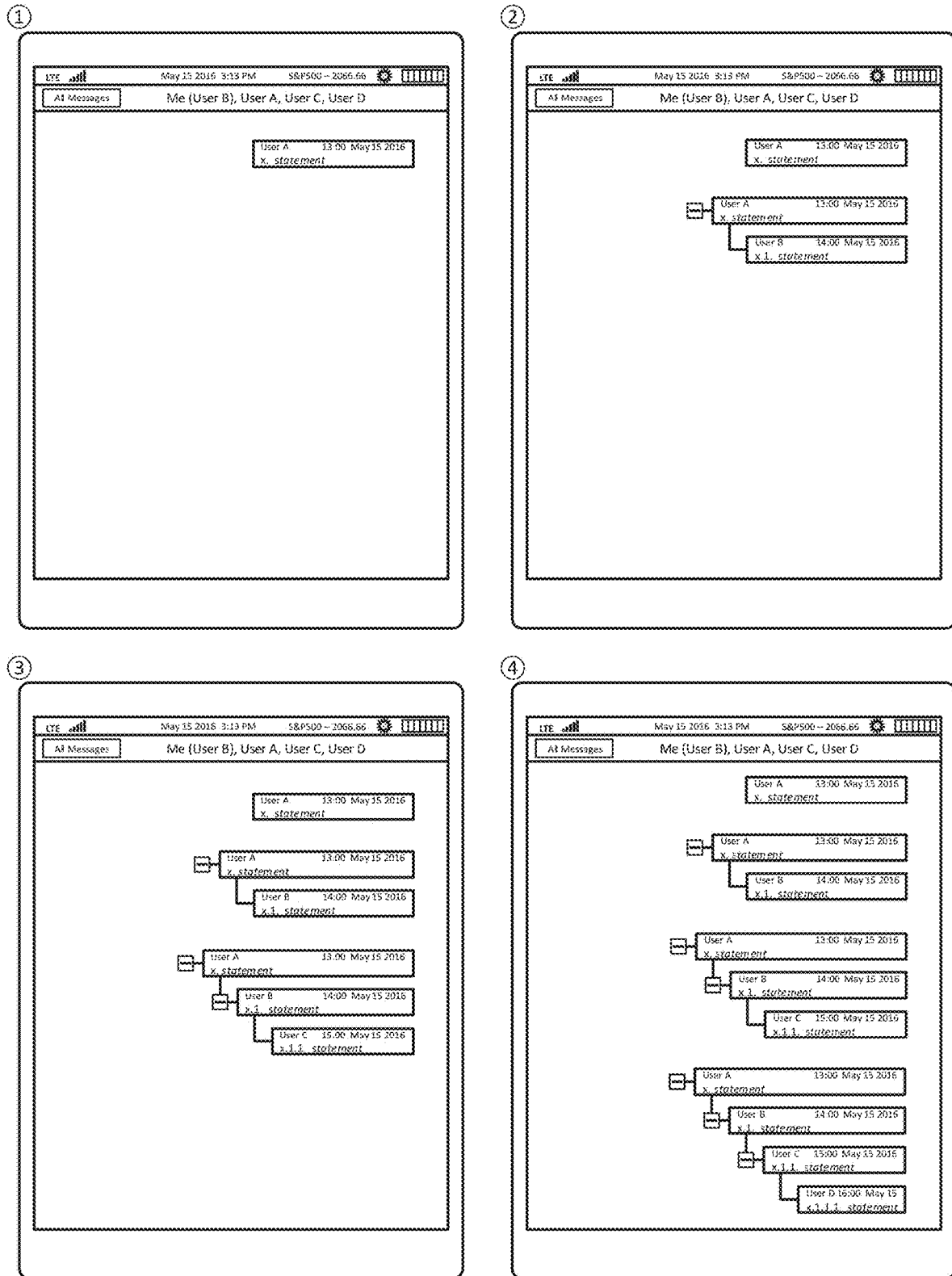
FIGS. 31A and 31B consists of exemplary diagrams illustrating two different methods placing layouts whenever the user sends/receives a text message(s).

FIG. 31A illustrates the first method. In this method, whenever the user receives a statement the current layout is not changed and the new statement is placed in the exact copy of the current layout. We call this, Display Method 1. In ① of FIG. 31A, the user receives a statement—statement x. In ② of FIG. 31A, the user receives statement x.1. As illustrated, the old layout (statement x) is not changed but the new statement is placed in the copy of the layout (statement x). In ③ of FIG. 31A, the user receives statement x.2. In ④ of FIG. 31A, the user receives statement x.1.1. As illustrated, in Display Method 1, the user can easily see how interaction between users progresses.

Figure 31B:
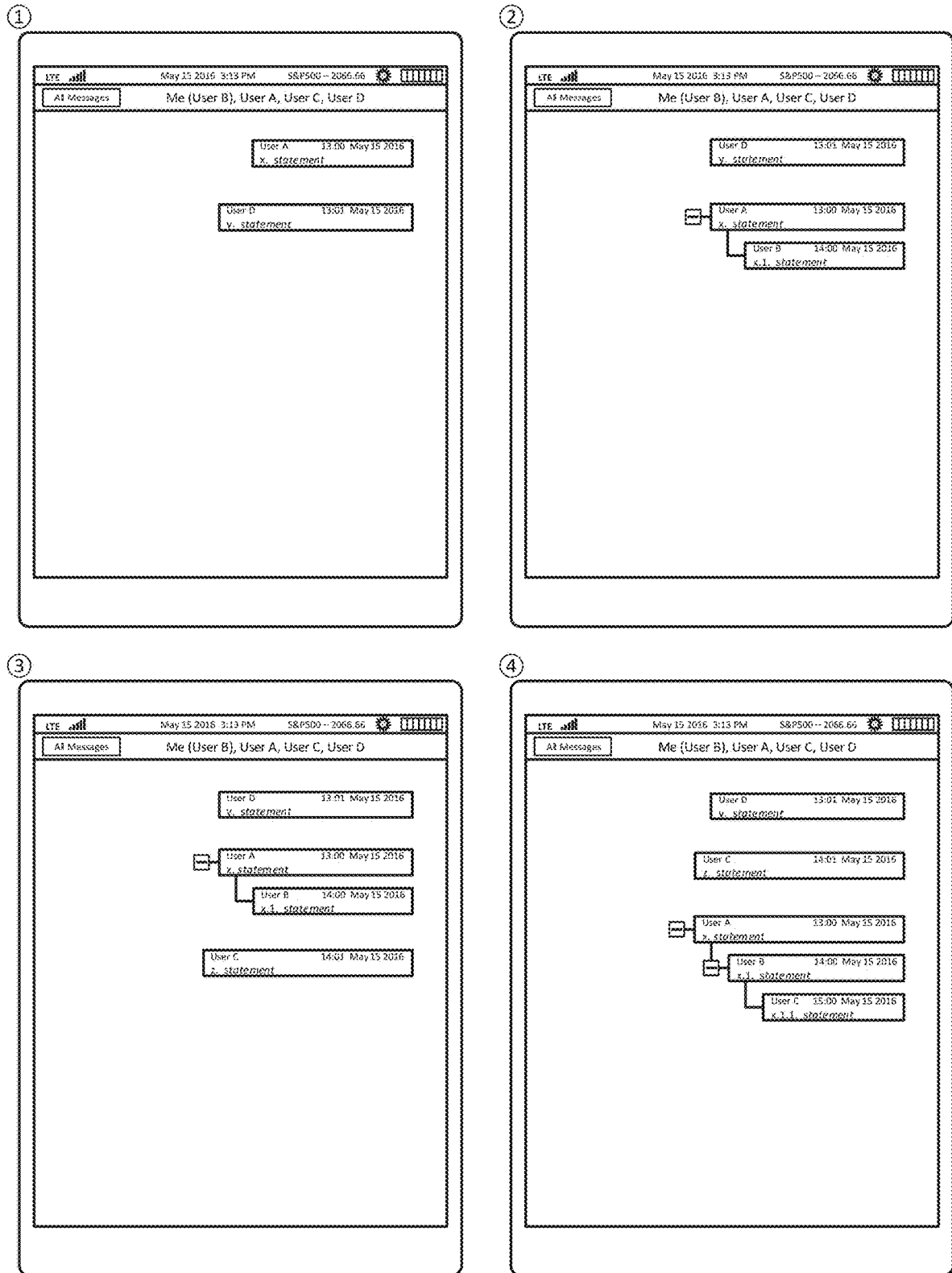

FIG. 31B illustrates the second method. In this method, unlike Method 1, the device does not produce a copy of a layout when it receives a new statement. We call this, Display Method 2. In order to explain the idea in detail, we assume the user of the device sends statements to other users. In ① of FIG. 31B, the user receives two statements, statement x and statement y, from User A and User D, respectively. In ② of FIG. 31B, the user sends a statement (statement x.1). As illustrated, the whole layout (where the main statement is statement x) is treated as a new statement and is placed at the bottom of the screen. In ③ of FIG. 31B, the user receives statement z from User C. As illustrated, the new statement is placed at the bottom of the screen. In ④ of FIG. 31B, the user receives statement x.1.1 from User C. Again, the whole layout is treated as a new statement and is placed at the bottom of the screen. As illustrated, in Display Method 2, whenever a sub-statement is added to the main statement, the whole layout is treated as a statement and is displayed at the bottom of the screen.

Thus far, we have only illustrated commands independently. That is, we have not illustrated how they can be combined together. In this section, we combine all the commands we have explained thus far and illustrate how they are displayed. As mentioned, commands can be internalized, externalized, or customized. Also, any command can be internalized, externalized, and customized at the same time. What we present here is demonstration of how commands are provided to the users that lead them to execution of the selected command. FIG. 32A illustrates all the possible ways a command can be provided to a user.

The figure in ① of FIG. 32A illustrates possible cases of a command being internalized, externalized, or customized. For example, if a command is internalized, we assign 1 and if not, assign 0. So, as denoted in the first row of the table, if we have (0,0,1) then this means the command is only customized. Also, as denoted in the last row of the table, if we have (1,1,1) then this means the command is internalized, externalized, and customized. For example, if the Delete command is (1,1,1) then the user is able to apply the command by means of internalized, externalized, and customized command. For easy referencing, we assign a number to each tuple. For simplicity, we consider a tuple as a binary number. Therefore, we assign 5 to the tuple (1,0,1) and so on.

The figure in ② of FIG. 32A illustrates all the possible cases of all the eighteen commands being internalized, externalized, or customized. So, the number of possible combination is $7^{18}$=1,628,413,597,910,449 (more than 1.6 quadrillion). However, the nature of some of the commands is doing-and-undoing a specific task. Therefore, we can group these mutually exclusive commands as one group. For example, the commands Hide and Show are mutually exclusive commands. They will not be applicable on a statement at the same time. So, we can see these pair of mutually exclusive commands and group them as if they are one command. Note that grouping mutually exclusive commands together is not necessary. We can make Hide command only internalized but we can make Show command only externalized.

The figure in ③ of FIG. 32A illustrates the same table from ② of FIG. 32A except that we have combined mutually exclusive commands as one and this gives us twelve "commands". So, the table denotes that there are $7^{12}$=13,841,287,201 (more than 13 billion) possible ways to provide the commands to the user on a statement that is not a leaf-statement and $7^8$=5,764,801 possible ways to provide commands to the user on a leaf-statement. This implies mutually exclusive commands are provided to the users in the same way. For example, if Hide command is externalized then its mutually exclusive command, Show command, is also externalized.

From 1.6 quadrillion ($7^{18}$) possible ways to set the commands we give a specific setting.

We can consider the combination of 18 such as:

(5, 2, 2, 2, 2, 4, 4, 4, 4, 4, 1, 1, 4, 4, 4, 4, 4, 4)$^{18}$

This means the Reply command is internalized and customized which the combination is represented by the number 5. The Collapse, Expand, Hide, and Show commands are only externalized which is represented by the number 2. The Delete, Modify, UBD, Invert, and Revert commands are only internalized which is represented by the number 4. The Increase and Decrease commands are only customized which is represented by the number 1. Finally, the rest of the ALL Commands are internalized which is represented by the number 4.

Using the combined version of mutually exclusive commands with twelve commands, we can express the combination as:

(5, 2, 2, 4, 4, 4, 4, 1, 4, 4, 4, 4)$^{12}$

Figure 32B:
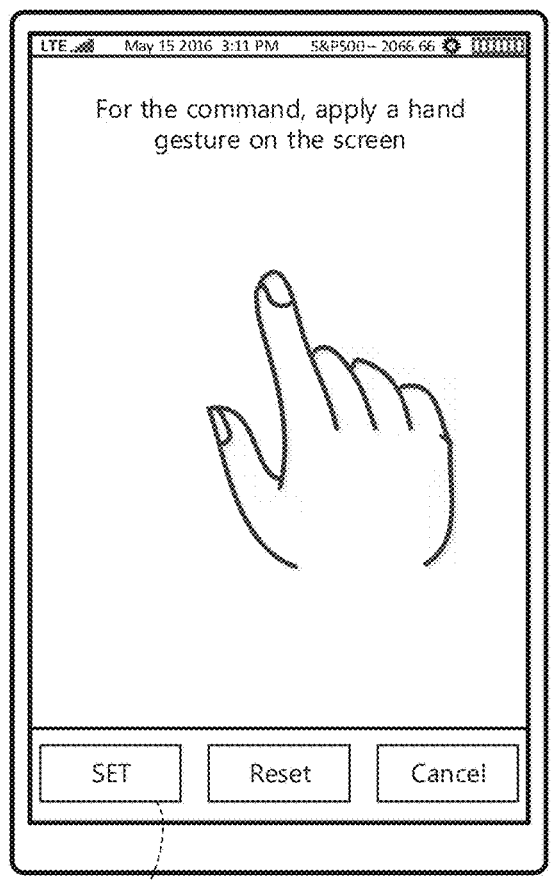
FIG. 32B consists of tables illustrating the possible combinations of how each command can be set by a user.

FIG. 32B illustrates user setting the commands using the combination. In ①, device displays a list of commands (3200) where a user can set each command to be internalized, externalized, or customized. In the first row (3202), where the user can set the device for the Reply command, user checks 'Internalized' and 'Customized'. The device sets Reply command to be internalized and customized. Once the device detects that the user has checked 'Customized', it displays a new screen as illustrated in ②, so the user can input a hand gesture for the Reply command. After the user successfully inputs a hand gesture then he/she applies the SET (3204) and the device stores the hand gesture information. As illustrated in the first row (3202) and the row for Increase and Decrease commands, if the user had set any commands to be customized then the SET buttons in the last column are activated so the user can reset the hand gesture.

Figure 32C:
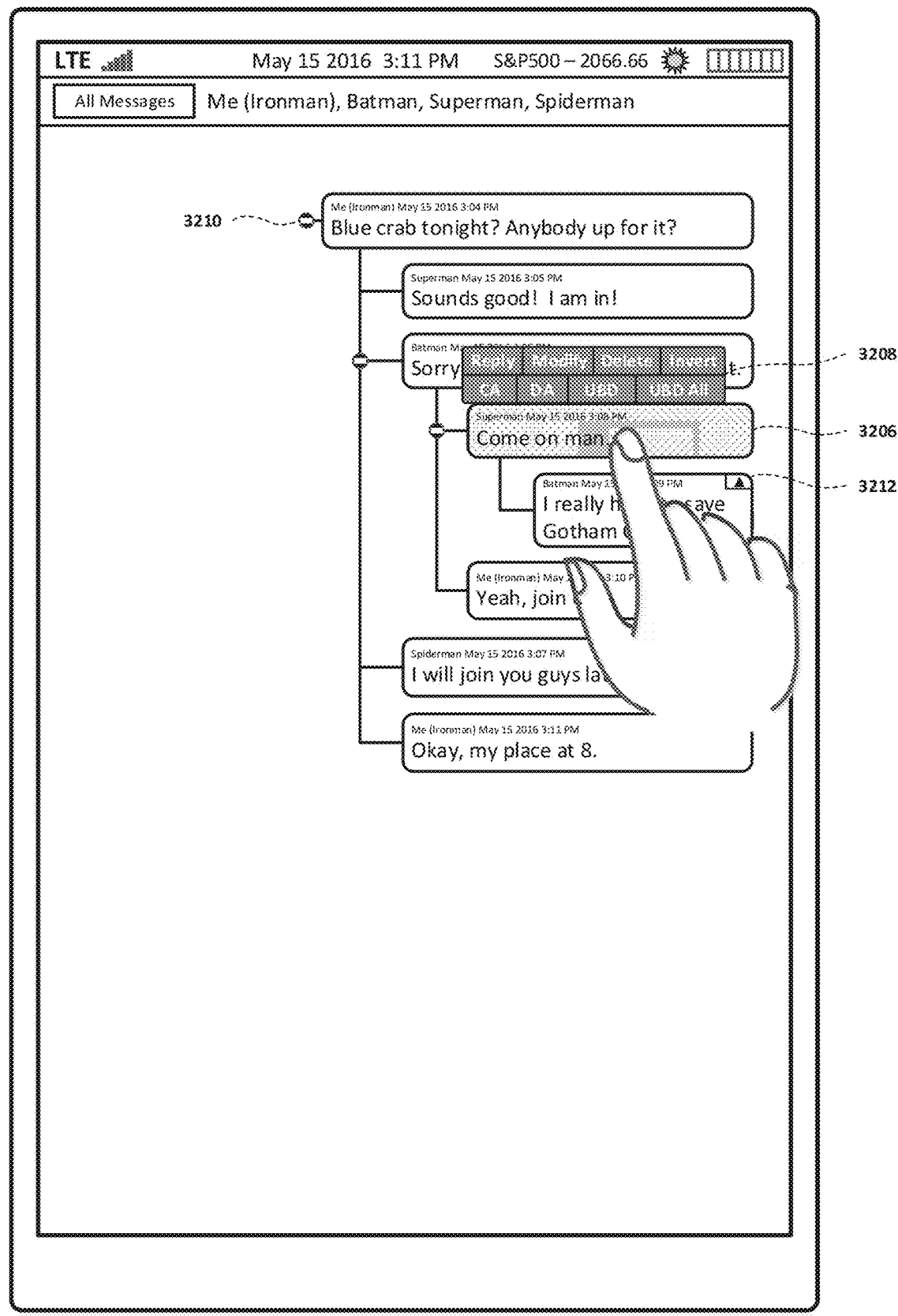
FIG. 32C consists of exemplary diagram illustrating the command display area with internalized commands displayed inside. Additionally, the externalized commands are illustrated using symbols.

FIG. 32C illustrates (5, 2, 2, 4, 4, 4, 4, 1, 4, 4, 4, 4)$^{12}$.

Before we go on, we define the "hand gesture" for prompting the prompted command display area as press-and-hold. Also, since Reply command is both customized and internalized, we assign swipe left or right to customized Reply command. For customized Increase and Decrease commands we assign double-tap. Additionally, the symbols are hand gesture applicable and we assign simple tap to make the device acknowledge user's input.

As illustrated in FIG. 32C, the user applies press-and-hold on a statement (3206). Once the device detects this specific hand gesture, the device displays the prompted command display area (3208) and displays all the internalized and applicable commands. The displayed commands are—Reply, Modify, Delete, Invert, Collapse All, UBD, and UBD All. Although, Revert, Expand All, Hide All, and Show All commands are internalized, these commands are not displayed since they are not applicable.

Since Collapse, Expand, Hide, and Show commands are externalized, these commands are not displayed in the prompted command display area. Also, instead of displaying these commands on any of the statement, the symbols are used to indicate that said commands are applicable. As illustrated, the externalized Collapse command is replaced with the collapsible symbol (3210). If the user applies a simple tap on the symbol then the device collapses the main statement and the symbol changes to expandable symbol. If the user applies a simple tap on the expandable symbol then the device expands the main statement. This applies the same for Hide and Show commands. As illustrated, the externalized Hide command is replaced with the hidable symbol (3212). If the user applies a simple tap on the symbol then the device hides the leaf-statement and the symbol changes to showable symbol. If the user applies a simple tap on the showable symbol then the device shows the leaf-statement.

We now provide all the flowcharts of how commands are executed.

In the flowcharts, in some situations, we assume the user is applying a command on an arbitrary statement and we denote it by statement x.$a_1 \ldots a_k$.

Figure 33A:
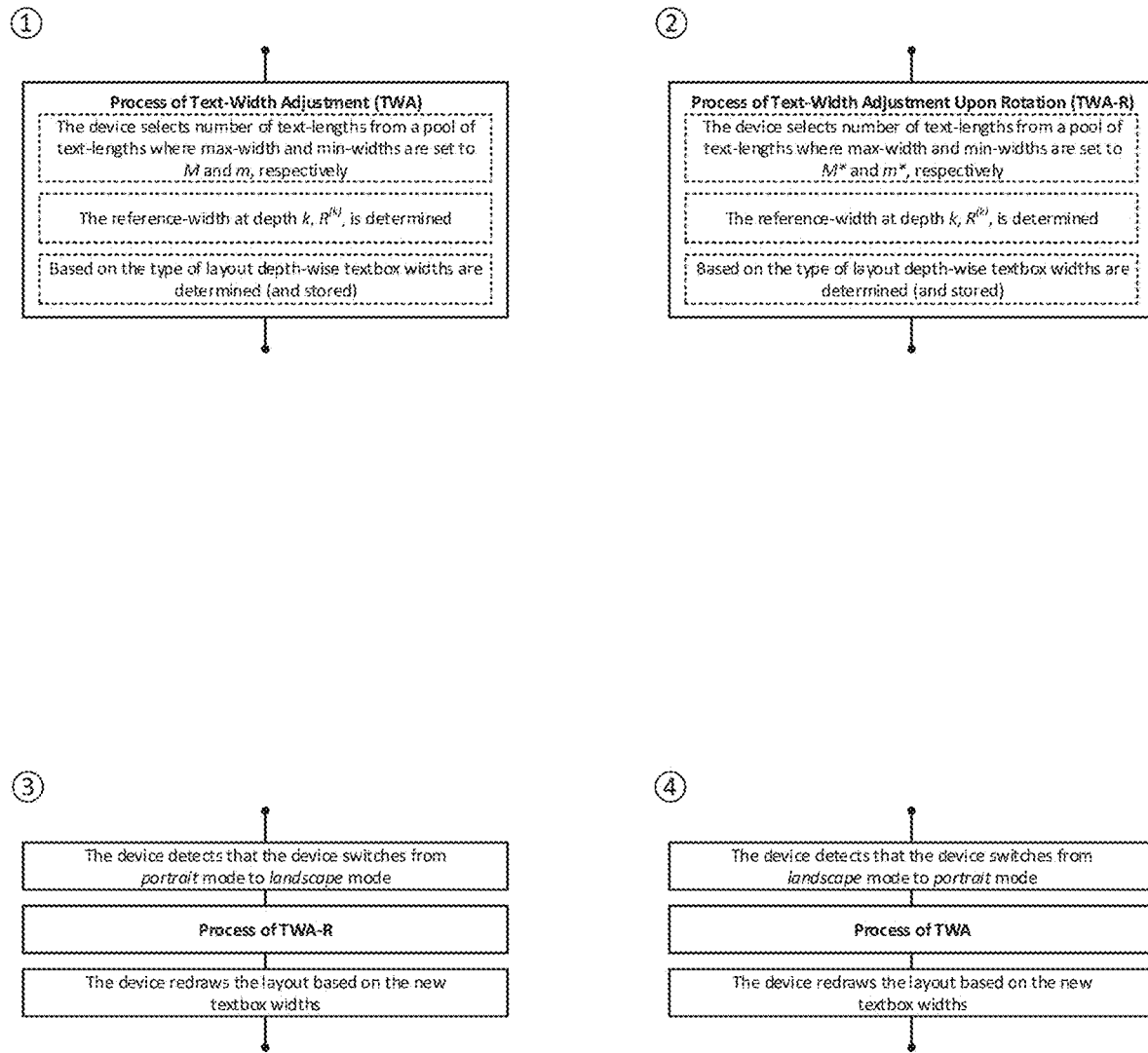
FIG. 33A consists of flowcharts illustrating a method of both Text-width Adjustment (TWA) and Text-width Adjustment Upon Rotation (TWA-R).

FIG. 33A illustrates the flowchart of the feature, Text-Width Adjustment (TWA).

The flowchart in ① of FIG. 33A illustrates the core of TWA and we call it the Process of Text-Width Adjustment. The process is applied when the device is in portrait mode. Once this process is executed, the device selects number of text-lengths from all the text-lengths. This is so since in some situations some of the text-lengths need to be excluded in determining the textbox widths. The device, using the select text-lengths, determines the reference-width at depth k, Rao, that relies on algorithms or mathematical functions (note that since the max-width M and min-width m play a crucial role in determining the textbox widths, the device uses these values in determining reference-width). This implies, based on the layout (or model) used, the device can calculate (or determine) the textbox widths at all depths. For example, if the lowest depth of a layout is 4 and we have reference-width equals $R^{(2)}$, then the textbox widths of the statements at depth 2 equal R. Also, based on the value R at depth 2, the device calculates rest of the textbox widths at depth 0, 1, 3, and 4. Once these textbox widths are determined, the text of each statement is displayed in the textbox.

The flowchart in ②of FIG. 33A illustrates the core of TWA Upon Rotation and we call it the Process of Text-Width Adjustment Upon Rotation. The process is applied when the device is in landscape mode. The process is identical to the one in ① but the difference is that the max-width M and min-width m are larger when the device is in landscape mode. We denote these two larger values of M and m by M* and m*, respectively. So the device recalculates reference-width at depth k with the M* and m*.

The flowchart in ③ of FIG. 33A illustrates the steps executed by the device when it detects that the device has switched from portrait mode to landscape mode. In the flowchart, the device detects that the device has switched from portrait mode to landscape mode. Then the device executes the Process of TWA-R and redraws the layout.

The flowchart in ④ of FIG. 33A illustrates the steps executed by the device when it detects that the device has switched from landscape mode to portrait mode. In the flowchart, the device detects that the device has switched from landscape mode to portrait mode. Then the device executes the Process of TWA and redraws the layout.

If the device finds textboxes widths for portrait mode and landscape mode in advance (whenever the device receives a statement) and stores it then we can skip the two processes and initiate the redrawing whenever the device detects in change of modes.

Figure 33B:
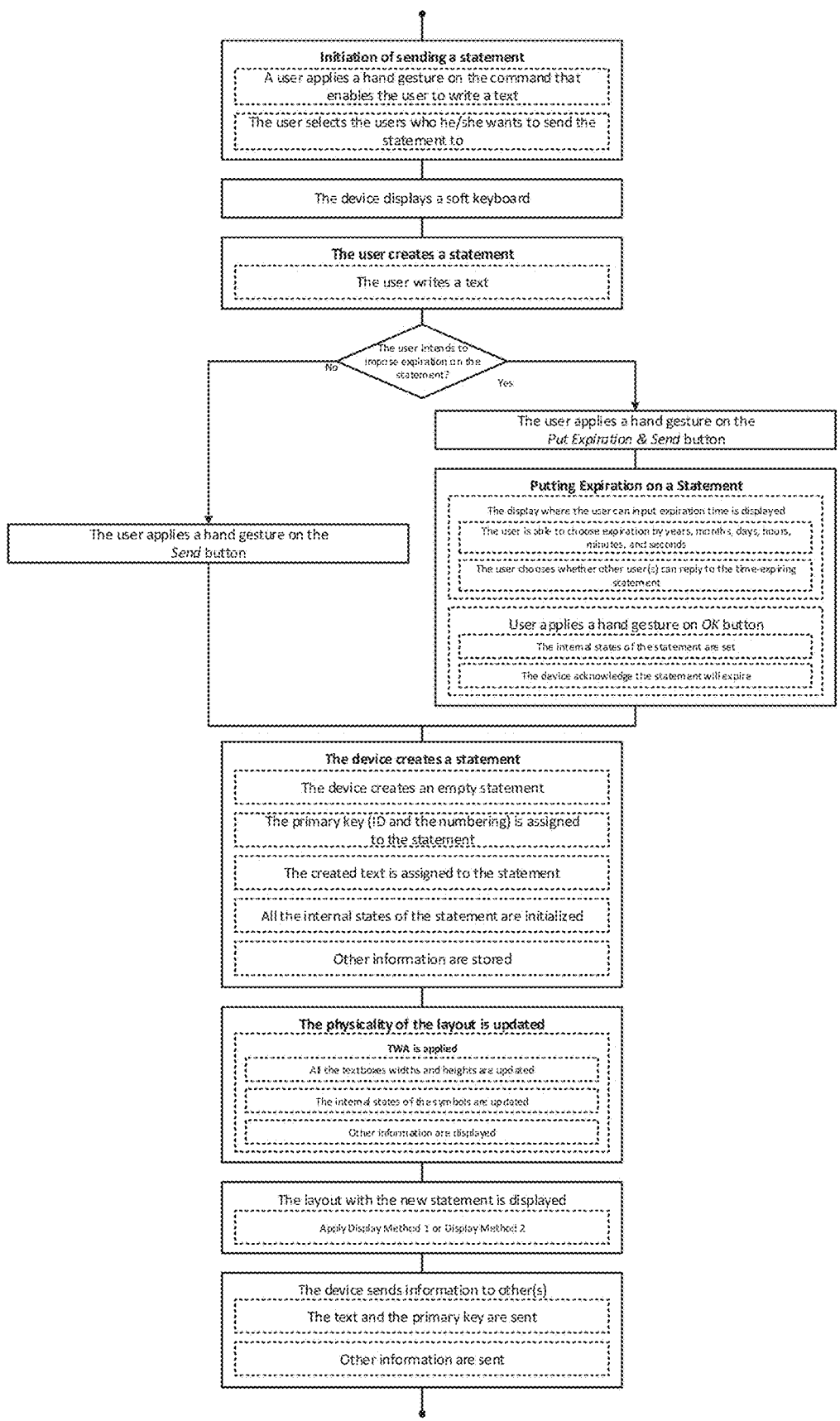
FIG. 33B consists of a flowchart illustrating a method of sending a text message to other user(s).

FIG. 33B illustrates the flowchart of the user sending a statement to other user(s). First, the user applies a hand gesture on the command that enables the user to input a text. Then the user selects recipient(s) who the user wishes to send the statement to. Once this is done, the device displays a soft keyboard. The user inputs a text and then applies a hand gesture either on the Send button or Put Expiration & Send button. If the user applies a hand gesture on the Put Expiration & Send button then the device displays a small display where the user can input expiration time. The user inputs the expiration-time (or duration) and selects whether other user(s) can reply to the time-expiring statement. The user applies a hand gesture on the OK button. Then the internal states of the statement are updated and the device acknowledges that the statement is time-expiring. Now, the device creates a statement. This consists of several steps such as: (1) the device creating an empty statement, (2) the device assigning primary key to the statement, (3) the device assigning the created text to the empty statement, (4) the device setting the internal states of the statement, and (5) the device storing other important information. Once this step is done, the device applies TWA on pool of text-lengths and determines the new textbox widths and heights and the internal statements of the symbols are updated. The layout is displayed using either Display Method 1 or Display Method 2. Finally, the device sends the text and the primary key to the recipient(s). It also sends other information such as internal codes, whether the statement is time-expiring, the sender's phone number or multimedia files.

Figure 33C:
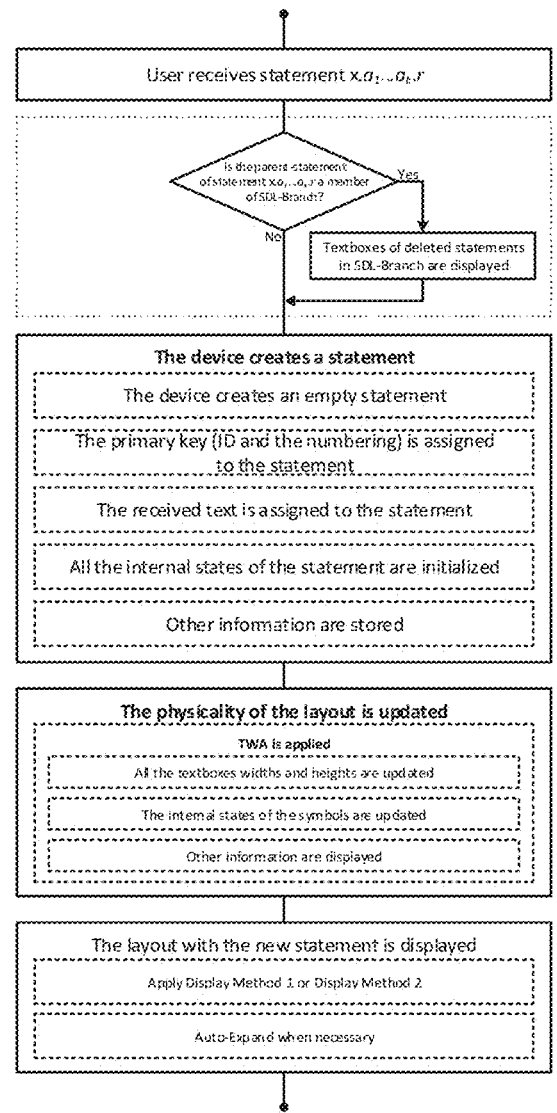
FIG. 33C consists of a flowchart illustrating a method of receiving a text message(s) from other user(s).

FIG. 33C illustrates the flowchart of the user receiving a statement from other users. First, the user receives a statement from other user. In the next step (dotted box) the device checks if the parent-statement of the received statement is displayed (this is for the case where the device operates under Delete Method 2). If so, the device displays the deleted textboxes. If the device operates under Delete Method 1 then this step can be omitted. Next, just as in the case where the user sends a statement, the device goes through the steps of creating a statement with the received text, the device applies TWA and updates all the necessary information, and finally, displays the received statement to the user. The layout is displayed using either Display Method 1 or Display Method 2. As mentioned, when one of the super-statement of the received statement is in collapsed state then the device needs to expand the collapsed statement and place the new statement in its right position. This is Auto-Expand does and the flowcharts of four different kinds of Auto-Expands are provided later.

Figure 33D:
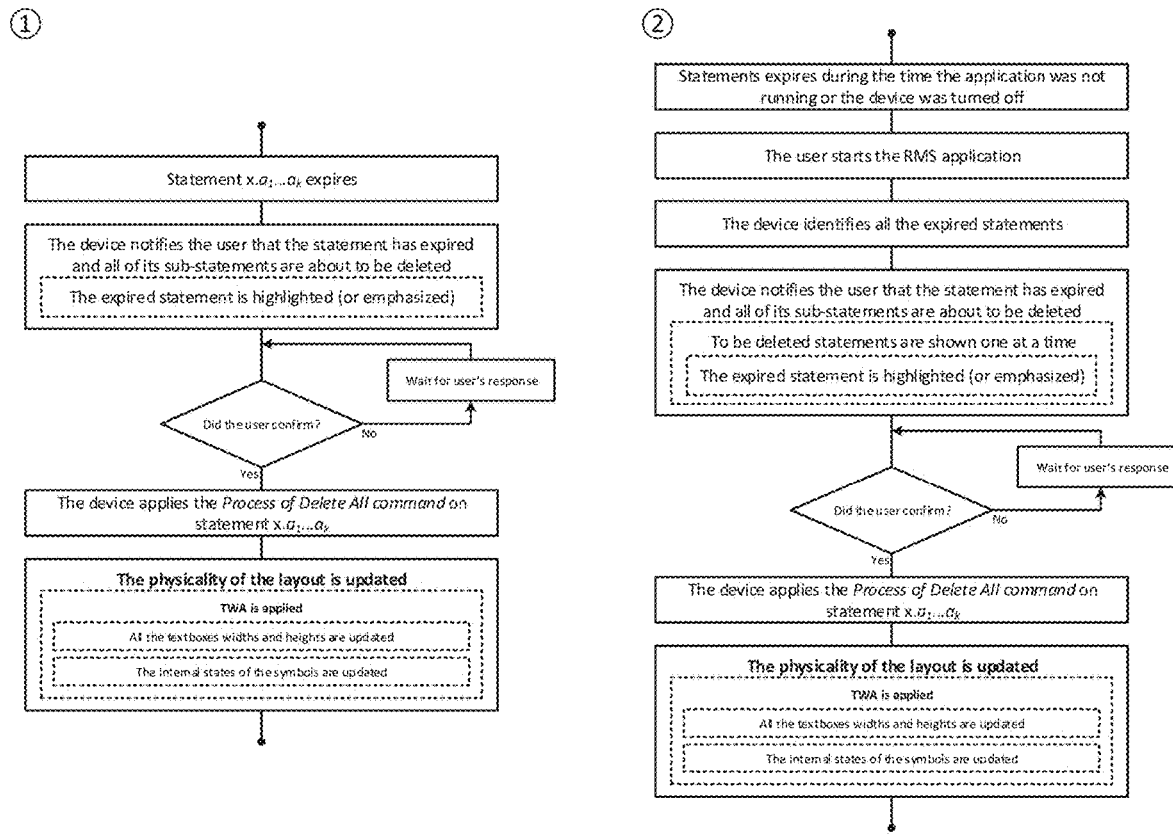
FIG. 33D consists of a flowchart illustrating a method of deleting a text message(s) that has expired.

FIG. 33D illustrates the flowchart of the device dealing with the expired statements.

The flowchart in ① of FIG. 33D illustrates the case the statement expires while the RMS application is running. First, statement $x.a_1 \ldots a_k$ expires. The device displays a note adjacent to the expired statement that the statement is about to be deleted (a pre-notification can be displayed to the user minutes before the expiration). The device waits for the user's response. Once the device acknowledges the user's response, the device applies the Process of Delete All command (explained later) on the expired statement. This process deletes the selected statement (expired statement in this case) and all of its sub-statements (if there is any). Then the physicality of the layout is updated such as applying TWA and updating the internal states.

The flowchart in ② of FIG. 33D illustrates the case the statement expires while the RMS application is not running (this includes the case the device was turned off). First, statement $x.a_1 \ldots a_k$ expires while the RMS application was not running. The user starts the RMS application. The device displays a note adjacent to the expired statement, one at a time, that the statement is about to be deleted. The device waits for the user's response(s). Once the device acknowledges the user's response(s), the device applies the Process of Delete All command on every expired statement. This process deletes the selected statement (expired statement in this case) and all of its sub-statements (if there is any). Then the physicality of the layout is updated such as applying TWA and updating the internal states.

We now provide flowcharts for eighteen commands. The flowcharts we present are the core of the command. Later, we present how the user selects a statement and applies the command.

Figure 33E:
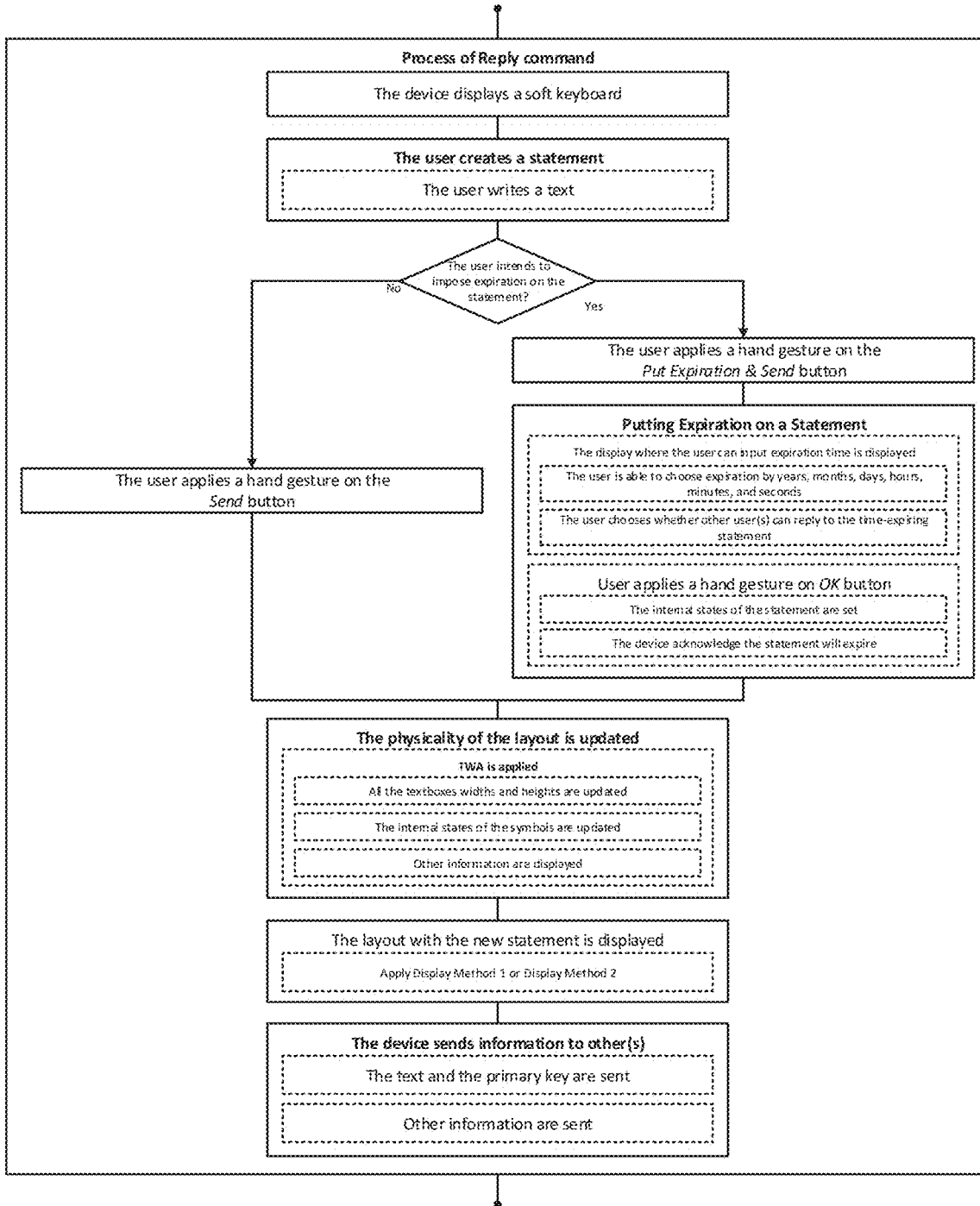
FIG. 33E consists of a flowchart illustrating a method of Reply command.

FIG. 33E illustrates the core of Reply command and we call it the Process of Reply command. This process is basically identical to the process that sends statements.

Figure 33F:
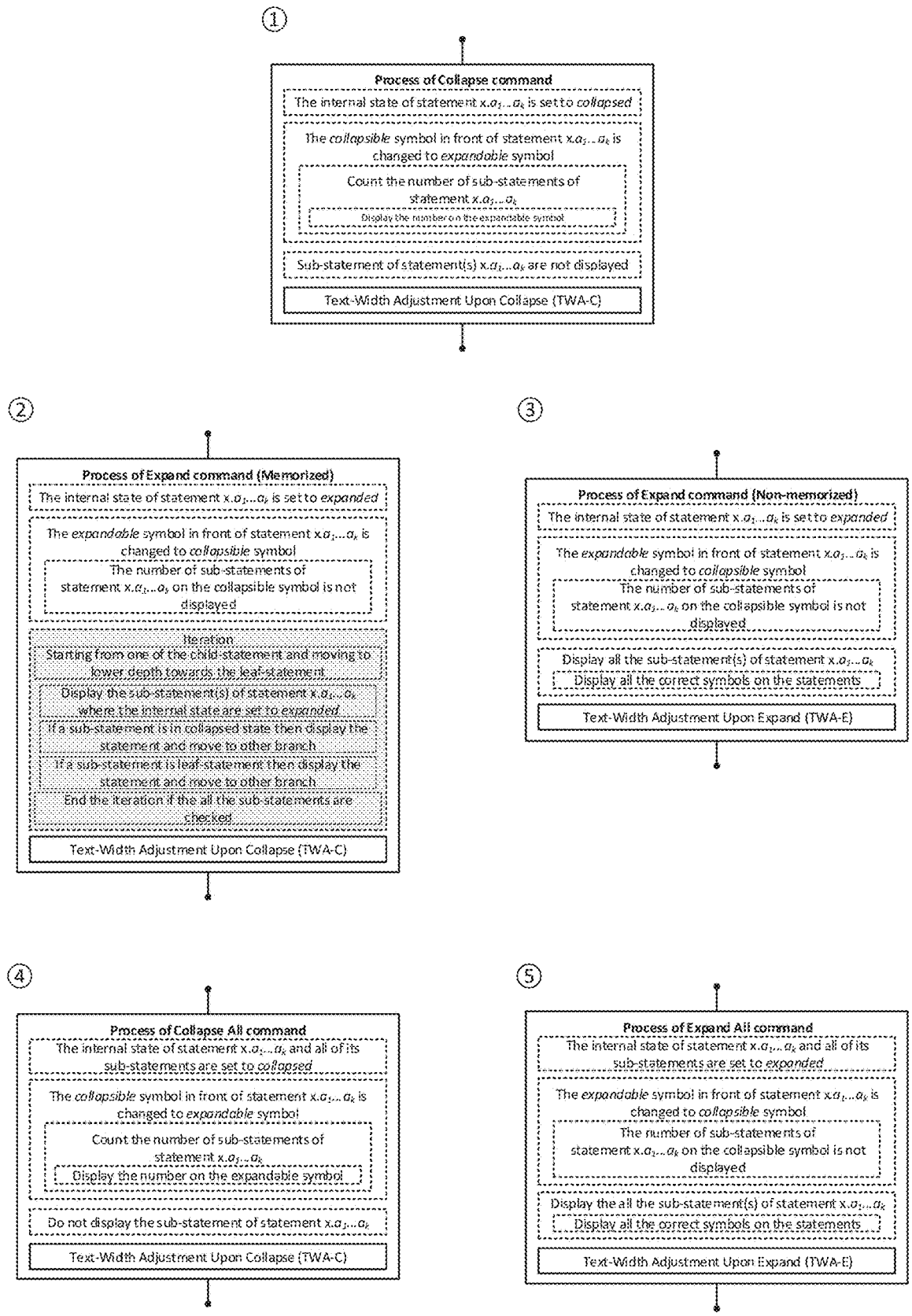
FIG. 33F consists of flowcharts illustrating methods of Collapse, Expand, Collapse All, and Expand All commands.

FIG. 33F illustrates the core of Collapse, Expand, Collapse All, and Expand All commands.

The flowchart in ① of FIG. 33F illustrates the core of Collapse command and we call it the Process of Collapse command. Once the process is executed, the device changes the internal state of the statement to collapsed state. Second, the collapsible symbol in front of the statement is changed to expandable symbol (the number of sub-statements being collapsed is counted and displayed within the symbol). Then the device does not display the sub-statements of statement $x.a_1 \ldots a_k$. Finally, Text-Width Adjustment Upon Collapse (TWA-C) is executed (this step can be skipped). What TWA-C does is that the device applies TWA on statements without the sub-statements of the statements in collapsed states.

The flowchart in ② of FIG. 33F illustrates the core of Memorized Expand command and we call it the Process of Expand command (Memorized). Once the process is executed, the device changes the internal state of the statement to expanded state. Second, the expandable symbol in front of the statement is changed to collapsible symbol (the number of sub-statements being collapsed is no longer displayed within the symbol). Then the device displays the sub-statements of statement $x.a_1 \ldots a_k$. In Memorized method, this is an iterative process. The device checks all the sub-statements of x.a$_1$ ... a$_k$ in a tree traversing way. The device starts from one of child-statement of statement x.a$_1$ ... a$_k$ and see if it is expanded state. If it is in expanded state then the statement and the symbol are displayed. The same is done if the statement is in collapsed state. But once the statement and the symbol are displayed it moves on to other branch. Also, if the sub-statement is a leaf-statement, the device displays the statement and moves on to different branch. So, if a sub-statement is in collapsed state or it is a leaf-statement then the device sees them as a dead end. Finally, Text-Width Adjustment Upon Expand (TWA-E) is executed (this step can be skipped). The process TWA-E is a reverse process of TWA-C. That is, TWA is applied upon all the statements in the layout including statements those were just expanded.

The flowchart in ③ of FIG. 33F illustrates the core of Non-memorized Expand command and we call it the Process of Expand command (Non-memorized). Once the process is executed, the device changes the internal state of the statement to expanded state. Second, the expandable symbol in front of the statement is changed to collapsible symbol (the number of sub-statements being collapsed is no longer displayed within the symbol). Then the device displays the sub-statements of statement x.a$_1$ ... a$_k$. Finally, Text-Width Adjustment Upon Expand (TWA-E) is executed (this step can be skipped).

The flowchart in ④ of FIG. 33F illustrates the core of Collapse All command and we call it the Process of Collapse All command. Once the process is executed, the device changes the internal state of statement x.a$_1$ ... a$_k$ and all of its sub-statements to collapsed state. Second, the collapsible symbol in front of the statement is changed to expandable symbol (the number of sub-statements being collapsed is counted and displayed within the symbol). Then the device does not display the sub-statements of statement x.a$_1$ ... a$_k$. Finally, Text-Width Adjustment Upon Collapse (TWA-C) is executed (this step can be skipped).

The flowchart in ⑤ of FIG. 33F illustrates the core of Expand All command and we call it the Process of Expand All command. Once the process is executed, the device changes the internal state of statement x.a$_1$ ... a$_k$ and all of its sub-statements to expanded state. Second, the expandable symbol in front of the statement is changed to collapsible symbol (the number of sub-statements being collapsed is no longer displayed within the symbol). Then the device displays all the sub-statements of statement x.a$_1$ ... a$_k$. Finally, Text-Width Adjustment Upon Collapse (TWA-C) is executed (this step can be skipped).

Figure 33G:
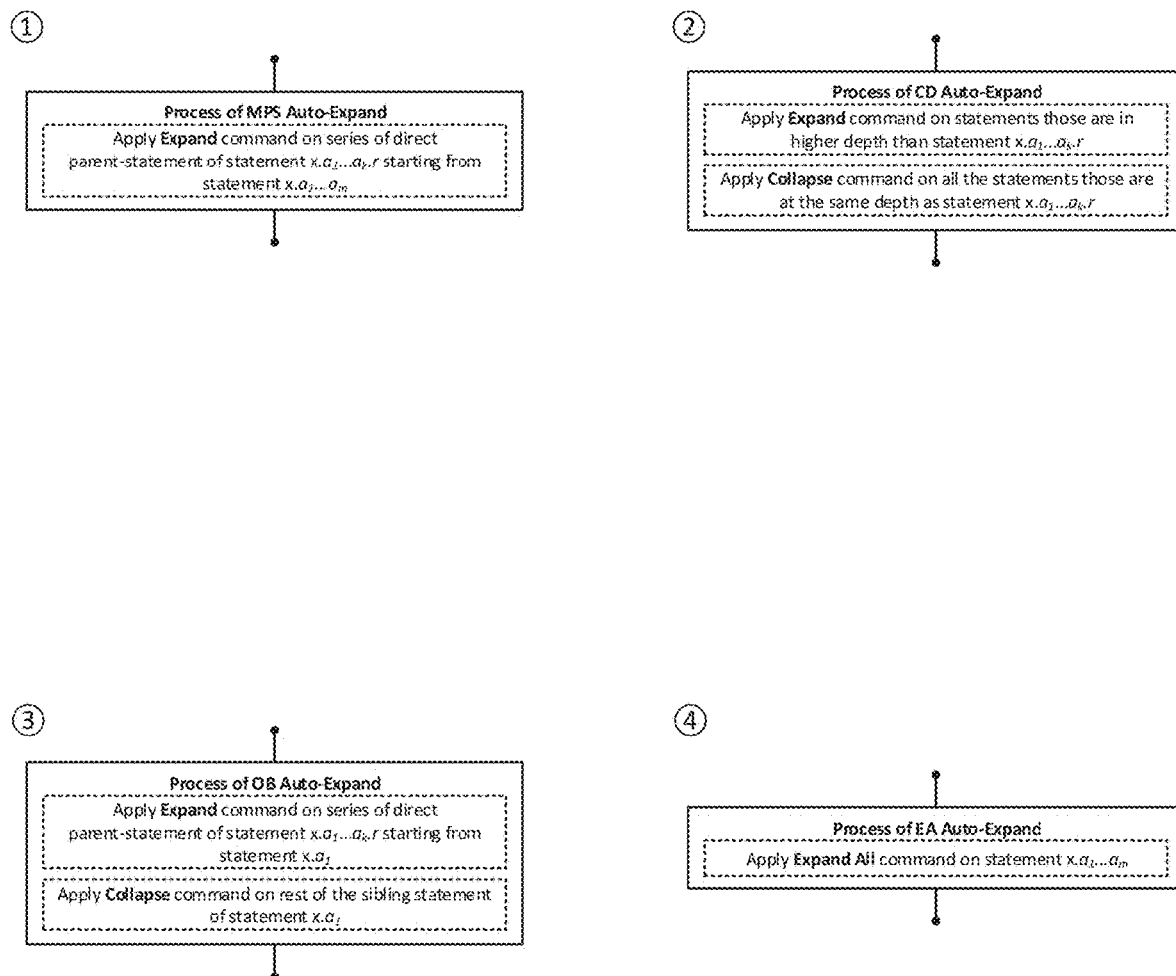
FIG. 33G consists of flowcharts illustrating methods of Maintain the Previous State Auto-Expand, Common Depth Auto-Expand, One Branch Auto-Expand, and Expand All Auto-Expand commands.

FIG. 33G illustrates the flowcharts of four auto-expands—Maintain Previous State (MPS) Auto-Expand, Common Depth (CD) Auto-Expand, One Branch (OB) Auto-Expand, and Expand All (EA) Auto-Expand.

We note that the flowcharts can be applied on either Memorized Method or Non-memorized Method.

Also, we assume the received statement is statement x.a$_1$ ... a$_k$.r and its super-statement, statement x.a$_1$ ... a$_m$ is in collapsed state. Obviously, statement x.a$_1$ ... a$_m$ is one of direct parent-statements of statement x.a$_1$ ... a$_k$.r.

The following four flowcharts can be executed after the device finalizes the internal settings of the newly received statement.

The flowchart in ① of FIG. 33G illustrates MPS Auto-Expand. Whenever the device receives a new statement (statement x.a$_1$ ... a$_k$.r) the device applies Expand commands on direct parent-statements of statement x.a$_1$ ... a$_k$.r, starting from statement x.a$_1$ ... a$_m$. So this means the Expand command is applied on statement x.a$_1$ ... a$_m$, x.a$_1$ ... a$_m$.a$_{m+1}$, and so on (up until statement x.a$_1$ ... a$_m$ ... a$_k$).

The flowchart in ② of FIG. 33G illustrates CD Auto-Expand. Whenever the device receives a new statement (statement x.a$_1$ ... a$_k$.r) the device applies Expand commands on all the statements those are in higher depth than statement x.a$_1$ ... a$_k$.r. Then the device applies Collapse command on all the statements those are at the same depth as statement x.a$_1$ ... a$_k$.r.

The flowchart in ③ of FIG. 33G illustrates OB Auto-Expand. Whenever the device receives a new statement (statement x.a$_1$ ... a$_k$.r) the device applies Expand commands on direct parent-statements of statement x.a$_1$ ... a$_k$.r, starting from statement x.a$_1$. So this means the Expand command is applied on statement x.a$_1$, x.a$_1$.a$_2$, x.a$_1$.a$_2$.a$_3$, and so on (up until statement x.a$_1$ ... a$_k$.r). Then the device applies Collapse command on all the statements at depth 1 (except statement x.a$_1$). That is, all the child-statements of the main statement (except statement x.a$_1$).

The flowchart in ④ of FIG. 33G illustrates EA Auto-Expand. Whenever the device receives a new statement (statement x.a$_1$ ... a$_k$.r) the device applies Expand All command on the main statement.

Figure 33H:
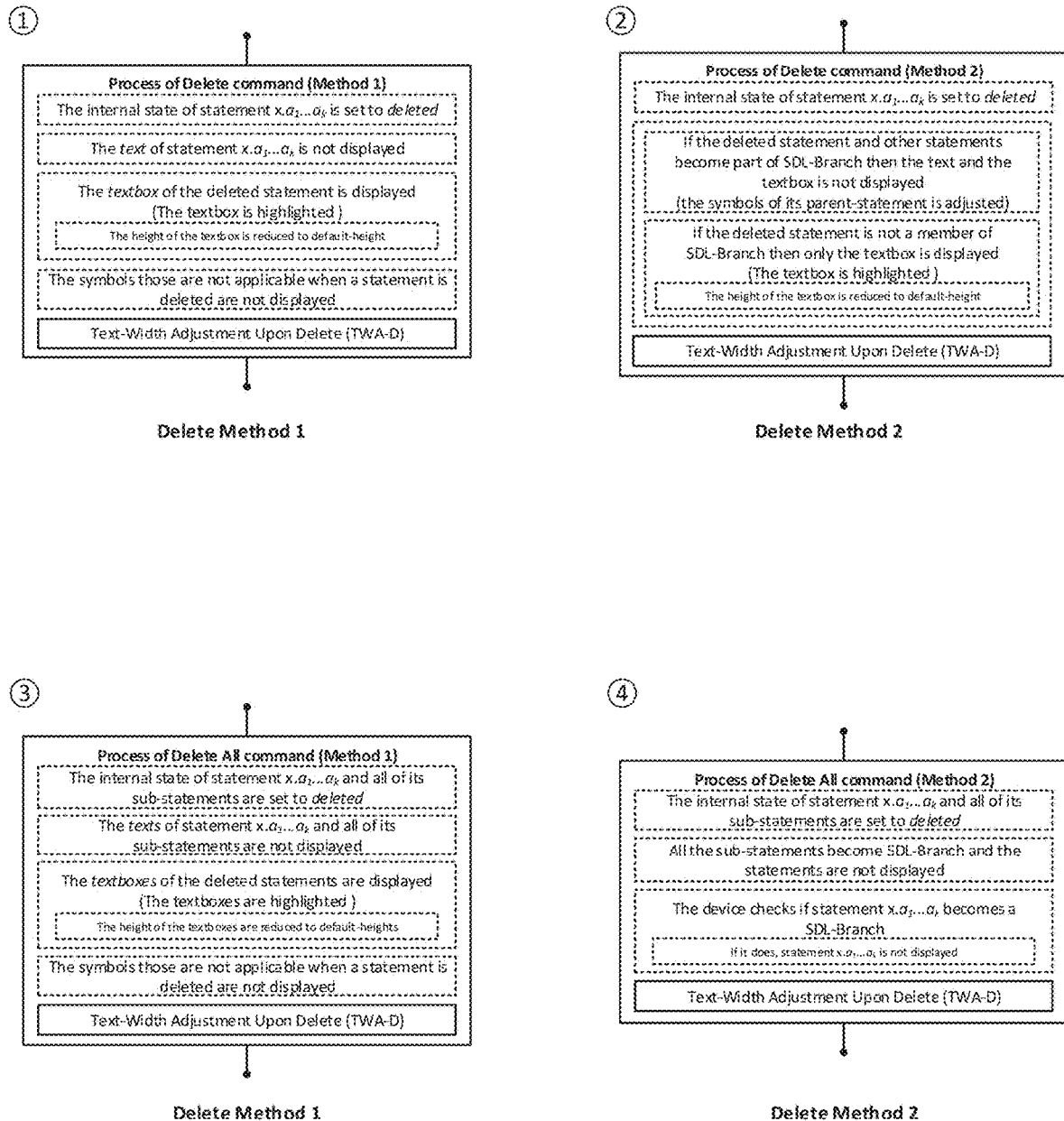
FIG. 33H consists of flowcharts illustrating methods of Delete and Delete All commands.
Figure 331:
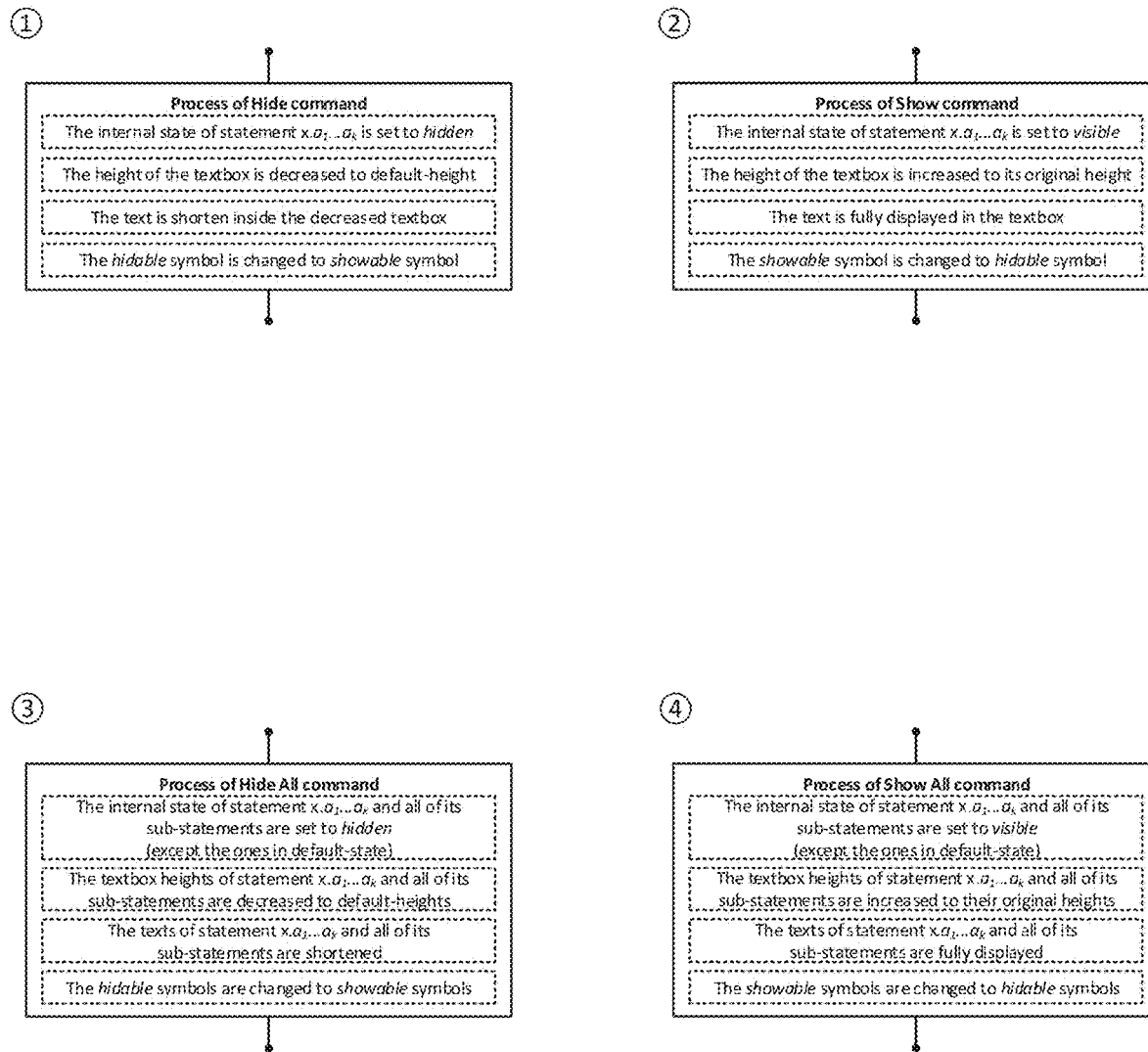

FIG. 33H illustrates the core of Delete and Delete All commands.

The flowchart in ① of FIG. 33H illustrates the core of Delete command (Delete Method 1) and we call it the Process of Delete command (Method 1). Once the process is executed, the device changes the internal state of statement x.a$_1$ ... a$_k$ to deleted state. Second, the text of the statement is not displayed but the textbox is still displayed and highlighted. Third, the height of the textbox is reduced to default-height. Fourth, the symbols those are applicable when a statement is not in deleted state are no longer displayed (e.g. hidable and showable symbols). Finally, the Text-Width Adjustment Upon Delete (TWA-D) is applied. What TWA-D does is that the device applies TWA on statements without the statements in deleted states.

The flowchart in ② of FIG. 33H illustrates the core of Delete command (Delete Method 2) and we call it the Process of Delete command (Method 2). Once the process is executed, the device changes the internal state of statement x.a$_1$ ... a$_k$ to deleted state. Second, the device checks if the deleted statement itself becomes part of the SDL-Branch. If it does then the statement is no longer displayed and the symbols of statement x.a$_1$ ... a$_{k-1}$ (parent statement of statement x.a$_1$ ... a$_k$) are adjusted. Since the parent-statement (statement x.a$_1$ ... a$_{k-1}$) becomes "visibly" a leaf-statement, this is necessary. On the other hand, if the deleted statement does not form an SDL-Branch then simply the text of the statement is not displayed and textbox is highlighted. Finally, the Text-Width Adjustment Upon Delete (TWA-D) is executed.

The flowchart in ③ of FIG. 33H illustrates the core of Delete All command (Delete Method 1) and we call it the Process of Delete All command (Method 1). Once the process is executed, the device changes the internal states of statement x.a$_1$ ... a$_k$ and all of its sub-statements are set to deleted states. Second, the text of the statement and its sub-statements are not displayed but the textboxes are still displayed, highlighted. Third, the heights of the deleted textboxes are reduced to default-heights. Fourth, the symbols those are applicable when a statement is not in deleted state are no longer displayed (e.g. hidable and showable symbols). Finally, the Text-Width Adjustment Upon Delete (TWA-D) is applied.

The flowchart in ④ of FIG. 33H illustrates the core of Delete All command (Delete Method 2) and we call it the Process of Delete All command (Method 2). Once the process is executed, the device changes the internal states of statement $x.a_1 \ldots a_k$ and all of its sub-statements to deleted states. Second, since all the sub-statements of statement $x.a_1 \ldots a_k$ become SDL-Branch all the sub-statements are not displayed. Third, the device checks if statement $x.a_1 \ldots a_k$ becomes part of SDL-Branch. If it does, statement $x.a_1 \ldots a_k$ is not displayed. Finally, the Text-Width Adjustment Upon Delete (TWA-D) is executed.

FIG. 33I illustrates the core of Hide, Show, Hide All, and Show All commands.

The flowchart in ① of FIG. 33I illustrates the core of Hide command and we call it the Process of Hide command. Once the process is executed, the device changes the internal state of statement $x.a_1 \ldots a_k$ to hidden state. Second, the height of the textbox is decreased to default-height. Third, the text is shortened inside the decreased textbox. Finally, the hidable symbol is changed to showable symbol.

The flowchart in ② of FIG. 33I illustrates the core of Show command and we call it the Process of Show command. Once the process is executed, the device changes the internal state of statement $x.a_1 \ldots a_k$ to visible state. Second, the height of the textbox is increased to its original height. Third, the text is fully displayed in the textbox. Finally, the showable symbol is changed to hidable symbol.

The flowchart in ③ of FIG. 33I illustrates the core of Hide All command and we call it the Process of Hide All command. Once the process is executed, the device changes the internal states of statement $x.a_1 \ldots a_k$ and all of its sub-statements to hidden states. Second, the textboxes heights of statement $x.a_1 \ldots a_k$ and all of its sub-statements are decreased to default-heights. Third, the texts of statement $x.a_1 \ldots a_k$ and all of its sub-statements are shortened inside the decreased textboxes. Finally, the hidable symbols are changed to showable symbols.

The flowchart in ④ of FIG. 33I illustrates the core of Show All command and we call it the Process of Show All command. Once the process is executed, the device changes the internal states of statement $x.a_1 \ldots a_k$ and all of its sub-statements to visible states. Second, the textboxes heights of statement $x.a_1 \ldots a_k$ and all of its sub-statements are increased to their original heights. Third, the texts of statement $x.a_1 \ldots a_k$ and all of its sub-statements are fully displayed. Finally, the showable symbols are changed to hidable symbols.

Figure 33J:
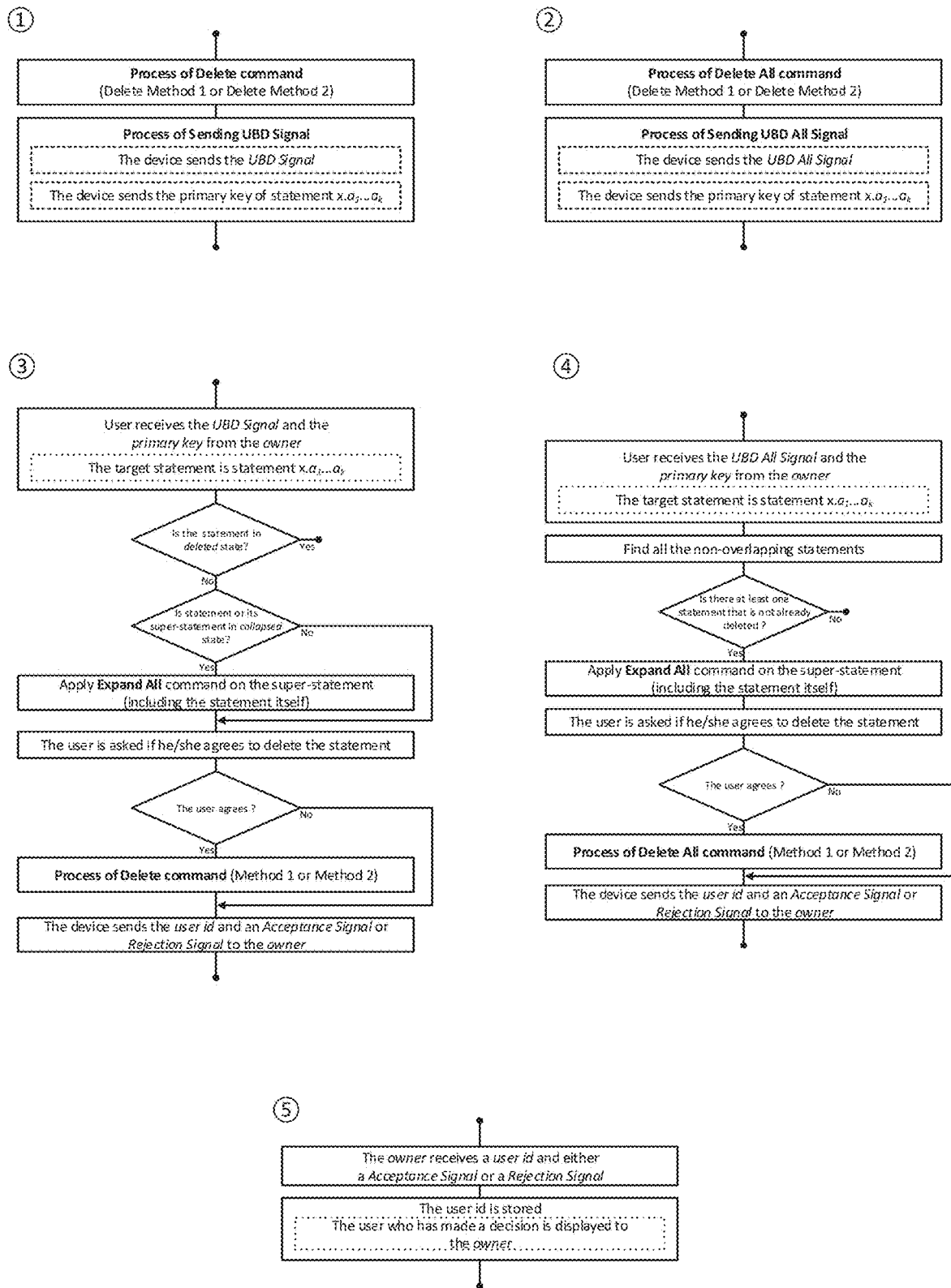
FIG. 33J consists of flowcharts illustrating methods of UBD and UBD All commands.

FIG. 33J illustrates the core of UBD and UBD All commands. As mentioned, UBD and UBD All commands are the same as Delete and Delete All command except that at the end of the delete operation, the device sends a signal to other users to delete the statement(s) the owner of the user is requesting. Once the other user(s) receives the request and makes a decision, the device sends a feedback signal (i.e., decision message) to the owner of the statement.

The flowchart in ① of FIG. 33J illustrates the process followed by any delete operation. As illustrated in the figure, once the device executes the Process of Delete command (either Delete Method 1 or Delete Method 2), the device sends UBD Signal and relevant information to other users.

The flowchart in ② of FIG. 33J illustrates the process followed by any delete all operation. As illustrated in the figure, once the device executes the Process of Delete All command (either Delete Method 1 or Delete Method 2), the device sends UBD All Signal and relevant information to other users.

The flowchart in ③ of FIG. 33J illustrates the case where the other user receives a request from the owner of the statement. First, the user (receiver) receives UBD Signal and the primary key of statement $x.a_1 \ldots a_k$ from the owner. The device first checks if the corresponding statement is in deleted state. If the statement is in deleted state then the device does nothing and ends the process (this is considered as the other user agreeing to the owner's request). If it is not in deleted state then the device checks if the super-statement of statement $x.a_1 \ldots a_k$ or the statement itself is in collapsed state. If so, the device applies Expand All command on the statement. The device asks the user if he/she consents to deleting the statement. Once the device detects that the user has consented, Process of Delete command (Method 1 or Method 2) is applied on the statement. Then the device sends the user id and the Acceptance Signal that user had agreed and deleted the statement. If the user did not consent to deleting the statement then the device sends the user id and the Rejection Signal that user had not agreed to delete the statement.

The flowchart in ④ of FIG. 33J illustrates the case where the other user receives a request from the owner of the statement. First, the user (receiver) receives UBD All Signal and the primary key of statement $x.a_1 \ldots a_k$ from the owner. The device first finds non-overlapping statements. If all the deleted statements overlaps with the statements asked to be deleted then the device does nothing and ends the process (this is considered as the other user agreeing to the owner's request). If there is at least one non-overlapping statement then the device checks if the super-statement of statement $x.a_1 \ldots a_k$ or the statement itself is in collapsed state. If so, the device applies Expand All command on the statement. The device also checks if the sub-statements are in deleted state. If they are then the device applies Expand All command on all the sub-statements of statement $x.a_1 \ldots a_k$ those are in collapsed states. The device asks the user if he/she consents to deleting the statements. Once the device detects that the user has consented, the Process of Delete All (Method 1 or Method 2) command is executed. Then the device sends the user id and an Acceptance Signal that user had agreed and deleted the statement. If the user did not consent to deleting the statement then the device sends the user id and Rejection Signal that user had not agreed to delete the statement.

The flowchart in ⑤ of FIG. 33J illustrates the owner receiving a notification whether the other user has decided to delete the statement or not. First, the device receives user id and Acceptance/Rejection Signal from other users. Then based on these information, the decisions made by other users are displayed to the owner.

Figure 33K:
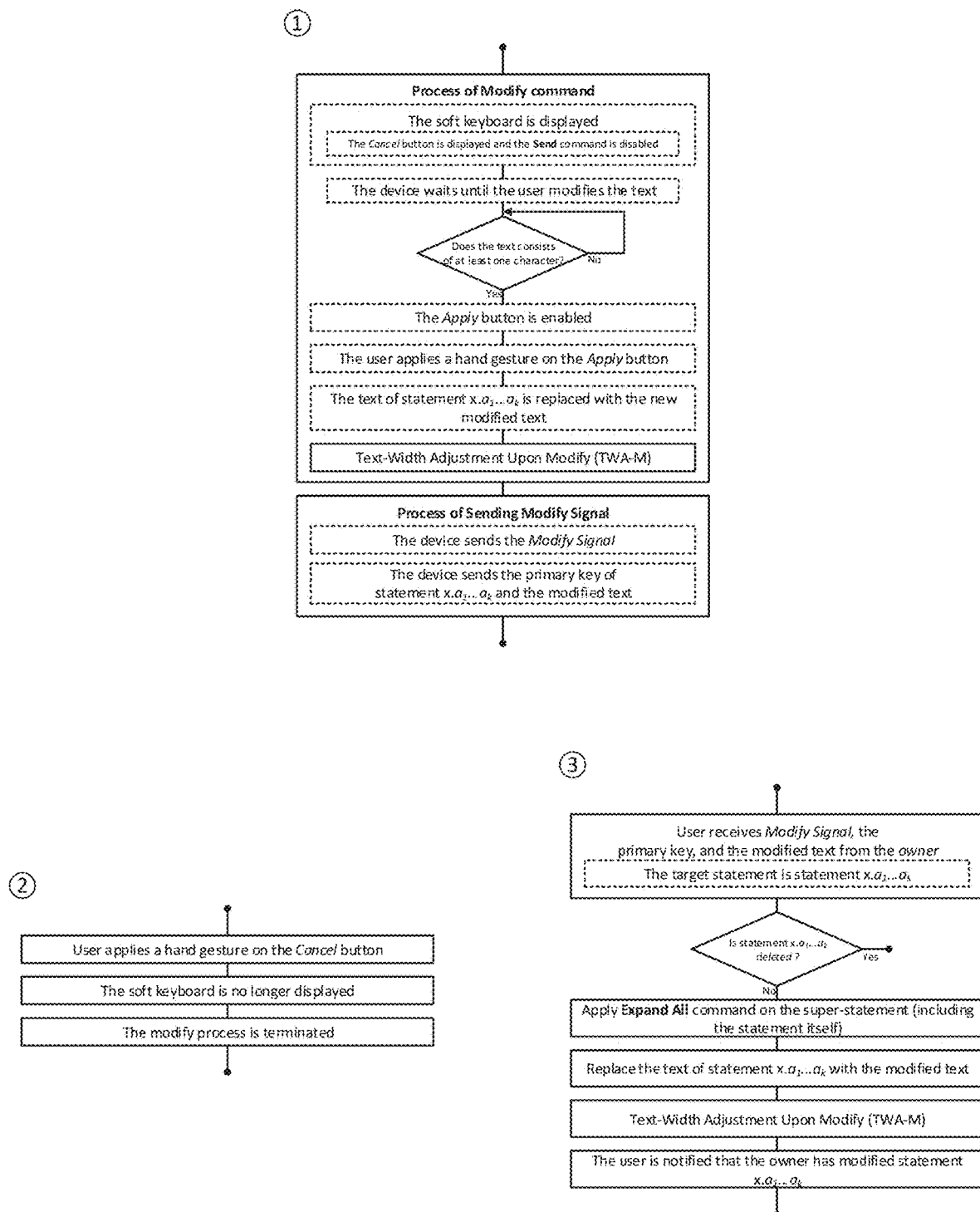
FIG. 33K consists of a flowchart illustrating methods of Modify command.

FIG. 33K illustrates the core of Modify command.

The figure in ① of FIG. 33K illustrates the core of Modify command and we call it the Process of Modify command. Once the process is executed, the soft keyboard is displayed and on it the Cancel button is displayed and the Apply button is disabled. The device waits for the user's modification. Once the device detects a change in the text, it checks if the text consists of at least one character. If not, the device waits for user input. If so, the device changes the enables the Apply command. The user applies a hand gesture on the Apply command. The text of statement $x.a_1 \ldots a_k$ is replaced by the new text. The Text-Width Adjustment Upon Modify (TWA-M) is executed at this point adjusting the textbox widths of all the statements in the layout with the new text. What TWA-M does is that the device applies TWA on all statements including the newly modified statement. Finally, the Process of Sending Modify Signal is executed.

In this process, the device sends the Modify Signal, primary key, and the modified text to other users. Note that the Modify Signal is a signal that notifies other users that the owner of the statement has modified the statement.

The figure in ② of FIG. 33K illustrates the flowchart when the user applies the Modify command but chooses to cancel the operation by applying the hand gesture on the Cancel button.

The figure in ③ of FIG. 33K illustrates the flowcharts of the device receiving the Modify Signal and applying Modify command on the same statement the owner has modified. First, the user (receiver) receives the Modify Signal, the primary key of statement $x.a_1 \ldots a_k$, and the modified text from the owner. The device first checks if the super-statement of statement $x.a_1 \ldots a_k$ or the statement itself is in collapsed state. If so, the device applies Expand All command on the collapsed statement. Then the device checks if the corresponding statement is deleted. If the statement is deleted then the device does nothing and ends the process. Otherwise, the device replaces the old text with the new (modified) text. Then the device applies Text-Width Adjustment Upon Modify (TWA-M) on the layout with the new statement. Finally, the receiver is notified that the owner of the statement has modified the statement.

Figure 33L:
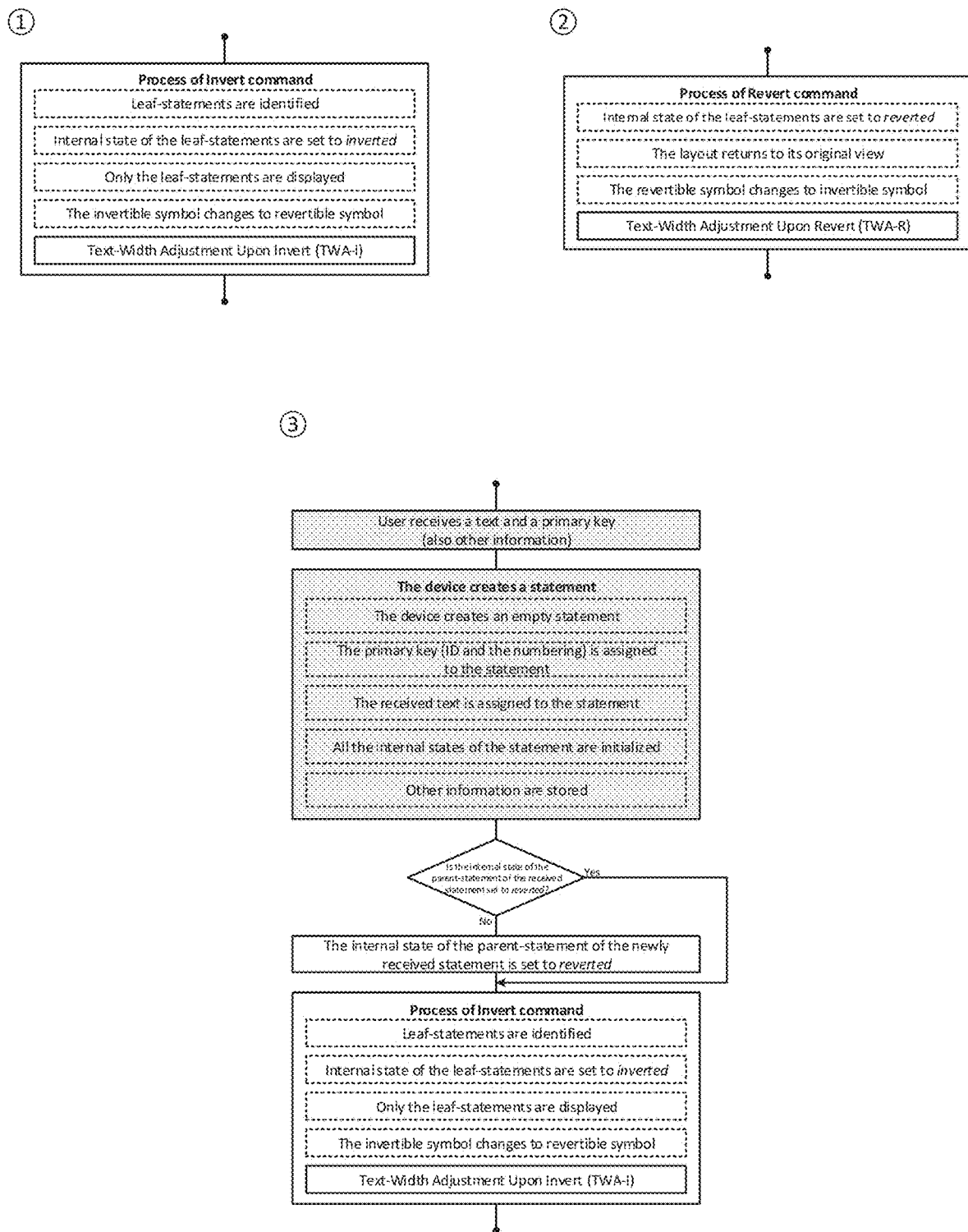
FIG. 33L consists of flowcharts illustrating methods of Invert and Revert commands.

FIG. 33L illustrates the core of Invert and Revert command.

The flowchart in ① of FIG. 33L illustrates the core of Invert command and we call it the Process of Invert command. Once the process is executed, all the leaf-statements are identified. Then the device sets the internal state of these leaf-statements to inverted states. The device only displays the leaf-statements and changes the invertible symbol to revertible symbol. Finally, Text-Width Adjustment Upon Invert (TWA-I) is applied on these leaf-statements. What TWA-I does is that the device applies TWA only on the leaf-statements and determines the textbox widths of them.

The flowchart in ② of FIG. 33L illustrates the core of Revert command and we call it the Process of Revert command. Once the process is executed, the device sets the internal state of these leaf-statements to reverted states. The device returns the layout to its original view and changes the revertible symbol to invertible symbol. Finally, Text-Width Adjustment Upon Revert (TWA-R) is applied on the layout. What TWA-R does is that the device applies TWA on the original layout before it was inverted.

Now we provide the flowchart for receiving a statement while the layout is in inverted state. Here we assume the layout is already in inverted state.

The flowchart in ③ of FIG. 33L illustrates a flowchart of processing the received statement while the layout is in inverted state. The upper part of the flowchart (shaded boxes) is the same as the part that handles received statements. Once the internal settings are done, the device checks if the received statement's parent-statement is in reverted state. If the parent-statement is in inverted state this implies that the new statement needs to replace its parent-statement and the internal state of the parent-statement needs to change to reverted state. Otherwise, if the parent-statement is already in reverted state, this implies that the received statement is a new leaf-statement. After this setting is done, the device executes the Process of Invert command.

Figure 33M:
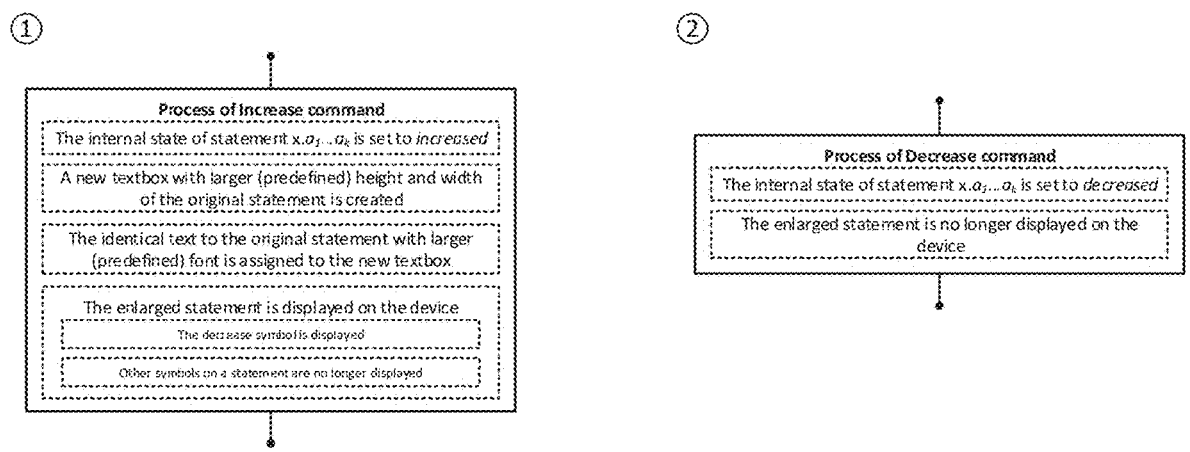
FIG. 33M consists of flowcharts illustrating methods of Increase and Decrease commands.

FIG. 33M illustrates the core of Increase and Decrease command.

The figure in ① of FIG. 33M illustrates the core of Increase command and we call it the Process of Increase command. Once the process is executed, the device changes the internal state of statement $x.a_1 \ldots a_k$ to increased state.

Second, a new textbox with larger (predefined) height and width of the original statement is created. Third, the identical text to the original statement with larger (predefined) font is assigned to the new textbox. Finally, the enlarged statement is displayed on the device with only the decrease symbol on it.

The figure in ② of FIG. 33M illustrates the core of Decrease command and we call it the Process of Decrease command. Once the process is executed, the device changes the internal state of statement $x.a_1 \ldots a_k$ to decreased state. Then the device no longer displays the enlarge statement.

Thus far, we have presented the core of each command. We present how the user applies a command in internalized, externalized, and customized settings.

Figure 33N:
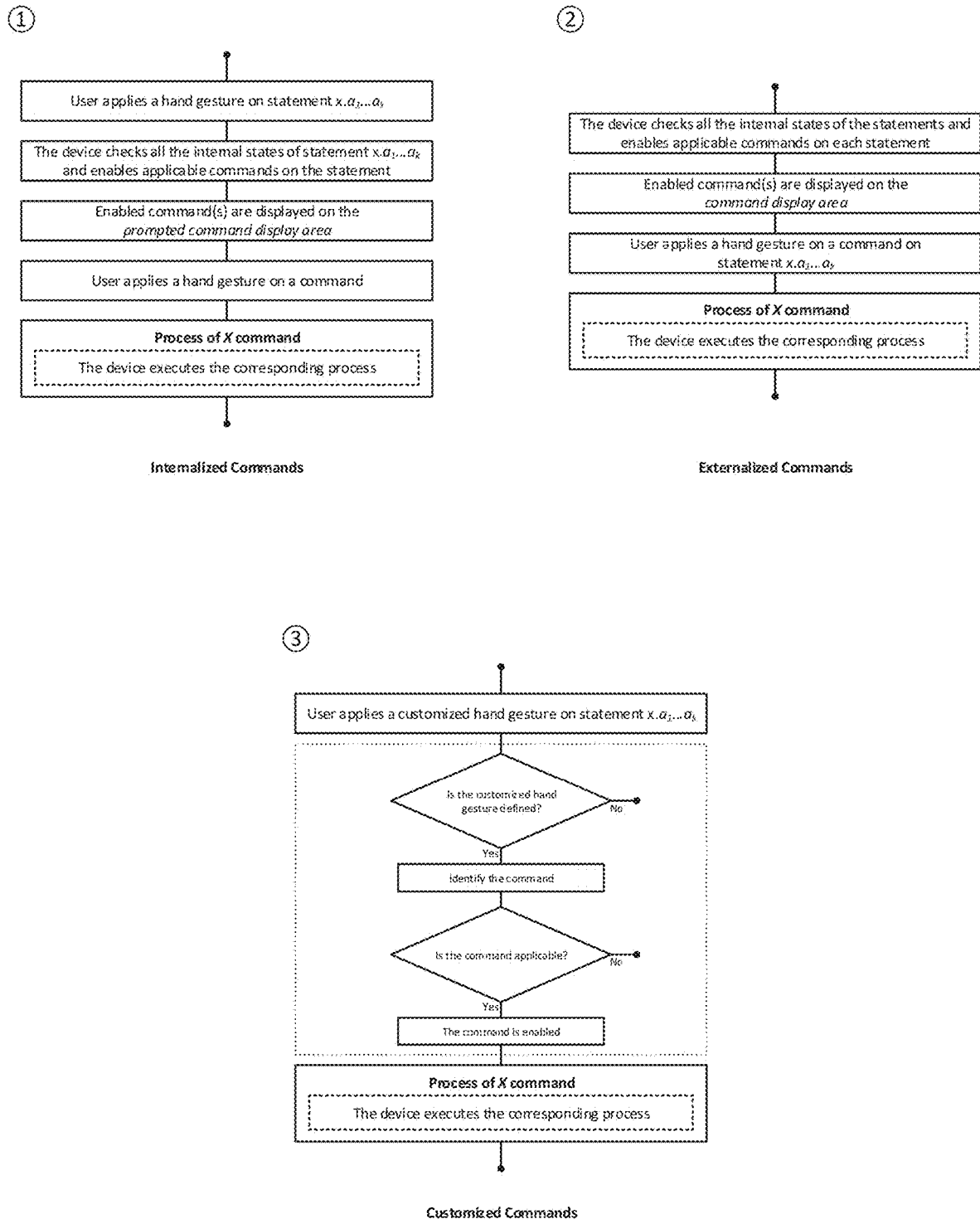
FIG. 33N consists of flowcharts illustrating methods of Internalized, Externalized, and Customized commands.

FIG. 33N illustrates the flowchart for internalized, externalized, and customized commands.

The figure in ① of FIG. 33N illustrates the flowchart of internalized commands. First, the user applies a hand gesture (predefined) on statement $x.a_1 \ldots a_k$. The device checks the internal settings of the statement and enables all the applicable commands. The device displays the prompted command display area and all the enabled commands are display in that area. The user applies a hand gesture on one of the command the user intended to apply. Finally, the Process of X command is executed (X represent the command the user had applied).

The figure in ② of FIG. 33N illustrates the flowchart of externalized commands. First, the device checks the internal settings of each statement and enables all the applicable commands. The device displays all the enabled commands on the command display area. The user applies a hand gesture on one of the command the user intended to apply. Finally, the Process of X command is executed (X represent the command the user had applied).

The figure in ③ of FIG. 33N illustrates the flowchart of customized commands. First, the user applies a customized hand gesture (predefined) on statement $x.a_1 \ldots a_k$. The device checks if the customized hand gesture is predefined (or defined). If not, the device does nothing. Otherwise, the device identifies the command and checks the internal settings and its applicability. If the command is not applicable then the device does nothing. Otherwise, the device enables the command. Finally, the Process of X command is executed (X represent the command the user had applied).

Although various exemplary embodiments of the present disclosure has been described for illustrative purposes, those skilled in the art will appreciate that various modifications, additions and substitutions are possible, without departing from the scope and spirit of the claimed invention as disclosed in the accompanying claims. Accordingly, the present disclosure is not limited to the embodiments disclosed in the specification of the present disclosure. The scope of the claimed invention is to be determined by not only the following claims but also their equivalents. Specific terms used in this disclosure and drawings are used for illustrative purposes and not to be considered as limitations of the present disclosure.

What is claimed is:

1. A device for organizing and displaying messages, the device comprising a processor, the processor being configured to:
   establish a plurality of layout modes for organizing and displaying the messages exchanged among the devices in a structured fashion;
   determine a layout mode for a chat session among the plurality of layout modes;

display the messages included in the chat session in the determined layout mode; and adjust the textbox-widths of all messages whenever a predetermined event occurs, wherein the event comprises at least one of a rotation of the device, sending or receiving of at least one message, and an input of at least one command for a scheme of displaying messages, wherein the messages include a reply message generated by specifically selecting a target message to which to respond, wherein the processor is further configured to set a command set for a scheme of displaying messages, the command set including at least Collapse, Expand, Collapse All and Expand All commands, wherein the Collapse command is configured to enable the processor to collapse the sub-statements of the statement to which the Collapse command is applied and attach an expandable symbol adjacent to the statement, the Expand command is configured to enable the processor to expand the sub-statements of the statement to which the Expand command is applied and attach a collapsible symbol adjacent to the statement, the Collapse All command is configured to enable the processor to apply the Collapse command to the selected statement and all of its sub-statements, and the Expand All command is configured to enable the processor to apply the Expand command to the selected statement and all of its sub-statements, wherein the processor is further configured to automatically expand at least some of the collapsed statements in the layout to which the newly received statement belongs while some or all of the other statements in the layout are in the collapsed state, and wherein the processor is further configured to perform a Maintain the Previous State (MPS) auto-expand command to expand only the super-statements directly related to the received statement and return the layout to the previous state before one of the super-statements was collapsed.

2. The device of claim 1, wherein:

the processor is further configured to include in at least one of the messages an expiration time set by a message creator, and to delete the message with the expiration time from all user devices participating in the chat session at the expiration time.

3. The device of claim 2, wherein the message having the expiration time is set so that a reply to the message is not allowed.

4. The device of claim 1, wherein the processor is further configured to establish a command set for a scheme of displaying messages to a type selected from the group consisting of internalized, externalized and customized types, and wherein: the internalized type is a type in which the command sets are displayed according to a user's hand gesture input on the display screen of the device; the externalized type is a type in which the command sets are displayed simultaneously with each displayed message; and the customized type is a type in which a command corresponding to the user's hand gesture input on the display screen of the device is executed without indication of the executed command.

5. The device of claim 4, wherein the command set includes at least Reply, Collapse, Expand, Delete, UBD, Hide, Show, Modify, Inver and Revert commands, each command being independently configurable to have a type among one of internalized, externalized and customized types.

6. A device for organizing and displaying messages, the device comprising a processor, the processor being configured to:

establish a plurality of layout modes for organizing and displaying the messages exchanged among the devices in a structured fashion;

determine a layout mode for a chat session among the plurality of layout modes;

display the messages included in the chat session in the determined layout mode; and adjust the textbox-widths of all messages whenever a predetermined event occurs, wherein the event comprises at least one of a rotation of the device, sending or receiving of at least one message, and an input of at least one command for a scheme of displaying messages, wherein the messages include a reply message generated by specifically selecting a target message to which to respond, wherein the processor is further configured to set a command set for a scheme of displaying messages, the command set including at least Collapse, Expand, Collapse All and Expand All commands, wherein the Collapse command is configured to enable the processor to collapse the sub-statements of the statement to which the Collapse command is applied and attach an expandable symbol adjacent to the statement, the Expand command is configured to enable the processor to expand the sub-statements of the statement to which the Expand command is applied and attach a collapsible symbol adjacent to the statement, the Collapse All command is configured to enable the processor to apply the Collapse command to the selected statement and all of its sub-statements, and the Expand All command is configured to enable the processor to apply the Expand command to the selected statement and all of its sub-statements, wherein the processor is further configured to automatically expand at least some of the collapsed statements in the layout to which the newly received statement belongs while some or all of the other statements in the layout are in the collapsed state, and wherein the processor is further configured to perform a Common Depth (CD) auto-expand command to expand only the super-statements directly related to the received statement and collapse the statements in the same depth as the received statement.

7. A device for organizing and displaying messages, the device comprising a processor, the processor being configured to:

establish a plurality of layout modes for organizing and displaying the messages exchanged among the devices in a structured fashion;

determine a layout mode for a chat session among the plurality of layout modes;

display the messages included in the chat session in the determined layout mode; and adjust the textbox-widths of all messages whenever a predetermined event occurs, wherein the event comprises at least one of a rotation of the device, sending or receiving of at least one message, and an input of at least one command for a scheme of displaying messages, wherein the messages include a reply message generated by specifically selecting a target message to which to respond, wherein the processor is further configured to set a command set for a scheme of displaying messages, the command set including at least Collapse, Expand, Collapse All and Expand All commands, wherein the Collapse command is configured to enable the processor to collapse the sub-statements of the statement to which the Collapse command is applied and attach an expandable symbol adjacent to the statement, the Expand command is configured to enable the processor to expand the sub-statements of the statement to which the Expand command is applied and attach a collapsible symbol adjacent to the statement, the Collapse All command is configured to enable the processor to apply the Collapse command to the selected statement and all of its sub-statements, and the Expand All command is configured to enable the processor to apply the Expand command to the selected statement and all of its sub-statements, wherein the processor is further configured to automatically expand at least some of the collapsed statements in the layout to which the newly received statement belongs while some or all of the other statements in the layout are in the collapsed state, and wherein the processor is further configured to perform a One Branch (OB) auto-expand command to expand only the super-statements directly related to and belonging to the same branch as the received statement and collapse all other statements in the layout.

8. A device for organizing and displaying messages, the device comprising a processor, the processor being configured to:

establish a plurality of layout modes for organizing and displaying the messages exchanged among the devices in a structured fashion;

determine a layout mode for a chat session among the plurality of layout modes;

display the messages included in the chat session in the determined layout mode; and adjust the textbox-widths of all messages whenever a predetermined event occurs, wherein the event comprises at least one of a rotation of the device, sending or receiving of at least one message, and an input of at least one command for a scheme of displaying messages, wherein the messages include a reply message generated by specifically selecting a target message to which to respond, wherein the processor is further configured to set a command set for a scheme of displaying messages, the command set including at least Collapse, Expand, Collapse All and Expand All commands, wherein the Collapse command is configured to enable the processor to collapse the sub-statements of the statement to which the Collapse command is applied and attach an expandable symbol adjacent to the statement, the Expand command is configured to enable the processor to expand the sub-statements of the statement to which the Expand command is applied and attach a collapsible symbol adjacent to the statement, the Collapse All command is configured to enable the processor to apply the Collapse command to the selected statement and all of its sub-statements, and the Expand All command is configured to enable the processor to apply the Expand command to the selected statement and all of its sub-statements, wherein the processor is further configured to automatically expand at least some of the collapsed statements in the layout to which the newly received statement belongs while some or all of the other statements in the layout are in the collapsed state, and wherein the processor is further configured to perform an Expand All (EA) auto-expand command to expand all the collapsed statements in the layout to which the newly received statement belongs.

9. The device of claim 1, wherein the processor is further configured to establish a command set for a scheme of displaying messages, the command set including Hide, Show, Hide All and Show All commands, and wherein: the Hide command is configured to enable the processor to adjust the height of the textbox of the statement to which the Hide command is applied to a default height, hide the portions of the statements beyond the default height not to be displayed, and attach a showable symbol adjacent to the statement; the Show command is configured to enable the processor to return the height of the textbox of the statement to which the Show command is applied from the default height to its original height, show the portions of the hidden statements to be displayed, and attach a hidable symbol adjacent to the statement; the Hide All command is configured to enable the processor to apply the Hide command to both the statement to which the Hide All command is applied and its sub-statements; and the Show All command is configured to enable the processor to apply the Show command to both the statement to which the Show All command is applied and its sub-statements.

10. The device of claim 1, wherein the processor is further configured to establish a command set for a scheme of displaying messages, the command set including at least Delete and Delete All, and wherein: the Delete command is configured to enable the processor to delete the texts of the statement to which the Delete command is applied; the Delete command is further configured to enable the processor to perform one of two delete methods, wherein the processor adjusts the textbox to a default height and display the empty textbox for the deleted texts in a first delete method while the processor deletes both the texts and the textbox for the texts in a second delete method; the Delete All command is configured to enable the processor to apply the Delete command to both the statement to which the Delete All command is applied and its sub-statements; and when the Delete command enables the processor to perform the second delete method, the processor, which has received a reply message for the deleted statement, displays the deleted textbox again alone or with the deleted statement.

11. The device of claim 1, wherein the processor is further configured to establish a command set for a scheme of displaying messages, the command set including at least UBD and UBD All, and wherein: the UBD command is configured to enable the processor to delete the texts of the statement to which the UBD command is applied and to transmit a request message to another user who has received the statement to delete the received statement; and the UBD All command is configured to enable the processor to apply the UBD command to both the statement to which the UBD All command is applied and its sub-statements.

12. The device of claim 11, wherein the UBD command is executed, the processor receives a decision message from the recipient of the request message.

13. The device of claim 1, wherein the processor is further configured to establish a command set for a scheme of displaying messages, the command set including at least Modify command; and the Modify command is configured to enable the processor to modify at least a portion of the statement to which the Modify command is applied and to transmit a notice message to the other users who have already received the statement that the received statement has been modified.

14. The device of claim 1, wherein the processor is further configured to establish a command set for a scheme of displaying messages, the command set including at least Invert and Revert commands, and wherein: the Invert command is configured to enable the processor to display only a leaf statement in the layout to which the Invert command is applied and to attach a revertible symbol adjacent to the layout; and the Revert command is configured to enable the processor to return the statements in the layout to which the Revert command is applied to their original state and to attach an invertible symbol adjacent to the layout.

15. The device of claim 1, wherein the processor is further configured to establish a command set for a scheme of displaying messages, the command set including at least Increase and Decrease commands, and wherein: the Increase command is configured to enable the processor to increase font, textbox width and textbox size of the statement to which the Increase command is applied and to attach a decreasable symbol adjacent to the statement; and the Decrease command is configured to enable the processor to decrease font, textbox width and textbox size of the statement to which the Decrease command is applied and to attach an increasable symbol adjacent to the statement.

* * * * *